(12) United States Patent
Brechtel et al.

(10) Patent No.: US 12,530,330 B2
(45) Date of Patent: Jan. 20, 2026

(54) SYSTEMS AND METHODS FOR REVIEW AND MERGER OF TEXTUAL NOTATION FILES OF COMPLEX HARDWARE SYSTEMS MODEL IN POST-CLOUD ENGINEERING DATA MANAGEMENT INFRASTRUCTURE

(71) Applicant: Prewitt Ridge, Inc., Los Angeles, CA (US)

(72) Inventors: Charles Ezekial Brechtel, Culver City, CA (US); Jonathan Thomas, Dripping Springs, TX (US); Michael Karric, Los Angeles, CA (US); Steven Richard Massey, Los Angeles, CA (US); Cassandra Silva, Austin, TX (US); Pablo Sanfilippo, Santa Fe (AR)

(73) Assignee: Prewitt Ridge, Inc., Los Angeles, CA (US)

( * ) Notice: Subject to any disclaimer, the term of this patent is extended or adjusted under 35 U.S.C. 154(b) by 0 days.

(21) Appl. No.: 19/017,310

(22) Filed: Jan. 10, 2025

(65) Prior Publication Data

US 2025/0298609 A1 Sep. 25, 2025

Related U.S. Application Data

(60) Provisional application No. 63/690,264, filed on Sep. 3, 2024, provisional application No. 63/645,939, filed
(Continued)

(51) Int. Cl.
*G06F 16/21* (2019.01)
*G06F 8/71* (2018.01)
(Continued)

(52) U.S. Cl.
CPC .............. *G06F 16/219* (2019.01); *G06F 8/71* (2013.01); *G06F 8/73* (2013.01); *G06F 40/197* (2020.01); *G06F 40/211* (2020.01); *G06F 40/284* (2020.01)

(58) Field of Classification Search
CPC ............ G06F 8/71; G06F 8/73; G06F 16/219; G06F 40/197; G06F 40/211; G06F 40/284
See application file for complete search history.

(56) References Cited

U.S. PATENT DOCUMENTS 6,983,227 B1 * 1/2006 Thalhammer-Reyero ................... G16B 50/20 703/2
7,020,697 B1 3/2006 Goodman et al.
(Continued)

FOREIGN PATENT DOCUMENTS

WO 2022221927 A1 10/2022

OTHER PUBLICATIONS

International Search Report and Written Opinion from corresponding PCT Application No. PCT/US2025/020718 dated May 15, 2025.

*Primary Examiner* — Douglas M Slachta
(74) *Attorney, Agent, or Firm* — Sale LLP

(57) ABSTRACT

The present disclosure provides a system for modifying a model of a complex hardware system. The system includes one or more memories configured to store computer-executable instructions and one or more processors configured to execute the instructions. The system is configured to submit a pull request to a distributed version control system comprising snapshots of the model stored in text notation, receive a first snapshot in text notation, perform a transform operation to generate a transform of the first snapshot for graphical display in an engineering application, display the transform via a user interface, generate a modified version of the first snapshot in response to user inputs, and store the
(Continued)

modified version in the one or more memories. The system enables efficient modification and management of complex hardware system models using distributed version control and graphical engineering applications.

19 Claims, 72 Drawing Sheets

Related U.S. Application Data on May 12, 2024, provisional application No. 63/568,320, filed on Mar. 21, 2024.

(51) Int. Cl.
*G06F 8/73* (2018.01)
*G06F 40/197* (2020.01)
*G06F 40/211* (2020.01)
*G06F 40/284* (2020.01)

(56) References Cited

U.S. PATENT DOCUMENTS

| | | | | |
|---|---|---|---|---|
| 7,987,444 | B2 * | 7/2011 | Fuller, III | H04L 67/12 |
| | | | | 717/172 |
| 8,195,709 | B2 * | 6/2012 | Pulfer | G06Q 10/06 |
| | | | | 707/802 |
| 8,453,112 | B1 * | 5/2013 | Brambley | G06F 8/71 |
| | | | | 717/113 |
| 9,116,899 | B2 * | 8/2015 | Cullen | G06F 8/65 |
| 9,430,229 | B1 * | 8/2016 | Van Zijst | G06F 9/3844 |
| 9,817,931 | B1 * | 11/2017 | Gu | G06F 30/3308 |
| 10,452,366 | B2 * | 10/2019 | Daniel | G06F 8/36 |
| 11,010,702 | B1 * | 5/2021 | Shah | G06Q 10/0635 |
| 11,048,773 | B1 | 6/2021 | Gokhan et al. | |
| 11,537,598 | B1 * | 12/2022 | Yu | G06N 20/20 |
| 12,333,228 | B1 * | 6/2025 | Roper, Jr. | G06F 8/36 |
| 2006/0168577 | A1 * | 7/2006 | Melo | G06F 8/71 |
| | | | | 717/168 |
| 2008/0126070 | A1 * | 5/2008 | Copty | G06F 8/72 |
| | | | | 703/22 |
| 2010/0115490 | A1 * | 5/2010 | Wilcock | G06F 8/10 |
| | | | | 717/104 |
| 2011/0113359 | A1 | 5/2011 | Massey et al. | |
| 2012/0221315 | A1 * | 8/2012 | Yanoo | G06F 9/44505 |
| | | | | 703/21 |
| 2012/0265507 | A1 * | 10/2012 | Carbajales | G06Q 10/067 |
| | | | | 703/6 |
| 2015/0356207 | A1 * | 12/2015 | Reitman | G06F 30/15 |
| | | | | 703/1 |
| 2018/0189369 | A1 * | 7/2018 | Baek | G06F 40/197 |
| 2018/0351819 | A1 * | 12/2018 | Mohanram | H04L 41/142 |
| 2020/0134374 | A1 * | 4/2020 | Oros | G06N 20/00 |
| 2020/0201625 | A1 * | 6/2020 | Kryzhanovsky | G06F 8/71 |
| 2020/0379956 | A1 * | 12/2020 | Mendo Hernandez | |
| | | | | G06F 16/13 |
| 2023/0274094 | A1 * | 8/2023 | Tunstall-Pedoe | G06F 40/30 |
| | | | | 704/9 |
| 2024/0193051 | A1 * | 6/2024 | Waplington | G06F 11/3003 |

\* cited by examiner

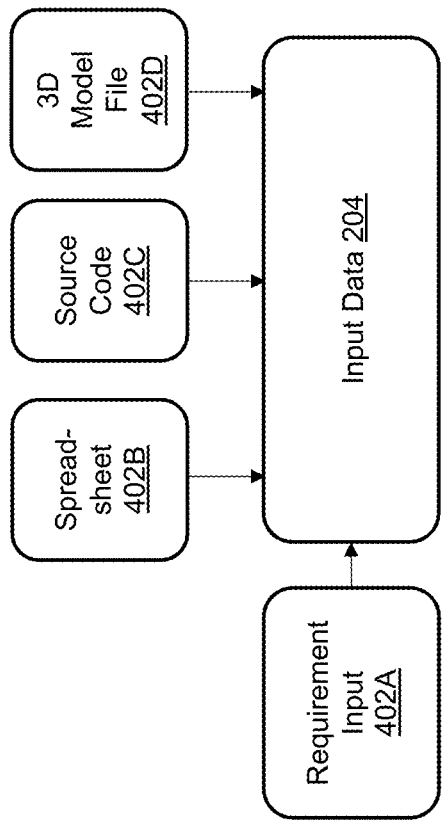
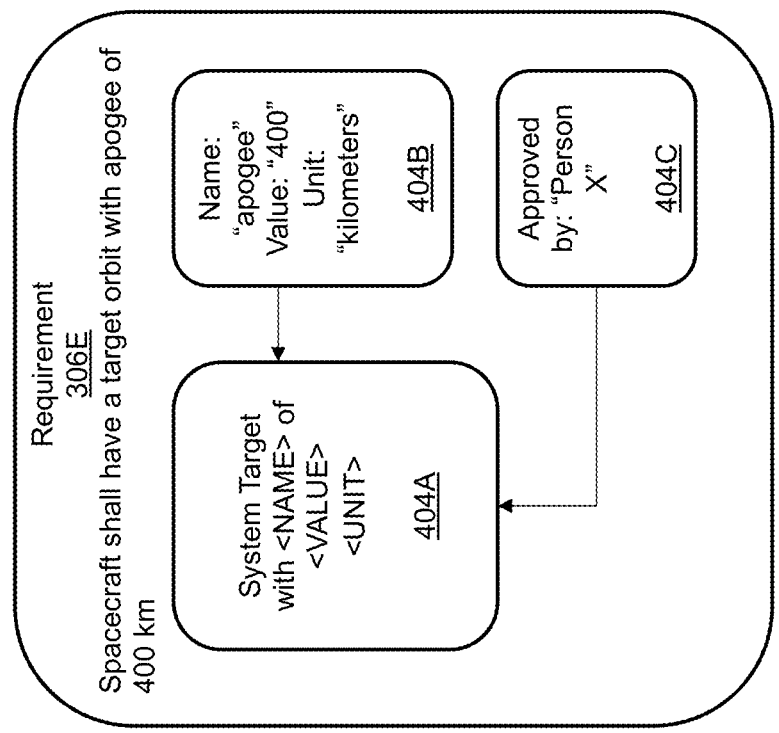
400A  FIG. 4A
400B  FIG. 4B

Stage 2: Model Generation - Graph to Model Language Format

⊙ Sun Sensor Verification

System ID: 111

User Defined ID

⊖ Unverified    ⊘ Draft

Description

| H1 | H2 | H3 | B | *I* | U | S | ≡ | ≡ | ≡ | 🖼 |

Accusantium sed conséquuntur eius, sapiente neque amet sit, impedit voluptas iste modi aspernatur similique perspiciatis sequi, in facere voluptates a et nihil consequatur enim velit quasi labore, Ad sed earum blanditiis delectus alias numquam deleniti cupiditate suscipit libero, minima magnam vel aperiam quae similique saepe earum perspiciatis ex sapiente veniam, modi enim voluptatem perferendis doloribus itaque non quae?

Ⓐ                                                                                           Ⓑ

Attachments         1806        Loading...   [Save]  [Cancel]

⤴ Browse files

Owner
 No Owner

Categories                                                      ⋮

(VE: Inspection)

Relationships                                                   +

Data

⚛ Atomics  [+ New Atomic]

No atomics

🔗 Remote Resources  [+ New Resource]

```
Drag Remote Resource URL here
```

Testing — 1810

✏ Reviews

[👥 Reviewers]

No reviewers requested

⊖ Verification

| Method | Status |
|---|---|
| Inspection ▾ | Unverified ▾ |

Ⓑ

Activity — 1812

History  [Comments]  All

```
Leave a comment...
```

[Add Comment]

FIG. 18 (Cont'd)

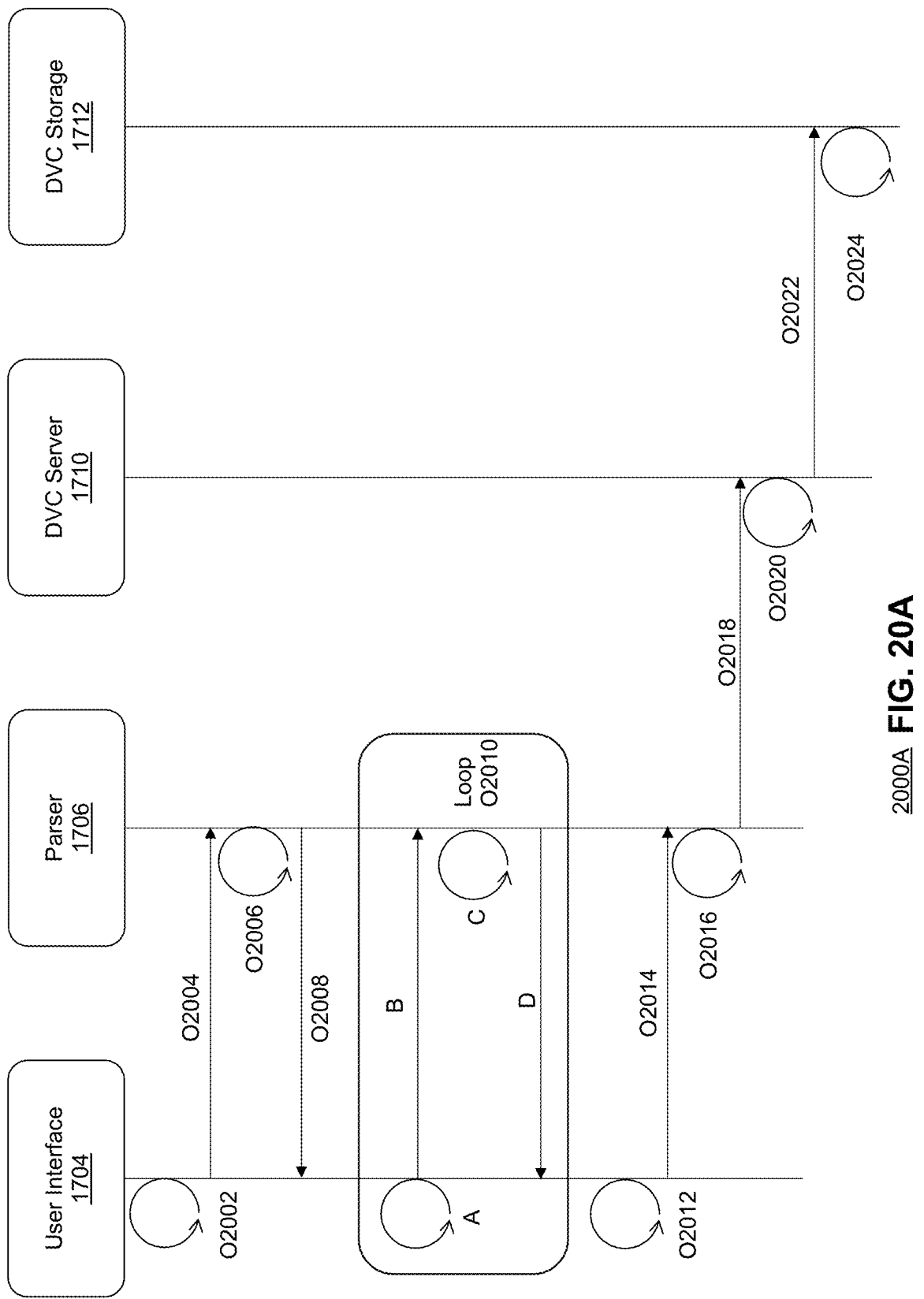

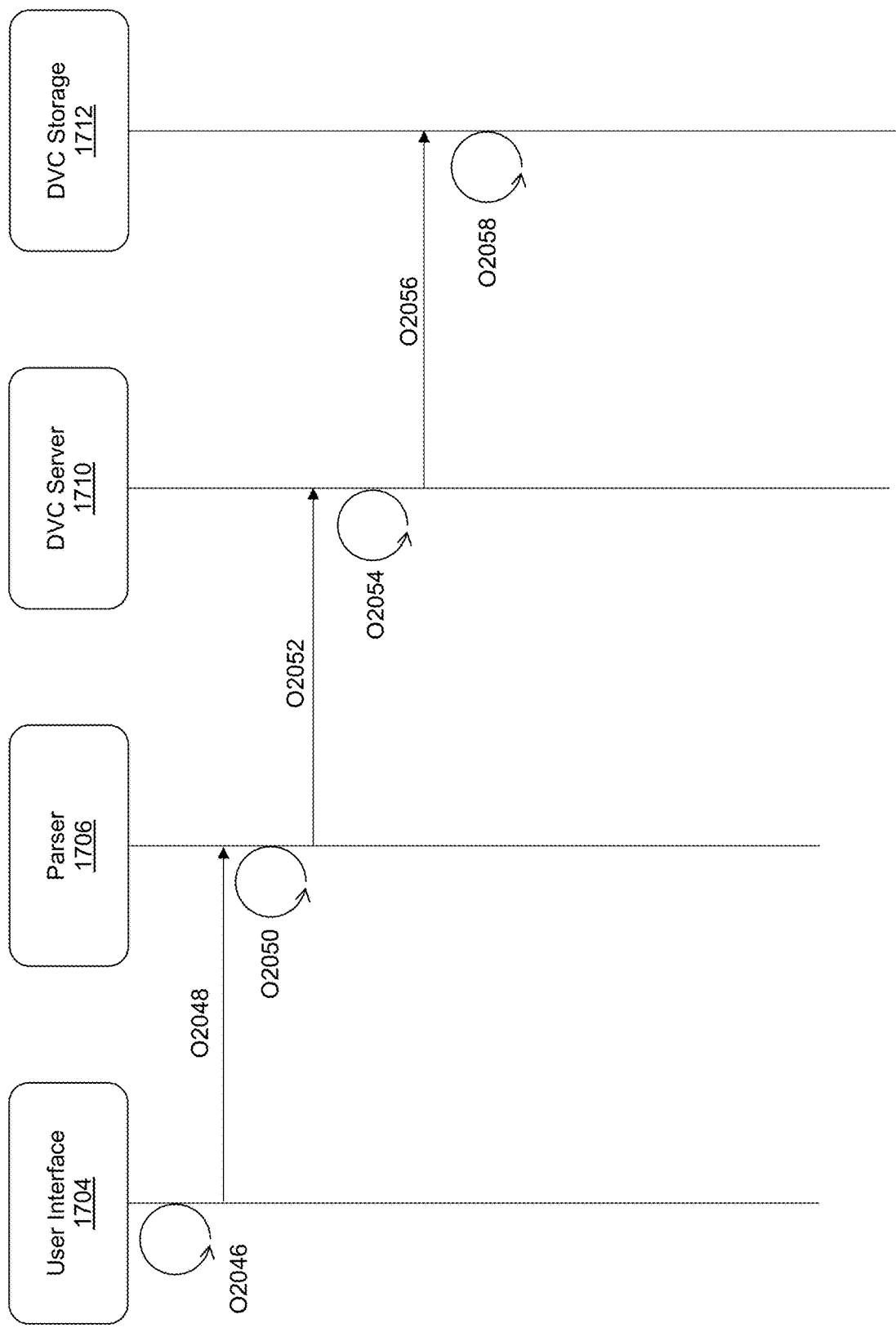

FIG. 23B

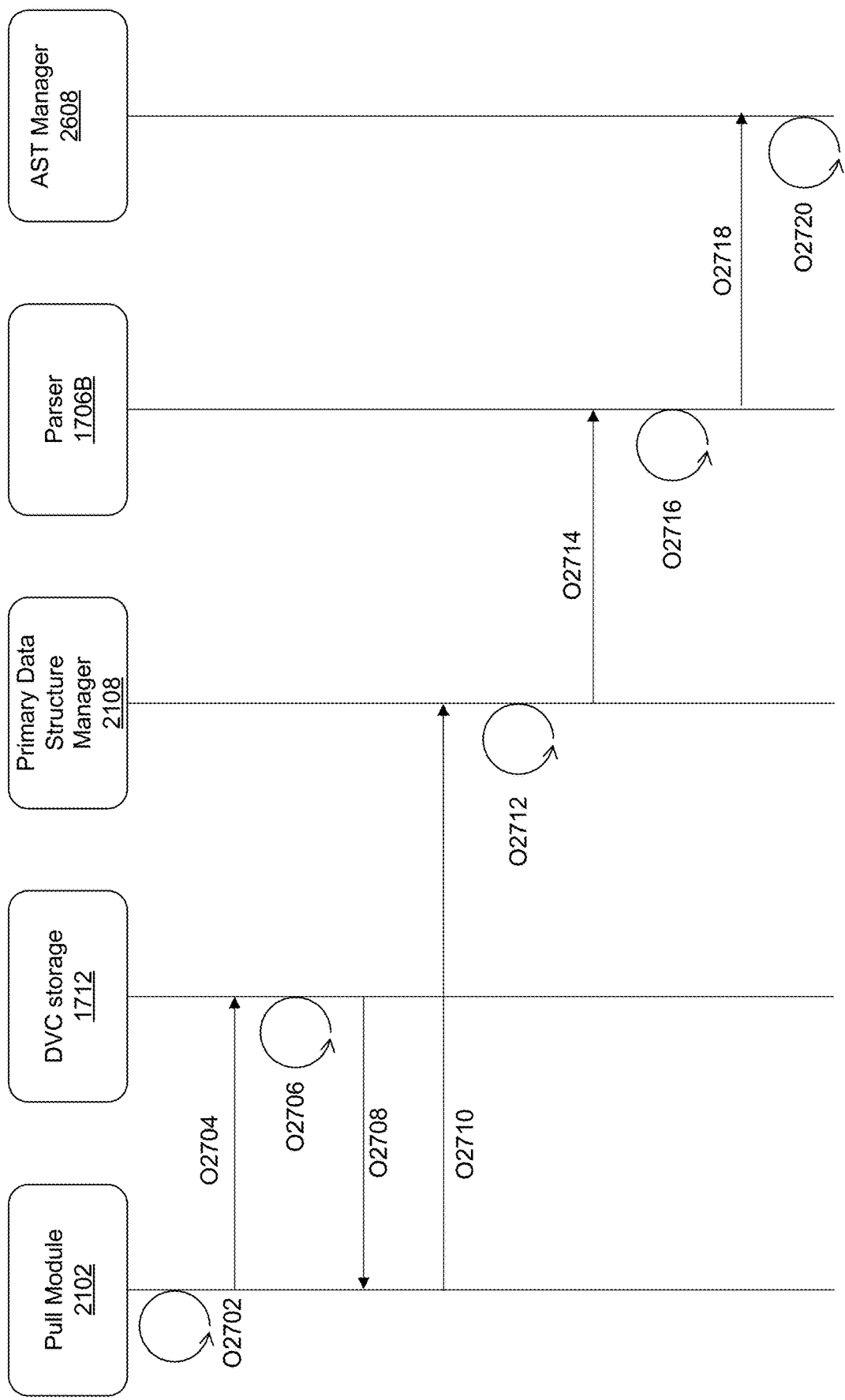

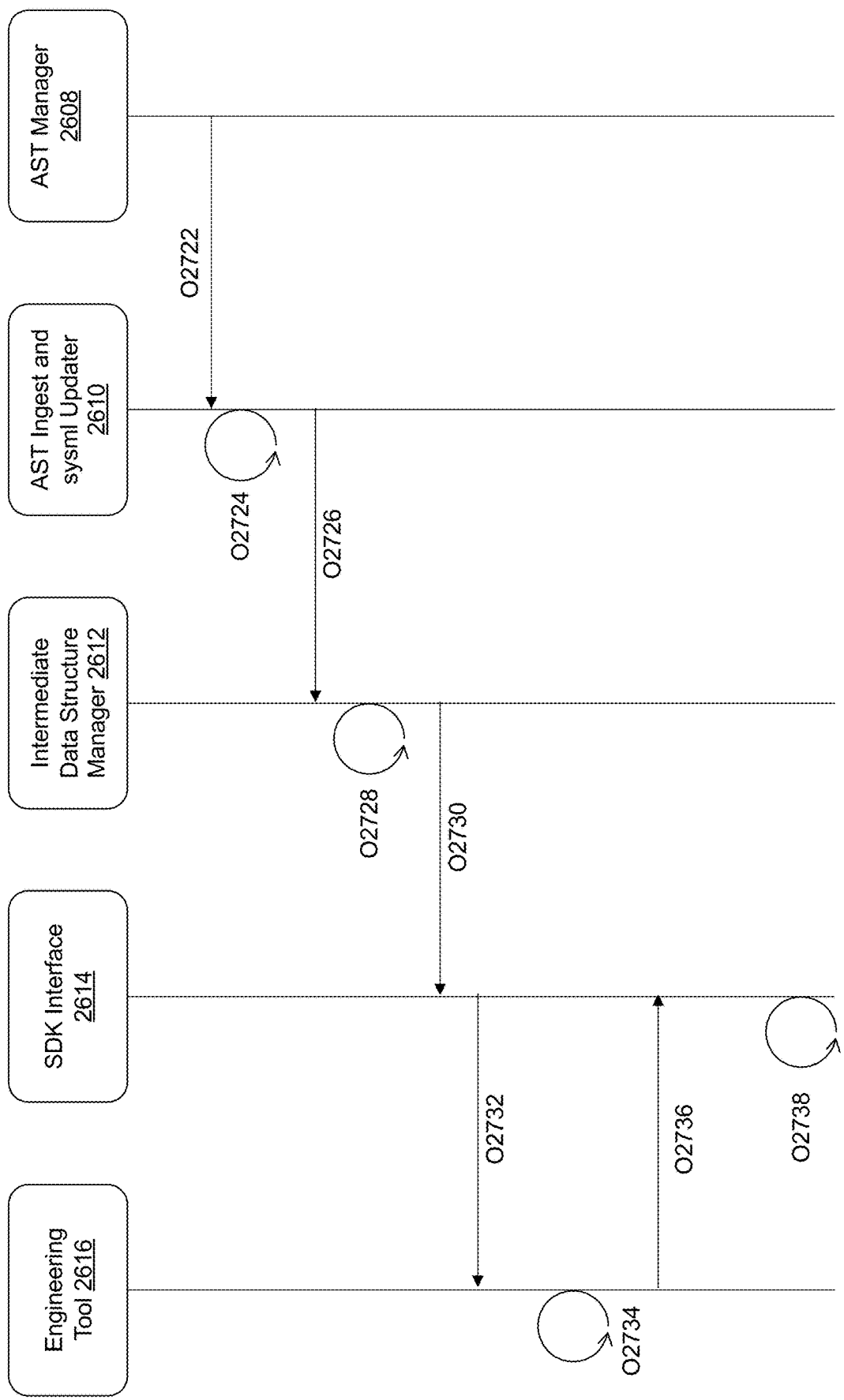

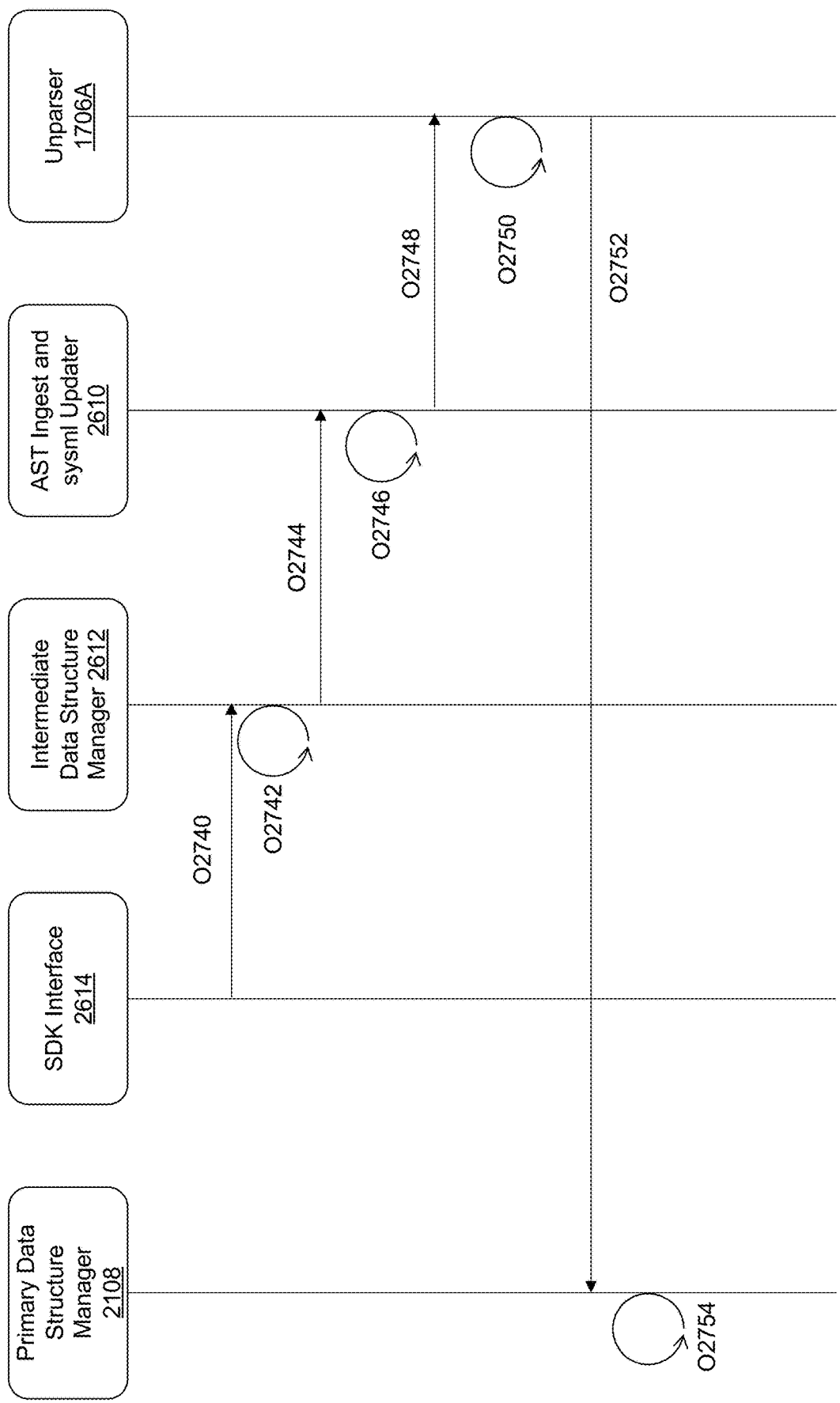

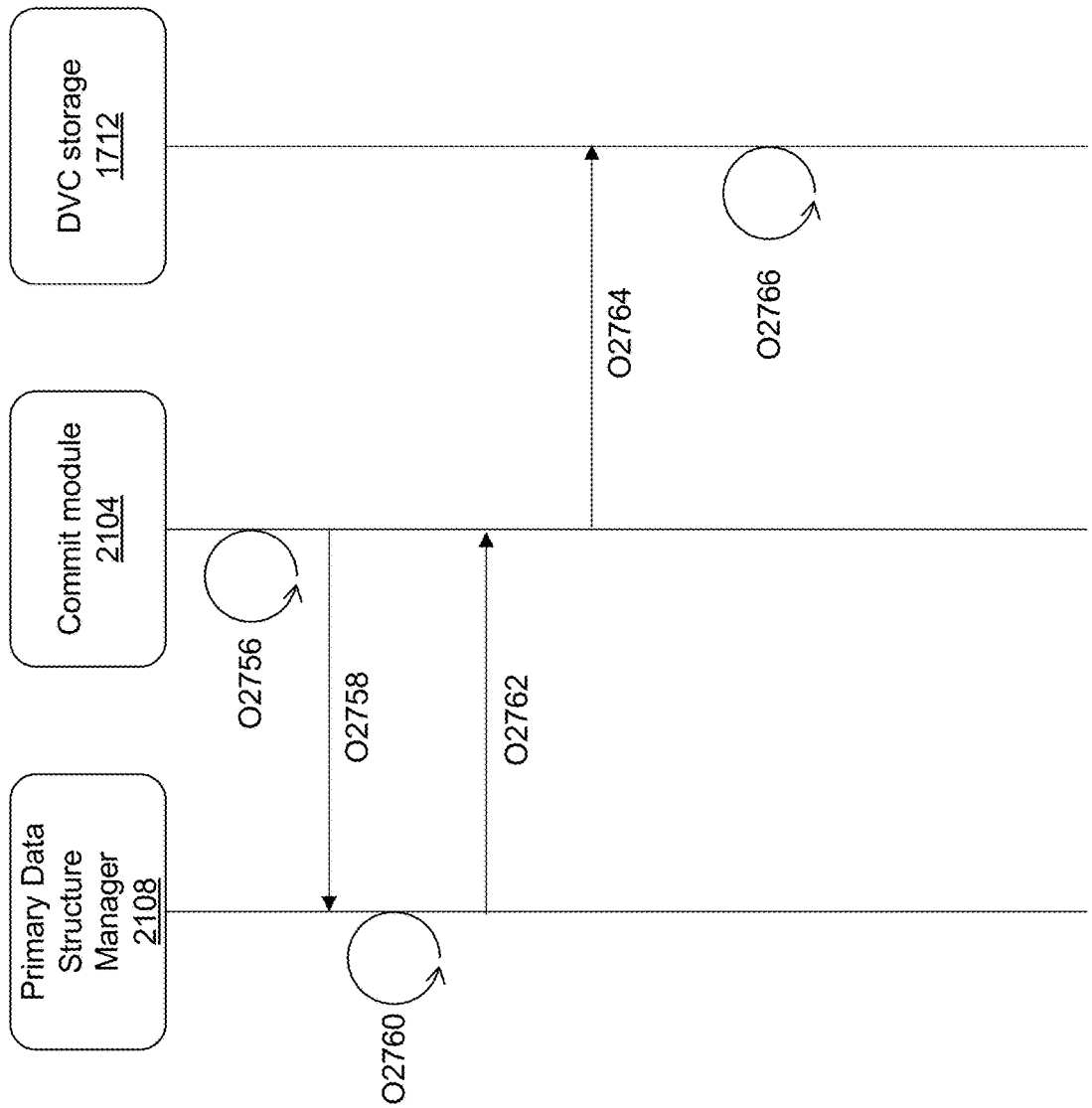

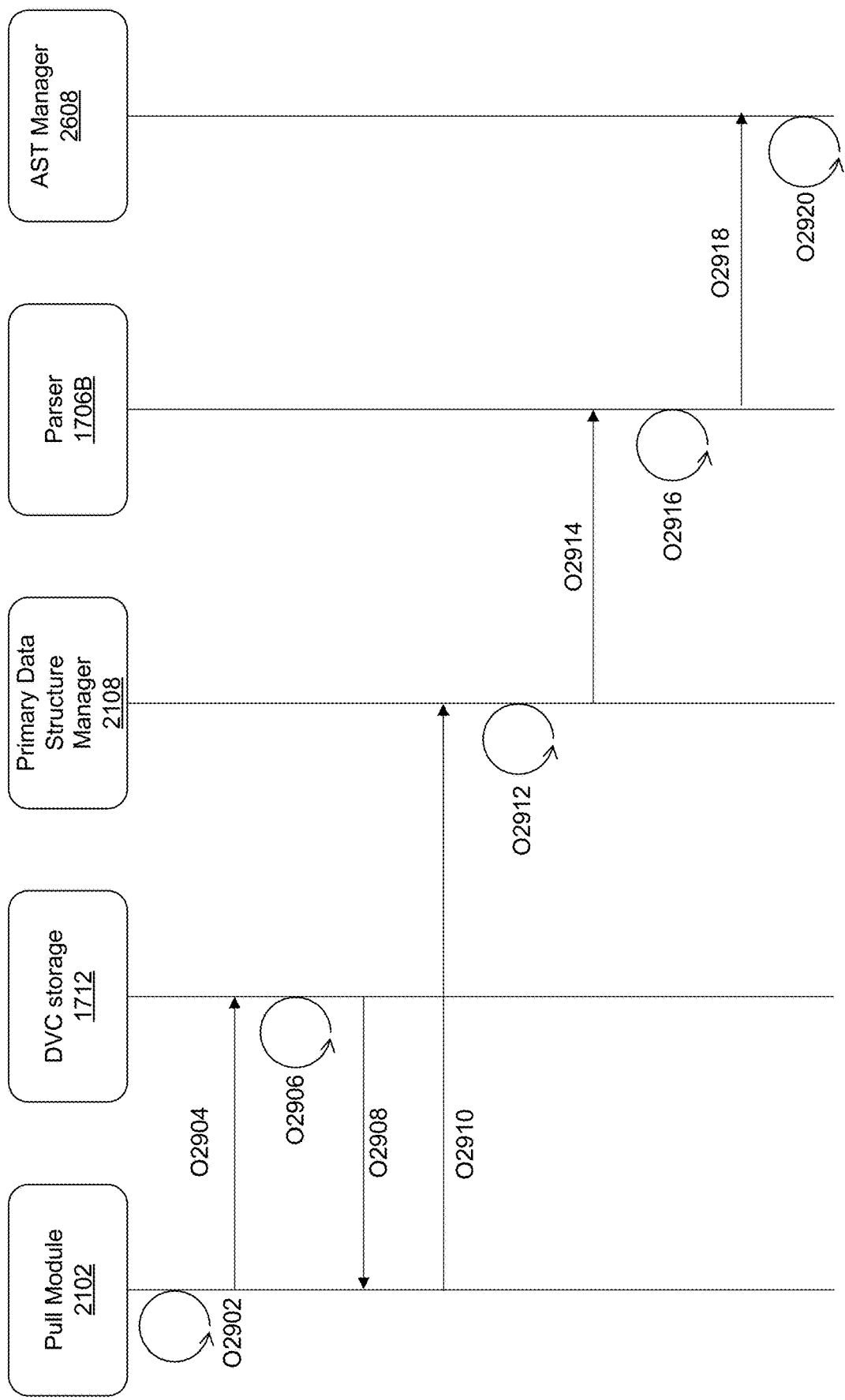

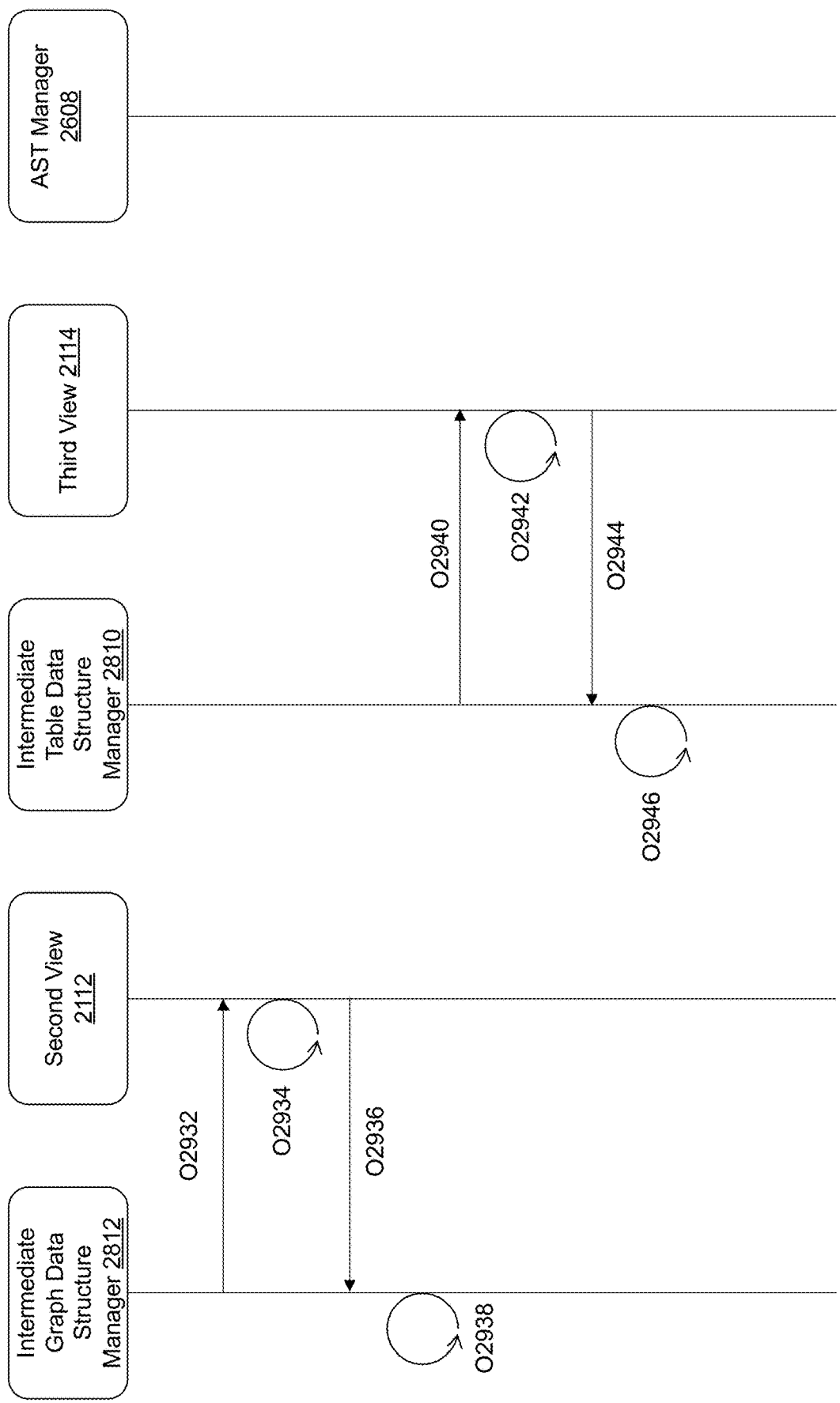

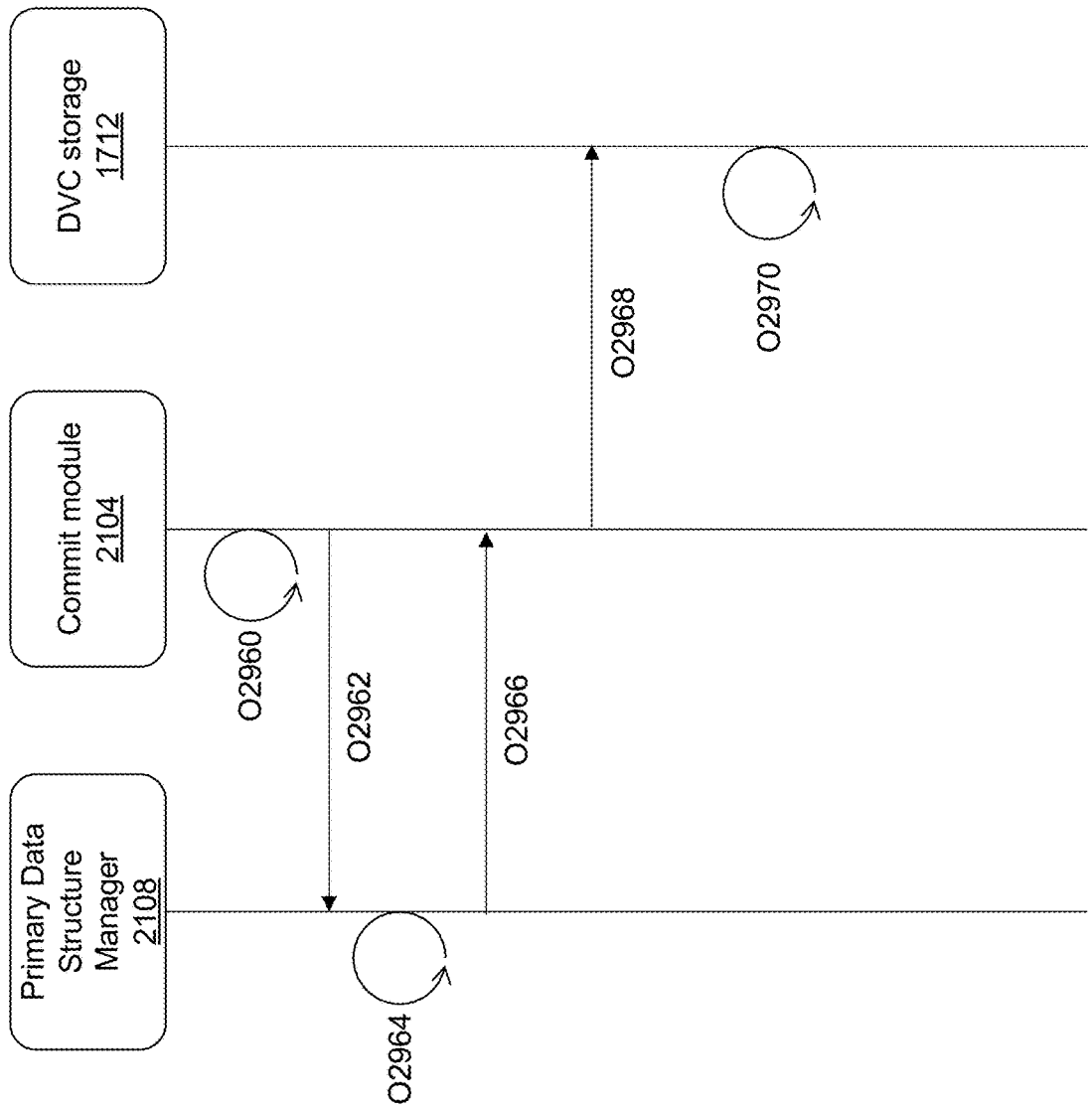

ridge-app / Merge requests / 1290 to merge S6-414 into main 31 minutes ago

Pipelines [1]  Charges [2]

net/browse/SG-414

604568 failed 

for 381839e3 25 minutes ago from eligible users and Coverage-Check.

no new licenses new potential vulnerabilities 

be given.

draft.

Squash commits ?  ☐ Edit commit message behind the target branch. 1 commit and 1 merge commit will be added to when all merge check pass ?

@jonathan-prewittridge 31 minutes ago

FIG. 32A (Cont'd)

Sixth Review/Merge UX 3200F

PrewittRidge / Experiments / big-sur / ridge-app

Draft: Subsystem update
(Open) Jonathan Thomas requested to merge

Overview [0] Commits [1] Pipelines [1] Charges

Compare main ⌄ and latest version ⌄

Files 2

Search (e.g. *.vue) (XP)

ui/src/components
  System          +5 -8
  - Subsystem    +46 -35

Metrics:
subsystems
# of changes

Semantic Data:
Explanation Text of diffs

Comment
Thread:
Comment #1 ui/src/com

≡ Filters
ID
1.
1.1

—A

Project
R ridge-app
  ★ Pinned          ⌄
    Issues          ②
  Manage           >
  Plan             >
  </> Code         ⌄
  Merge requests  3
  Repository
  Branches
  Commits
  Tags
  Repository graph
  Compare revisions
  Snippets
  Locked files
  Build            >
  Secure           >
  Deploy           >
  Operate          >
  Monitor          >
  Help

SysGit

- Projects
- Requirements
- System
- Dependencies
- Version Control
- Settings
- Integrations
- Profile
- Logout Pull request I 43
Merge 6 changes from ⌥ Launch params into main There are Conflicts between this branch and main that must be resolved before merge. [Resolve]

*Conflict indicator 3330*

Name (required)
Launch parameters

Overview
Added launch requirements to the vehicle.

Reviewers
- Character actress margot martind
- Bela lugosi

Commits [Changes]

1 changed package with 2 additions 2 edits and 2 deletions nostromo/requirements.sysml ▾

| S. | Name | Name | Doc | Rationale | Related |
|---|---|---|---|---|---|
| 2 | REQ-2 | SpacecraftMass | The spacecraft mass shall be less than 200kg. | It's heavy | |
| 3 | REQ-3 | SpacecraftOrbitRequirements | | | Derives REQ-1 |
| 4 | REQ-4 | ApogeePerigee | The spacecraft orbit shall have an apogee of 750 +/- 50 km. The spacecraft shall have a perigee of 725 +/- 25 km. | ~~This is the~~ suggested ~~value per astro.~~ | Allocates REQ-4 REQ-5 ~~Allocates REQ-4~~ |
| 5 | REQ-5 | Inclination | The spacecraft orbit shall have an inclination of 98.5 +/- 0.5 degrees. | | |
| 6 | ~~REQ-6~~ | ~~Habitation for cat~~ | ~~There shall be a dedicated 2m^2 living area for one cat.~~ | Defined by the MIL specification ~~ASPCA said we could.~~ | Is allocated to REQ-3 |
| 6.1 | REQ-7 | Power Consumption | The spacecraft shall consume less than 100 W of power. | | |

[Merge]

*Merge conflict UX 3300E*

SYSTEMS AND METHODS FOR REVIEW AND MERGER OF TEXTUAL NOTATION FILES OF COMPLEX HARDWARE SYSTEMS MODEL IN POST-CLOUD ENGINEERING DATA MANAGEMENT INFRASTRUCTURE

CROSS-REFERENCE TO RELATED APPLICATION(S)

This application claims the benefit of: U.S. Provisional Application No. 63/690,264, filed Sep. 3, 2024, entitled "Systems and Methods for Post-Cloud Engineering Data Management Infrastructure Using Distributed Version Control;" U.S. Provisional Application No. 63/645,939, filed May 12, 2024, entitled "System and Methods for Client Application for Distributed Version Control of Engineering Data;" and U.S. Provisional Application No. 63/568,320, filed Mar. 21, 2024, entitled "System and Methods for Client-and-Server Infrastructure for Distributed Version Control of Engineering Data."

The contents of each of the above referenced applications are hereby incorporated by reference in its entirety.

TECHNICAL FIELD

Various aspects of the present disclosure relate generally to systems and methods for systems engineering and, more particularly, to systems and methods for a post-cloud engineering data management infrastructure using distributed version control.

BACKGROUND

In the realm of engineering and systems design, particularly in the context of complex hardware systems, managing and modifying system models efficiently is crucial. These systems often involve intricate interactions and dependencies, which can be challenging to track and update without sophisticated tools. Traditionally, engineers and system designers have relied on various forms of version control systems to manage changes in system models. However, these systems typically handle files and code changes without providing deeper insights into the specific content of engineering models.

The present disclosure is directed to overcoming one or more of these above-referenced challenges.

SUMMARY OF THE DISCLOSURE

According to certain aspects of the disclosure, systems, methods, and computer readable memory are disclosed for post-cloud engineering data management infrastructure using distributed version control.

In some cases, a system for modifying a model of a complex hardware system may include: one or more memories configured to store computer-executable instructions; and one or more processors configured to execute the computer-executable instructions. The system may be configured to: submit, by a client application, a pull request to a distributed version control system, the distributed version control system comprising a plurality of snapshots of the model of the complex hardware system, the snapshots being stored in the distributed version control system in a text notation; receive, from the distributed version control system, a first snapshot of the model of the complex hardware system, the first snapshot being in the text notation; perform a transform operation to the first snapshot of the model of the complex hardware system, thereby generating a transform of the first snapshot, the transform of the first snapshot being in a format configured for graphical display in an engineering application; display, via a user interface of the engineering application, the transform of the first snapshot; in response to user inputs received via the user interface of the engineering application, generate a modified version of the first snapshot of the model of the complex hardware system; and store the modified version of the first snapshot of the model of the complex hardware system in the one or more memories.

In some cases, a system for modifying a model of a complex hardware system may include: one or more memories configured to store computer-executable instructions; and one or more processors configured to execute the computer-executable instructions. The system may be configured to: obtain, from a distributed version control system, a first snapshot of the model of the complex hardware system, wherein the first snapshot is in a text-based systems modeling language; parse a text of the first snapshot in the systems modeling language to generate an intermediate data structure, wherein the intermediate data structure is configured to be loaded and manipulated by an engineering application; store the intermediate data structure in the one or more memories; modify, via a user interface of the engineering application, the intermediate data structure based on user inputs, thereby generating a modified version of the intermediate data structure; store the modified version of the intermediate data structure in the one or more memories; access the modified version of the intermediate data structure; based on the modified version of the intermediate data structure, generate a modified version of the first snapshot of the model of the complex hardware system, wherein the modified version of the first snapshot is in the text-based systems modeling language; and store the modified version of the first snapshot of the model of the complex hardware system in the one or more memories.

In some cases, a system for modifying a model of a complex hardware system may include: one or more memories configured to store computer-executable instructions; and one or more processors configured to execute the computer-executable instructions. The system may be configured to: obtain, from a distributed version control system, a first snapshot of the model of the complex hardware system, the first snapshot being in a text-based systems modeling language; based on the first snapshot of the model of the complex hardware system, generate an intermediate data structure, the intermediate data structure being configured to be loaded and manipulated by an engineering application; store the intermediate data structure in the one or more memories; access a modified version of the intermediate data structure, wherein the modified version of the intermediate data structure is modified by the engineering application based on user inputs received via the engineering application; transform the modified version of intermediate data structure, thereby generating a modified version of the first snapshot of the model of the complex hardware system, wherein the modified version of the first snapshot is in the text-based systems modeling language; and store the modified version of the first snapshot of the model of the complex hardware system in the one or more memories.

In some cases, a system for modifying a model of a complex hardware system may include: one or more memories configured to store computer-executable instructions; and one or more processors configured to execute the computer-executable instructions. The system may be configured to: obtain, from a distributed version control system, a first snapshot of the model of the complex hardware system, wherein the first snapshot is in a text-based systems modeling language; based on the first snapshot of the model of the complex hardware system, generate an intermediate data structure, wherein the intermediate data structure is configured to be loaded and manipulated by an engineering application; store the intermediate data structure in the one or more memories; access a modified version of the intermediate data structure, wherein the modified version of the intermediate data structure is modified by the engineering application based on user inputs received via the engineering application; based on the modified version of the intermediate data structure, generate a modified version of the first snapshot of the model of the complex hardware system, wherein the modified version of the first snapshot is in the text-based systems modeling language; store the modified version of the first snapshot of the model of the complex hardware system in a staging environment; and in response to a commit input from a user, store, in the distributed version control system, the modified version of the first snapshot of the complex hardware system as a second snapshot of the first snapshot of the complex hardware system.

In some cases, a system for modifying a model of a complex hardware system may include: one or more memories configured to store computer-executable instructions; and one or more processors configured to execute the computer-executable instructions. The system may be configured to: obtain, from a distributed version control system, a first snapshot of the model of the complex hardware system, wherein the first snapshot being in a text-based systems modeling language; based on the first snapshot of the model of the complex hardware system, generate an intermediate data structure, wherein the intermediate data structure is configured to be loaded and manipulated by an engineering application; store the intermediate data structure in the one or more memories; access a modified version of the intermediate data structure, wherein the modified version of the intermediate data structure is modified by the engineering application based on user inputs received via the engineering application; based on the modified version of the intermediate data structure, generate a modified version of the first snapshot of the model of the complex hardware system, wherein the modified version of the first snapshot is in the text-based systems modeling language; perform a comparison of the first snapshot of the model of the complex hardware system to the modified version of the first snapshot of the model of the complex hardware system, thereby generating a diff; and based on the diff, display changes between the first snapshot of the model of the complex hardware system and the modified version of the first snapshot of the model of the complex hardware system.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIGS. 4A and 4B depict block diagrams schematically showing exemplary input data types and requirements.

FIGS. 20A-20C depict dataflow diagrams of the client-and-server infrastructure for capturing, storing, and managing engineering data using distributed version control.

FIG. 27A depicts a dataflow diagram of a file retrieval and parsing process, in accordance with example embodiments.

FIG. 27B illustrates a dataflow diagram of a system for managing and processing engineering data, according to an embodiment.

FIG. 27C depicts a dataflow diagram for updating and processing data structures in a software system, according to aspects of the present disclosure.

FIG. 27D illustrates a dataflow diagram depicting the commit process in a distributed version control system, in accordance with example embodiments.

FIG. 29A depicts a dataflow diagram for retrieving and parsing a file from a distributed version control system, according to an embodiment.

FIG. 29C depicts a dataflow diagram showing interactions between data structure managers and views, according to an embodiment.

FIG. 29E depicts a dataflow diagram of a commit process in a distributed version control system, according to an embodiment.

FIG. 33D depicts a review pull request interface for a system modeling application, according to aspects of the present disclosure.

FIG. 33E illustrates a merge conflict interface for a version control system, in accordance with example embodiments.

DETAILED DESCRIPTION

In general, the present disclosure is directed to methods and systems for post-cloud engineering data management infrastructure using distributed version control. The field of systems engineering is inherently complex, involving the integration of various disciplines and components to create a cohesive and functional whole. This complexity is compounded by the rapid advancement of technology and the increasing demand for sophisticated systems that operate seamlessly across multiple platforms and environments. The challenges faced in systems engineering are multifaceted, ranging from the management of intricate multi-dimensional relationships to the documentation and validation of latent relationships among system components.

Addressing these challenges requires innovative solutions that can streamline the systems engineering process, enhance the accuracy of documentation, and facilitate the identification and management of both explicit and latent relationships. The present disclosure introduces novel systems and methods that address some or all of these challenges.

1. Environment

Figure 1:
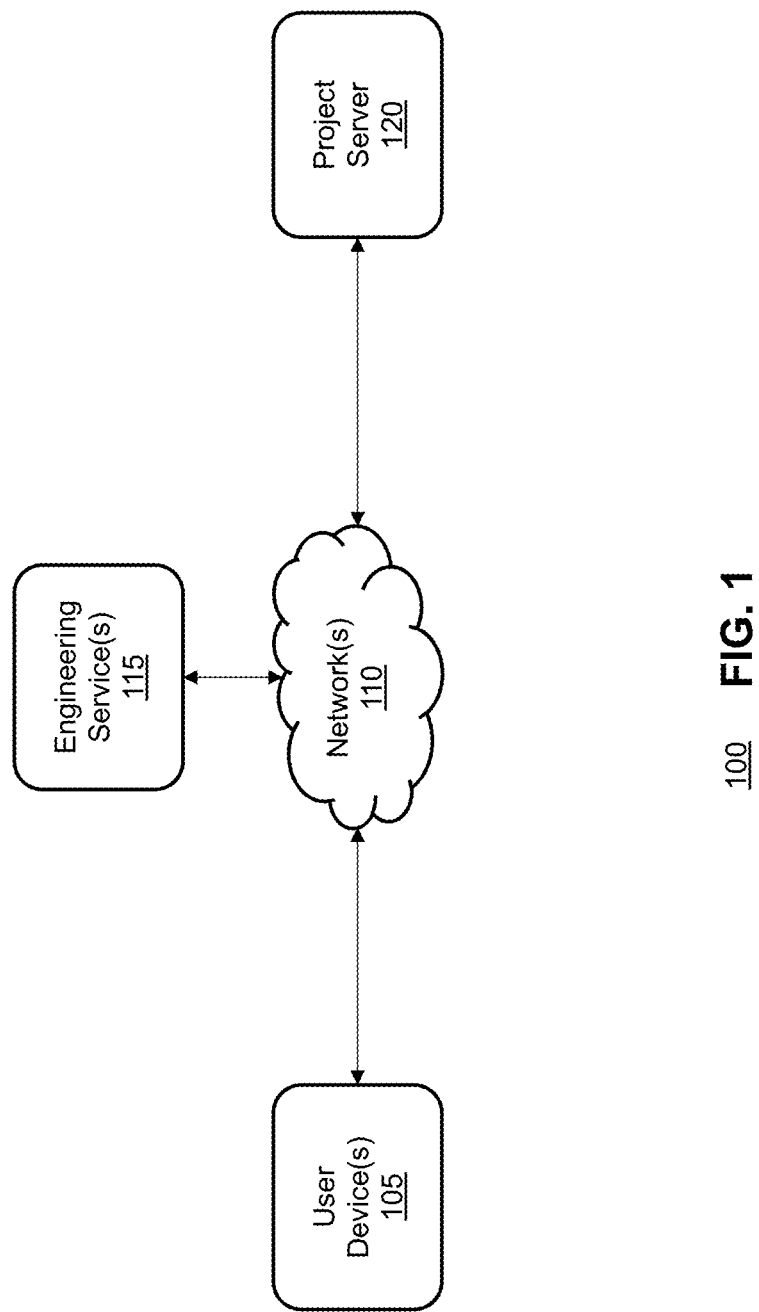
FIG. 1 depicts an example environment for systems engineering.

FIG. 1 shows an example environment 100 for systems engineering. The environment 100 may include user device(s) 105, network(s) 110, engineering service(s) 115, and a project server 120.

The user device(s) 105 ("user device 105" for case of reference) may be a personal computing device, such as a cell phone, a tablet, a laptop, or a desktop computer. In some cases, the user device 105 may be an extended reality (XR) device, such as a virtual reality device, an argument reality device, a mixed reality device, and the like. In some cases, the user device 105 may be associated with a user (e.g., an engineer/software developer of a project). The user may have a user account associated with the user device 105 that uniquely identifies the user (e.g., within the project server 120). Additional features of the user device 105 and interactions with other devices are described below.

The network(s) 110 may include one or more local networks, private networks, enterprise networks, public networks (such as the internet), cellular networks, and satellite networks, to connect the various devices in the environment 100. Generally, the various devices of the environment 100 may communicate over network(s) 110 using, e.g., network communication standards that connect endpoints corresponding to the various devices of the environment 100.

The engineering service(s) 115 ("engineering service 115" for ease of reference) may be local (e.g., on a user device 105) or cloud services for engineering or software services. For instance, engineering or software services may include: (1) simulation software, CAD software, FEA software, electronics modeling software, orbital mechanics software, chemical reactions software, and the like, for modeling, designing, development, testing, maintenance, and the like of physical, electrical, and chemical systems and process; (2) software development services (e.g., code repository, low code or no code development and the like); (3) software hosting services (e.g., enterprise, hybrid, or cloud software-running environments); (4) data modeling services (e.g., data repositories or business software, such as spreadsheets); or (5) machine learning services (e.g., for development, training, testing, and hosting ML models), and the like. Generally, the engineering or software services may be native environments where engineers/software developers design and build discrete components (referred herein as "entity") of a projects and the relationships between discrete components. In some cases, the native environments may provide API access (e.g., data connectors) to provide periodic, responsive (e.g., to saves or merge requests), or real-time access to engineering/software specifications, requirements, designs, testing, code, verifications (collectively "engineering information"). In some cases, the native environments may provide export functionality (in addition to, or in place of, API access) to provide (entire or partial) copies of engineering information to users.

The project server 120 may be a computer, a server, a system of servers, and/or a cloud hosted software environment. The project server 120 may be configured to interact with user device(s) 105 and/or engineering service(s) 115 to store, manage, and update project objects for users. Each project object may store, manage, and update a set of entities that each represent a discrete system/subsystem that is physically and/or logically (e.g., in design or software) connected or related to other entities of the set of entities. Each project object may represent a specific, explicit instantiation of a project being developed. The project object may include objectives, requirements (e.g., scope and capabilities of systems/subsystems), how are objectives/requirements verified (e.g., what testing, simulation, or user verification), and maps and interacts with native environments to be used to build and connect physical, electrical, chemical, or software entities.

In some cases, the users are associated with an organization, as a primary user, and the users are end-users of the organization. Each user may have an account that uniquely identifies the user on the project server 120. In some cases, the user may have access to some or all project objects of an organization (as set by organization access and control settings). Some users may have read-only access, while some users may have read-write access and the like, for specific project objects. Some users may have read-only access, while some users may have read-write access and the like, for specific components or features of project objects.

The project server 120 may generate and provide graphical user interfaces to user device(s) 105, so that users of user device(s) may view data, interact with, and provide data/instructions to the project server 120, as discussed herein. In some cases, the project server 120 may enable the user to input text to describe requirements or design features. In some cases, the graphical user interface may be a structured input (e.g., to map entity, features of entities, and relationships between entities). In some cases, the project server 120 may enable the user to upload exported engineering information. In some cases, the project server 120 may enable the user to connect certain native environments using data connectors (e.g., access credentials to access engineering information via APIs) so that the user does not need to manually port data from native environments. Thus, the project server 120 may receive, via an input graphical user interface or one or more data connectors, engineering information. The engineering information may include data for at least one entity, one or more entities, or a plurality of entities to be stored on a datastore (e.g., project datastore 216).

In some cases, the project server 120 may process, using a language model, the engineering information to output entity information (referred to as "entity mapping" herein). For instance, when a set of input data is or includes unstructured data, the project server 120 may determine to process the unstructured data using the language model to generate the entity information. In cases where the engineering data has already been processed and stored in a data store (e.g., the project data store 216), the project server 120 may retrieve the entity information. In cases where the user/the engineering service 115 provided the engineering information in a mapped format, the project server 120 may verify the mapped format is proper; if so, the project server 120 may store it as entity information; if not, the project server 120 may process the unstructured and/or improperly mapped data using the language model to obtain the entity information.

In some cases, the entity information/mapping may include one or more data attributes of at least one entity (e.g., a first entity) of the plurality of entities. In some cases, the entity information/mapping may include a plurality of data attributes of the at least one entity. In some cases, the entity information/mapping may include at least one data attribute for each entity of a plurality of entities.

In some cases, the project server 120 may output, e.g., via a graphical user interface or an alert via a message service, the entity mapping to the user for visual verification and/or correction. In some cases, the verification and/or correction may supplement a training corpus of the language model.

Thus, the project server 120 may utilize the language model to handle unstructured or semi-structured data (e.g., text prompts, text input, text files, metadata, headers, code files, and the like) to extract entity-related information, and to generate a structured relationship between discrete data fields, files, records, or pointers to generate entities and relationships between entities (referred to as "language model relationships"). In some cases, the project server 120 may utilize the language model to check structured formats or to check for consistency between unstructured and structured data. In this manner, the language model may make inferences beyond the explicit specific relationships hard-coded by engineers in the project object. Thus, the language model of the project server 120 may increase accuracy or safety and increase efficiency of project development, testing, and iteration.

In some cases, the engineering information is unstructured information, and the entity information is structured information. Thus, the project server 120 may provide computationally tractable solutions even when presented with unstructured data.

In some cases, the project server 120 may query an ontological framework using the entity information/mapping. For instance, the project server 120 query the ontological framework for at least one entity (e.g., a first entity) to determine whether the ontological framework includes an entry (e.g., a node) for the at least one entity. If not, the project server 120 may report an error to the user (e.g., entity not recognized) and/or report to a project server engineer (e.g., entity not recognized by ontological framework). If so, the project server 120 may determine any associated relationships based on the ontological framework. Generally, an ontological framework may be a formal model that describes how entities exist and relate in the world. See FIG. 6 for additional details.

For instance, querying the ontological framework may determine a relationship between the first entity and at least a second entity of the plurality of entities. In some cases, the query may return a plurality of second entities that are associated with the first entity. In some cases, the query may be run for several first entities (e.g., separately, in parallel, or in series) and each of the first entities may have respective result sets of second entities. In this manner, the project server 120 may reference an external source of relationships to determine if an entity is omitted or (if included) not currently connected to entities already a part of a project object. The omitted or not-currently-connected entities may be automatically joined to a project object or recommended to a user for additional data, verification, and/or confirmation. Thus, omitted entities or not-yet-made relationships between entities may be formed in the project object, thereby increasing accuracy or safety, or reducing engineering time/resources.

In some cases, the ontological framework may verify inferences made may the language model. In some cases, the ontological relationships may be suggested to users for verification/confirmation. In some cases, e.g., where a user over-rides the ontological relationship, the project server 120 may require a user verification (e.g., to track the deviation from the ontological framework). In some cases, the deviation may be incorporated in custom ontological models (for that specific project object or for an organization).

In some cases, the ontological framework may be selected from a set of ontological frameworks. For instance, the project server 120 may receive the engineering information from an API and determine the engineering information is related to a first type of project (e.g., a rocket project) and not a second type of project (e.g., a moon base or race car); and select a rocket ontological framework (and not a moon base or race car ontological framework). In some cases, this selection process may be preset by organization settings, to reduce compute/time delays. In some cases, this may be run-time dependent (e.g., based on an associated project object) if in an organization develops projects across various technology domains.

In some cases, the project server 120 may generate an output based, at least in part, on the relationship between the first entity and the second entity. In some cases, the output may be a user alert, a user interface requesting additional information, a request for verification/confirmation and the like. In these cases, the project server 120 may inform the user of an omitted entity and/or omitted relationship between entities, and inform the user of the new entity/relationship or request confirmation or additional data. In some cases, the output may be a digital twin, a modification to a model-based systems-engineering diagram (MBSE diagram) that represents a state of the project object; and/or a conflict detection. As discussed herein, the digital twin may be generated based on, at least in part, based on inference (e.g., from the language model relationships) and/or ontological relationships (e.g., from the ontological framework), so that the digital twin includes the impact of the new entity and/or new relationships between entities. The modification of MBSE diagram may correspond to the new entity and/or new relationships between entities. As discussed herein, detection of a conflict between two or more: (i) system requirements; (ii) entities; and/or (iii) combinations of (i) and (ii).

In some cases, the output is for a project object, where the project object is a specific engineering project developing designed, developed, and built. In the case of a digital twin, the digital twin may enable faster iteration (for discrete entities and relationships between entities), simulated testing and verification, and the like. In the case of MBSE diagrams, the MBSE diagrams may document design versions and provide external stakeholders with a human-understandable formats of design and requirement verification. In the case of conflict detection, users may be alerted to the conflict so that the conflict may be resolved before, e.g., production, deployment, and the like, thereby reducing waste and/or increasing safety or compliance with requirements.

In some cases, the project object may be an aerospace vehicle (e.g., a satellite, a rocket, a plane, and the like). However, while examples of aerospace systems are depicted in the present disclosure, the systems and methods of the present disclosure could be used for any level of complex (or even simply) systems engineering tasks. For instance, the systems and methods of the present disclosure could be used for nautical systems (e.g., ships, boats, and the like), heavy equipment (e.g., boring systems, drilling systems, earth moving equipment, and the like), military systems (e.g., warships, aircraft carriers, submarines, tanks or other land vehicles), consumer electronics (e.g., mobile phones, televisions, computers, and the like), production facilities (e.g., oil and gas plants, chemical systems), and the like.

Generally, the relationship between the first entity and the second entity may be (1) an indication that the second entity has been omitted from a set of entitles associated with the project object, and/or (2) an indication that the second entity exists in the set of entities associated with the project object but that the relationship between the two entities has not been formally documented between the two entities. In this manner, project objects may be modified to include new entities or new relationships between entities that have not been hardcoded by users. In this manner, project development may be improved (e.g., faster design, higher accuracy, fewer conflicts).

In some cases, the relationship between the first entity and the second entity is automatically joined to a project object associated with the first entity. For instance, the relationship may be joined to a relationship information dataset (e.g., stored in project datastore 216) of the project object. The relationship information dataset may include relationships between entities, as indicated by users (e.g., hardcoded), as indicated by the language model relationships, and as indicated the ontological relationships. In some cases, the relationship information dataset is stored apart from the entities in the project datastore 216. In some cases, the relationship information dataset is stored in parts with respective entities in the project datastore 216 (e.g., in a record or database entry associated with an entity).

In some cases, the relationship between the first entity and the second entity is recommended to a user for confirmation to join the project object. In some cases, the project server 120 may transmit an alert (e.g., via a message service) to the user device 105 of the user. The alert may indicate the recommended relationship between the first entity and the second entity and any associated information (e.g., what input data triggered the alert).

In some cases, the project server 120 may cause a notification to be displayed to the user in a native environment. The notification may indicate the recommended relationship between the first entity and the second entity and any associated information (e.g., what input data triggered the alert). In some cases, the notification may be displayed in response to a user taking an action in the native environment. For instance, the notification may be displayed in response to a save or merge request that caused a data input to the project server 120 that triggered the recommendation.

In some cases, the project server 120 may cause a graphical user interface (e.g., in a web-based or mobile application) to display the recommended relationship between the first entity and the second entity. For instance, the graphical user interface may display a popup or notification indicating the recommendation and any associated information (e.g., what triggered the recommendation). In some cases, the recommended relationships may be displayed in a specific graphical user interface that groups all recommendations (e.g., based on users, groups, or entities).

In response to the user confirming the second entity as a new entity and/or a new relationship, the project server 120 may join the new entity or the new relationship to the project object. In some cases, the project server 120 may use the confirmation (or not) as feedback for further training of the language model.

In some cases, the relationship between the first entity and the second entity is presented to a user for additional data or data connectors. In this case, the presentation for additional data or data connectors may be displayed in addition to or separately from the recommendations discussed above. The presentation for additional data or data connectors may direct the user to provide a specific engineering artifact (e.g., a value, a record, a file, or a pointer), so that an attribute of the first or second entity may be populated. In response to a user providing the additional data or a data connector to the relevant engineering artifact, the project server 120 may update the first or second entity. In some cases, the project server 120 may process the new data using the language model and/or the ontological framework.

1.A. Project Server

Figure 2:
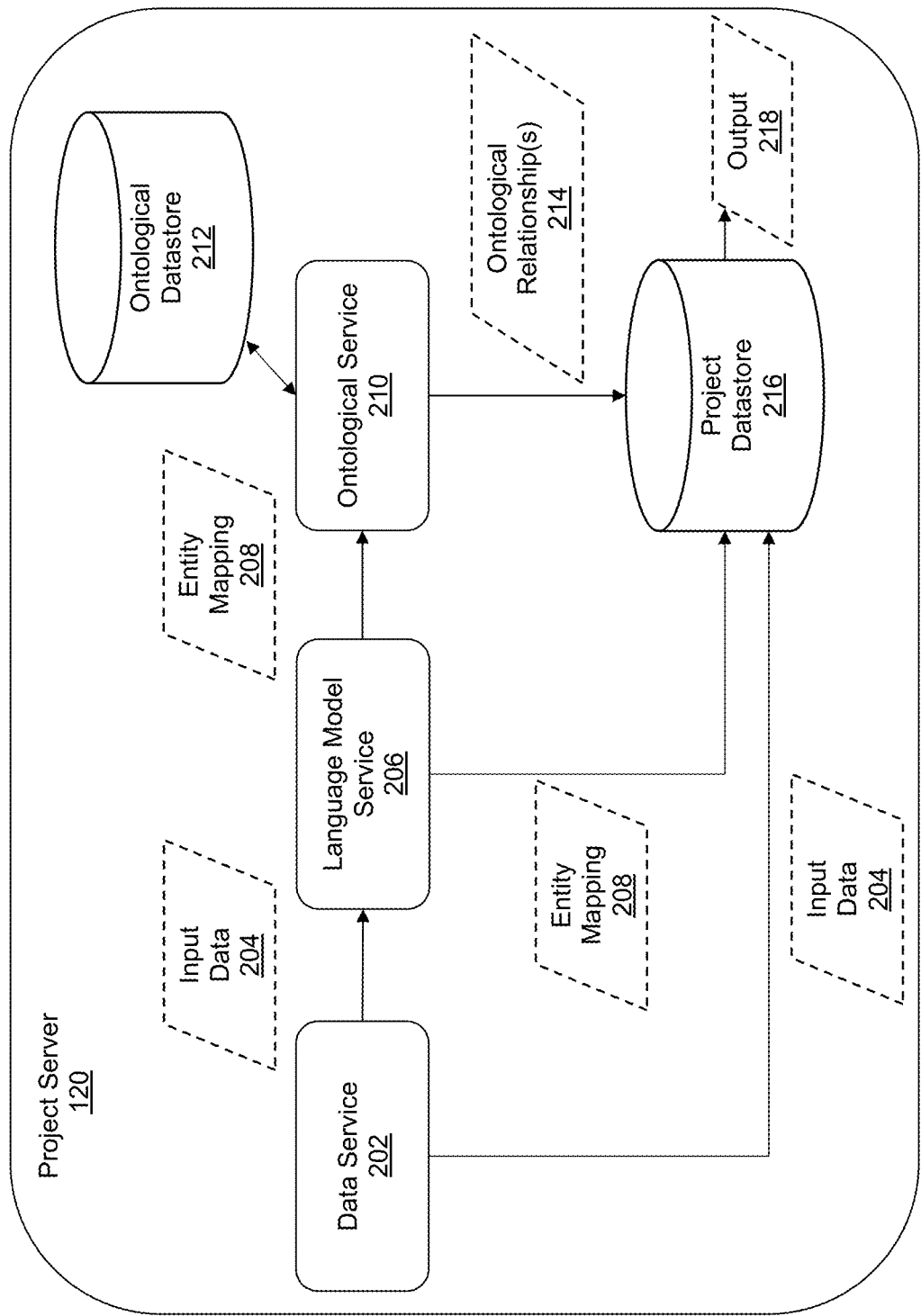
FIG. 2 depicts a block diagram schematically showing features of a project server for systems engineering using an ontological framework.

FIG. 2 depicts a block diagram 200 schematically showing features of a project server 120 for systems engineering using an ontological framework. The features of FIG. 2 may apply to any of FIGS. 1, 3, 4A-4B, 5, 6, 7, 8, 9, 10, and 11. The project server 120 may include a data service 202, a language model service 206, an ontological service 210, an ontological datastore 212, and a project datastore 216.

The data service 202 may obtain input data 204. For instance, data service 202 may manage graphical user interfaces to receive uploaded engineering information and/or interact with data connectors to native environments to receive engineering information (e.g., files or events). The data service 202 may store the input data 204 in the project datastore 216, e.g., after pre-processing for format and verification. The data service 202 may also provide the input data 204 to the language model service 206.

The language model service 206 may process the input data 204 to generate entity mapping 208, as discussed herein. The language model service 206 may store the entity mapping 208 in the project datastore 216, e.g., automatically or after user verification/confirmation or additional data is provided. The language model service 206 may also provide the entity mapping 208 to the ontological service 210.

The ontological service 210 may query an ontological framework from the ontological datastore 212 to determine ontological relationship(s) 214, as discussed herein. In some cases, the ontological datastore 212 may store a plurality of ontological frameworks. For instance, the ontological service 210 may retrieve a specific ontological framework and query the retrieved ontological framework to determine the ontological relationship(s) 214. The ontological service 210 may store the ontological relationship(s) 214 in the project datastore 216, e.g., automatically or after user verification/confirmation or additional data is provided.

The project datastore 216 may store and manage the various pieces of data over time, such that the current version of the project object is available, e.g., for the MSBE service, for digital twins, or for conflict detection. As discussed herein, the project server 120 may generate the output 218, such as requests for data, requests for user verification/confirmation, diagrams, digital twins, or conflict resolution.

1.B. Language Model Service

Figure 3:
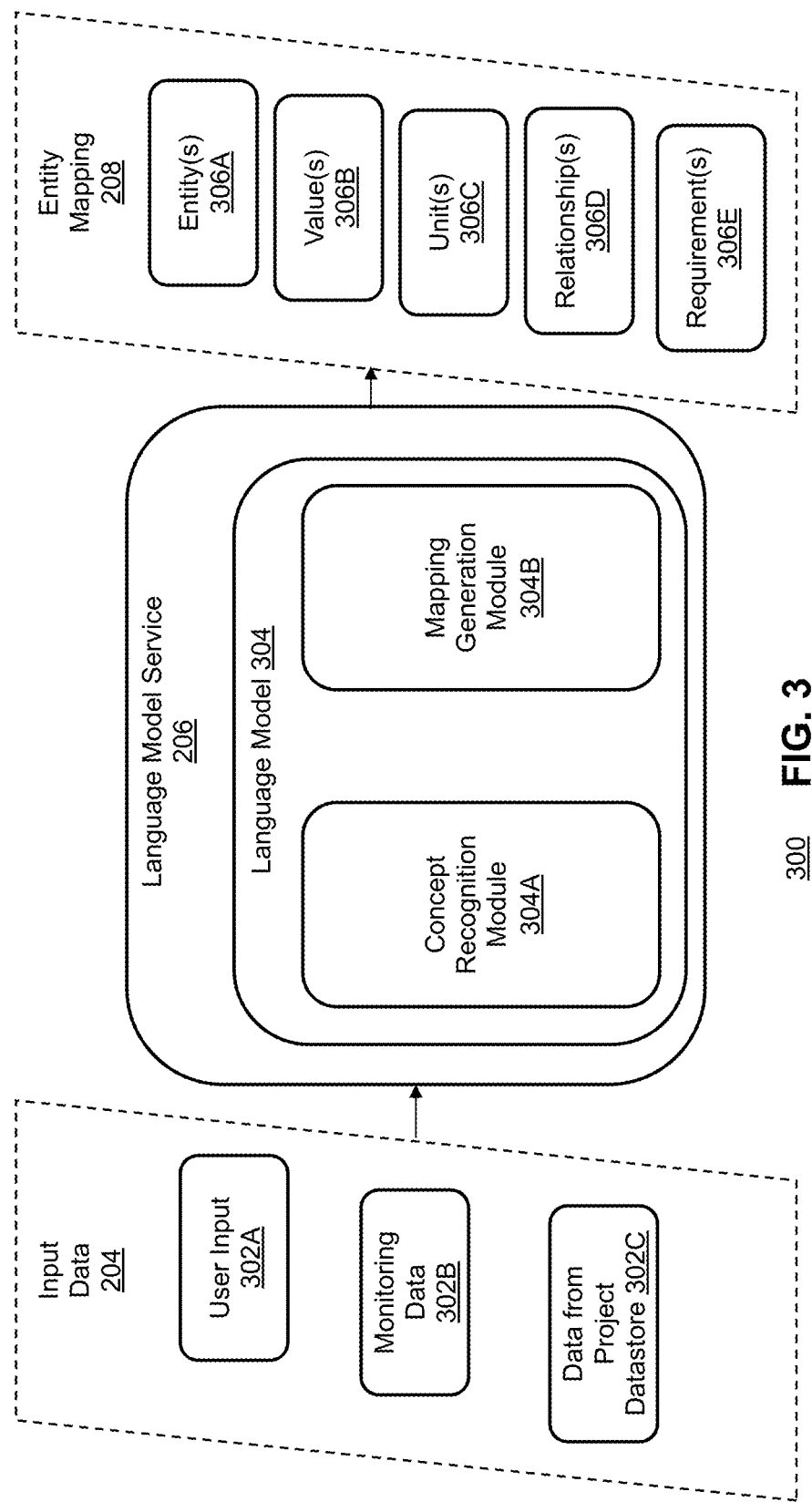
FIG. 3 depicts a block diagram schematically showing a language model service for systems engineering using an ontological framework.

FIG. 3 depicts a block diagram 300 schematically showing a language model service 206 for systems engineering using an ontological framework. The features of FIG. 3 may apply to any of FIGS. 1, 2, 4A-4B, 5, 6, 7, 8, 9, 10, and 11. The language model service 206 may include a language model 304. In some cases, the language model 304 may include a concept recognition module 304A and a mapping generation module 304B. The language model service 206 may receive input data 204 from various sources, such as user input 302A (e.g., text strings), monitoring data 302B (e.g., events in native environments), and/or data from project datastore 302C (e.g., text strings or events previously stored in project datastore 216). Thus, in some cases, the engineering information in the input data 204 may be obtained, at least in part, by monitoring actions of one or more users of the system.

The language model service 206 may process the input data 204 to determine an entity mapping 208. The entity mapping 208 may include entity(s) 306A, value(s) 306B, unit(s) 306C, relationships 306D, and/or requirements 306E.

In some cases, the language model 304 may be a natural language processing (NLP) model. The NLP model may process different types of engineering information including a set of machine-readable text, engineering specifications, metadata, code, and the like. In some cases, the NLP model may be configured to output: (a) one or more entities of the plurality of entities and (b) one or more tags associated with the one or more entities of the plurality of entities.

For instance, the language model 304 may be a large language model (LLM), a transformer model or transformer-based deep neural network model, such as a bidirectional encoder representations from transformers (BERT). In some cases, the language model 304 may include more than one transformer model, such as specifically designed BERTS on specific datasets. For instance, the specifically designed BERTS may be selected based on a type of project object associated with the input data 204. The specifically designed BERTS may include an aerospace-related BERT (such as Space BERT), an automotive BERT, a military BERT, and the like. In some cases, the language model 304 may be trained using customer use (e.g., events from monitoring data, examples from data from the project datastore 216, curated training sets, and the like. For instance, the LLM may be a LLM that receives designed prompts to extract entities and relationships from text. In some cases, the LLM may be tuned and/or modified based on a specific corpus of text, such an aerospace-related LLM, an automotive LLM, a military LLM, and the like.

In some cases, the concept recognition module 304A may identify the entity(s) 306A, the value(s) 306B, and the unit(s) 306C. In some cases, the mapping generation module 304B may associate specific values the value(s) 306B to specific units of unit(s) 306C (e.g., as pairs). Each pair may be a data attribute of an entity. In some cases, the mapping generation module 304B may associate the pairs to entity(s) 306A. In some cases, associated of pairs and pairs to entities may be done by tags. A tag may include information indicative of (i) a name of an entity (e.g., a first entity);

and/or (ii) respective data values corresponding to each of the one or more data attributes.

In some cases, the mapping generation module 304B may determine relationships 306D between specific pairs of entities of entity(s) 306A. See, e.g., FIGS. 4B and 5. In these cases, the relationships 306D may be language model relationships.

In some cases, the concept recognition module 304A may identify requirements 306E from the input data 204. The requirements 306E may generate an entity of the entity(s) 306A as a requirement entity. See, e.g., FIG. 4B.

1.C. Example Input Data and Requirements

FIGS. 4A and 4B depict block diagrams 400A and 400B schematically showing exemplary input data types and requirements. The features of FIGS. 4A and 4B may apply to any of FIGS. 1, 2, 3, 5, 6, 7, 8, 9, 10, and 11.

Diagram 400A may depict exemplary input data types, such as a requirement input 402A (e.g., structured or unstructured text that a user indicates is a requirement), a spreadsheet 402B (e.g., semi-structured data), a source code 402C (e.g., a file), a 3D model file 402D (e.g., a copy of the file or a pointer to the file). Each of these input data types may be uploaded by a user or provided by a data connecter.

Diagram 400B may depict an exemplary requirement 306E. The requirement 306E may have a data structure 404A that associates data attributes 404B to fields of the data structure 404A, and associates a verification 404C (if present) by a user (by storing, e.g. a user ID).

1.D. Text Prompt Conversion

Figure 5:
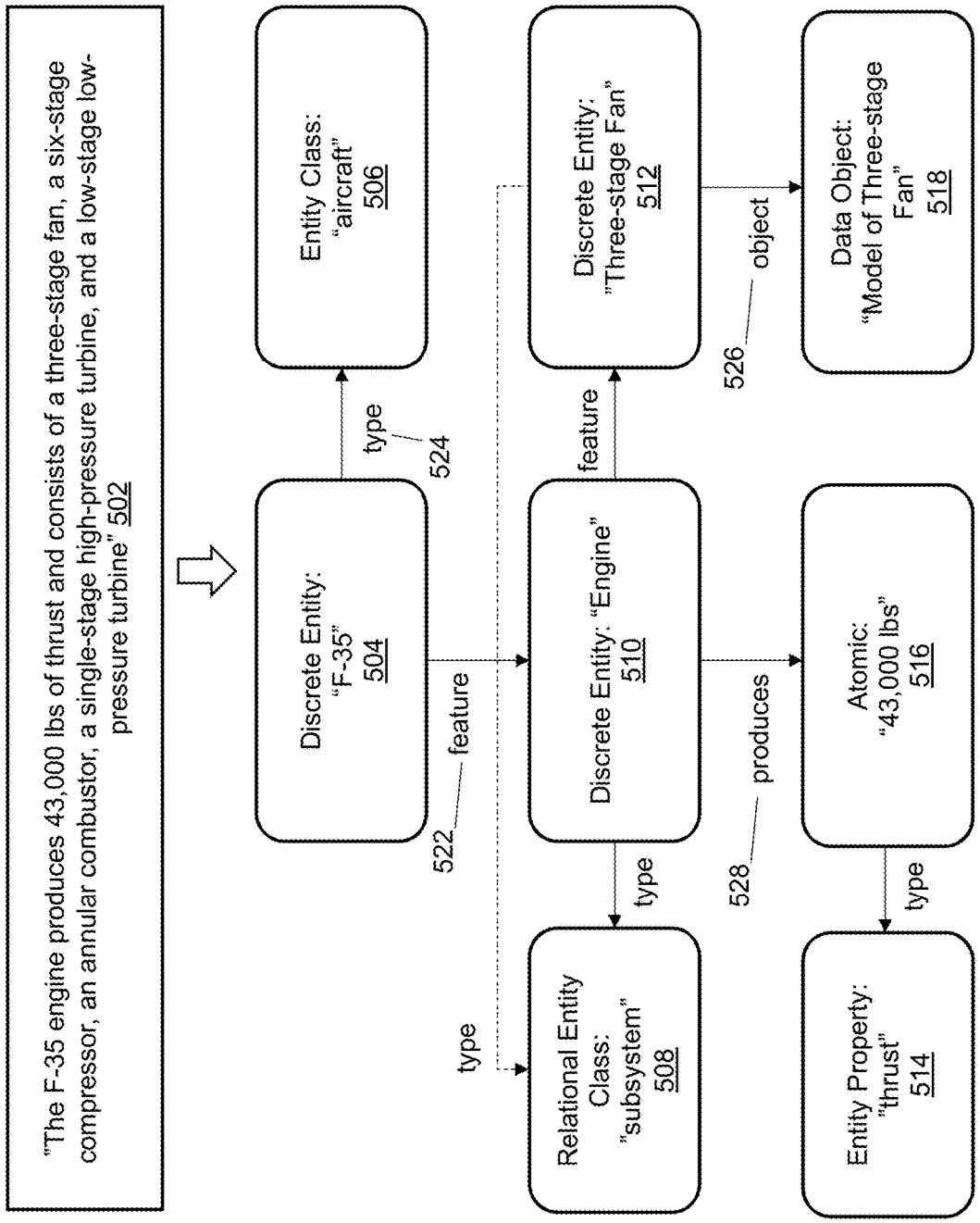
FIG. 5 depicts a block diagram schematically showing text prompt conversion using a language model and an ontological service.

FIG. 5 depicts a block diagram schematically showing text prompt conversion using a language model service 206 and an ontological service 210. The features of FIG. 5 may apply to any of FIGS. 1, 2, 3, 4A-4B, 6, 7, 8, 9, 10, and 11. In some cases, the language model service 206 may receive an unstructured text prompt 502 and generate at least some of a plurality of entities 504-518, and at least some of relationships 522-526 between respective entities of the plurality of entities 504-518. In some cases, the ontological service 210 may generate at least some of a plurality of entities 504-518, and at least some of relationships 522-526 between respective entities of the plurality of entities 504-518, as discussed herein.

The entities 504-518 may include one or combinations of: a discrete entities 504, 510, 512, entity class 506, relational entity class 508, entity property 514, atomics 516, and data object 520. Each of the relationships may connect two (or more entities) with a relationship style, such as relationship feature 522, relationship type 524, relationship object 526, and relationship produces 528.

1.E. Ontological Framework

Figure 6:
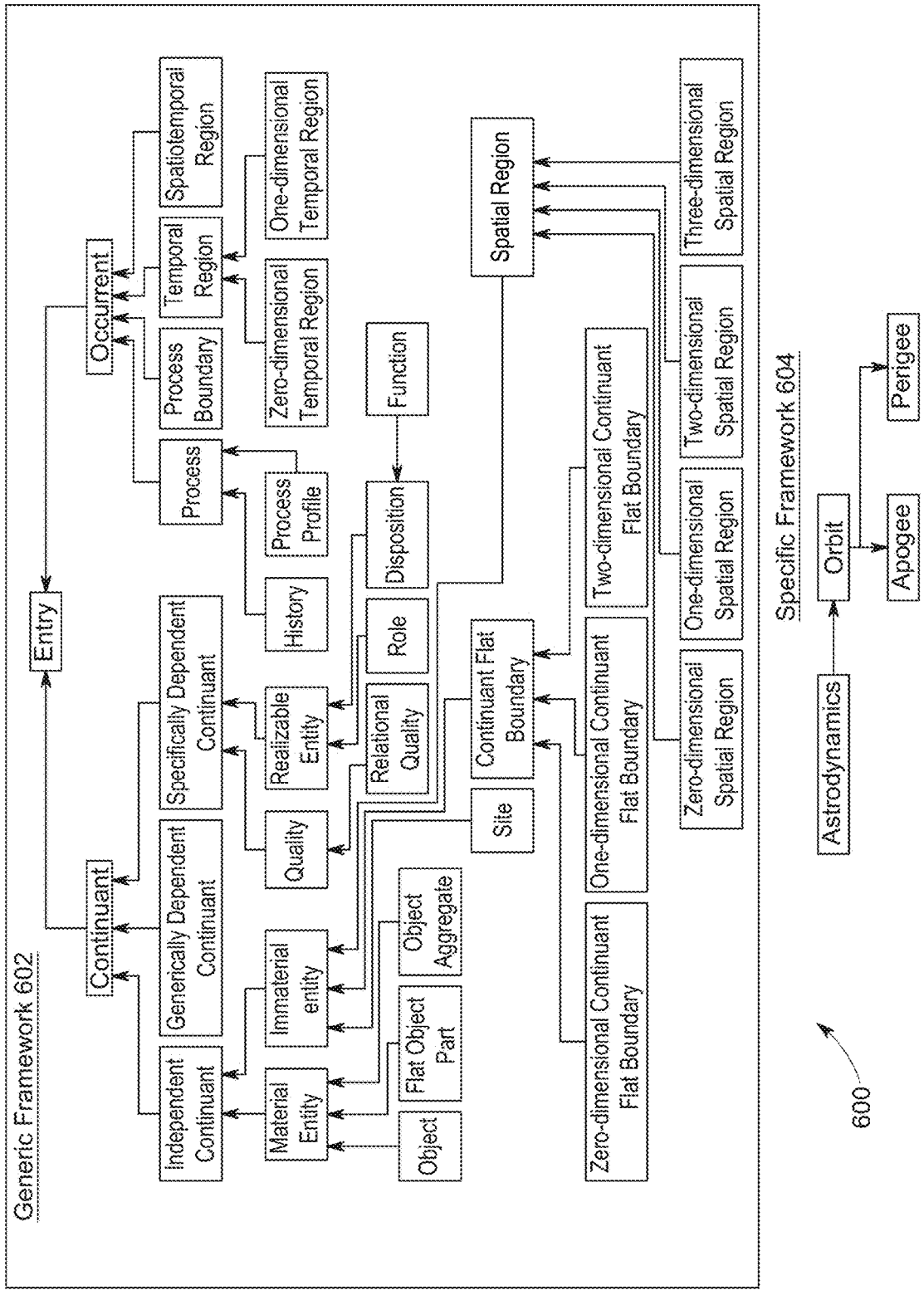
FIG. 6 depicts a block diagram schematically showing ontological frameworks.

FIG. 6 depicts a block diagram 600 schematically showing ontological frameworks 602 and 604. The features of FIG. 6 may apply to any of FIGS. 1, 2, 3, 4A-4B, 5, 7, 8, 9, 10, and 11. A generic framework 602 may depict how physical, temporal, or logical relationships may be structured in a hierarchy of relationships between entities. An example of a generic framework may be the common core ontology or the basic formal ontology. A specific framework 604 may depict a hierarchy of relationships between entities in a specific domain, such as aerospace, astrodynamics, automotive and the like.

In some cases, to query the ontological framework using the entity information/mapping, the project server 120 may: search the ontological framework for a matching entry of the ontological framework to a query entity (e.g., a first entity); in response to determining a matching entry, determine at least one related entry in the ontological framework; and determine a first one of the at least one related entry as a matching entity (e.g., a second entity).

In some cases, the ontological framework may be a graph of nodes and edges. For instance, the graph may be a memgraph database, a Neptune database, and the like. The nodes may correspond to potential entities (e.g., that exist in the world as physical, temporal, or logical entities). The edges may correspond to spatial, temporal, and/or logical relationships between potential entities.

In some cases, to search the ontological framework for the matching entry of the ontological framework to the query entity (e.g., a first entity), the project server 120 may: recursively traverse branches of the nodes and the edges; retrieve an entry at each node; determine whether the entry satisfies match condition for the first entity; and if the match condition is satisfied, return the entry as the matching entry. If the match condition is not satisfied, the project server 120 may continue traversing branches until all nodes have been searched.

To determine at least one related entry in the ontological framework, the project server 120 may obtain entries for all nodes that are on a same level as the matching node, if any; all relationships between the same level nodes, if any; all nodes that are nested below the matching node, if any; all relationships between the nested nodes, if any (collectively, "query result set"). In this manner, the project server 120 may return a query result set, as indicated by the ontological framework.

In some cases, the project server 120 may determine whether the project object includes each of the entities in the query result set. If project server 120 determines that the project object omits one or more entities in the query result set, the project server 120 may determine those entities as omitted entities.

In some cases, the project server 120 may determine whether the project object includes each of the relationships between entities in the query result set. If project server 120 determines that the project object omits one or more relationships in the query result set, the project server 120 may determine those relationships as omitted relationships (as between their respective entities).

Thus, in some cases, the project server 120 may also generate an omitted result set. The omitted result set may include the omitted entities and omitted relationships. The project server 120 may use the omitted result set to automatically join new entities or new relationships to the project object, or recommend new entities or new relationships to be joined to the project object.

1.F. Example Data Flow

Figure 7:
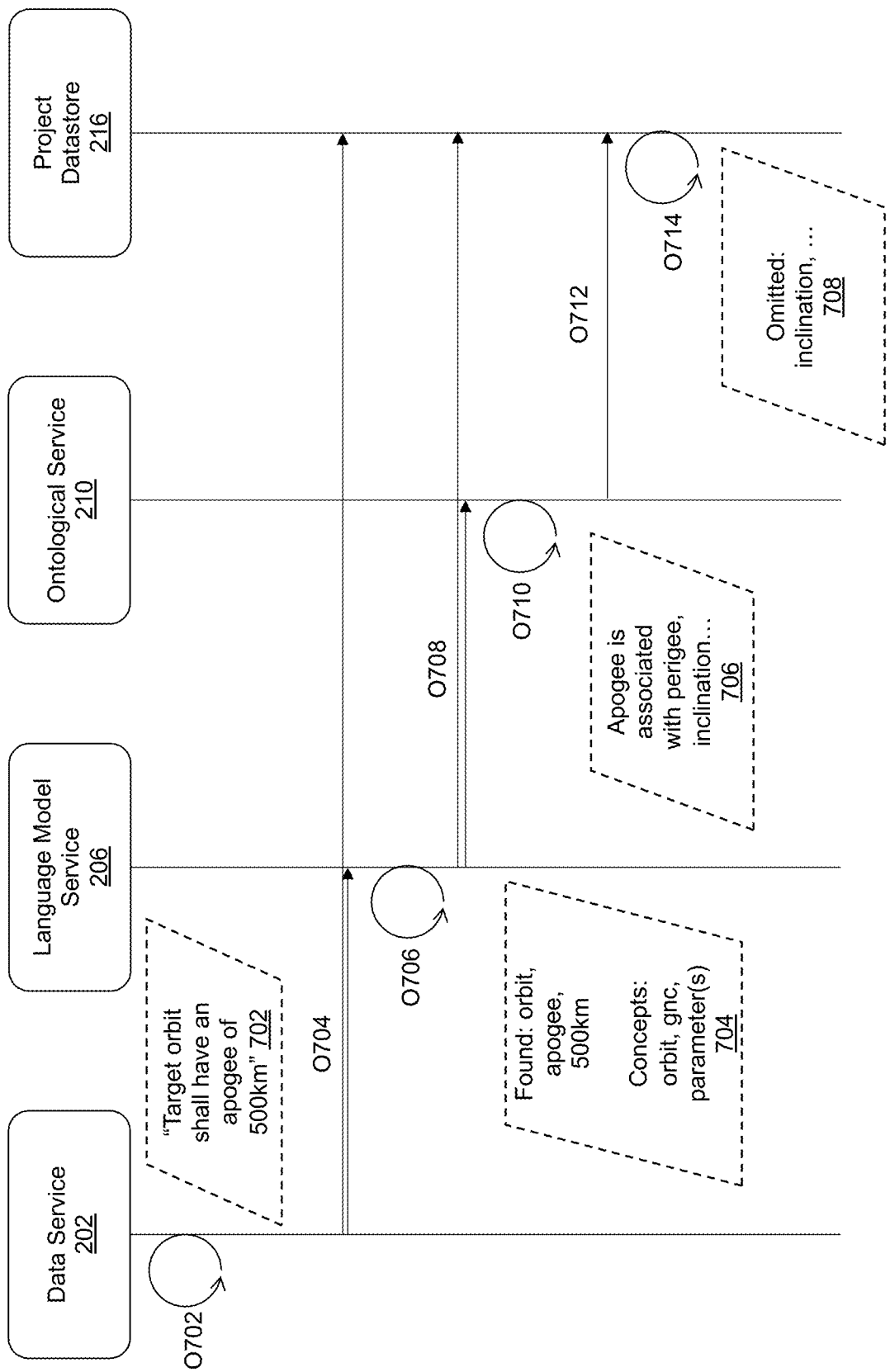
FIG. 7 depicts a dataflow diagram for systems engineering using an ontological framework.

FIG. 7 depicts a dataflow diagram 700 for systems engineering using an ontological framework. The features of FIG. 7 may apply to any of FIGS. 1, 2, 3, 4A-4B, 5, 6, 8, 9, 10, and 11. The operations of the dataflow diagram 700 may be performed by the project server 120.

At operation O702, the data service 202 may obtain input data 702. For instance, the data service 202 may obtain events from native environments or text strings from users, via a graphical user interface, as discussed herein. At operation O704, the data service 202 may provide the input data 702 to the language model service 206 and/or the project datastore 216. The language model service 206 may receive the input data 702.

At operation O706, the language model service 206 may process the input data 702 through the language model 304 to obtain an entity mapping 704. For instance, the language model service 206 may determine the entity(s) 306A, value(s) 306B, unit(s) 306C, relationships 306D, and/or requirements 306E, as discussed herein. At operation O708, the language model service 206 may provide the entity mapping 704 to the ontological service 210 and/or the project datastore 216. The ontological service 210 may receive the entity mapping 704.

At operation O710, the ontological service 210 may query an ontological framework using the entity mapping 704 to obtain a query result set 706. For instance, the ontological service 210 may search for matching entities to entities of the entity mapping 704 and return a query result set 706, as discussed herein. At operation O712, the ontological service 210 may provide the query result set 706 to the project datastore 216.

At operation O714, the project server 120 may determine an omitted result set 708 based on the query result set 706. For instance, the project server 120 may search the project datastore 216 to determine if the project object omits any entity(s) included in the query result set 706, and/or omits any relationship(s) between entities of the included in the query result set 706. If any entities or relationships are omitted, the project server 120 may generate the omitted result set 708 and perform actions for the omitted result set 708, as discussed herein.

1.G. Omitted Relationship Identification

Figure 8:
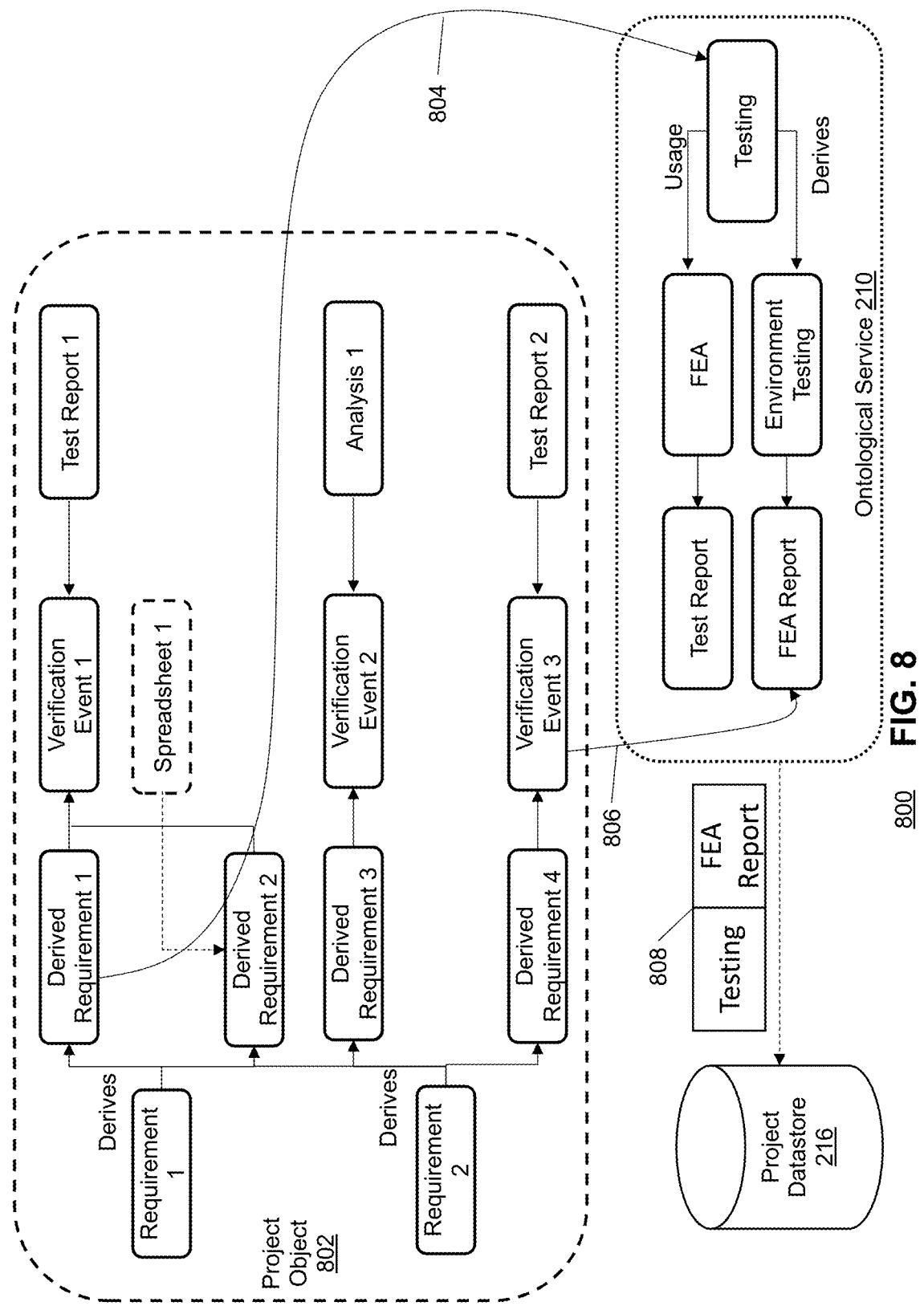
FIG. 8 depicts a block diagram schematically showing omitted relationships identified using an ontological framework.

FIG. 8 depicts a block diagram schematically showing omitted relationships identified using an ontological framework. The features of FIG. 8 may apply to any of FIGS. 1, 2, 3, 4A-4B, 5, 6, 7, 9, 10, and 11. The operations of the block diagram 800 may be performed by the project server 120. In some cases, in response to a project object 802 having been updated based on user inputs and/or monitoring events (e.g., test report 2 is input to data service 202), the project server 120 may perform an omitted relationship identification process.

To perform the omitted relationship identification process, the project server 120 may generate derived requirement 4 and verification event 3, based on the test report 2 being input to the data service 202, and join the derived requirement 4 and verification event 3 to the project object 802. In response to the derived requirement 4 and verification event 3 being joined to the project object 802, the project server 120 may invoke the ontological service 210 to determine if there are any omitted entities or relationships. In this case, after querying the ontological framework, the ontological service 210 determines that two entities (e.g., verification 3 and derived requirement 1) are related by matching entries 804 and 806 in the ontological framework. In response to determining the matching entries 804 and 806 are related in the ontological framework, the ontological service 210 may determine whether the two entities (e.g., verification 3 and derived requirement 1) have a relationship in the project object 802. In this case, the two entities do not have a relationship, so the ontological service 210 determines that the project object has a missing relationship 808. In this case, the ontological service 210 may automatically join or recommend the missing relationship 808 to be joined to the project object (e.g., by updating the project datastore 216).

1.H. Conflict Identification

Figure 9:
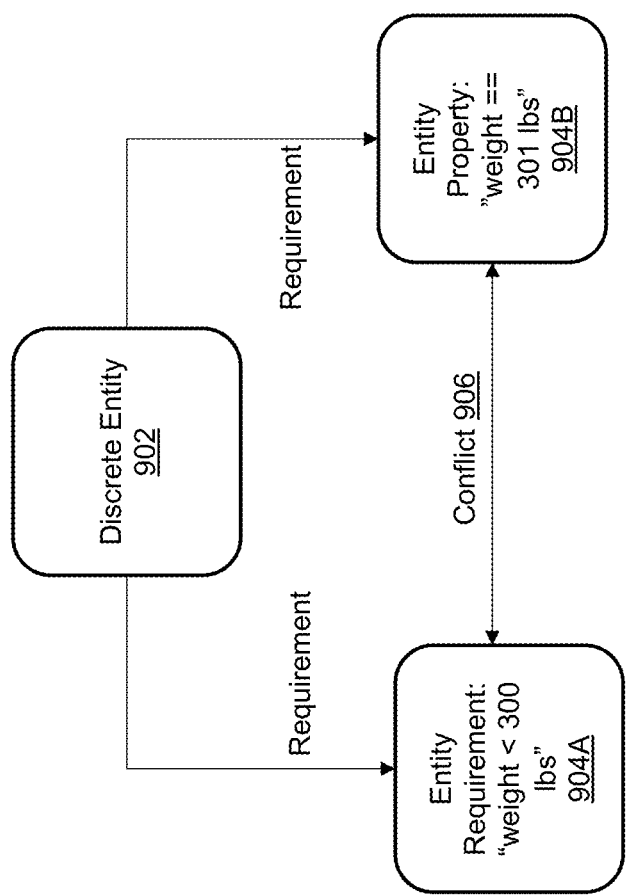
FIG. 9 depicts a block diagram schematically showing conflict identification using an ontological framework.

FIG. 9 depicts a block diagram 900 schematically showing conflict identification using an ontological framework. The features of FIG. 9 may apply to any of FIGS. 1, 2, 3, 4A-4B, 5, 6, 7, 8, 10, and 11. The operations of the block diagram 900 may be performed by one or more of the systems of environment 100, such as the project server 120 or any one of the engineering service(s) 115. In some cases, in response to a project object having been updated based on outputs from the ontological service 210, the project server 120 may perform a conflict identification process.

To perform the conflict identification process, the project server 120 may iterate (in parallel or in series) through each discrete entity (such as discrete entity 902) of the project object (such as project object 802). For each discrete entity 902, the project server 120 may compare an entity requirement 904A with any associated entity properties or other requirements (such as entity property 904B). The project server 120 may determine associated entity properties or other requirements (e.g., for a same type of unit) based on any entity mappings and/or ontological relationships associated with the entity 902.

To identify a conflict, the project server 120 may determine a logical expression for the entity requirement 904A and whether any entity properties or other requirements fail to satisfy the logical expression. In the case of entity properties, a logical expression may be an arbitrarily complex logical operator for value(s) that returns true or false based on populated value(s) from the entity properties. In the case of other requirements, a logical expression may be an arbitrarily complex logical operator for a second logical expression of the other requirement that returns true or false.

In the case that any entity properties or other requirements fail to satisfy the logical expression, the project server 120 may identify a conflict. In some cases, in response to identifying a conflict, the project server 120 may prompt a user to investigate/resolve the conflict. In some cases, the project server 120 may suggest a new requirement for a failed other requirement.

In the example depicted in block diagram 900, the entity property 904B may be associated with the discrete entity 902 using the ontological framework. In this manner, the conflict was identified using the ontological framework that was not provided by user devices 105 or engineering services 115. Thus, an associated engineering project detected and caused a process to resolve a conflict, thereby increasing accuracy and safety, and reducing engineer development costs/time.

1.I. Generate and Use Digital Twin

Figure 10:
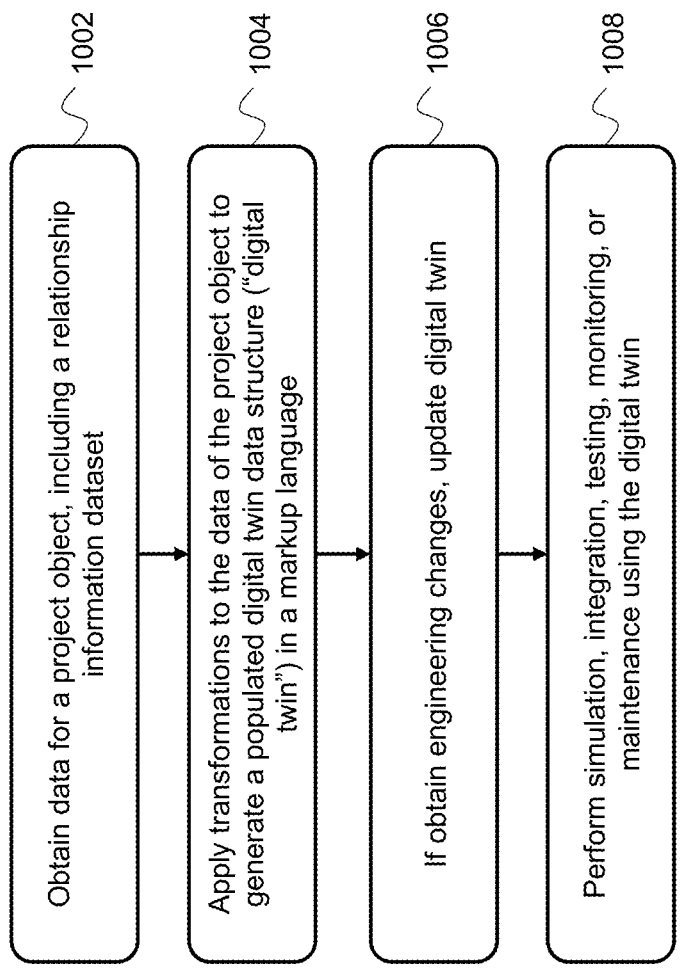
FIG. 10 depicts a flowchart for generating and using a digital twin.

FIG. 10 depicts a flowchart 1000 for generating and using a digital twin. The features of FIG. 10 may apply to any of FIGS. 1, 2, 3, 4A-4B, 5, 6, 7, 8, 9, and 11. The operations of the flowchart 1000 may be performed by one or more of the systems of environment 100, such as the project server 120 or any one of the engineering service(s) 115.

At block 1002, the project server 120 may obtain data for a project object, including a relationship information dataset. For instance, the project server 120 may select and retrieve entity(s) of a project object. For instance, the project server 120 may select all requirements; design models, documents, or references (collectively "designs"); and/or validation, testing, and/or simulation models (collectively, "models") for each entity associated with the project object from the project datastore 216. In some cases, the project server 120 may determine whether there are sufficient entities to generate a digital twin. In some cases, the project server 120 may determine whether at least one requirement, at least design, and/or at least one model exist for each entity. In some cases, based on the type of project object, the project server 120 may determine whether there is at least one requirement, at least design, and/or at least one model exist for each entity, for each type of technical discipline the entity interacts with or has. A technical discipline may be electrical, mechanical, software, chemical, and the like. In some cases, the project server 120 may determine whether there is at least one verification entity (or aspect of an entity)

for each entity associated with the project object. In each of the foregoing, if the project server 120 determines there are sufficient entities for the project object, the project server 120 may proceed with generation of the digital twin. In each of the foregoing, if the project server 120 determines there are not sufficient entities for the project object, the project server 120 may not proceed with generation of the digital twin. In this case, the project server 120 may indicate to a user (e.g., via message or native environment notification) that at least entity or aspect is missing and, optionally, a recommendation as to the missing entity or aspect.

In some cases, the project server 120 may also determine whether there is sufficient real-world telemetry data for entities of the project object. In some cases, the real-world telemetry data may be used as feedback into the designs and/or models. In some cases, the real-world telemetry data may be used to compare against simulated validation data. In some cases, the real-world telemetry data may be used to confirm the simulation. In some cases, the real-world telemetry data may be stored with or in association to specific entities. In some cases, the real-world telemetry data may be sourced from an exported set of observed results from a test apparatus, or fed directly into the project server 120 system from sensor (e.g., a networked IoT device) that can publish telemetry directly into the project server 120 system.

At block 1004, the project server 120 may apply transformations to the data of the project object to generate a populated digital twin data structure ("digital twin") in a markup language. In some cases, the digital twin data structure may be a SysML v2 compliant data structure. For instance, the project server 120 may select and convert, in accordance with the transformations, requirements, designs, and/or models into specific parts of a digital twin data structure (which may be a template that is populated or modified, in accordance with the transformations).

In some cases, the transformations may be generated based on, at least in part: (a) historical user interactions and/or event monitoring; and (b) an NLP model associating different entities, based on shared features, that were not labeled as related. In some cases, historical user interactions and/or event monitoring may indicate certain entities are associated based on how users interact with different entities of the native environments and/or the data service 202/project server 120. These types of associations may be latent relationships that are not documented by users, but nevertheless indicate related systems. As an example, a user may make input on a spreadsheet associated with a first entity that indicates a link to a CAD program file associated with a second entity.

In some cases, the NLP model may determine two entities share features, such as common concepts or words but the two entities may not be labeled as related. In this case, the NLP model may infer the entities are related because of the shared features, even if a relationship does not exist in the project object. As an example, a user may interact with a CAD model of a wing and interact with an airflow model over a wing. The NLP model may identify that the two entities (the CAD model and the airflow model) share a feature (the wing).

At block 1006, the project server 120 may, if engineering changes are obtained, update the digital twin. For instance, the project server 120 may obtain new input data; and update the project object. In response to the project object being updated, the project server 120 may update the digital twin based on the underlying changes to the project object.

At block 1008, the project server 120 may perform simulation, integration, testing, monitoring, or maintenance using the digital twin. For instance, the project server 120 may simulate an action (e.g., take off) using the digital twin (a "simulation") for the project object (e.g., an aircraft); and compare the simulation with real-world telemetry data of a real-word version of the project object. In this manner, the project server 120 may compare the expectation of the simulation or design with the real-world telemetry data. This comparison may be used to confirm (e.g., if requirements are satisfied) or enable updates (e.g., if requirements are not met) to the design/models associated with the project object. After confirmation or updates, a new simulation may be run (e.g., against the known performance) to determine different or harder test situations, thereby extending operational capability of a project object. As an example, telemetry captured from the test flight of an aircraft (e.g., an F16 aircraft) may include load stresses on a wing and flow through a jet engine. The simulation (using the digital twin) and designs/models (of the project object) may expect a correlation between thrust at takeoff at an angle of attack and wing stress, and the telemetry may be compared against the prediction (in the simulation or design/models) to then confirm or update the designs/models. After updating or confirming the designs/models with the telemetry and/or the comparison result, a new simulation may be run against known performance to determine more extreme stress cases and extend the aircraft's performance envelope.

1.J. MBSE Service and Diagram

Figure 11:
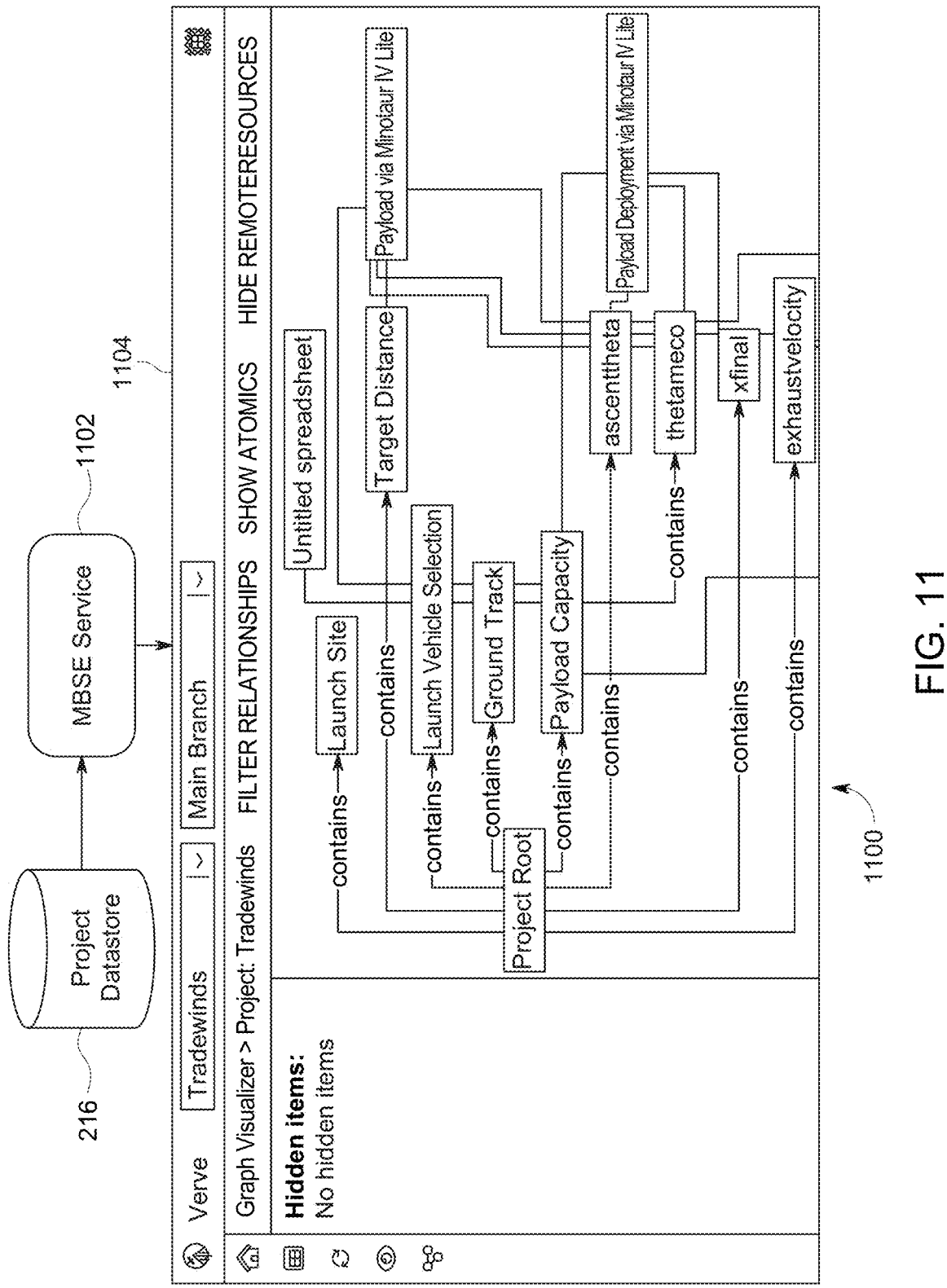
FIG. 11 depicts a graphical user interface for a model-based systems-engineering (MBSE) diagram generated by a MBSE service.

FIG. 11 depicts a block diagram 1100 for a model-based systems-engineering (MBSE) service 1102 and a MBSE diagram 1104. The features of FIG. 11 may apply to any of FIGS. 1, 2, 3, 4A-4B, 5, 6, 7, 8, 9, and 10. The operations of the diagram 1100 may be performed by the MBSE service 1102, which may be a part of the project server 120 or any one of the engineering service(s) 115.

The MBSE service 1102 may obtain data from the project datastore 216. For instance, the MBSE service 1102 may obtain filters or parameters (e.g., to a subsystem or process); determine entities based on the filters or parameters; and obtain data for those entities. The MBSE service 1102 may then generate a graphic 1104 based on the data for those entities (e.g., a subset of all entities of the project object). The graphic 1104 may graphically represent at least a subset of the plurality of entities for the project object. The graphic 1104 may display a hierarchy of entities and their relationships.

2. Generate Models Using Graphs

Figure 12:
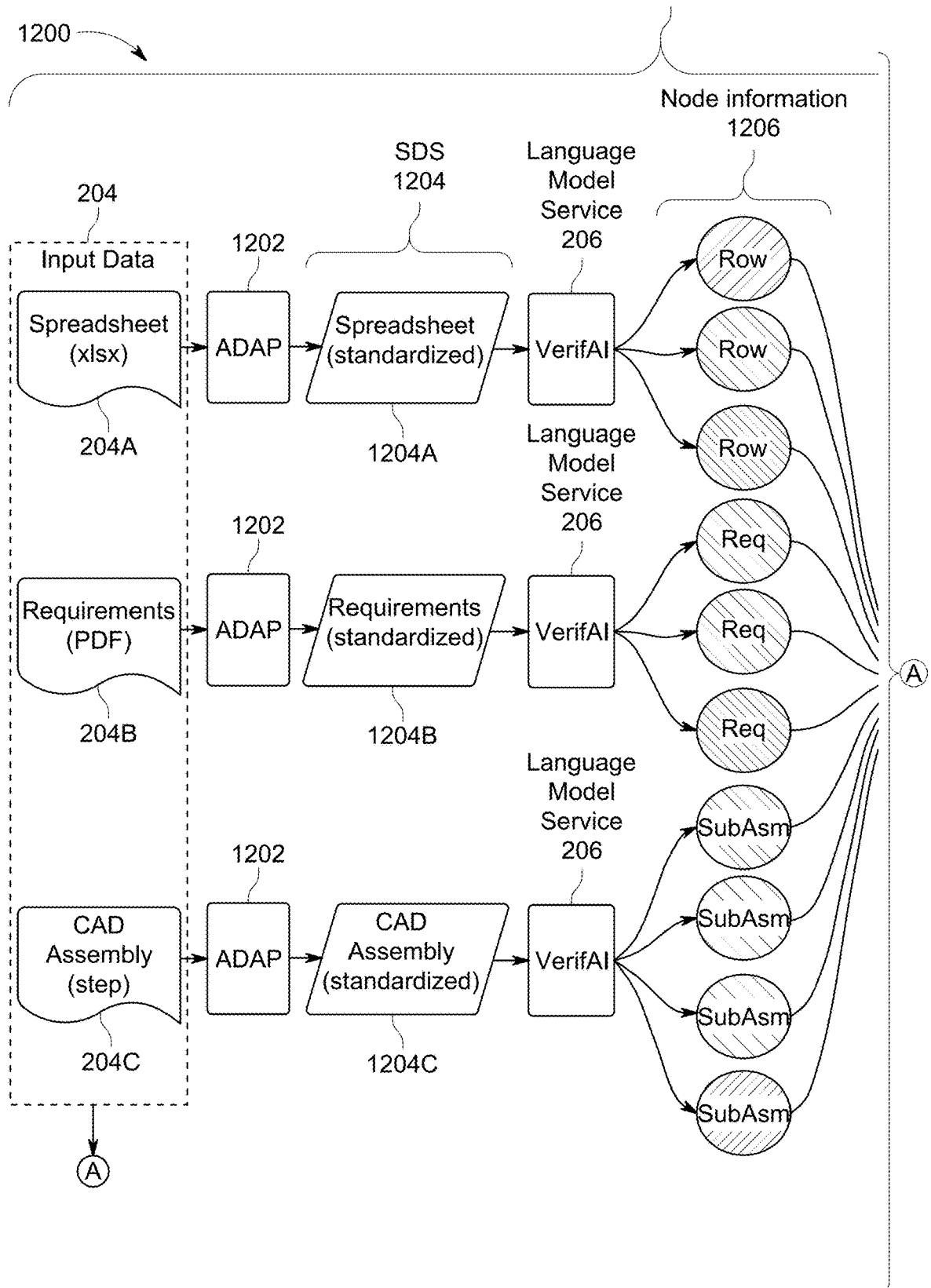
FIG. 12 depicts a block diagram schematically showing features of generating models using graphs.
Figure 12:
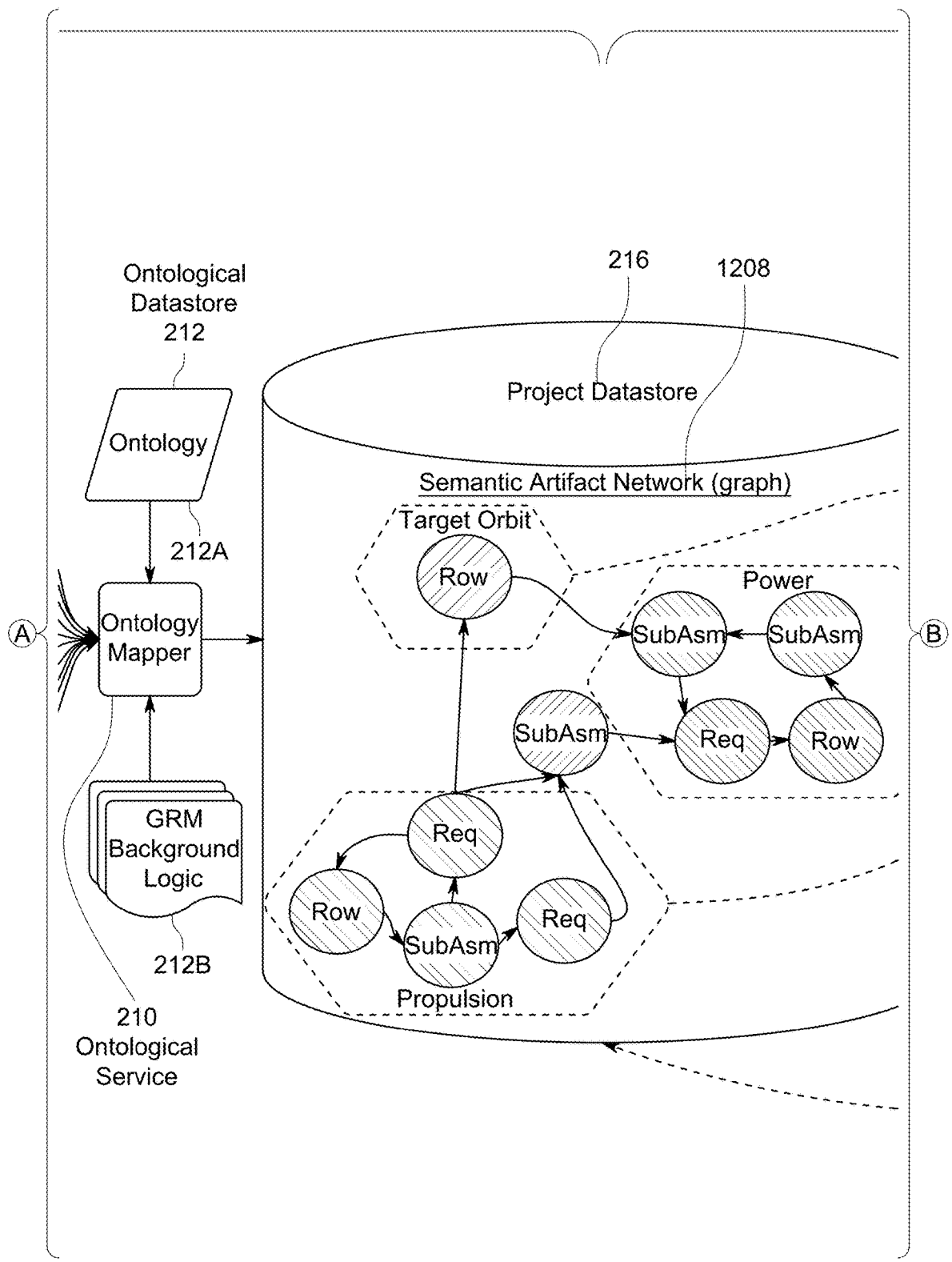
Figure 12:
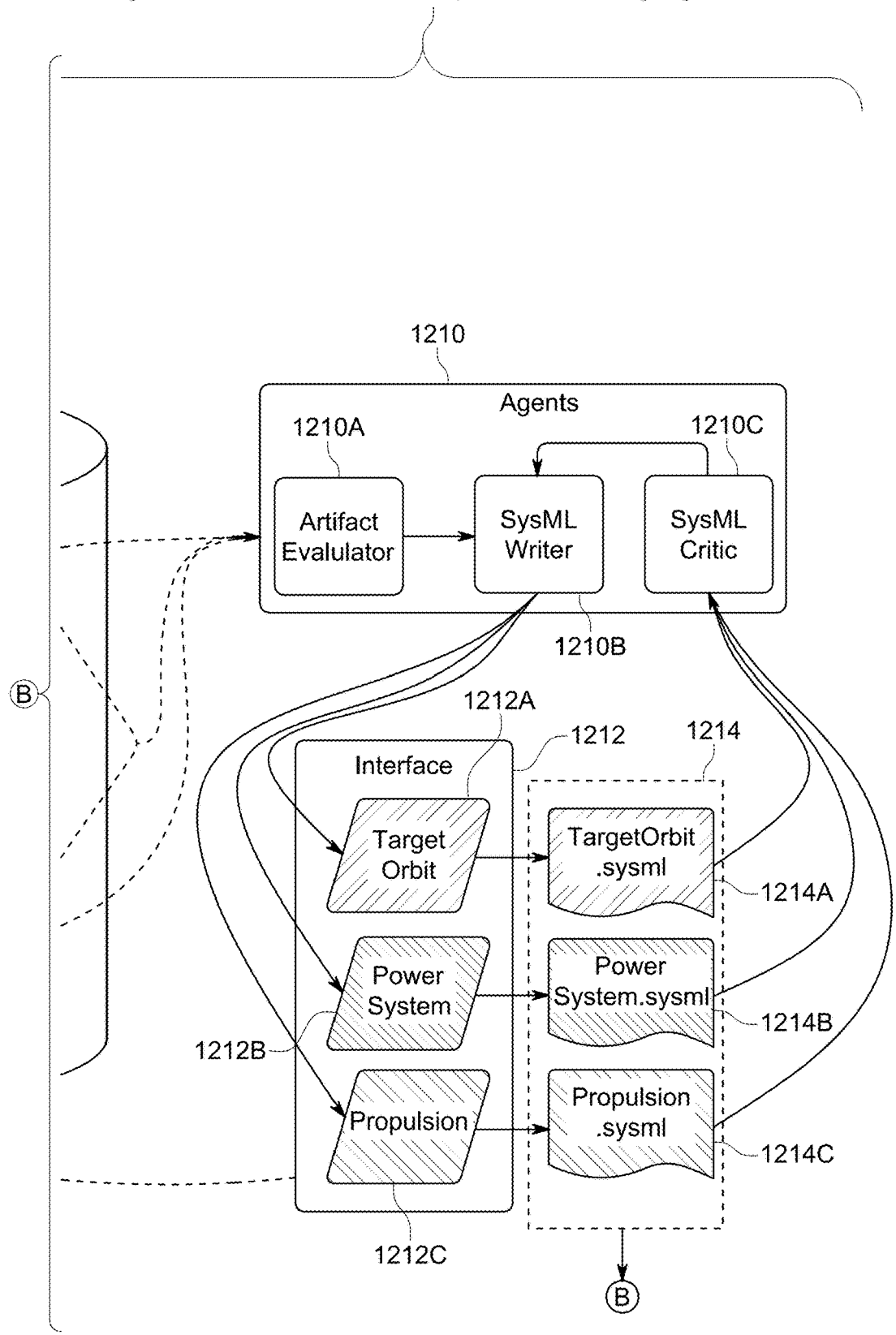

FIG. 12 depicts a block diagram 1200 schematically showing features of generating models using graphs. The features of FIG. 12 may apply to any of FIGS. 1, 2, 3, 4A-4B, 5, 6, 7, 8, 9, 10, 11, 13, 14, 15, and 16. The block diagram 1200 may depict, by operations of, e.g., the project server 120, two stages to generate models using graphs based on engineering information (e.g. at least one data artifact). In the first stage, a normalization pipeline may process engineering information to generate node information (e.g., a set of entities, a set of data attributes, and/or a set of relationships); and determine and add nodes and/or edges to a graph based on the node information and the graph. In some cases, the nodes and the edges correspond to at least a subset of the set of entities, the set of data attributes, and/or the set of relationships. In a second stage, agents and an interface may generate at least one data structure based on at least the nodes and/or the edges of the graph. In some cases, the at least one data structure is compliant to a model language syntax, such as SysML v2.

In some cases, the agents may also ensure semantic meaning. In a third stage, the project server 120 may then generate at least one digital thread by connecting the engineering information, via point A, to the at least one data structure, via point B. See FIG. 13 for details.

2.A. First Stage

The block diagram 1200 may include input data 204 that includes a set of data artifacts, such as first data artifact 204A, second data artifact 204B, and third data artifact 204C. While input data 204 may depict three data artifacts, the input data may include more or less data artifacts, as engineers/users interact with the project server 120 or the native environments. Moreover, each data artifact may be processed individually, in sequence, in parallel, as a group, as they are received, or in bulk processing. In the case depicted in block diagram 1200, the first data artifact 204A may correspond to a spreadsheet (e.g., in Microsoft xlsx format), the second data artifact 204B may correspond to a portable document format (PDF), such as requirements document, and the third data artifact 204C may correspond to a CAD assembly (e.g., in step format). While the examples discussed herein are related to sheets, PDFs, and a CAD file, the normalization pipeline may operate on various and different types of engineering documents, formats, and the like, as discussed above in FIG. 1 and below in FIG. 14.

In some cases, in the first stage, the normalization pipeline (e.g., the project server 120) may process the set of data artifacts using an arbitrary data artifact parser 1202 to generate standardized data structures 1204 of each data artifact. The standardized data structures 1204 of each data artifact may include a first standardized data structures 1204A, a second standardized data structures 1204B, and a third standardized data structures 1204C, each respectively corresponding to the first data artifact 204A, the second data artifact 204B, and the third data artifact 204C. Further details of the arbitrary data artifact parser 1202 are detailed in FIG. 14.

In some cases, the normalization pipeline may process the set of data artifacts and/or the standardized formats 1204 of each data artifact to generate node information. The node information may include a set of entities, a set of data attributes, and/or a set of relationships. The normalization pipeline may use the language model service 206, discussed herein, to break apart the artifacts or standardized data structures and determine entities, data attributes, relationships and the like based on content of the artifacts or standardized data structure.

In some cases, the normalization pipeline may process the node information to generate or update a graph 1208, depicted as stored in the project datastore 216. While the graph 1208 is depicted as stored in the project datastore 216, the graph 1208 may be stored or updated in device memory, on a separate device, in a managed datastore (e.g., cloud storage), or air-gapped computer system. Likewise, the engineering information and the software to perform operations of the project server 120 described herein may be deployed in the same or a corresponding environment (e.g., locally hosted, cloud hosted, air-gapped, and the like).

In some cases, the normalization pipeline may use the ontological service 210 discussed herein to understand implicit, inferred, or explicit relationships of the entities, data attributes, and relationships of the node information. For instance, the ontological service 210 may reference ontology 212A from ontological datastore 212, as discussed herein. In some cases, the ontological service 210 may also, or instead, reference a government reference model 212B to perform similar operations, thereby conforming to government requirements for government technology projects. In some cases, the reference ontology 212A and the government reference model 212B may be selectable based on context data or a user selection for a project (e.g., a space system ontology versus a missile system ontology).

In some cases, a graph 1208 does not yet exist for a project (e.g., this is the first data artifact for a new project). In these cases, the normalization pipeline may instantiate an empty graph 1208 to add the set of entities, the set of data attributes, and/or the set of relationships derived from the artifact. In some cases, the ontological service 210 may add relationships to the node information based on reference to the ontology 212A and/or the government reference model 212B.

In some cases, a graph 1208 already exists for a project (e.g., this is an update to an existing project). In these cases, the normalization pipeline may retrieve the graph 1208 (or data from the graph) and determine which of the set of entities, the set of data attributes, and/or the set of relationships derived from the artifact are to be added to the graph 1208. In some cases, the ontological service 210 may add relationships to the node information based on reference to the ontology 212A and/or the government reference model 212B, and in view of the existing nodes/edges of the graph 1208. In this manner, the ontological service 210 may avoid duplicating entities, data attributes of entities, or relationships that already exist in the graph 1208.

In some cases, a graph 1208 already exists for a project (e.g., this is an update to an existing project) and this artifact has previously been added (e.g., this is an update to the existing artifact). In these cases, the normalization pipeline may retrieve the graph 1208 (or data from the graph) and determine which of the set of entities, the set of data attributes, and/or the set of relationships derived from the artifact are to be used to update existing nodes/edges or which are to be added to the graph 1208.

Generating or updating the graph may end the first stage. In some cases, the second stage may be triggered based on an addition or update of one node or edge of the graph 1208. In some cases, the second stage may be triggered based on a trigger condition (e.g., a batch of data artifact(s) have been processed by the pipeline and the graph 1208 is updated). In this manner, attempts by the second stage to generate the at least one data structure may wait until the trigger condition is satisfied (and thereby have a fixed state of a graph 1208 to work against, until a next update or data artifact is obtained to be processed).

In some cases, the graph 1208 may work in parallel to a vector database, updated to reflect changes to the graph 1208 (collectively, a "Semantic Artifact Network or SAN). The graph 1208 and the vector database may store information in a structured format that allows for efficient retrieval and analysis. As data is ingested, various features of that data are extracted, inferred, or classified and added to the graph (and mirrored to the vector database). This results in a rich, interconnected network of information consisting of structured text/data objects, ontological information, SysML element classifications, and various other inferred information and metadata. In some cases, agents may select (or be designed to use) the graph 1208 or the vector database to perform node traversal or context retrieval. In cases, where the vector database is selected (e.g., for LLM based agents), the vector database may yield higher performant results (e.g., faster and/or more accurate results) and/or access to the latent space similarity of nodes and data associated therewith.

The node information may be added to the graph by checking whether an entity exists on the graph that matches an entity of the node information, and, if not, adding a node for that entity of the node information. Moreover, edges may be added between existing nodes (if that edge does not already exist on the graph). That added node may be connected via edges (indicated by relationships) to other entities.

In some cases, the system may also obtain/extract language model (e.g., SysML) element components and referenced entities (e.g., from an external source of data, such as Wikipedia). In this case, the system may map the language model element components and referenced entities (of the language model element components) to an ontology (or government reference model); and adding and linking the language model element components and referenced entities on the graph (to each other and entities derived from the artifacts).

In some cases, the graph may be a directed semantic graph. In some cases, the graph may be stored as a mem-graph database, a neptune database, and the like.

2.B. Second Stage

Turning to the second stage, the agents 1210 may include various combinations of agents to traverse the graph and generate the at least one data structure based on at least the nodes and/or the edges (that were added, but also, in some cases, existing node/edges) of the graph. For instance, in some cases, the agents 1210 may include an agent to provide feedback regarding the at least one data structure. As depicted in FIG. 12, the agents 1210 include an evaluator agent 1210A, a writer agent 1210B, and a critic agent 1210C. However, the combination or allocation of functions or operations of the agents may be changed or modified based on system constraints or design considerations. In some cases, the agents 1210 may interact in a finite state machine. See FIG. 15 for further details.

In some cases, the agents 1210 may use an interface 1212 to generate the least one data structure. The interface 1212 may be a programmatic interface. In some cases, the agents 1210 may generate the at least one data structure without an interface. However, in other cases, the agents 1210 do not directly generate the at least one data structure. Instead, the agents 1210 may instead use the interface 1212 to execute operations on an explicitly validated object model, as the agents 1210 traverse the graph. In the case depicted in FIG. 12, the object model of the interface 1212 may have multiple object models or sub-components of an object model, including a first object model 1212A, a second object model 1212B, and a third object model 1212C. The object model may export to the at least one data structure (e.g., in SysML textual notation, such as a SysML file). For instance, the first object model 1212A may export a text file/snippet having a first data structure 1214A, the second object model 1212B may export a text file/snippet having a second data structure 1214B, and the third object model 1212C may export a text file/snippet having a third data structure 1214C. Collectively, the first data structure 1214A, the second data structure 1214B, and the third data structure 1214C may be referred to as "language model data structures." The language model data structures may be syntactically valid (for the target language model, such as SysML v2) and semantically valid (in view of the data in or associated with nodes/edges of the graph). In some cases, a note is made in the metadata of each node the graph that was used to produce the at least one data structure.

In some case, the agents 1210 are configured to generate and execute a lists of functions of the interface 1212. In this manner, the interface may resolve persistent syntax issues in LLM outputs (e.g., ensuring SysML syntax is valid). For instance, when the SysML added is syntactically invalid, a value error may be raised, and thus that component is not added to the model-so the agent may reattempt its action (e.g., with feedback from a critic agent). For instance, in the case of SysML. SysML is not an executable programming language; nonetheless, it does have a rigorously defined syntax. Thus, in some cases, the interface 1212 may represent the SysML language as a graph (e.g., a language graph representation). Thus, the interface 1212 may be an interface for the language graph representation, and the interface 1212 may have meta-methods that enhance the language graph representation but are not contained in the literal in memory (e.g., NetworkX) directed graph data structure used to interact with the language graph representation. The directed graph data structures may not be natively exported to the target language model (e.g., SysML) textual notation, but the interface 1212 and object model (e.g. classes) may enable export to such language model textual notation.

In some cases, the evaluator agent 1210A may interact with the graph 1210 to assess whether the node, or data associated with that node, can be converted to the language model (e.g., SysML). If the node and or data in question is deemed to be relevant to the creation of a SysML model, the evaluator agent 1210A passes along this information to the writer agent 1210B. In some cases, the evaluator agent 1210A may be a LLM agent, a transcoder agent (e.g., like the LLM service 210), or an expert rules based system. In some cases, the evaluator agent 1210A may also determine additional information to pass to the writer agent 1210B from other nodes of the graph. For instance, in some cases, the evaluator agent 1210A may collect data from (a) nodes (or associated with those nodes) that are directly connected a current target node; (b) nodes within a same cluster as the target node; (c) nodes within a preset number of connections (e.g., edges) of the target node; (d) nodes within a distance metric of the target node; (c) nodes that classify (e.g., based on a LLM, transformer, or ML model) as a same system or sub-system; (c) nodes that classify (e.g., based on a LLM, transformer, or ML model) as language model element components of the target node; and/or (f) nodes of referenced entities of language model element components or the target node itself. In some cases, the other nodes may only be passed if the nodes have not yet been processed into a data structure yet. In some cases, the other nodes may be passed even if the other nodes have been processed into a data structure; in this case, the other nodes may be a duplicate feature or a shared connection between entities. In some cases, the other nodes may already have been processed into a data structure (or not if not relevant for a data structure), but the information of the other node may be used as contextual data (e.g., for an LLM).

In some cases, the writer agent 1210B may review the information provided from the evaluator agent 1210A, and assesses how to engage the interface 1212 (e.g., via an API call to instantiate a new class, add a feature, update a feature, etc.). For instance, the writer agent 1210B may determine how to call an enumerated list of functions provided by the interface 1212 (e.g., the object model, such as a python object model). In this manner, the system may ensure that whatever operations are performed on the object model will translate to valid language model (e.g., SysML v2) textual notation when exported from the object model. In the event an operation is invalid, a value error may be raised. In this case, the value error may be assessed by either the critic agent 1210C, or another agent given with an explicit directive for error evaluation, which can analyze the error and pass this analysis back to the writer agent 1210B, so the writer agent 1210B has greater context before reformulating the interface operation executed. In some cases, the writer agent 1210B may be a LLM agent, a transcoder agent (e.g., like the LLM service 210), or an expert rules based system.

In some cases, the critic agent 1210C may evaluate the output (e.g., the updated object model or exported textual notation format or a value error) to assess (1) whether or not it is an accurate portrayal of the natural language text or data from the graph, or provide feedback on the value error. In some cases, the critic agent 1210C may be a LLM agent, a transcoder agent (e.g., like the LLM service 210), or an expert rules based system.

In some cases, the critic agent 1210C is trained on example textual notation standards and assesses the validity and correctness of the textual notation generated by the writer agent 1210B. If the critic agent 1210C determines that the output is a sufficient representation of the input data (and syntactically correct), the traversal of the graph continues, otherwise the critic agent 1210C reverses the change to the model and passes criticism back to the writer agent 1210B. This loop continues until the critic agent 1210C is satisfied, or until a counter of loops triggers an error.

Note that the process described above is one possible configuration of the finite state machine. In some cases, the system may use automated generation and testing of various state machine configurations, including the necessary integration of agents with the task of performing information retrieval, data processing, inference, or interaction with deterministic functions that handle these activities.

Additionally, the system may use path optimization strategies for the agent-graph traversal process. For instance, a first traversal strategy may be to linearly traverse and assess text extracted from textual nodes or associated artifacts, and use non-natural-language-text data artifacts/nodes only indirectly during the text evaluation process. Additional traversal strategies could include, but are not limited to: (a) language model based agents that select the next node based on context/analysis of that node and its neighbors, (b) reinforcement learning agents that are trained on various simulated traversal/generation processes and the quality/accuracy of the output language model, and/or (c) heuristics derived from statistical algorithms available in the domain of graph theory.

In some cases, in addition to validating syntactic correctness, representing a language model (e.g., SysML) as a programmatically accessible graph may allow the system to perform various semantic validation operations on language graph. For instance, to test semantic validity, the system may apply logically deterministic validations on a graph representation of a syntax resembling the language model.

As an example, the system may define rules as (e.g., python) functions and determine whether the rules pass or fail. For instance, in natural language a rule could be interpreted as: "if some physical entity X is contained within some physical entity Y, the volume of X must be less than or equal to physical entity Y". Importantly, this rule does not validate the syntax of the graph, but the epistemological consistency, which in turn can be used to (partially) infer semantic correctness (or incorrectness)—or to automatically verify and validate the system design in a computationally deterministic manner. In some cases, the set of rules may be manually generated by users (as code and/or as first order logic). In this manner, the system may achieve some degree of explainability of deterministic expert systems.

In some cases, the set of rules may be a training sample. In this case, another agent based meta-process may generate deterministic rules based on the training sample and other language models (e.g., validated SysML files). The deterministic rules may be built by an arbitrary number of language models. In this manner, the system may also reclaim some generalizability.

In some cases, the system may determine a node or edge has been updated. In these cases, the agents and interface may perform a similar process to update an object model and, thereby, update a corresponding exported data structure (e.g., a SysML file in textual notation).

In this manner, the second stage may generate at least one data structure that may be syntactically and semantically valid. Generating or updating the at least one data structure may end the second stage. In some cases, the third stage may be triggered based on an addition or update of at least one data structure. In some cases, the third stage may be triggered based on a trigger condition (e.g., a batch of data artifact(s) have been processed by the pipeline and the graph 1208 is updated and at least one data structure has been updated or generated). In this manner, attempts by the third stage to generate (or update) a digital thread may wait until the trigger condition is satisfied (and thereby have a fixed state of a graph 1208 and (a new or updated) at least one data structure to work against, until a next update or data artifact is obtained to be processed).

In some cases, the digital thread may be omitted and the data structure may be used to perform various engineering tasks, such as perform simulation, integration, testing, monitoring, or maintenance using a digital twin (as discussed herein). However, the benefit of a digital thread enables engineers to operate in multiple domains, such as in static or development domains and model-based domains.

2.C. Generate Digital Threads Using Graphs

Figure 13:
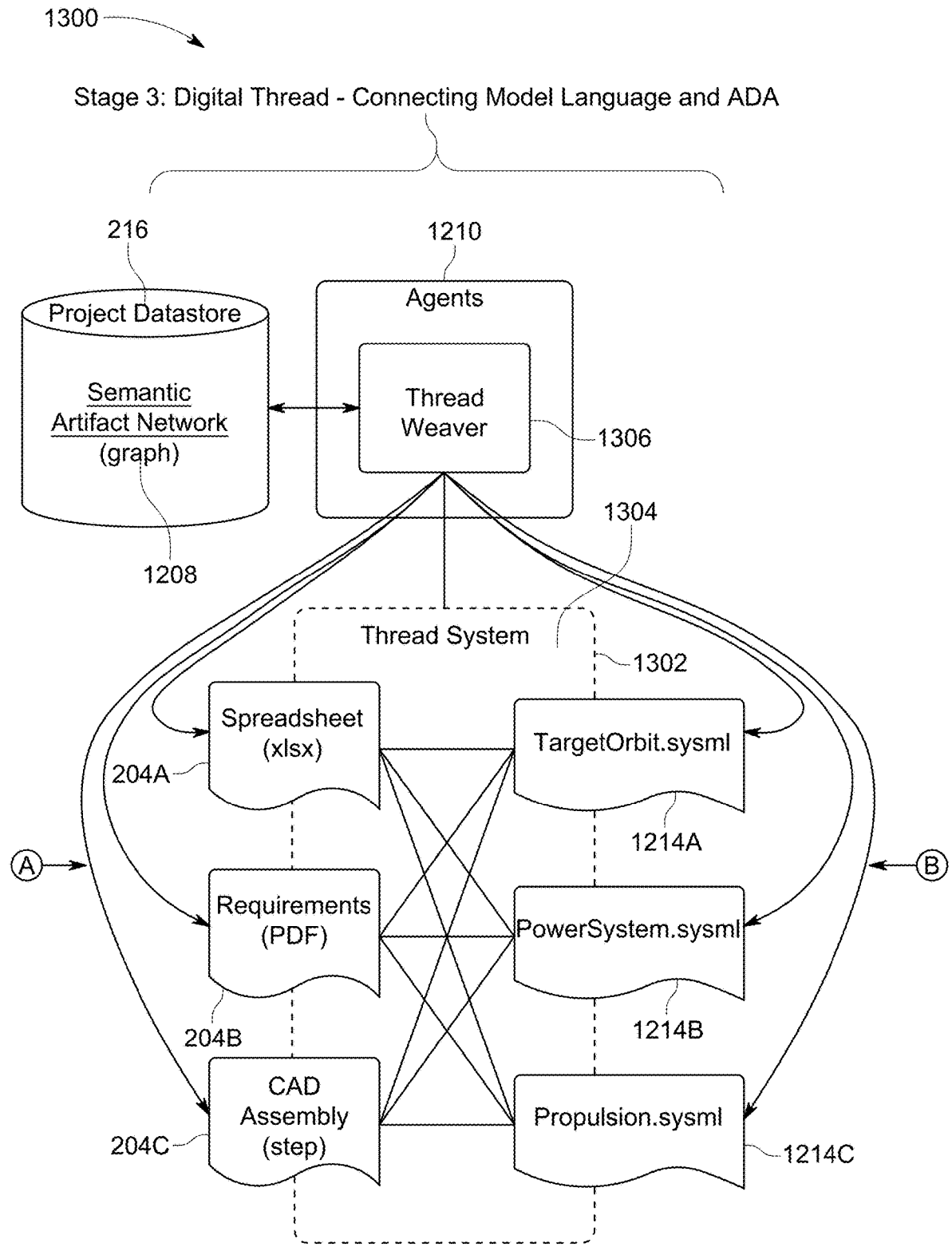
FIG. 13 depicts a block diagram schematically showing features of generating digital threads using graphs.

FIG. 13 depicts a block diagram 1300 schematically showing features of generating digital threads using graphs. The features of FIG. 13 may apply to any of FIGS. 1, 2, 3, 4A-4B, 5, 6, 7, 8, 9, 10, 11, 12, 14, 15, and 16. In relevant part, the block diagram 1300 depicts a thread weaver agent 1306 that is configured to generate at least one digital thread 1304 that connects at least one data artifact (e.g., any or all of 204A, 204B, 204C) and at least one data structure (e.g., any or all of 1214A, 1214B, 1214C). In some cases, the thread weaver agent 1306 may generate at least one digital thread 1304 in response to the at least one data structure being generated. The thread weaver agent 1306 may store the one digital thread 1304 in a thread system 1302.

The thread system 1302 may be configured to align multiple engineering source of truth against multiple engineering analyses and models used in the development of a system. The thread system 1302 may include a common storage platform for analysis, but also a visual way to develop and distribute these execution chains. By using a transport layer, the thread system 1302 may carry engineering parameters to connectors that correspond to the inputs and outputs of the relevant analysis or design files. By operating as a transport layer, and routing data back to the original model, the thread system 1302 may offload significant complexity in designing systems.

The thread weaver agent 1306 may use metadata (captured during the normalization pipeline of the first stage and the data structure generation process of the second stage) to generate the digital threads. Specifically, each node (e.g., semantic artifact nodes) in the graph may store metadata that lists the specific input artifact it came from. Additionally, each node has metadata associating that node to any resulting data structure (e.g., SysML file) produced from the finite state machine.

For instance, the thread weaver agent 1306 may iterate through each of the set of data artifacts and reference each of their nodes in graph, as well as the corresponding data structure (e.g., SysML artifact). Next, the thread weaver agent 1306 may call an API within the thread system 1302 to match the data artifact in their source location to the data structure. If a node in the graph is a units-aware engineering data attribute, this may be mapped using an "atomic" feature of the thread system 1302 at both ends, to ensure any engineering data is appropriately mapped.

Thus, the thread weaver agent 1306 may cause a digital thread to be registered within the thread system 1302. For instance, in the case of SysML v2 standard, the standard does not include a digital thread capability, so this external mapping and connecting capability is beneficial for quicker, more accurate, and more precise engineering development.

In some case, the thread weaver agent 1306 may be expert system or an LLM system. In the case of an expert system, this may ensure deterministic behavior when working with the API calls and searching the graph.

2.D. ADAP

Figure 14:
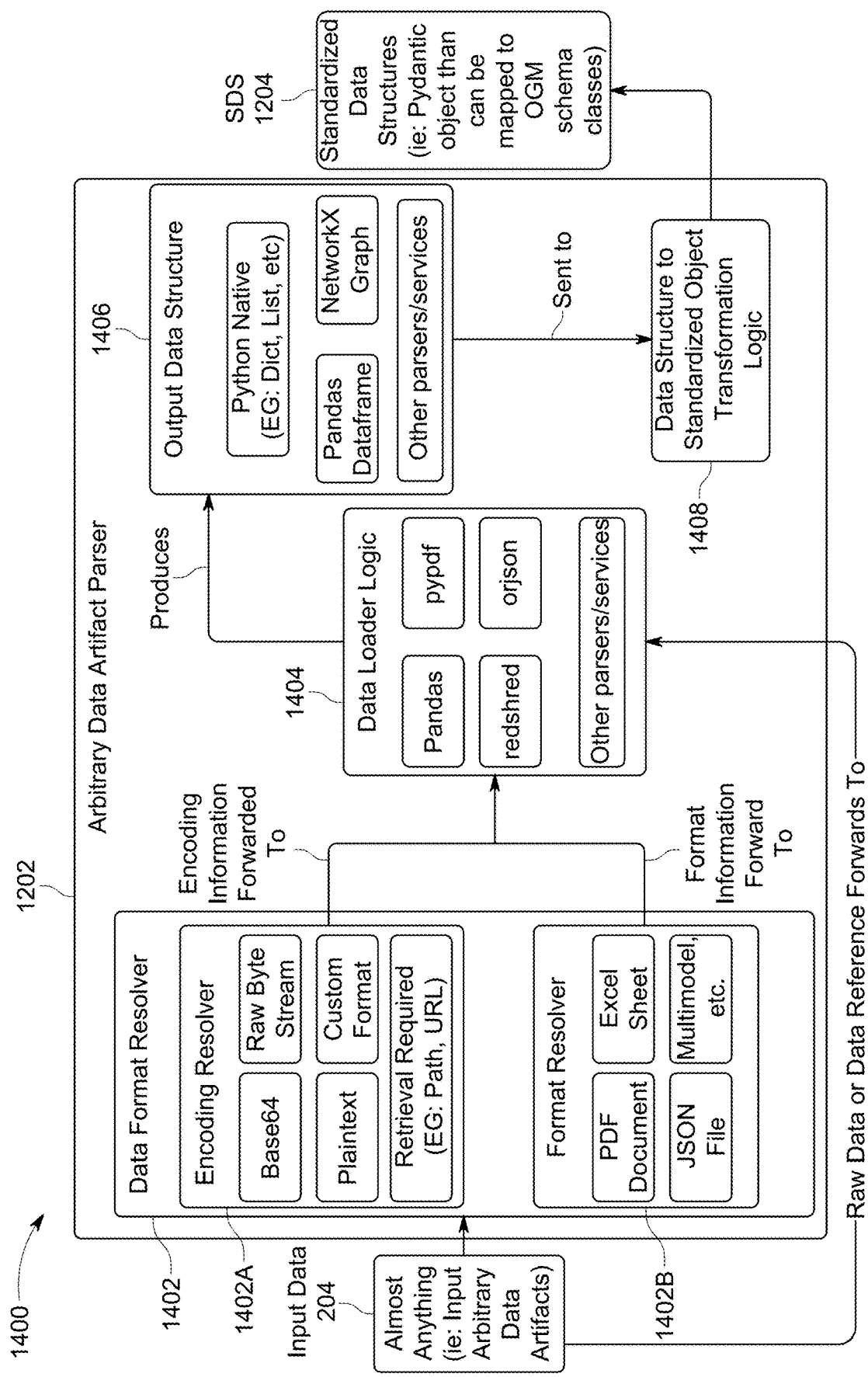
FIG. 14 depicts a block diagram schematically showing features of an arbitrary data artifact parser.

FIG. 14 depicts a block diagram 1400 schematically showing features of an arbitrary data artifact parser 1202. The features of FIG. 14 may apply to any of FIGS. 1, 2, 3, 4A-4B, 5, 6, 7, 8, 9, 10, 11, 12, 13, 15, and 16. The arbitrary data artifact parser 1202 of the block diagram 1400 may include a data format resolver 1402, a data loader logic 1404, and a transformation logic 1408. The data format resolver 1402 may include an encoding resolver 1402A and a format resolver 1402B.

Generally, the arbitrary data artifact parser 1202 is configured to parse data artifacts (e.g., arbitrary data artifacts, or ADA) and convert data artifacts to standardize the data artifacts into a common set of data structures (e.g., standardized data structures, or SDS). In reference to "artifact", artifact is meant to include items like PDFs, CAD files, excel spreadsheets, etc. and the term "artifact" is used because "document" may not necessarily accurate and "file" may not necessarily accurate for certain types of engineering data. In reference to "arbitrary", arbitrary is used to connote a superset of structured (e.g., csv file), semi-structured (e.g., PDF file), and unstructured data. With respect to standardized formats, an example may be Python classes that contain the information of the input data artifact, allowing the user to interact with its contents programmatically through a singular shared interface.

The conversion of ADA to SDS may be a beneficial step for two reasons. First, in order to work across large volumes of engineering data, that data should generally conform to some sort of predefined structure so the data can be queried with foreknowledge of what one will receive in return. In some cases, natural language modeling precludes this need, however, in this context it may still be required. For instance, not all the data we want the agents to interact with are natural language text. CAD files, Excel Spreadsheets, NetCDF arrays, GeoJSON, or just JSON data may not be processed with the exact same mechanisms used to process, encode, or extract features from natural language. Furthermore, some documents are multi-class in data representation (e.g., PDF with text, table, images). Therefore, being able to convert a PDF file into a programmatically defined PDF object that lets the system extract tables, images, and text separately, and add them as independent nodes on the graph may be quite useful.

Moreover, the system may derive benefits from discretization and chunking of data. For instance, the system may derive a benefit in processing time by break all data into a smaller (or smallest possible) meaningful components so as the agent traversal process may run on the graph efficiently. For example, discrete chunks of solely relevant information can be retrieved from arbitrary documents/artifacts throughout the engineering project, instead of breaking a part a large item (like a PDF at single node) at run time.

The arbitrary data artifact parser 1202 is configured to resolve an encoding type (by the encoding resolver 1402A) and a data format (by the format resolver 1402B) of the input data 204. The encoding type and the data format may be conditionally forwarded to the data loader logic 1404. The data loader logic 1404 may include parsers like Pandas, PyPDF, Redshred, etc. The data loader logic 1404 may produce an output data structure 1406 using, e.g., code native types (e.g., list, dictionary, etc.), data frames, graphs, etc. The data loader logic 1404 may pass the output data structure 1406 to the transformation logic 1408. The transformation logic 1408 may map the output data structure into a common programmatic data structure (e.g., Pydantic) to provide the SDS.

2.E. State Machine for Model Generation

Figure 15:
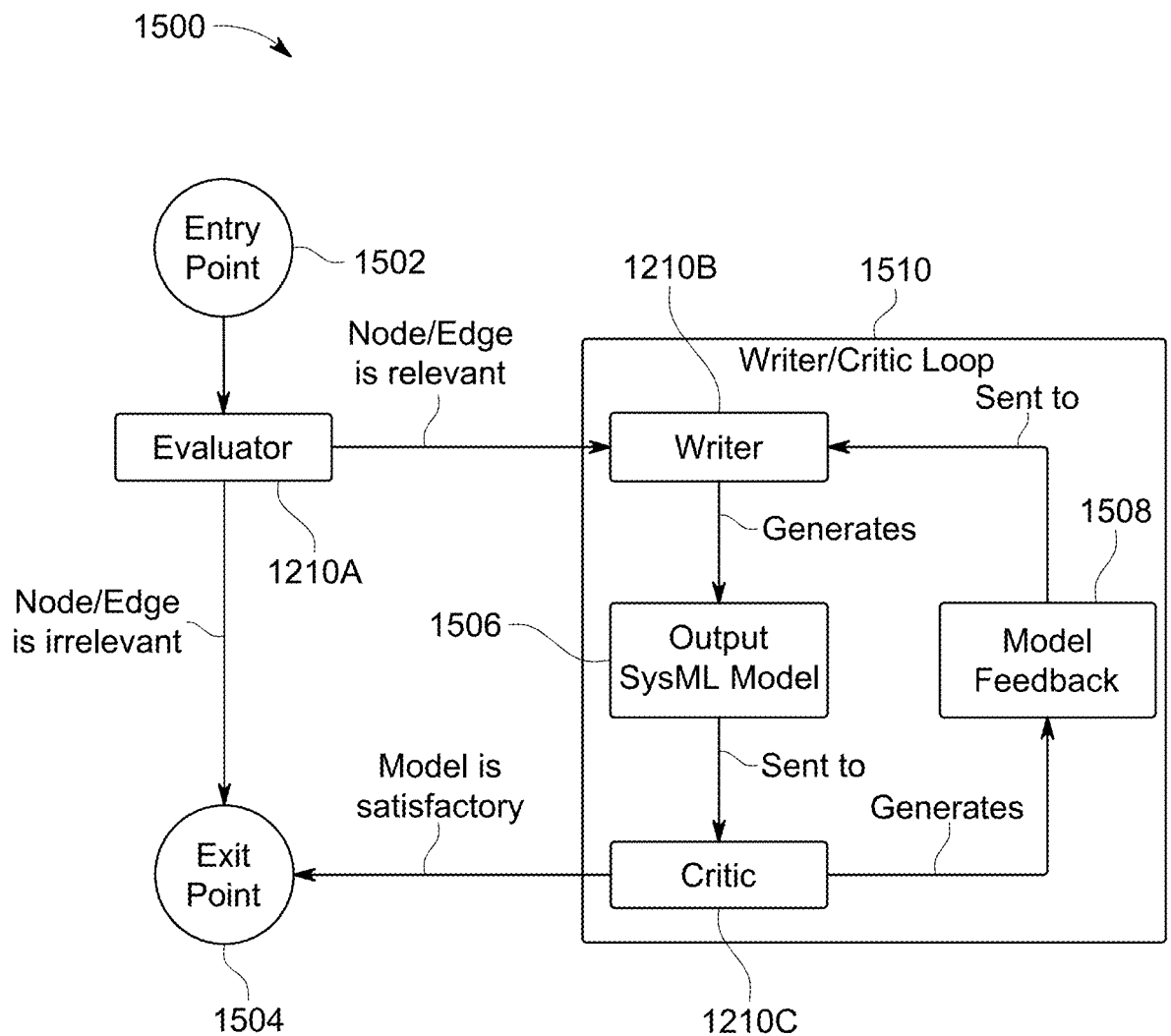
FIG. 15 depicts a state machine for generating models using graphs.

FIG. 15 depicts a state machine 1500 for generating models using graphs. The features of FIG. 15 may apply to any of FIGS. 1, 2, 3, 4A-4B, 5, 6, 7, 8, 9, 10, 11, 12, 13, 14, and 16. The state machine 1500 may start at entry point 1502. The state machine 1500 may then proceed to the evaluator agent 1210A. The evaluator agent 1210A may start at a node of the graph (e.g., pre-set or dynamically determined). The evaluator agent 1210A may determine whether the node and any edges of the node are relevant to generating a data structure (e.g., SysML v2). For instance, the evaluator agent 1210A may retrieve data from or associated with the node/edge (referred to as "prompt data") and determine whether the prompt data is relevant. For instance, the evaluator agent 1210A may use a transformer, encoder, a classifier, etc.

If not, the state machine 1500 may proceed to exit point 1504. If so, the state machine 1500 may proceed to the writer agent 1210B. The evaluator agent 1210A may pass the prompt data to writer agent 1210B.

The writer agent 1210B may then generate an object model 1506 (e.g., by using the interface 1212) using the prompt data. The state machine 1500 may then proceed to the critic agent 1210C. The writer agent 1210B may pass the object model 1506 and the prompt data to the critic agent 1210C.

The critic agent 1210C may determine whether the object model is satisfactory to generate a data structure that is syntactically valid and/or semantically valid. If so, the state machine 1500 may proceed to exit point 1504. If not, the state machine 1500 may proceed to generate feedback 1508 using the critic agent 1210C. The critic agent 1210C may then pass the feedback 1508 to the writer agent 1210B, which may re-attempt to generate the object model 1506 or modify the object model 1506 based on the feedback 1508.

The state machine 1500 may traverse the states until a satisfactory object model is generated, or until a set number of attempts have been made.

2.F. Flowchart for Generating Models and Digital Threads

Figure 16:
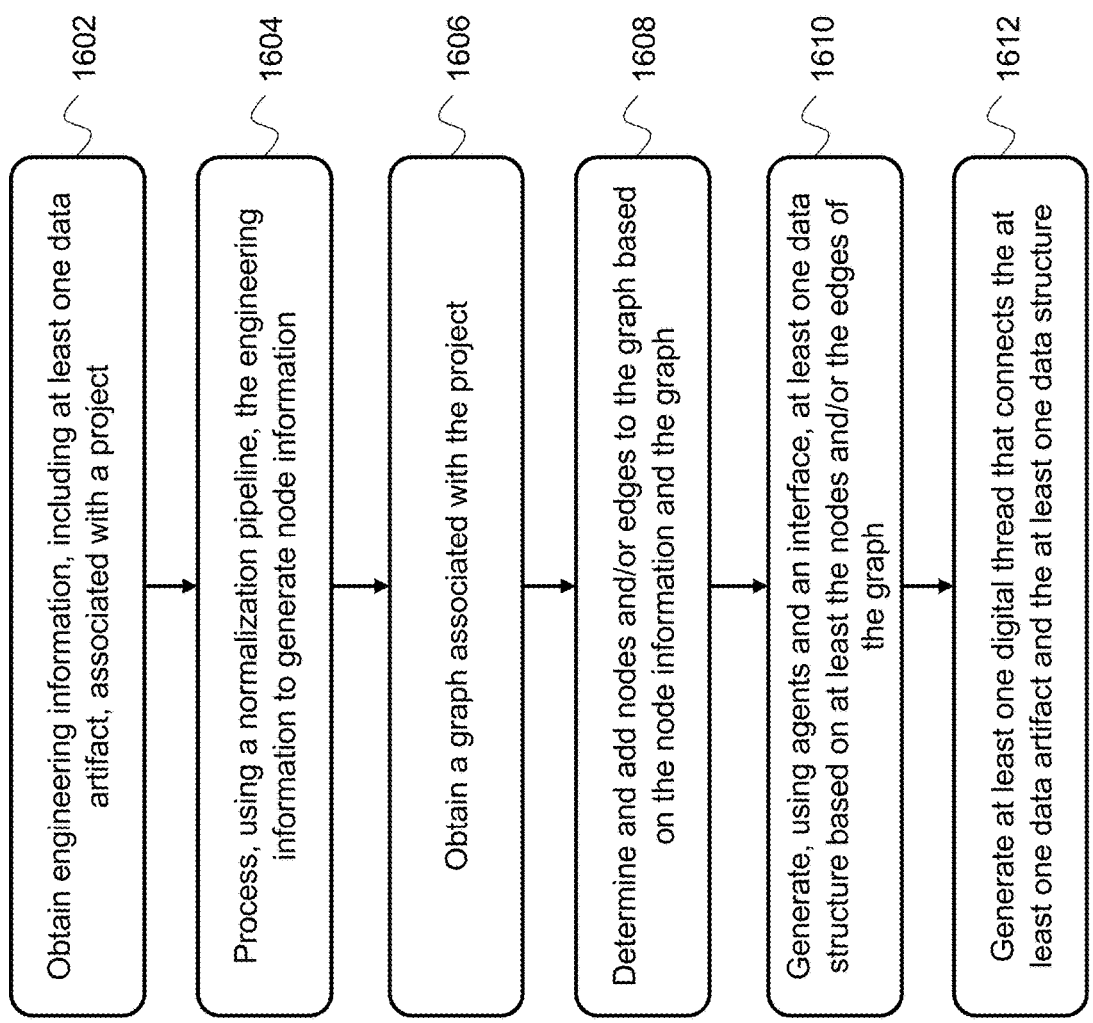
FIG. 16 depicts a flowchart for generating models and digital threads using graphs.

FIG. 16 depicts a flowchart for generating models and digital threads using graphs. The features of FIG. 16 may apply to any of FIGS. 1, 2, 3, 4A-4B, 5, 6, 7, 8, 9, 10, 11, 12, 13, 14, and 15. The operations of the flowchart 1600 may be performed by one or more of the systems of environment 100, such as the project server 120 or any one of the engineering service(s) 115.

At block 1602, the project server 120 may obtain engineering information, including at least one data artifact, associated with a project, as discussed herein.

At block 1604, the project server 120 may process, using a normalization pipeline, the engineering information to generate node information, as discussed herein.

At block 1606, the project server 120 may obtain a graph associated with the project, as discussed herein.

At block 1608, the project server 120 may determine and add nodes and/or edges to the graph based on the node information and the graph, as discussed herein.

At block 1610, the project server 120 may generate, using agents and an interface, at least one data structure based on at least the nodes and/or the edges of the graph, as discussed herein.

At block 1612, the project server 120 may generate at least one digital thread that connects the at least one data artifact and the at least one data structure, as discussed herein.

3. Distributed Version Control of Engineering Data

3.A. Client-and-Server Infrastructure

FIGS. 17, 18, 19A-19C, and 20A-20C depict features of a client-and-server infrastructure for capturing, storing, and managing engineering data using distributed version control. The features of FIGS. 17, 18, 19A-19C, and 20A-20C may apply to any of FIGS. 1, 2, 3, 4A-4B, 5, 6, 7, 8, 9, 10, 11, 13, 14, 15, and 16.

One of the benefits of utilizing a small footprint client application within the client-and-server infrastructure for distributed version control of engineering data is the reduction in resource consumption on the user's device. This allows for faster performance and lower power usage, which is particularly advantageous for users with limited computing resources or those using mobile devices. Additionally, a small footprint client application can be quickly downloaded and updated, facilitating ease of deployment and maintenance. This streamlined client application also simplifies the user experience by focusing on core functionalities that are directly relevant to the user's tasks, thereby reducing complexity and potential for user error. Furthermore, the lightweight nature of the client application minimizes the attack surface, enhancing security and making it less vulnerable to cyber threats.

Interoperability within the client-and-server infrastructure for distributed version control of engineering data presents several advantages. Firstly, it ensures seamless integration and communication between different systems and software tools, which is particularly beneficial in multi-vendor and multi-platform environments. This compatibility across diverse systems allows for the efficient exchange and use of information, reducing the likelihood of data silos and enhancing collaborative efforts among various stakeholders.

Secondly, interoperability facilitates the adoption of new tools and technologies without disrupting existing workflows. Organizations can easily incorporate innovative solutions into their processes, thereby staying current with technological advancements and maintaining a competitive edge. This flexibility also allows for scalability, as systems can be expanded or modified with relative ease to accommodate growing project demands.

Thirdly, the ability to interoperate promotes standardization of data formats and protocols, which leads to improved data quality and consistency. With standardized data, the risk of errors during data translation or transfer is minimized, ensuring that all users have access to accurate and reliable information. This standardization also simplifies the process of data analysis and reporting, as data from different sources can be aggregated and compared without extensive preprocessing.

Lastly, interoperability contributes to cost savings by reducing the time and resources spent on custom integration solutions and data conversion. It allows for the reuse of existing components and systems, maximizing the return on investment for software and infrastructure. Moreover, it reduces training requirements, as users become familiar with a consistent set of tools and interfaces across different applications.

In summary, interoperability within the client-and-server infrastructure may enhance collaboration, flexibility, data integrity, and cost-effectiveness, all of which are pivotal to the successful management and version control of engineering data in distributed environments.

The bidirectional conversion capabilities of the parser within the client application offer substantial benefits in the context of distributed version control of engineering data. The ability of the parser to convert graphical engineering data into a compliant data structure and vice versa facilitates a dynamic and flexible workflow that accommodates various user preferences and requirements.

Firstly, the bidirectional conversion allows users to work in the format that is the easiest or the most familiar to them. Some users may prefer to interact with graphical representations of engineering data for their intuitive and visual nature, while others may prefer the precision and detail provided by textual data structures. The parser enables seamless transitions between these formats, ensuring that all users can work in their preferred environment without compromising the integrity or consistency of the data.

Secondly, the conversion process supports iterative design and development processes. As users make edits to the graphical engineering data, the parser can instantly convert these changes into the data structure format, allowing for immediate version control actions such as commits and merges. Conversely, changes made directly to the data structure can be reflected in the graphical representation, ensuring that all team members have access to the latest project information.

Thirdly, the bidirectional nature of the parser's conversion process enhances collaboration among team members who may have different roles and expertise. Engineers, designers, and project managers can all contribute to the project using the representation that aligns with their skills, while the parser ensures that their contributions are accurately reflected across all formats.

Fourthly, the parser's ability to convert in both directions aids in maintaining data integrity during the translation process. By ensuring that the conversion to and from the graphical and data structure formats is lossless, the parser minimizes the risk of data corruption or loss of information, which is paramount in engineering projects where precision is of utmost concern.

Lastly, the bidirectional conversion capability of the parser streamlines the process of updating and maintaining engineering data. As project requirements evolve, the parser allows for quick and efficient updates to be made in either format, which can then be synchronized across the client-and-server infrastructure, reducing downtime, and enhancing productivity.

In conclusion, the parser's bidirectional conversion functionality is a feature of the client-and-server infrastructure for distributed version control of engineering data that provides a versatile, collaborative, and reliable platform for managing complex engineering projects.

The incorporation of a user interface that enables the manipulation of engineering data in a graphical format within the client-and-server infrastructure for distributed version control of engineering data offers numerous advantages. The graphical user interface (GUI) allows users to visualize complex data structures and relationships in a more intuitive and accessible manner, which can enhance understanding and facilitate more effective decision-making.

Firstly, the GUI provides an immediate visual representation of engineering data, which can be particularly beneficial for identifying patterns, anomalies, and interdependencies within the data. This visual context can help users to quickly grasp the implications of their data manipulations, leading to more informed and accurate engineering outcomes.

Secondly, the GUI supports direct manipulation of data elements through user-friendly controls such as drag-and-drop interfaces, context menus, and interactive diagrams. This hands-on approach to data management can improve user engagement and satisfaction, as it allows for a more natural interaction with the data compared to text-based inputs.

Thirdly, the GUI can facilitate faster and more efficient workflows by reducing the cognitive load on users. Instead of navigating through complex textual commands or syntax, users can perform operations on the engineering data through graphical controls that are often self-explanatory, thereby shortening the learning curve and increasing productivity.

Fourthly, the GUI can serve as a collaborative canvas where multiple users can simultaneously view and interact with the engineering data. This shared visual space can foster better communication and alignment among team members, as changes and updates to the data are immediately visible to all stakeholders.

Fifthly, the GUI can incorporate real-time feedback mechanisms, such as highlighting, color-coding, and tooltips, which provide users with instant validation of their actions or alert them to potential issues. This immediate responsiveness can prevent errors and ensure that data manipulations adhere to project requirements and standards.

In summary, the user interface enabling engineering data manipulation in a graphical user interface is a feature of the client-and-server infrastructure that enhances usability, efficiency, collaboration, and adaptability in the management and version control of engineering data.

The parser's capability to verify the syntax of engineering data before converting it into a compliant data structure offers several benefits within the client-and-server infrastructure for distributed version control of engineering data. This verification process ensures that the data adheres to the predefined model language syntax, which is instrumental in maintaining the quality and integrity of the engineering data throughout its lifecycle.

Firstly, syntax verification by the parser prevents the introduction of errors that could propagate through the version control system and affect subsequent data manipulations. By catching syntax errors early, the parser reduces the risk of costly mistakes that could require extensive debugging and correction efforts later in the project's development.

Secondly, the parser's syntax verification promotes consistency across the engineering data. Consistent use of the model language syntax facilitates better understanding and communication among team members, as well as interoperability with other tools and systems that interact with the data.

Thirdly, the verification process implemented by the parser enhances the reliability of the conversion between graphical engineering data and the data structure format. Users can trust that the data they are working with is syntactically correct, which supports accurate and efficient data translation and manipulation.

Fourthly, the parser's verification of syntax can lead to improved productivity by minimizing disruptions caused by syntax-related issues. Users can focus on their core tasks without being sidetracked by unexpected data inconsistencies or the need for manual syntax checks.

Lastly, the parser's ability to verify syntax supports the scalability of the client-and-server infrastructure. As projects grow in complexity and size, maintaining syntactic integrity becomes increasingly challenging. The parser's automated syntax verification can handle this scaling efficiently, ensuring that the system remains robust and manageable.

In conclusion, the parser's verification of syntax is a feature of the client-and-server infrastructure for distributed version control of engineering data that provides a safeguard against errors, ensuring data consistency, and enhancing the overall reliability and productivity of the engineering data management process.

3.A.i. Client-and-Server Infrastructure

Figure 17:
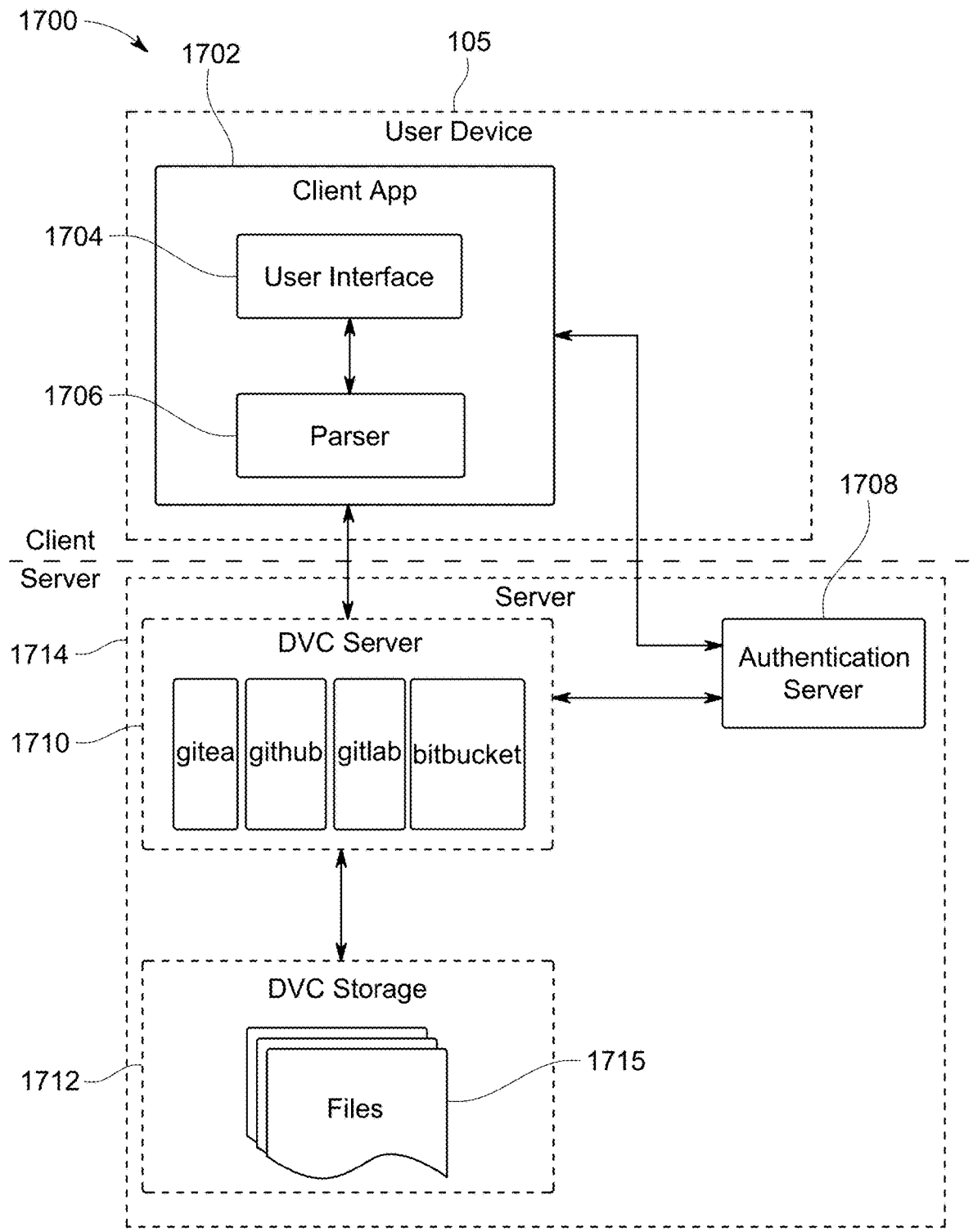
FIG. 17 depicts a block diagram for a client-and-server infrastructure for capturing, storing, and managing engineering data using distributed version control.

FIG. 17 depicts a block diagram 1700 for a client-and-server infrastructure for capturing, storing, and managing engineering data using distributed version control. The block diagram 1700 may depict a client application 1702, on a user device 105, communicating with a server 1714. The client application 1702 may include a user interface 1704 and a parser 1706. The server 1714 may include a distributed version control (DVC) server 1710, a DVC storage 1712, and an authentication server 1708.

The user interface 1704 may manage a structured user interface and pass data and requests to the parser 1706. For instance, the structured user interface may display various graphical user interfaces that include representations of engineering data, such a tables, graphics, text fields, drop down menus, and the like. The structured user interface may obtain and display engineering data, e.g., by using data service 202 and/or language model service 206, or by user selections/inputs on representations of engineering data. The user selections/inputs may make changes to data, delete data, add data, and connect different engineering parts of the representations of engineering data (collectively, "graphical engineering data"). In some cases, the engineering data may be requirements data. In some cases, the engineering data may be one or combinations of requirements data, verification data, procedure flow data, and concept of operations data.

The parser 1706 may be configured to (1) convert the graphical engineering data into a data structure that is compliant to a model language syntax (such as SysML v2) and (2) convert a data structure to graphical engineering data. In this manner, the parser 1706 may start new projects by collecting graphical engineering data (e.g., from the user interface 1704); and convert the graphical engineering data into a data structure to be stored by the DVC system 1712 in the DVC storage 1712. Moreover, the parser 1706 may retrieve a data structure for a project, via the DVC system 1712, from in the DVC storage 1712; convert the data structure into the graphical engineering data; and pass the graphical engineering data to the user interface 1704 to be displayed to a user. The user interface 1704 may receive user selections or additional data to add, delete, or change data of the graphical engineering data (collectively, "edits"); and pass the edits to the parser 1706. The parser 1706 may convert the graphical engineering data (or only edits to graphical engineering data) to the data structure format.

In some cases, the parser 1706 may perform verification of user edits and/or provided data structure, to ensure compliance with various check conditions. For instance, the parser 1706 may perform verification on each user edit, at set time intervals, or in response to trigger conditions, such as verify command or a save command.

In some cases, the parser 1706 may use the interface 1212 (see FIG. 12) to execute operations on an explicitly validated object model. The object model may be an intermediary model between the graphical engineering data and the data structure. For instance, the object model may be configured to export a data structure (e.g., in SysML textual notation, such as a SysML file). The data structure may be syntactically valid (for the target language model, such as SysML v2) and/or semantically valid (in view of the graphical engineering data).

In some case, the parser 1706 may be configured to generate and execute a lists of functions of the interface 1212. In this manner, the interface may ensure syntax compliance (e.g., ensuring SysML syntax is valid). For instance, when the SysML added is syntactically invalid, a value error may be raised, and thus that user edit is not added to the model-so the user may reattempt its action. For instance, in the case of SysML. SysML is not an executable programming language; nonetheless, it does have a rigorously defined syntax. Thus, in some cases, the interface 1212 may represent the SysML language as a graph (e.g., a language graph representation). Thus, the interface 1212 may be an interface for the language graph representation, and the interface 1212 may have meta-methods that enhance the language graph representation but are not contained in the literal in memory (e.g., NetworkX) directed graph data structure used to interact with the language graph representation. The directed graph data structures may not be natively exported to the target language model (e.g., SysML) textual notation, but the interface 1212 and object model (e.g. classes) may enable export to such language model textual notation.

In some cases, the parser 1706 may determine how to engage the interface 1212 (e.g., which API call to instantiate a new class, add a feature, update a feature, etc.). For instance, the parser 1706 may determine how to call an enumerated list of functions provided by the interface 1212 (e.g., the object model, such as a typescript or python object model). In this manner, the system may ensure that whatever operations are performed on the object model will translate to valid language model (e.g., SysML v2) textual notation when exported from the object model. In the event an operation is invalid, a value error may be raised. In this case, the value error may be displayed to a user (or agent), which can analyze the error and re-attempt the edit action.

Similarly, the parser 1706 may use the interface 1212 to import a data structure into an object model. The parser 1706 may then use the imported object model to extract and map data, attributes, relationships, and the like of imported data structure to graphical engineering data.

In some cases, the server 1714 may be, or an apart of, the project server 120. In some cases, the server 1714 may be managed by a user or organization, and the project server 120 may provide the client application 1702 to work independently of the project server 120. In some cases, the server 1714 may work cooperatively with the project server 120, thereby providing different functionalities to users or organizations.

In some cases, the authentication server 1708 may interact with the client application 1702 to verify access to the DVC server 1710, or to specific projects associated with the DVC server 1710. For instance, various methods may be used to control access to the DVC server 1710 9, such as login credentials, multifactor authentication, cryptographic keys, biometric authentication, and the like. Generally, the authentication server 1708 may provide identity and access control management to the DVC server 1710 and, thereby, to specific projects stored in the DVC storage 1712. In some cases, the authentication server 1708 may be (as depicted in FIG. 17) a part of the server 1714, while in other cases the authentication server 1708 may be separate from the server 1714 (e.g., for enterprise, cloud, or other hosting infrastructures).

The DVC server 1710 may be configured to manage and serve project data by managing data on the DVC storage 1712. For instance, the DVC server 1710 may receive requests from the client application 1702 (e.g., from the parser 1706) for existing projects; retrieve relevant data (e.g., a specific file) from the DVC storage 1712; and serve the relevant data. For instance, the DVC server 1710 may receive requests to update an existing project (e.g., from the parser 1706) for an existing project; determine which project to update; and transmit new data (e.g., a new file) to the DVC storage 1712. For instance, the DVC server 1710 may receive requests to add a new project (e.g., from the parser 1706); and transmit new data (e.g., a new file) to the DVC storage 1712 for a new project. The DVC server 1710 may also manage version control of projects, branching of projects, roll-backs of projects, forks of projects, merges of projects, and simultaneous access to projects.

The DVC storage 1712 may be a data store, such as the project datastore 216. In some cases, the DVC storage 1712 may store files 1715 as versions, branches, and the like of projects. In some cases, the DVC storage 1712 may store changes to files, snapshots of files and the like.

In some cases, the DVC server 1710 and the DVC storage 1712 (collectively, "DVC system") may implement a git-style DVC, such as bitbucket, gitlab, github, gitea. In this manner, the DVC system may store projects in an efficient and compact manner, focusing on saving changes (deltas) rather than complete file copies every time a change is made. The DVG system may handle projects of any size with speed and efficiency.

The DVG system may store its data (e.g., changes to files of compliant data structures) as a series of snapshots of a mini filesystem. Each time the user commits, or saves the state of a project, the DVG system takes a picture of what all the files look like at that moment and stores a reference to that snapshot. If files have not changed, the DVG system may not store the file again, just a link to the previous identical file it has already stored.

The DVG system may be designed to give each user a local copy of the entire development history, and changes are copied from one repository to another. These operations may be performed locally, making it extremely fast and versatile.

The DVG system may use check sums before data is stored and stored data may be referred to by that checksum. The DVG system may determine changes to contents of any file or directory.

The DVG system may include a repository. The repository may store metadata and object database for a project. The client application 1702 may store a copy of the repository.

The client application 1702 (for the DVG system) may include a working directory. The working directory may be a single checkout of one version of the project. The client application 1702 may pull a working directory out of a compressed database in the directory and placed on a user device's memory for a user to modify.

The DVG system may have three main states: committed, modified, and staged. Committed may mean that the data is safely stored in a device's local database. Modified may mean that the user has changed the file but has not committed it to the device's database yet. Staged may mean that the user has marked a modified file in its current version to go into a next commit snapshot.

The DVG system may include objects, trees, commits, and references. The objects may be data representing file data. The trees may include directory contents. The commits may include contain pointers to trees, parent commits, and commit message, author, etc. References may be pointers to commit objects. These may include branches, tags, and remote references, allowing for efficient navigation of the commit history.

This architecture allows the DVG system to provide speed, data integrity, and support for distributed, non-linear workflows. Moreover, the data and systems may be interoperable and require low implementation to adopt with the client application 1702.

3.A.ii. First Structured User Interface for a Client Application

Figure 18:
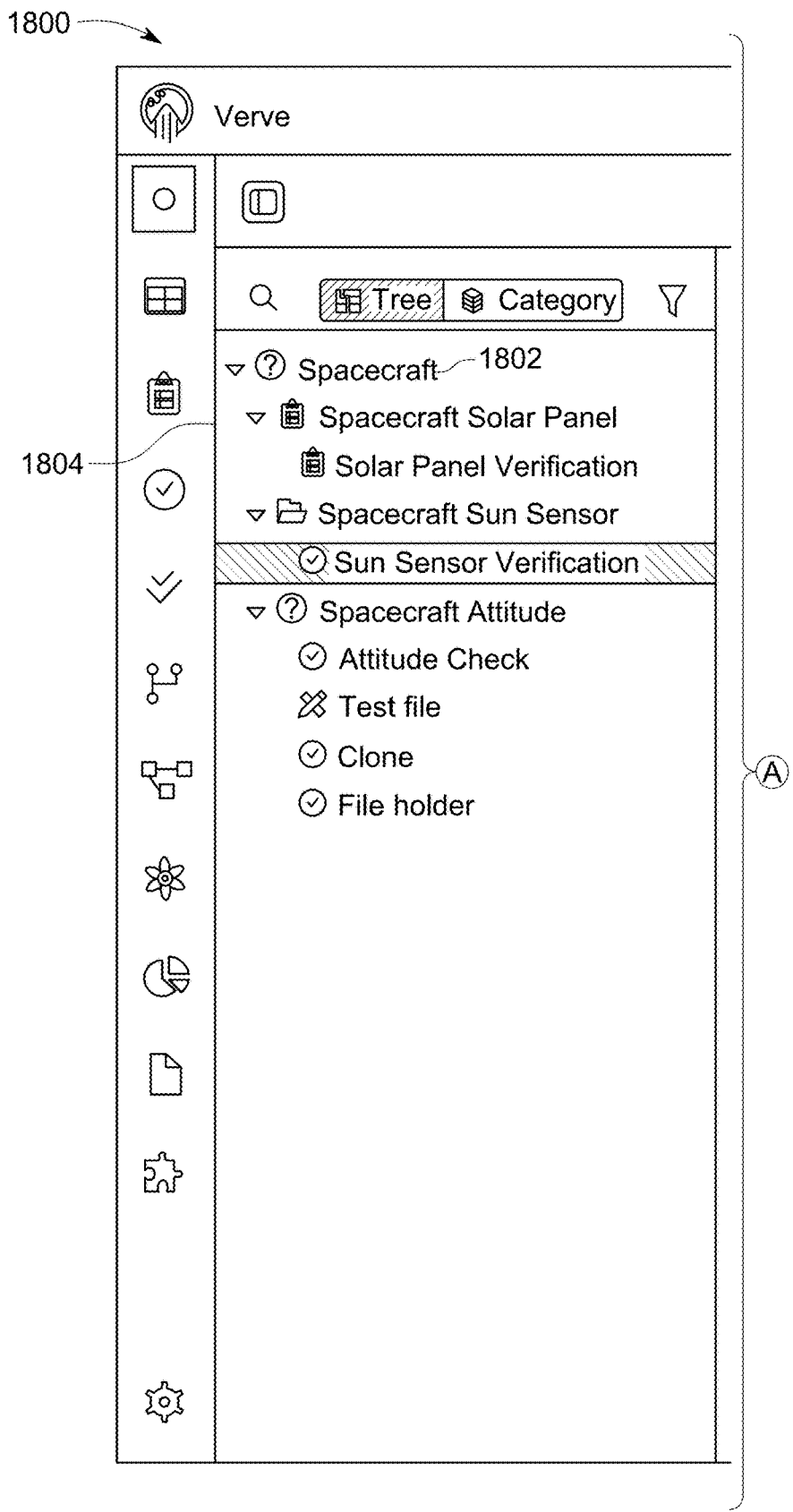
FIG. 18 depicts a first structured user interface for a client application of the client-and-server infrastructure for capturing, storing, and managing engineering data using distributed version control.

FIG. 18 depicts a first structured user interface 1800 (e.g., a first editor) for a client application of the client-and-server infrastructure for capturing, storing, and managing engineering data using distributed version control. The features of FIG. 18 may apply to any of FIGS. 17, 19A-19C, and 20A-20C.

The first structured user interface 1800 may include first graphical representations of data of a first project 1802. For instance, the first graphical representations of the first project 1802 may include components 1804 (e.g., subsystems, requirements, or procedures associated with components) that may be selected by a user input to view different portions of data. For instance, the data may include text 1806 (e.g., description text), data 1808 (e.g., atomics, links to remote resources, such as CAD or spreadsheet and the like), testing data 1810 (such as reviews, verification, methods, statuses, and the like), and activity data 1812 (such as history, comments, and the like). Some of this data may be retrieved from the files or data structures directly (e.g., as output from the parser 1706) or as metadata from the DVC server 1710.

Based on user selections/inputs on the first structured user interface 1800, the user interface 1704 may determine which data to display (e.g., converted by parser 1706 from a data structures) and if edits are made to graphical engineering data. If edits are made to the graphical engineering data, the user interface 1704 may pass the edits to the parser 1706, which may convert the edits to a data structure that is compliant, and store the data structure (e.g., edits or whole file) as an update with the DVC server 1710.

3.A.iii. Second Structured User Interface for a Client Application

Figure 19A:
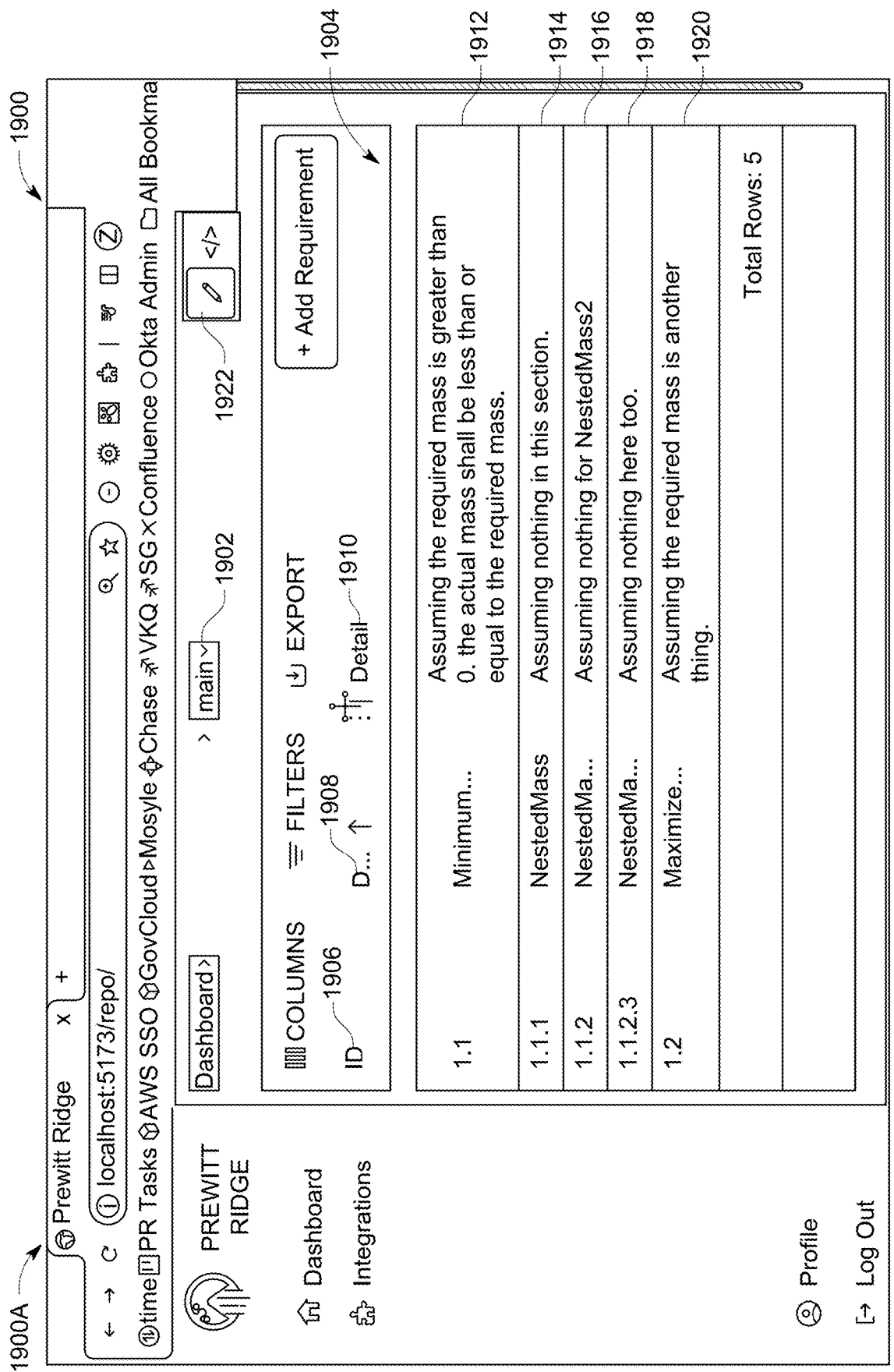
FIGS. 19A-19C depict a second structured user interface for a client application of the client-and-server infrastructure for capturing, storing, and managing engineering data using distributed version control.
Figure 19B:
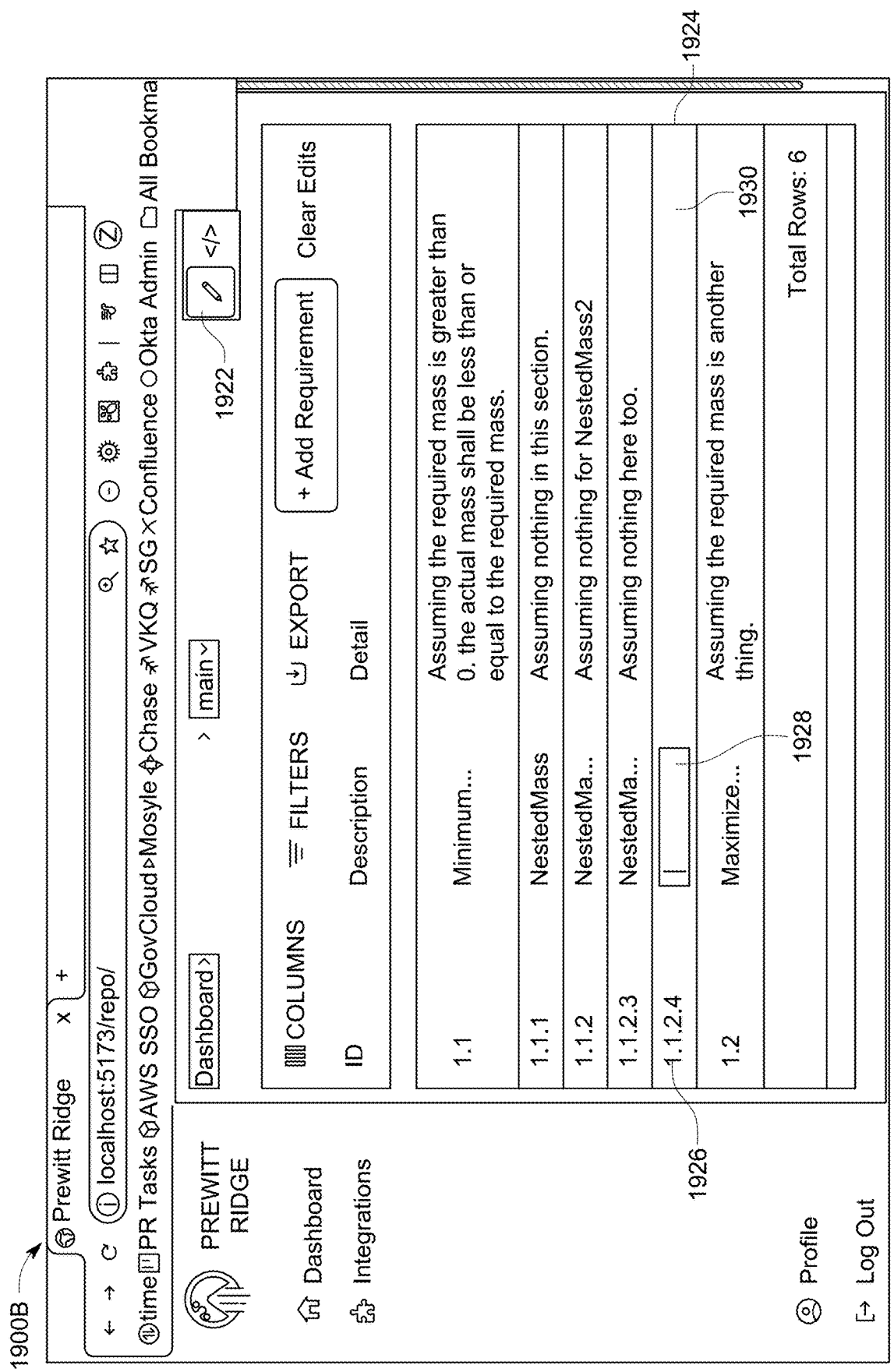
Figure 19C:
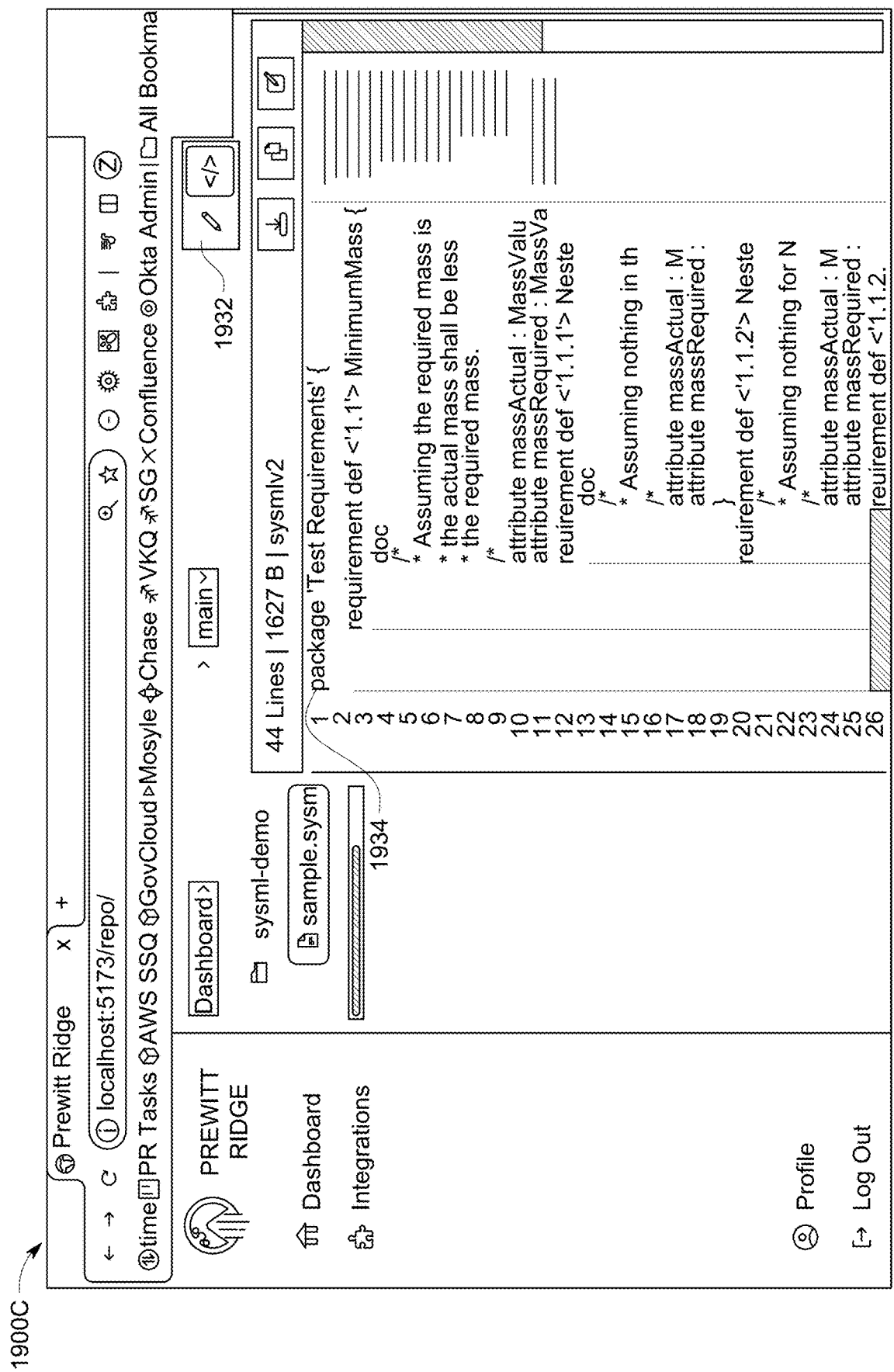

FIGS. 19A-19C depict a second structured user interface 1900, for a client application of the client-and-server infrastructure for capturing, storing, and managing engineering data using distributed version control. The features of FIGS. 19C-19C may apply to any of FIGS. 17, 18, and 20A-20C.

The second structured user interface 1900 (e.g., a second editor) may depict different graphical user interfaces, such as a first graphical user interface 1900A, a second graphical user interface 1900B, and a third graphical user interface 1900C, as the user interacts with the client application.

The first graphical user interface 1900A may include a second graphical representation of data of a second project 1902 (which may be the same or different than the first project 1802). For instance, the second graphical representation of the second project 1902 may include a tabular representation 1904. The tabular representation 1904 may include a set of columns and a set of rows. The set of columns may include an identifier column 1906, a description column 1908, and a detail column 1910. In some cases, the tabular representation 1904 may be configured to input and display requirements data and/or verification data. In some cases, the identifiers in the identifier column 1906 may indicate a nested relationship of rows (e.g., if the identifiers share leading characters or most significant bits). The set of rows may be dependent on a number of items entered by a user (or based on engineering data), or based on data retrieved from the files or data structures directly (e.g., as output from the parser 1706). The data in the rows may be (1) input, modified, or deleted based on user selections/inputs, or (2) populated from the files or data structures directly (e.g., as output from the parser 1706). Other data of second graphical representation of the second project 1902 may be metadata from the DVC server 1710.

In response to a user input indicating an add new row, the user interface 1704 may cause the second structured user interface 1900 to display the second graphical user interface 1900B. In the second graphical user interface 1900B, a new row 1924 may be inserted. The new row 1924 may include fields for user inputs, such a new identifier field 1926, new description field 1928, and a new detail field 1930. In some cases, the new identifier field 1926 may automatically populate with a new identifier based on context (e.g., based on where the user selected the new row or a most recent interaction occurred). For instance, if inserted below an existing row, the new row may be automatically provided an identifier that is nested to the existing row, or a parent of a set of nested rows, and the like.

Based on user selections/inputs on the second structured user interface 1900, the user interface 1704 may determine which data to display (e.g., converted by parser 1706 from a data structures) and if edits are made to graphical engineering data. If edits are made to the graphical engineering data, the user interface 1704 may pass the edits to the parser 1706, which may convert the edits to a data structure that is compliant, and store the data structure (e.g., edits or whole file) as an update with the DVC server 1710.

In some cases, the first graphical user interface 1900A and the second graphical user interface 1900B may include a toggle element set to a first state 1922. The first state 1922 may indicate that the tabular representation 1904 is to be displayed to a user. In response to a user selection of the toggle element set to the first state 1922, the toggle element may be set to a second state 1932 and cause the user interface 1704 to display the third graphical user interface 1900C.

The third graphical user interface 1900C may display a textual notation format 1934 that is compliant with the model language syntax. The textual notation format 1934 may be generated by the parser 1706 based on a state of the tabular representation 1904. The user may make selection and/or edits in the textual notation format 1934. In these cases, the user interface 1704 and/or the parser 1706 may perform verification checks on the edits (e.g., for syntax). The parser 1706 may convert the edits, if any, into graphical representations for the tabular representation 1904, if the user makes a selection of the toggle element set to the second state 1932.

In some cases, the user may start with importing a textual notation format 1934 into the second structured user interface 1900. In these cases, the user interface 1704 and/or the parser 1706 may perform verification checks on the imported textual notation format 1934 (e.g., for syntax).

3.A.iv. Dataflows of the Client-and-Server Infrastructure

Figure 20B:
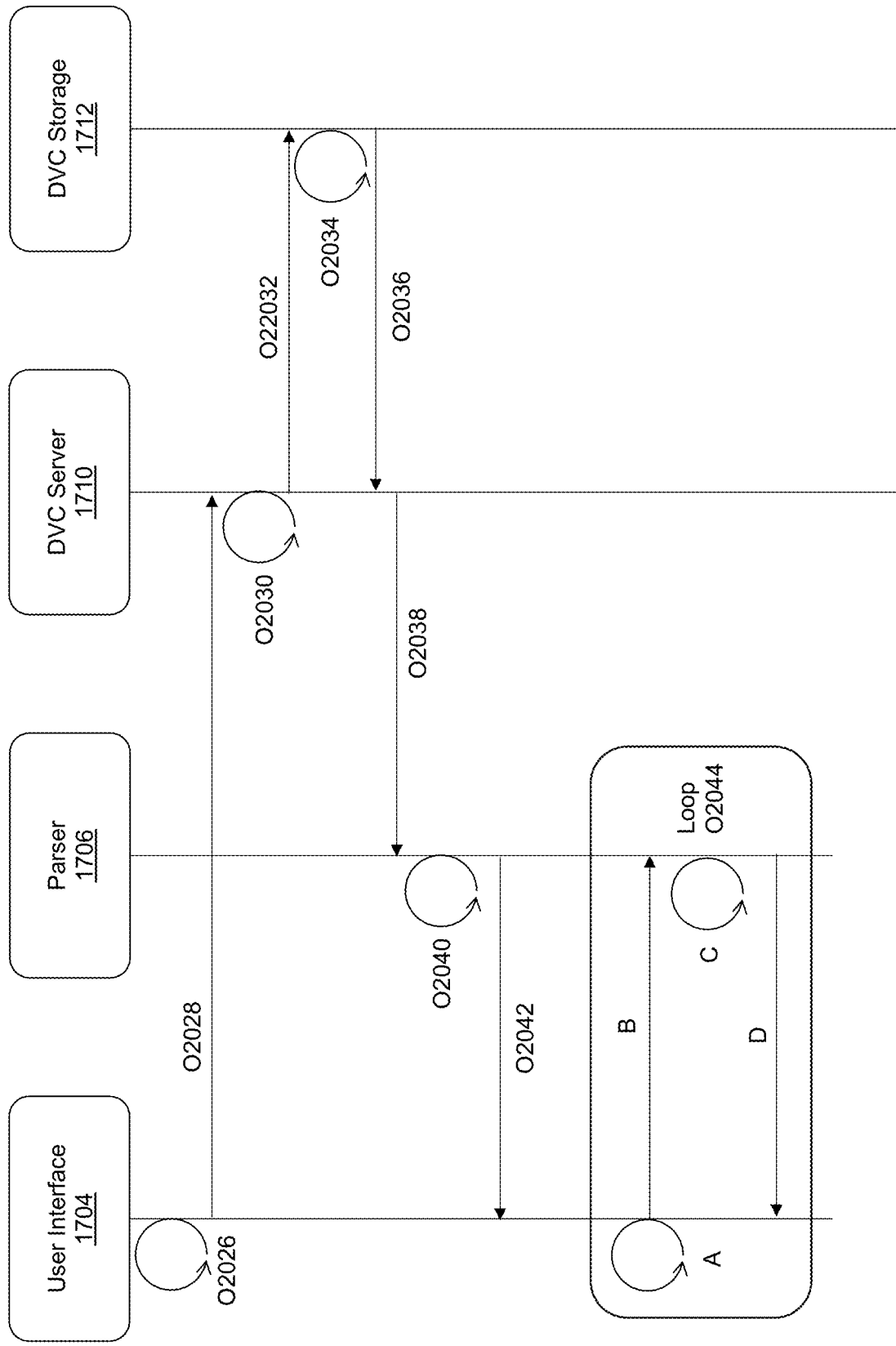

FIGS. 20A-20C depict dataflow diagrams, including a first dataflow diagram 2100A, a second dataflow diagram 2100B, and a third dataflow diagram 2100C, of the client-and-server infrastructure for capturing, storing, and managing engineering data using distributed version control. The features of FIGS. 20A-20C may apply to any of FIGS. 17, 18, and 19A-19C. In FIG. 20A, the first dataflow diagram 2100A may depict operations to capture, store, and manage engineering data in operation O2002 to operation O2024, to start and store data for a new project.

In operation O2002, the user interface 1704 may obtain a user input to launch an editor (e.g., the first or second editor). In some cases, the user interface 1704 may determine the user input is associated with a new project or an existing project. For instance, the user input may be a part of an existing project or a request to start a new project. In some cases, a new project may be a sub-project of a larger project. In these cases, the sub-project may be treated like an entirely new project or an existing project. In the case depicted in operation 2002, the user input was associated with a new project, so the user interface 1704 determines this is a new project.

In operation O2004, the user interface 1704 may pass a request for new project to the parser 1706. The parser 1706 may receive the request.

In operation O2006, the parser 1706 may instantiate the new project. For instance, the parser 1706 may notify the DVC server 1710 and create a package/working space to populate data structure(s) based on user inputs/engineering data.

In operation O2008, the parser 1706 may pass a new project ready message to the user interface 1704. The user interface 1704 may receive the new project ready message. In some case, the operations O2004 through O2008 may be omitted, and the user interface 1704 may perform similar operations without invoking the parser 1706.

In operation O2010, the user interface 1704 and the parser 1706 may loop to obtain engineering data and/or user edits and update data for the project. For instance, in sub-operation A, the user interface 1704 may obtain user edits via the editor or engineering data (e.g., from an upload or data service 202). In sub-operation B, the user interface 1704 may pass the engineering data and/or user edits to the parser 1706. In sub-operation C, the parser 1706 may convert the user edits to data structures or portions of data structures. In some cases, the parser 1706 may also perform verification checks on the user edits. In sub-operation D, the parser 1706 may pass the data structures, portions of data structures, or updates to data structures (as the case may be) to the user interface 1704. In this manner, the user interface 1704 may have the textual notation format to display/provide to the user, in case the user requests that view state. In some cases, the user interface 1704 and parser 1706 may omit the loop, but instead the user interface 1704 may pass engineering data and/or user edits in response to trigger conditions (e.g., changes in user interaction domain, save points, etc.).

In operation O2012, the user interface 1704 may determine a commit condition is satisfied. For instance, the user interface 1704 may determine a user input selected a save request (e.g., a commit), or that the user navigated away from a project.

In operation O2014, the user interface 1704 may pass a save request to the parser 1706. The parser 1706 may receive the save request.

In operation O2016, the parser 1706 may verify the engineering data of the graphical engineering data, user edits to the graphical engineering data, and/or the generated data structure is compliant to the model language syntax. In some cases, the parser 1706 may keep and store relevant data that does not verify, so that the user does not lose data. In some cases, the parser 1706 may cause the user interface 1704 to output an alert or request to add, delete, or modify a portion of the engineering data. If the verification returns valid (or an error exists but the parser 1706 will save that information for the user for future fixing), the parser 1706 may proceed.

In operation O2018, the parser 1706 may transmit a save request to the DVC server 1708. The DVC server 1708 may receive the save request. The save request may include relevant metadata (such as project ID, user ID, and the like) along with files, data structures, or portions of data structures (e.g., snapshots).

In operation O2020, the DVC server 1710 may determine a new project. For instance, the DVC server 1710 may determine if the project ID is not in use, etc.

In operation O2022, the DVC server 1710 may pass new project data to the DVC storage 1712. The DVC storage 1712 may receive the new project data. For instance, the new project data may include various information, such project ID, user ID, files, snapshots, objects, trees, commits, and references.

In operation O2024, the DVC storage 1712 may generate appropriate data structures to store the new project data, and store the new project data so the new project data can be served later.

Thus, the systems of present disclosure may generate and store relevant data for new projects using a resource-lite client application in conjunction with an interoperable server-side DVC storage system.

In FIGS. 20B and 20C, the second dataflow diagram 2100B and the third dataflow diagram 2100C may depict operations to capture, store, and manage engineering data in operation O2026 through operation O2056, to update and store data for an existing project.

In operation O2026, the user interface 1704 may obtain a user input to launch an editor (e.g., the first or second editor). In the case depicted in operation 2026, the user input was associated with an existing project (e.g., associated with a project ID), so the user interface 1704 determines this is an existing project.

In operation O2028, the user interface 1704 may transmit a request for the existing project to the DVC server 1710. In some cases, the parser 1706 may receive and relay the request to the DVC server 1710. The DVC server 1710 may receive the request.

In operation O2030, the DVC server 1710 may determine an existing project based on the request. For instance, the DVC server 1710 may determine whether a project ID matches any existing projects IDs, and/or confirm with authentication server 1708 that user or user device 105 has access authorization to the existing project. The DVC server

1710 may also determine what data to retrieve from the DVC storage 1712 based on the request (e.g., version, branch, etc.).

In operation O2032, the DVC server 1710 may pass a request for existing project data to the DVC storage 1712. For instance, the request may indicate what data to retrieve. The DVC storage 1712 may receive the request from the DVC server 1710.

In operation O2034, the DVC storage 1712 may retrieve the relevant data based on the request from the DVC server 1710.

In operation O2036, the DVC storage 1712 may pass the existing project data to the DVC server 1710. The DVC server 1710 may receive the existing project data (e.g., files, data structures, or portions of data structures, and the like).

In operation O2038, the DVC server 1710 may transmit the existing project data to the parser 1706. The parser 1706 may receive the existing project data. In some cases, the parser 1706 may update a local copy of repository or working directory based on the existing project data.

In operation O2040, the parser 1706 may convert data structures of the existing project data (or of the updated repository or working directory) to graphical engineering data, so that the user interface 1704 may populate structured user interfaces of an editor.

In operation O2042, the parser 1706 may pass the graphical engineering data, the existing project data, and/or at least one data structure to the user interface 1704 (collectively "display data"). The user interface 1704 may receive the display data.

In operation O2044, the user interface 1704 and the parser 1706 may loop to obtain engineering data and/or user edits and update data for the project. For instance, in sub-operation A, the user interface 1704 may obtain user edits via the editor or engineering data (e.g., from an upload or data service 202). In sub-operation B, the user interface 1704 may pass the engineering data and/or user edits to the parser 1706. In sub-operation C, the parser 1706 may convert the user edits to data structures or portions of data structures. In some cases, the parser 1706 may also perform verification checks on the user edits. In sub-operation D, the parser 1706 may pass the data structures, portions of data structures, or updates to data structures (as the case may be) to the user interface 1704. In this manner, the user interface 1704 may have the textual notation format to display/provide to the user, in case the user requests that view state. In some cases, the user interface 1704 and parser 1706 may omit the loop, but instead the user interface 1704 may pass engineering data and/or user edits in response to trigger conditions (e.g., changes in user interaction domain, save points, etc.).

In operation O2046, the user interface 1704 may determine a commit condition is satisfied. For instance, the user interface 1704 may determine a user input selected a save request (e.g., a commit), or that the user navigated away from a project.

In operation O2048, the parser 1706 may pass a save request to the parser 1706. The parser 1706 may receive the save request.

In operation O2050, the parser 1706 may verify the engineering data of the graphical engineering data, user edits to the graphical engineering data, and/or the generated data structure is compliant to the model language syntax. In some cases, the parser 1706 may keep and store relevant data that does not verify, so that the user does not lose data. In some cases, the parser 1706 may cause the user interface 1704 to output an alert or request to add, delete, or modify a portion of the engineering data. If the verification returns valid (or an error exists but the parser 1706 will save that information for the user for future fixing), the parser 1706 may proceed.

In operation O2052, the DVC server 1710 may provide a save request to the DVC server 1708. The DVC server 1708 may receive the save request. The save request may include relevant metadata (such as project ID, user ID, and the like) along with files, data structures, or portions of data structures (e.g., snapshots).

In operation O2054, the DVC server 1710 may determine an existing project. For instance, the DVC server 1710 may determine the project ID is in use, and that the save request includes snapshot information, and related metadata (e.g., user ID).

In operation O2056, the DVC server 1710 may pass new existing project data to the DVC storage 1712. The DVC storage 1712 may receive the new existing project data. For instance, the new existing project data may include various information, such project ID, user ID, files, snapshots, objects, trees, commits, and references.

In operation O2058, the DVC storage 1712 may generate appropriate data structures (if needed) to store the new existing project data, and store the new existing project data so the new existing project data can be served later.

Thus, the systems of present disclosure may retrieve, update, and store relevant data for existing projects using a resource-lite client application in conjunction with an interoperable server-side DVC storage system.

3.B. Client Application of a Client-and-Server Infrastructure

FIGS. 21, 22, 23A-23B, 24A-24B, and 25 depict features of a client application of a client-and-server infrastructure for capturing, storing, and managing engineering data using distributed version control. The features of FIGS. 21, 22, 23A-23B, 24A-24B, and 25 may apply to or use any features of FIGS. 1, 2, 3, 4A-4B, 5, 6, 7, 8, 9, 10, 11, 13, 14, 15, 16, 17, 18, 19A-19C, and 20A-20C.

The client application offers several benefits in the context of distributed version control of engineering data. Firstly, it provides a user-friendly interface that simplifies the complex process of version control, making it accessible to users with varying levels of technical expertise. This enhances productivity by allowing users to focus on their core engineering tasks without being hindered by the intricacies of version control systems.

Secondly, the client application's ability to parse engineering data into a compliant data structure ensures that the data adheres to industry standards, which is paramount for maintaining data integrity and facilitating collaboration across different teams and systems. This standardization also aids in the seamless integration of new tools and technologies, allowing organizations to stay current with advancements without disrupting existing workflows.

Furthermore, the client application's lightweight design minimizes the computational load on user devices, leading to faster performance and lower power usage. This is particularly beneficial for users who rely on local devices or have limited computing resources. The streamlined nature of the client application also simplifies updates and maintenance, as it can be quickly downloaded and deployed across various platforms.

Additionally, the client application's parser includes verification checks that prevent the loss of data by storing relevant information that does not initially verify. This feature acts as a safeguard against potential errors, ensuring that users do not lose valuable work and can address issues at a later stage.

The parser within the client application may play a role in the distributed version control of engineering data by ensuring that the data is accurately converted and maintained in a format that is compliant with the model language syntax. This compliance may be integral to the interoperability of the system, allowing for seamless collaboration and integration with other tools and systems that adhere to the same standards. The parser's verification checks serve as a quality control mechanism, preventing the introduction of errors into the version control system and ensuring that the data remains consistent and reliable throughout its lifecycle.

The parser's functionality extends beyond mere data conversion; it is also designed to facilitate the management of engineering data within the distributed version control environment. By handling the complexities of data structure compliance and verification, the parser enables users to focus on their core engineering tasks without being bogged down by the technicalities of data management. This focus on core tasks can lead to increased efficiency and productivity, as users can dedicate more time and resources to the design and development aspects of their projects.

In summary, the parser within the client application is a powerful tool that ensures data integrity, facilitates collaboration, and enhances productivity within the distributed version control of engineering data. Its verification checks and data preservation capabilities make it a useful component of the client application, contributing to the overall reliability and effectiveness of the version control system.

Lastly, the integration of the client application with a server-side DVC storage system provides a robust infrastructure for managing engineering data. The DVC server's management of storage and version control operations, coupled with the DVC storage's capability to store and serve project data, creates a secure and efficient environment for handling complex engineering projects. This interoperable system supports distributed environments, enabling access and management of engineering data, which is increasingly relevant in today's global and mobile workforce.

3.B.i. Client Application of Client-and-Server Infrastructure

Figure 21:
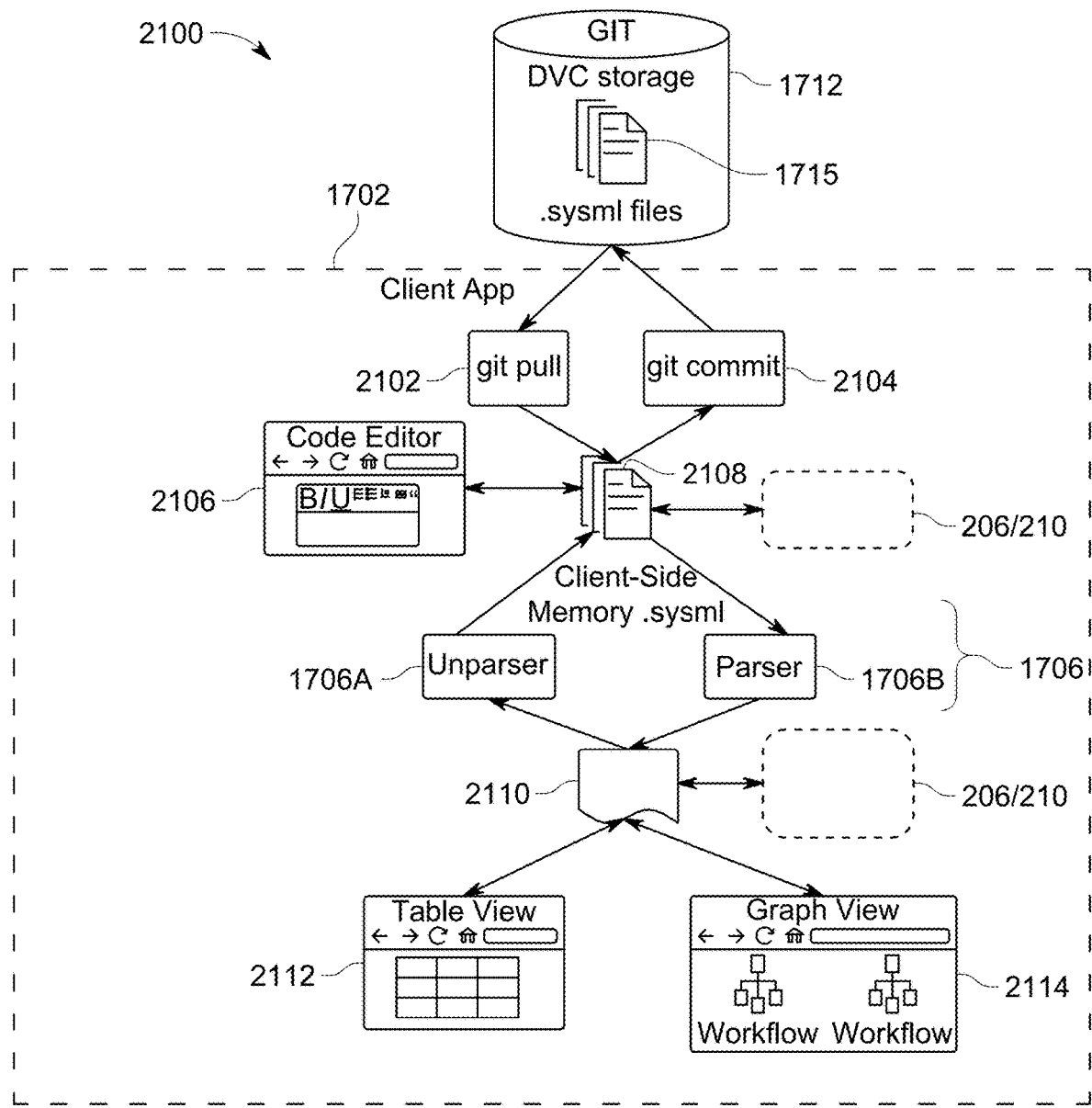
FIG. 21 depicts a block diagram for a client application of a client-and-server infrastructure.

FIG. 21 depicts a block diagram 2100 for a client application of a client-and-server infrastructure for capturing, storing, and managing engineering data using distributed version control. The block diagram 2100 may depict the client application 1702, on the user device 105, communicating with the DVC storage 1712, via the server 1714, such as initiating pull requests using pull module 2102 and/or push requests using push module 2104. As discussed herein, the client application 1702 may include the user interface 1704 and the parser 1706. In some cases, the client application 1702 may include versions of the language model service 206, the ontological service 210, or, generally, any of the herein described components. In some case, these versions may be configured for client-side only execution, or limited server-side interaction. For example, these versions may utilize light versions (e.g., less functions, less server calls, smaller compute or memory requirements, etc.) to provide some or all features described herein. In some cases, these versions may utilize components that are compliant to specific domains (e.g., data handling or storage requirements, cyber vulnerabilities, and the like).

The user interface 1704 may receive user interactions and perform operations in accordance with the user interactions. For instance, the user interactions may indicate instructions to add, delete, or modify some or parts of the graphical engineering data in one or more views, such as a first view 2106, a second view 2112, and a third view 2114. The first view 2106 may correspond to the textual notation format 1934. The second view 2112 may correspond to the tabular representation 1904. The third view 2114 may be a graph representation of the graphical engineering data. See, e.g., FIGS. 23A-23B.

The second view 2112 and the third view 2114 may extract and display the graphical engineering data from an intermediate data structure (e.g., using intermediate data structure manager 2110), such as JSON or a graph database (e.g., memgraph). The second and third views may update the graphical engineering data by updating the intermediate data structure by using the intermediate data structure manager 2110. In some cases, the user may provide an intermediate data structure to the intermediate data structure manager 2110 (e.g., by uploading a JSON or graph database).

The first view 2106 may extract and display text (e.g., the textual notation format 1934) based on a primary data structure (by a primary data structure manager 2108), such as a file compliant to SysML v2, architecture analysis and design language (AADL), or other textual system description format. The first view may update the text by updating the primary data structure (by using the primary data structure manager 2108). The user interactions may indicate instructions to change a view (e.g., from the first view 2106 to the second view 2112) of the engineering data.

In some cases, the user interface 1704 may perform verification checks on user interactions. For instance, the user interface 1704 may determine that a user interaction in the first view is syntactically invalid, and block transferring a corresponding update to the intermediate data structure. The user interface 1704 may determine that a user interaction in the first view is syntactically valid, and transfer a corresponding update to the intermediate data structure. In some cases, the user interface 1704 may determine that a user interaction in the second view (or third view) is syntactically invalid, and block transferring a corresponding update to the primary data structure. The user interface 1704 may determine that a user interaction in the second view (or third view) is syntactically valid, and transfer a corresponding update to the primary data structure.

In some cases, each of the first view, second view, and third view may have different verification checks based on user interaction (e.g., data type of inputs, modification to data, etc.). In some cases, the user interface 1704 may accept an input for a view (e.g., second view), and loop through the data structures and views to confirm that the update is compliant to the primary data structure (or each view). In the case that the loop returns that the primary data structure (or each view) is compliant, the user interface 1704 may allow a user to save a version and proceed. If not, the user interface 1704 may block the user from saving, recommend a modification, and the like.

The parser 1706 may include a unparser 1706A and a parser 1706B. The unparser 1706A may convert the graphical engineering data (e.g., in the intermediate data structure) into the primary data structure. As discussed herein, the primary data structure may be compliant to a model language syntax (such as SysML v2). The parser 1706B may convert the primary data structure to the graphical engineering data (e.g., in the intermediate data structure).

3.B.ii. Language Conversion

Figure 22:
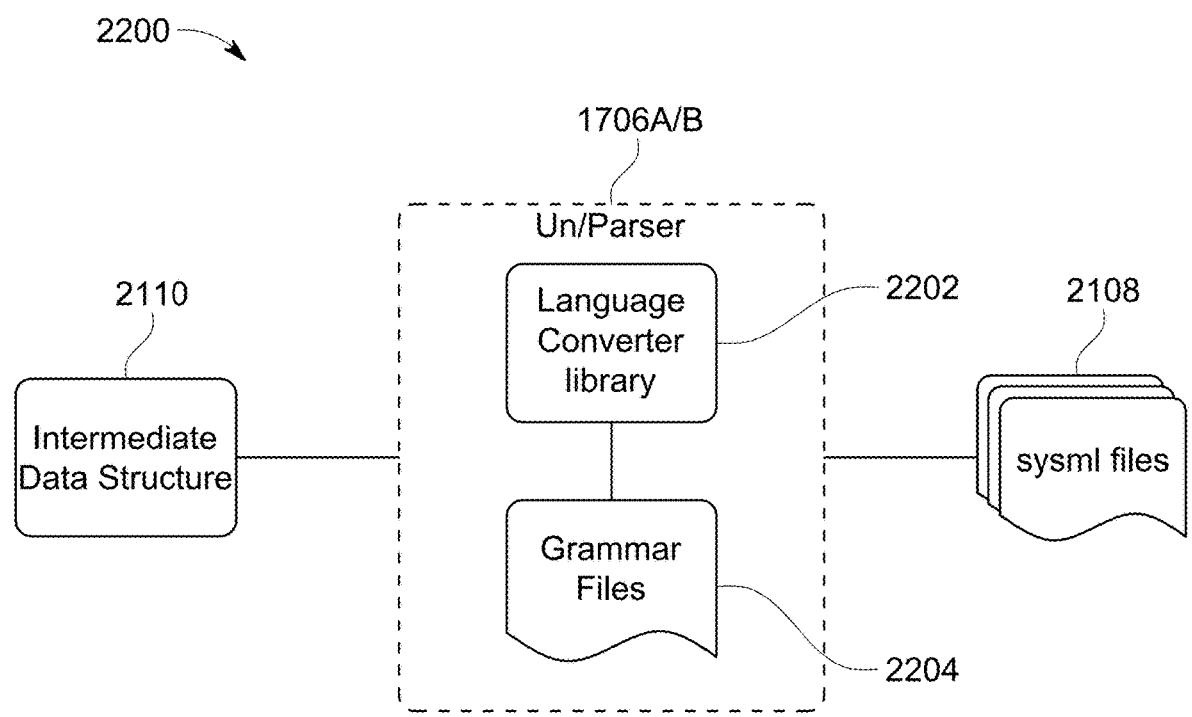
FIG. 22 depicts a block diagram for language conversion of a parser/unparser for use in a client application.

FIG. 22 depicts a block diagram 2200 for language conversion of a parser/unparser 1706A/B for use in a client application of a client-and-server infrastructure for capturing, storing, and managing engineering data using distributed version control. The features of FIG. 22 may apply to any of FIGS. 21, 23A-23B, 24A-24B, and 25. The block diagram 2200 may include a language converter library 2202 and a grammar files 2204. In the case of the unparser 1706A, the language converter library 2202 may use a first grammar file from the grammar files 2204. In the case of the parser 1706B, the language converter library 2202 may use a second grammar file from the grammar files 2204. The first grammar file (e.g., for the unparser 1706A) may be designed to understand the intermediate data structure (e.g., JSON or a graph database) so as to generate a version of the primary data structure (e.g., SysML v2 or AADL). The second grammar file (e.g., for the parser 1706B) may be designed to understand the primary data structure so as to generate a version of the intermediate data structure.

Generally, the parser/unparser 1706A/B may convert a first data structure into a second data structure by parsing the first data structure, processing the first data structure according to the rules defined in the grammar file, and then generating the second data structure. The grammar files may specify a syntax of a language (e.g., JSON, graph database, or SysML v2) and define how to parse the first data structure. The grammar of the grammar files may include rules and tokens. The rules may define the structure of the language, such as how different elements are composed and what syntax is valid. The tokens may be basic building blocks of the language, such as keywords, identifiers, literals, etc.

The parser/unparser 1706A/B may automatically generate a directional parser for input data structure based on the grammar file. This directional parser may be configured to read the first data structure (e.g., written in the domain specific language, such as JSON, graph database, or SysML v2) and transform the first data structure into an abstract syntax tree (AST). The AST may be a tree representation of the syntactic structure of the first data structure, where each node represents a construct in the language defined by the grammar file.

For instance, the parser/unparser 1706A/B may first perform a lexical analysis and then a syntactic analysis. The lexical analysis may break the first data structure into tokens defined in grammar rules of the grammar file. The syntactic analysis may construct an AST from the tokens based on the grammar rules.

After the AST is generated, the parser/unparser 1706A/B may process the AST according to the specifications of the DSL and the user's requirements (e.g., in grammar file). For instance, the parser/unparser 1706A/B may perform validation and/or transformation operations. A validation operation may check the AST for errors or inconsistencies against the DSL's rules. A transformation operation may modify the AST or create a new structure necessary for the output specifications.

The parser/unparser 1706A/B may then generate the second data structure from the processed AST. For instance, the parser/unparser 1706A/B may traverse the AST and convert the AST into a format associated with the target language.

In some cases, the process of traversing a SysML v2 file to parse it into tokens and map those tokens into nodes and edges of an abstract syntax tree (AST) may involve several steps. The parser may begin by reading the SysML v2 file and performing lexical analysis to break down the text into a series of tokens. These tokens may represent various elements of the SysML v2 language, such as keywords, identifiers, literals, and punctuation.

During the tokenization process, the parser may utilize a set of predefined rules specified in the grammar file to recognize and categorize different elements of the SysML v2 language. For example, it may identify tokens representing package declarations, element definitions, relationships, and attributes.

Once the tokens are generated, the parser may proceed with syntactic analysis to construct the AST. This process may involve applying grammar rules to group and organize the tokens into a hierarchical structure that represents the logical structure of the SysML v2 model.

The parser may create nodes in the AST to represent different elements of the SysML v2 model. For instance, a node may be created for each package, block, requirement, or other SysML v2 construct encountered in the file. These nodes may contain information about the element's type, name, and other relevant attributes.

As the parser traverses the tokens, it may also establish edges between nodes to represent relationships and hierarchies within the SysML v2 model. For example, an edge may be created to connect a parent package node to its child element nodes, or to link a block node to its associated property nodes.

In some aspects, the parser may handle nested structures by recursively processing tokens and creating corresponding nested structures in the AST. This may allow for the representation of complex SysML v2 models with multiple levels of hierarchy and relationships.

The parser may also process comments and metadata encountered in the SysML v2 file, storing this information as attributes of relevant nodes in the AST or as separate comment nodes.

As the AST is constructed, the parser may perform additional validation checks to ensure that the structure and relationships defined in the SysML v2 file adhere to the language's syntax and semantic rules. This may involve checking for proper nesting of elements, valid relationship types between different elements, and correct usage of SysML v2 constructs.

In some cases, the parser may maintain a symbol table during the AST construction process to keep track of defined elements and their scopes. This may aid in resolving references and ensuring the consistency of the model representation.

Once the entire SysML v2 file has been processed and the AST fully constructed, the resulting tree structure may provide a comprehensive representation of the model that can be easily traversed, analyzed, and manipulated by other components of the system.

The parser may also be configured to store line and column data corresponding to the locations of tokens within the nodes or edges of the abstract syntax tree (AST). This feature allows for precise tracking of where each token was originally located in the source file, facilitating easier debugging and more accurate error reporting. When the parser performs lexical analysis and tokenizes the input data structure, it captures the line and column numbers where each token begins and ends. This positional information is then attached to the corresponding nodes or edges in the AST.

For instance, if a syntax error is detected during the parsing process, the parser can use the stored line and column data to pinpoint the exact location of the error in the source file. This capability enhances the user's ability to quickly identify and correct errors in the system model, improving the efficiency of the development process. Additionally, this positional data can be utilized during the transformation operations to ensure that any modifications or annotations are accurately reflected in the correct positions within the output specifications.

In some cases, the process of unparsing an abstract syntax tree (AST) to generate a SysML v2 file may involve several steps. The unparser may begin by traversing the AST in a depth-first manner, visiting each node and edge to reconstruct the SysML v2 textual representation.

As the unparser traverses the AST, it may use a set of predefined rules specified in the grammar file to convert each node and edge into its corresponding SysML v2 textual representation. For example, it may convert a package node into a package declaration, a block node into a block definition, or a relationship edge into a relationship statement.

During the unparsing process, the unparser may maintain context information to ensure proper nesting and indentation of SysML v2 elements. This may involve keeping track of the current nesting level and applying appropriate indentation to each line of the generated text.

The unparser may handle complex structures by recursively processing nested nodes in the AST. This may allow for the accurate representation of hierarchical relationships and nested elements within the SysML v2 model.

In some aspects, the unparser may reconstruct comments and metadata associated with AST nodes, inserting them at appropriate locations in the generated SysML v2 file. This may help preserve important documentation and annotations from the original model.

As the unparser generates the SysML v2 text, it may perform additional formatting operations to enhance readability. This may include adding line breaks between major elements, aligning related items, and inserting appropriate whitespace.

In some cases, the unparser may utilize the line and column data stored in the AST nodes to ensure that the generated SysML v2 text closely matches the structure and formatting of the original input file. This may be particularly useful when preserving the layout of manually crafted SysML v2 models.

The unparser may also implement validation checks during the generation process to ensure that the output adheres to SysML v2 syntax and semantic rules. This may involve verifying that all required elements are present, relationships are properly defined, and naming conventions are followed.

Once the entire AST has been processed, the unparser may assemble the generated text into a complete SysML v2 file. This file may include any necessary headers, import statements, or other structural elements required by the SysML v2 specification.

In some aspects, the unparser may provide options for customizing the output format, such as specifying the indentation style, comment placement, or ordering of elements within the generated SysML v2 file. This flexibility may allow users to tailor the output to their preferred coding style or organizational standards.

The grammar files may contain formal specifications that define the structure and syntax of a particular language or data format. These files may include rules for parsing and generating code in the specified language. In some cases, the grammar files may be written in a specialized notation or language designed for describing grammars, such as Extended Backus-Naur Form (EBNF) or Antlr grammar syntax.

The grammar files may define various elements of the language, including:
1. Lexical rules: These may specify how individual characters are grouped into tokens, such as keywords, identifiers, literals, and operators.
2. Syntactic rules: These may describe how tokens can be combined to form valid language constructs, such as expressions, statements, and declarations.
3. Semantic rules: These may define the meaning and relationships between different language elements.
4. Error handling: The grammar files may include rules for detecting and reporting syntax errors.

In some aspects, the grammar files may be used to automatically generate parsers and unparsers for the specified language. This may allow for efficient and consistent processing of input and output in the target language format. The grammar files may also serve as a formal specification of the language, providing a reference for developers and ensuring consistency across different implementations.

The grammar files may be designed to be modular and extensible, allowing for easy updates and modifications to the language specification. In some cases, they may include provisions for handling different versions or dialects of the language, enabling backward compatibility and flexibility in language evolution.

3.B.iii. Graph View in Second Structured User Interface

Figure 23A:
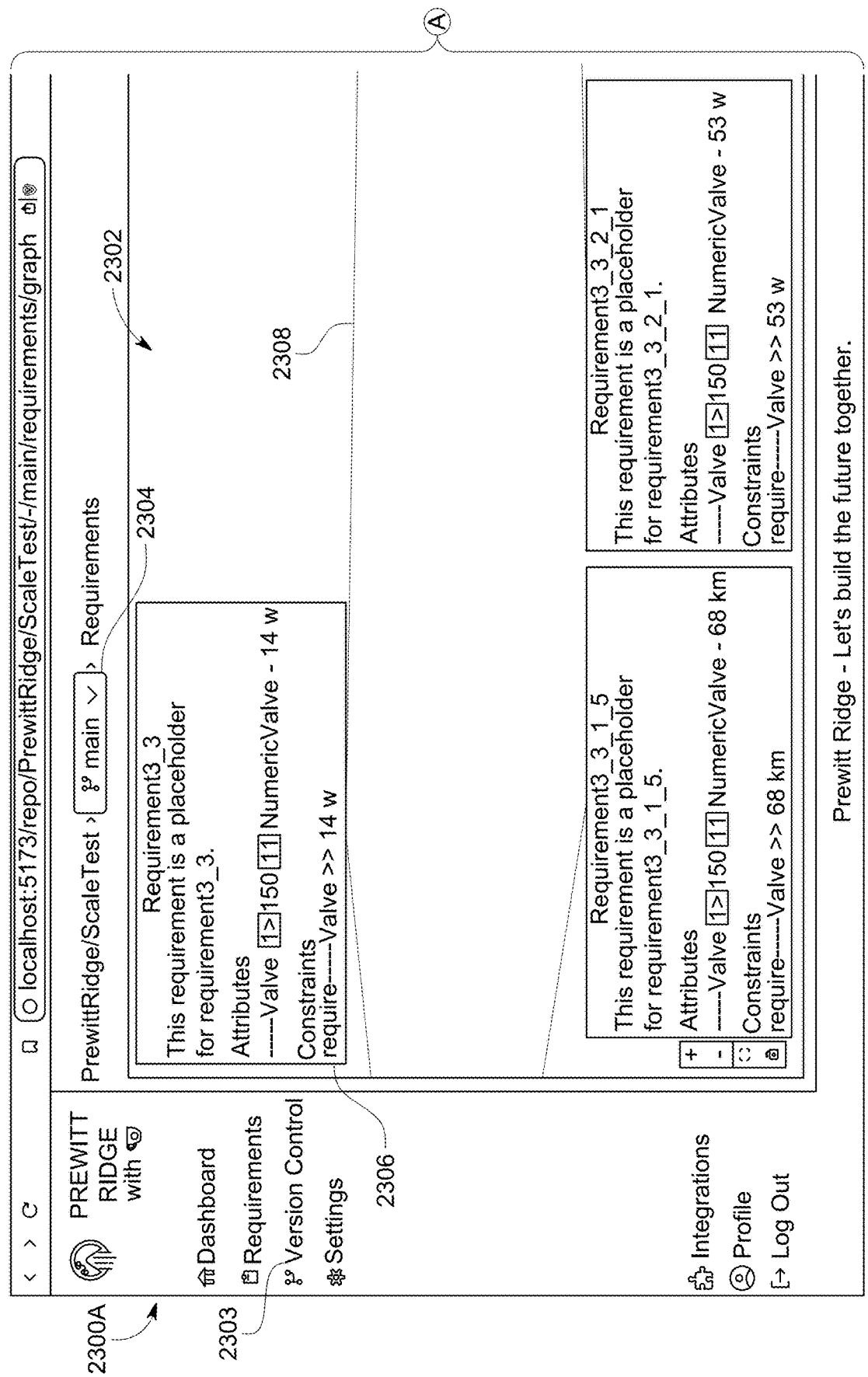
FIGS. 23A and 23B depict graphical user interfaces for a graph view.
Figure 23A:
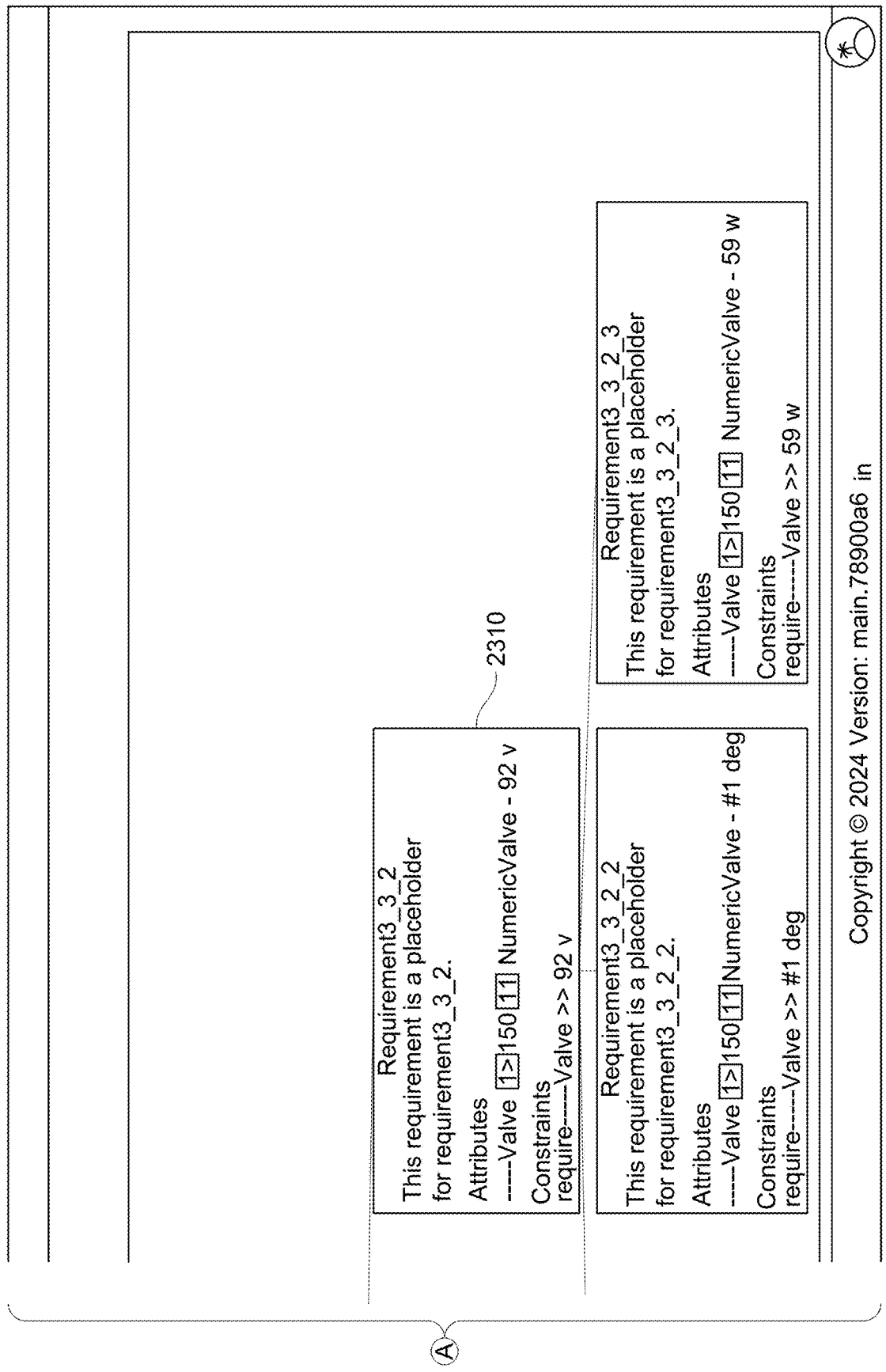
Figure 23B:
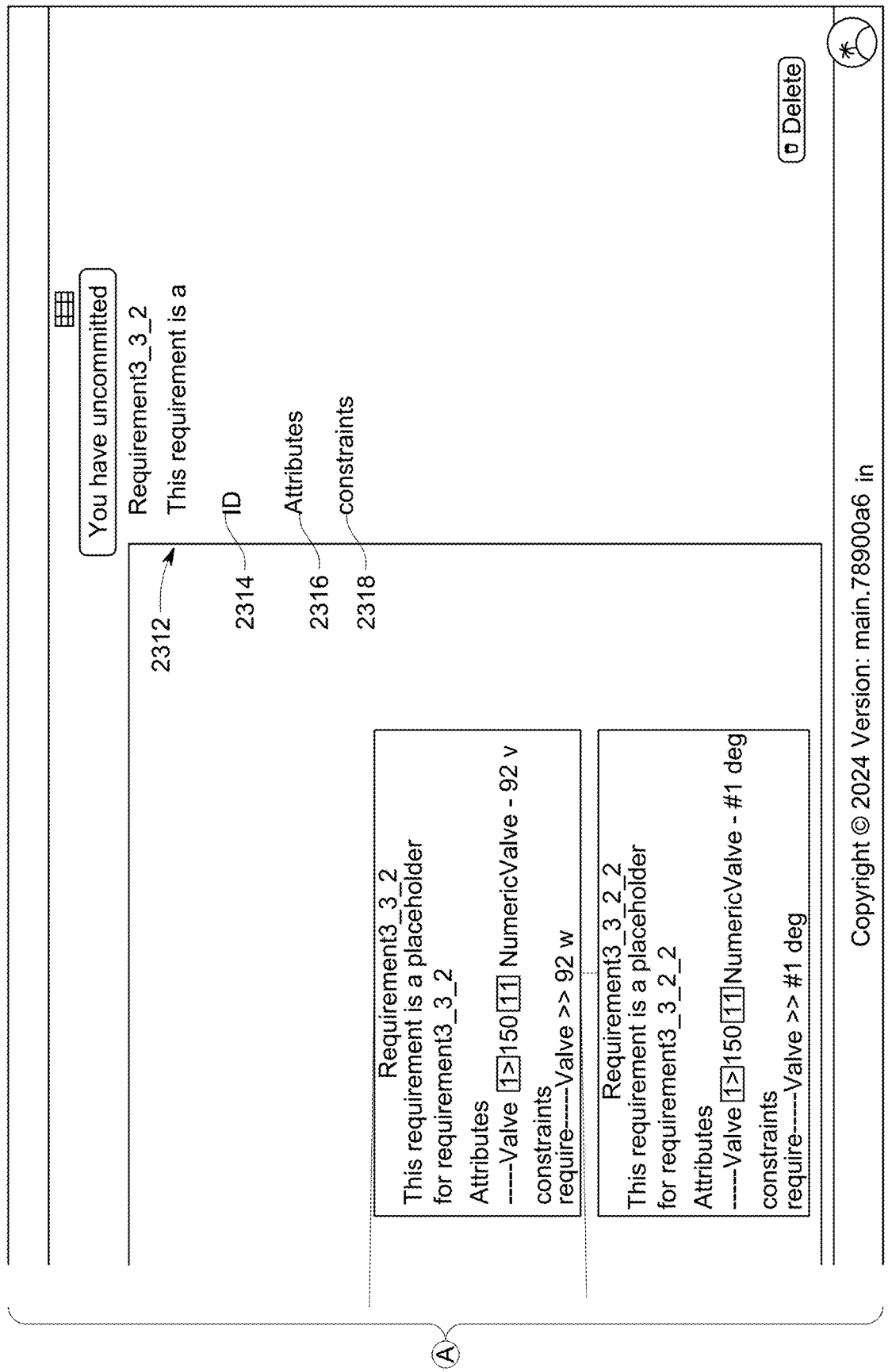

FIGS. 23A and 23B depict graphical user interfaces, such as first graphical user interface 2300A and second graphical user interface 2300B, for a graph view 2114 within the second structured user interface 1900. The features of FIGS. 23A and 23B may apply to any of FIGS. 21, 22, 24A-24B, and 25.

The second structured user interface 1900 (e.g., the second editor) may depict different graphical user interfaces, such as a first graphical user interface 2300A, and a second graphical user interface 2300B for the graph view 2114. In some cases, the user may navigate and interact with some or all of the first graphical user interface 1900A, the second graphical user interface 1900B, the third graphical user interface 1900C, the first graphical user interface 2300A, and the second graphical user interface 2300B, as the user interacts with the client application.

The first graphical user interface 2300A may include a third graphical representation of data of the second project 1902 (which may be the same or different than the first project 1802). For instance, the third graphical representation of the second project 1902 may include a graph representation 2302 for the graph view 2114. The graph representation 2302 may include a plurality of nodes 2306 and 2310 connected by respective edges 2308. In some cases, the graph representation 2302 may enable a user to select a version currently being viewed 2303 and a branch 2304. In some cases, the graph representation 2302 may be configured to input and display requirements data and/or verification data, or other engineering data types.

In response to a user input selecting a node (or adding a node), the user interface 1704 may cause the second structured user interface 1900 to display the second graphical user interface 2300B. In the second graphical user interface 2300B, a data configuration window 2312 may be displayed to a user. The data configuration window 2312 may display data for a node, such as identifier 2314, attributes 2316, and/or constraints 2318 of the node.

Based on user selections/inputs on the second structured user interface 1900, the user interface 1704 may determine which data to display (e.g., converted by parser 1706 from the intermediate data structure) and if edits are made to graphical engineering data. If edits are made to the graphical engineering data, the user interface 1704 may pass the edits to the parser 1706, which may convert the edits to the primary data structure that is compliant, and store the primary data structure (e.g., edits or whole file) as an update with the DVC server 1710.

In some cases, the first graphical user interface 2300A and the second graphical user interface 2300B may include a toggle element that selects the first state, the second state 1932, or a third state. The first state 1922 may indicate that the tabular representation 1904 is to be displayed to a user. In response to a user selection of the toggle element set to the second state 1932, the toggle element may cause the user interface 1704 to display the third graphical user interface 1900C. In response to a user selection of the toggle element set to the third state, the toggle element may cause the user interface 1704 to display the first graphical user interface 2300A. In this manner, a user may transition between the first view, second view, and third view of engineering data.

3.B.iv. Dataflows of Client Application

Figure 24A:
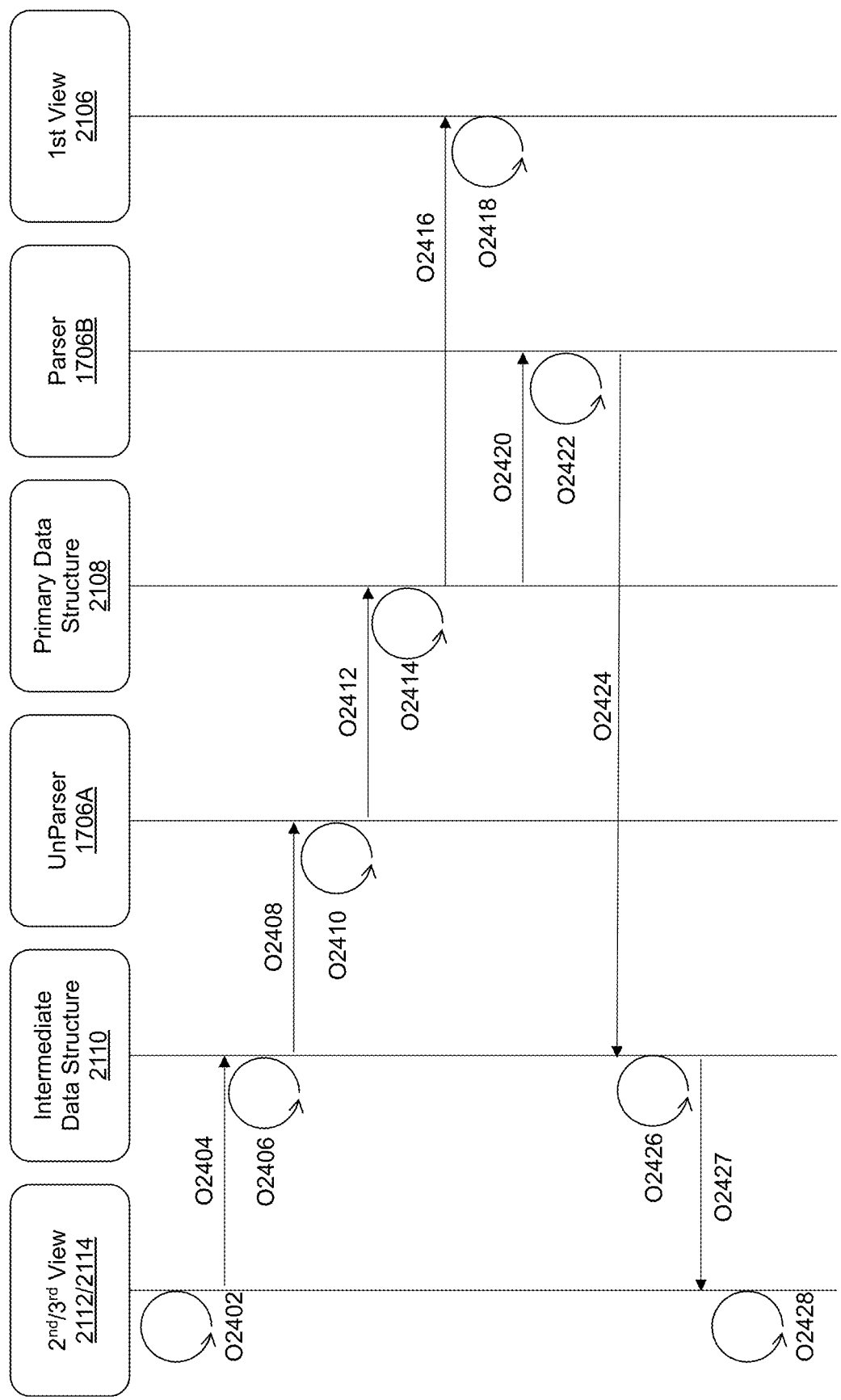
FIGS. 24A and 24B depict dataflow diagrams of a client application of a client-and-server infrastructure.
Figure 24B:
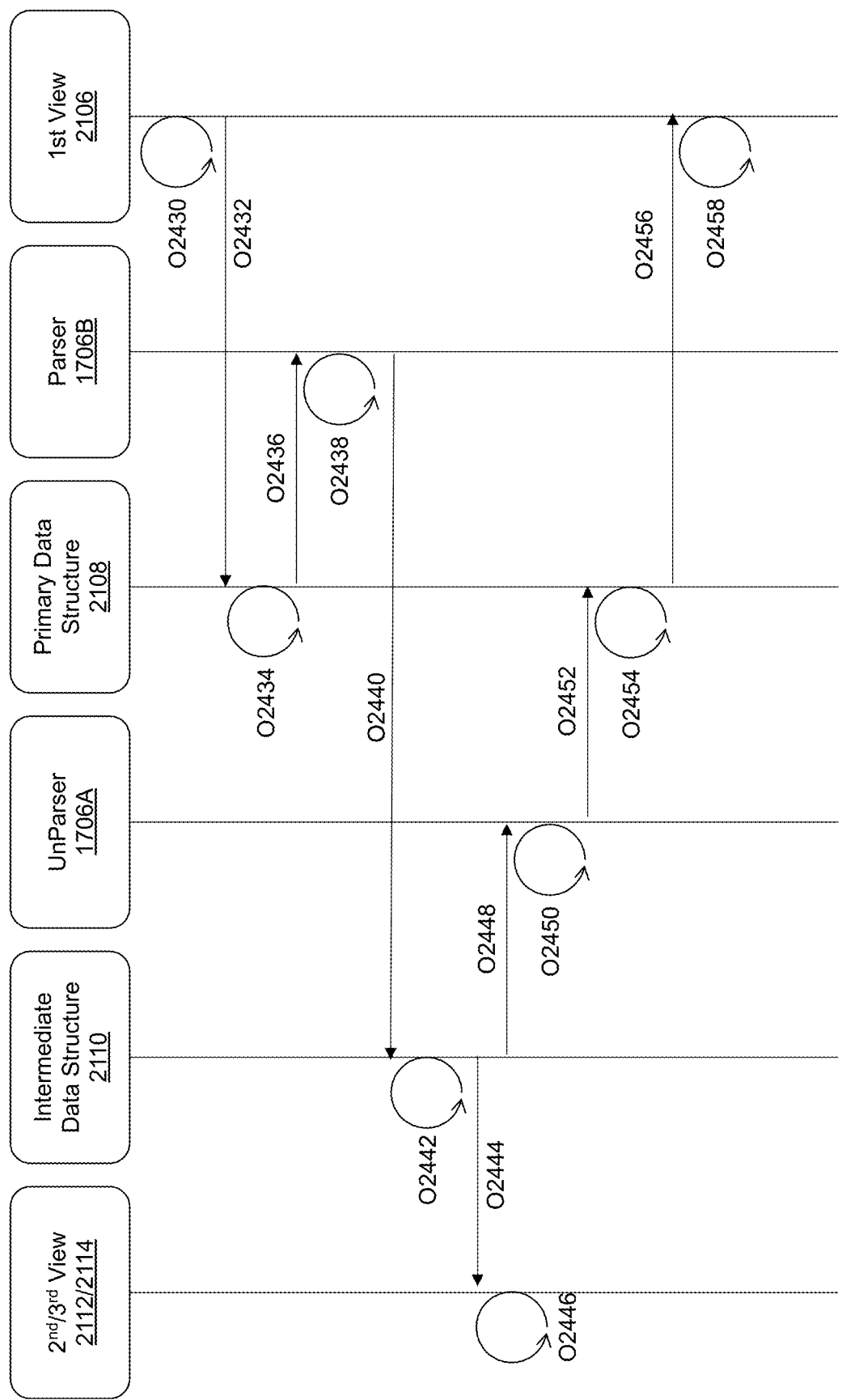

FIGS. 24A and 24B depict dataflow diagrams, including a first dataflow diagram 2400A and a second dataflow diagram 2400B, of a client application 1702 of a client-and-server infrastructure for capturing, storing, and managing engineering data using distributed version control. The features of FIGS. 24A and 24B may apply to any of FIGS. 21, 22, 23A-23B, and 25. In FIG. 24A, the first dataflow diagram 2400A may depict operations to capture, store, and manage engineering data from a second or third view in operation O2402 to operation O2428.

In operation O2402, the second view 2112 (or third view 2114) may receive a user interaction making a first modification to data in the second view (or third view 2114).

In operation O2404, the second view (or third view) may pass the first modification to the intermediate data structure manager 2110.

In operation O2406, the intermediate data structure manager 2110 may update the intermediate data structure to reflect the first modification. For instance, the intermediate data structure manager 2110 may update the intermediate data structure after confirming valid syntax and such for the user interaction.

In operation O2408, the intermediate data structure manager 2110 may pass the first modification and/or a copy of the intermediate data structure to the unparser 1706A.

In operation O2410, the unparser 1706A may process the first modification and/or the copy of the intermediate data structure to generate a second modification to or a copy of the primary data structure.

In operation O2412, the unparser 1706A may pass the second modification or the copy of the primary data structure to the primary data structure manager 2108.

In operation O2414, the primary data structure manager 2108 may update the primary data structure to reflect the second modification or the copy of the primary data structure. For instance, the primary data structure manager 2108 may update the primary data structure after confirming valid syntax and such for the second modification or the copy of the primary data structure.

In some cases (e.g., a toggle in state), in operation O2416, the primary data structure manager 2108 may pass data to the first view 2106.

In operation O2418, the first view 2106 may display the updated data based on the change in state and data in the updated primary data structure.

In operation O2420, the primary data structure manager 2108 may pass the updated primary data structure to the parser 1706B to loop back to the second view (or third view).

In operation O2422, the parser 1706B may process the updated primary data structure to generate a version of the intermediate data structure.

In operation O2424, the parser 1706B may pass the version of the intermediate data structure to the intermediate data structure manager 2110.

In operation O2426, the intermediate data structure manager 2110 may compare the version of the intermediate data structure to the updated intermediate data structure to check for conflicts and the like.

In operation O2427, the intermediate data structure manager 2110 may pass an update to the second view (or third view) that indicates the first modification was accepted.

In operation O2428, the second view (or second view) may indicate that the first modification was accepted and the user may make more modifications in the second view (or third view) or change views.

In FIG. 24B, the second dataflow diagram 2400B may depict operations to capture, store, and manage engineering data from a first view in operation O2430 to operation O2458.

In operation O2432, the first view 2106 may receive a user interaction making a third modification to data in the first view 2106.

In operation O2432, the first view 2106 may pass the third modification to the primary data structure manager 2108.

In operation O2434, the primary data structure manager 2108 may update the primary data structure to reflect the third modification. For instance, the primary data structure manager 2108 may update the primary data structure after confirming valid syntax and such for the user interaction.

In operation O2436, the primary data structure manager 2108 may pass the third modification and/or a copy of the primary data structure to the parser 1706B.

In operation O2438, the parser 1706B may process the third modification and/or the copy of the primary data structure to generate a fourth modification to or a copy of the intermediate data structure.

In operation O2440, the parser 1706B pass the fourth modification or the copy of the intermediate data structure to the intermediate data structure manager 2110.

In operation O2442, the intermediate data structure manager 2110 may update the intermediate data structure to reflect the fourth modification or the copy of the intermediate data structure. For instance, the intermediate data structure manager 2110 may update the intermediate data structure after confirming valid syntax and such for the fourth modification or the copy of the intermediate data structure.

In some cases (e.g., a toggle in state), in operation O2444, the intermediate data structure manager 2110 may pass data to the second view or third view.

In operation O2446, the second view 2112 (or third view 2214) may display the updated data based on the change in state and data in the updated intermediate data structure.

In operation O2448, the intermediate data structure manager 2110 may pass the updated intermediate data structure to the unparser 1706A to loop back to the first view.

In operation O2450, the unparser 1706A may process the updated intermediate data structure to generate a version of the primary data structure.

In operation O2452, the unparser 1706A may pass the version of the primary data structure to the primary data structure manager 2108.

In operation O2454, the primary data structure manager 2108 may compare the version of the primary data structure to the updated primary data structure to check for conflicts and the like.

In operation O2456, the primary data structure manager 2108 may pass an update to the first view that indicates the third modification was accepted.

In operation O2458, the first view may indicate that the third modification was accepted and the user may make more modifications in the first view or change views.

3.B.v. Analysis Client Application

Figure 25:
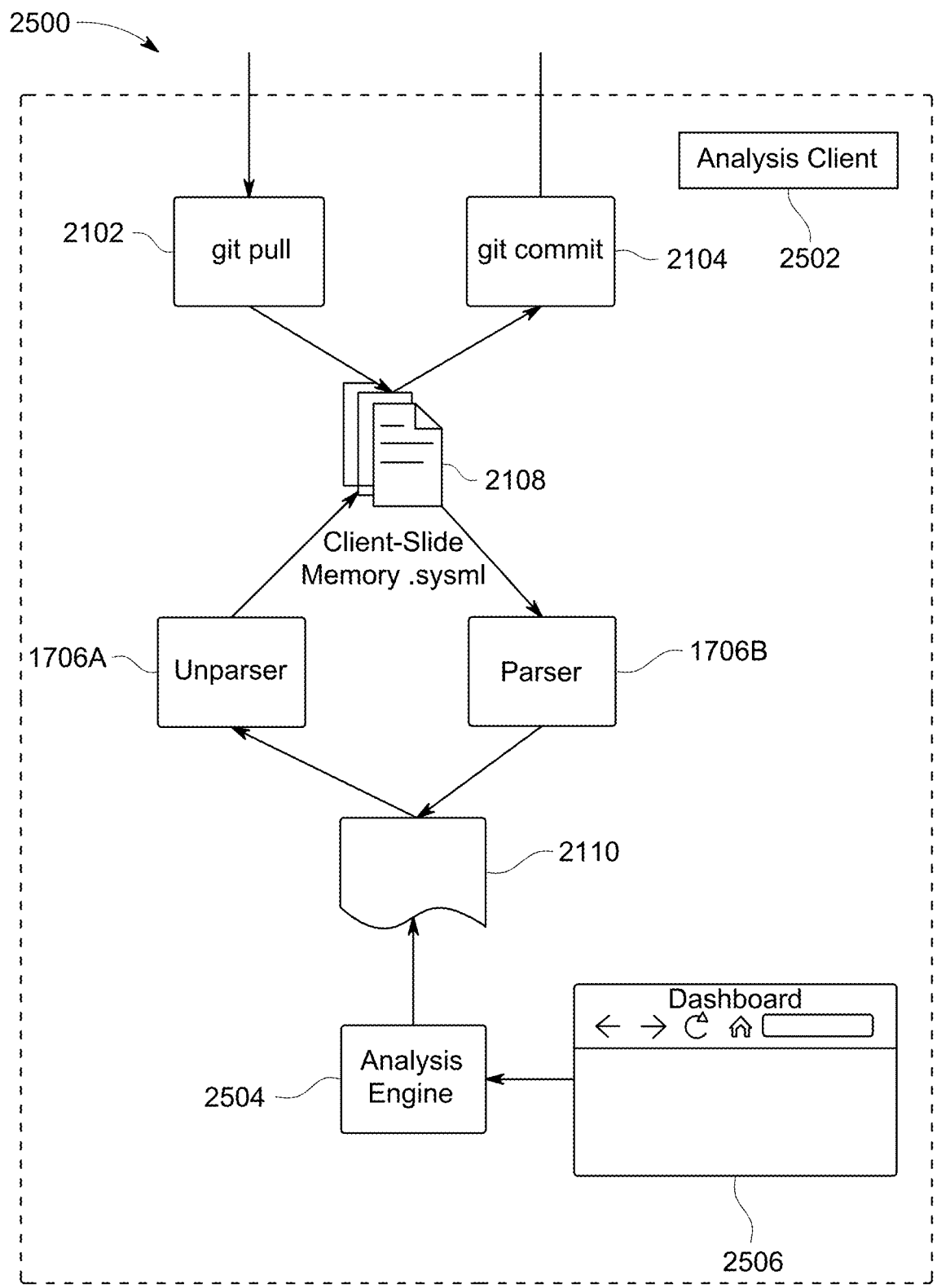
FIG. 25 depicts a block diagram for an analysis client application of a client-and-server infrastructure.

FIG. 25 depicts a block diagram 2500 for an analysis client application 2502 of a client-and-server infrastructure for capturing, storing, and managing engineering data using distributed version control. The features of FIG. 25 may apply to any of FIGS. 21, 22, 23A-23B, and 24A-24B. The analysis client application 2502 may be the same as the client application 1702 except that the analysis client application 2502 includes an analysis engine 2504 and a dashboard interface 2506, instead or in addition to different views 2106, 2112, 2114 of engineering data. In some cases, the analysis engine 2504 may provide representations (e.g., MSBE diagrams), analytics, simulations, recommendations, and the like ("analysis data"), based on engineering data stored in the intermediate data structure (by the intermediate data structure manager 2110). The analysis engine 2504 may display certain data (of the analysis data) to a user in the dashboard interface 2506. The user may interact with the dashboard interface 2506, such as modifications of engineering data, confirmations (or not) of recommendations, verifications of, e.g., models and/or simulations, and the like. The analysis engine 2504 may receive user interactions from the dashboard interface 2506, and update the engineering data stored in the intermediate data structure (by the intermediate data structure manager 2110) based on the user interactions. Updates to the engineering data stored in the intermediate data structure (by the intermediate data structure manager 2110) may be processed and stored in the primary data structure (by the primary data structure manager 2108) and the DVC storage 1712, as discussed herein, using the unparser, parser, git pull, and git commit.

In some cases, the analysis engine 2504 is a co-pilot engine, an AI engine, a verification engine, and the like. In some cases, the analysis engine 2504 may be a client-side application (e.g., a light version) or a server-side application to serve functionality to user devices (e.g., on a local network or from a cloud).

3.C. Post-Cloud Interface for Engineering Data Management

FIGS. 26, 27A-27E, 28, and 29A-29E depict features of a post-cloud engineering data management for a client-and-server infrastructure for capturing, storing, and managing engineering data using distributed version control. The features of FIGS. 26, 27A-27E, 28, and 29A-29E may apply to or use any features of FIGS. 1, 2, 3, 4A-4B, 5, 6, 7, 8, 9, 10, 11, 13, 14, 15, 16, 17, 18, 19A-19C, 20A-20C, 21, 22, 23A-23B, 24A-24B, and 25.

3.C.i. SDK for Post-Cloud Interface

The present disclosure relates to systems and methods for managing complex hardware system models in a software development environment. More specifically, the disclosure provides a client-and-server infrastructure that utilizes distributed version control to capture, store, and manage engineering data. This infrastructure includes a client application that interacts with a distributed version control system to retrieve and store snapshots of the model of the complex hardware system. These snapshots are stored in a text-based systems modeling language and are transformed into a format suitable for graphical display in an engineering application.

The client application includes a parser that facilitates bidirectional conversion between graphical engineering data and a compliant data structure. This allows users to work in their preferred format, whether it be graphical or textual, and ensures that all modifications to the data are accurately reflected across all formats. The client application also features a user interface that enables the manipulation of engineering data in a graphical format, providing an intuitive and accessible platform for users to interact with the data.

The parser within the client application verifies the syntax of the engineering data before converting it into a compliant data structure, ensuring the quality and integrity of the engineering data. The system also includes an analysis client application that provides representations, analytics, simulations, and recommendations based on the engineering data stored in the intermediate data structure. This analysis client application enhances the functionality of the system by providing additional insights and recommendations to the user.

In summary, the present disclosure provides a robust and flexible platform for managing complex hardware system models, enhancing collaboration, efficiency, and data integrity in the engineering data management process.

Figure 26:
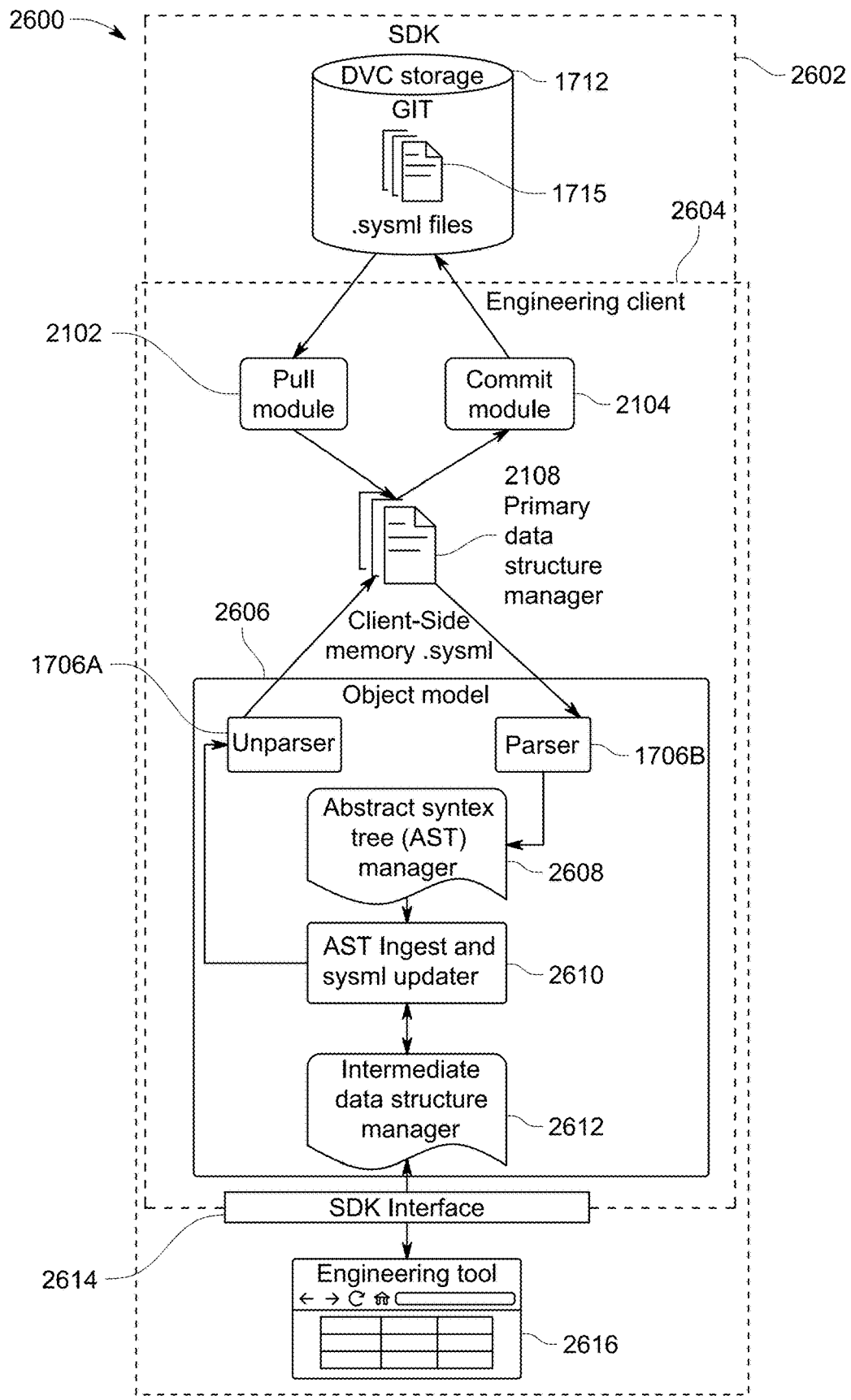
FIG. 26 illustrates a system diagram of a software development kit for managing complex hardware system models, according to aspects of the present disclosure.

FIG. 26 depicts a system diagram 2600 of a software development kit (SDK) 2602 for managing and modifying complex hardware system models. The system includes several interconnected components that work together to facilitate the manipulation and storage of system modeling information.

The SDK 2602 comprises a distributed version control (DVC) storage 1712 which contains files 1715. These files are accessed and modified through an engineering client 2604. The engineering client 2604 includes a pull module 2102 for retrieving data from the DVC storage 1712 and a commit module 2104 for saving changes back to the storage.

A primary data structure manager 2108 interacts with both the pull module 2102 and commit module 2104, managing the flow of data between the DVC storage 1712 and the rest of the system. The system utilizes an object model 2606 which contains several components for processing the data.

Within the object model 2606, an unparser 1706A, a parser 1706B, and an AST ingest and sysml updater 2610 are responsible for converting between different data representations. This allows users to work in their preferred format, whether it be graphical or textual, and ensures that all modifications to the data are accurately reflected across all formats.

The AST ingest and sysml updater 2610 may serve as a central component in managing data between different representations within the system. In some aspects, it may receive the Abstract Syntax Tree (AST) from the parser 1706B, providing a structured representation of the primary data structure. The AST ingest and sysml updater 2610 may then process and update this AST based on modifications made to the intermediate data structure, ensuring that changes made in one representation are accurately reflected in others.

In some cases, when updates are made to the intermediate data structure, the AST ingest and sysml updater 2610 may analyze these changes and apply corresponding modifications to the AST. This process may involve adding, removing, or modifying nodes and/or edges within the AST to reflect the updated state of the model.

The AST ingest and sysml updater 2610 may also be responsible for routing the updated intermediate data structure to the unparser 1706A. This routing may enable the unparser to generate an updated version of the primary data structure, maintaining consistency across all representations of the model.

By managing the flow of data between the AST, intermediate data structure, and primary data structure, the AST ingest and sysml updater 2610 may play a key role in ensuring data integrity and consistency throughout the system. It may act as a bridge between different data representations, facilitating seamless transitions between textual and graphical formats of the engineering data.

The SDK interface 2614 serves as a connection point between the object model 2606 and external tools. An engineering tool 2616 is shown connected to the SDK interface 2614, allowing users to interact with and modify the system model through an interface.

In the engineering tool, Create, Read, Update, and Delete (CRUD) actions are fundamental operations that users can perform on the engineering data. These actions are mapped to corresponding CRUD APIs provided by the SDK interface, which in turn manipulate the intermediate data structure accordingly.

1. Create: When a user adds new data or components in the engineering tool, this action triggers a 'Create' operation. The engineering tool sends a request to the SDK interface using a specific 'Create' API. This API call includes all necessary data to be added to the intermediate data structure. The intermediate data structure manager then processes this request and adds the new data to the existing structure.
2. Read: Users can view existing data within the engineering tool. When a user requests to view data, the engineering tool uses a 'Read' API provided by the SDK interface to retrieve the required data from the intermediate data structure. The intermediate data structure manager fetches the requested data and sends it back to the engineering tool, where it is displayed to the user.
3. Update: If a user modifies existing data in the engineering tool, this action is captured as an 'Update' operation. The modified data is sent to the SDK interface using an 'Update' API, which specifies the changes to be made to the intermediate data structure. The intermediate data structure manager processes these changes and updates the data structure accordingly.
4. Delete: When a user removes data or components in the engineering tool, a 'Delete' operation is initiated. The engineering tool sends a 'Delete' request to the SDK interface using the corresponding API. This request identifies the data to be removed from the intermediate data structure. The intermediate data structure manager then removes the specified data, updating the structure to reflect this change.

These CRUD actions ensure that any changes made in the engineering tool are accurately reflected in the intermediate data structure, maintaining consistency and integrity of the engineering data across the system. The SDK interface acts as a bridge between the engineering tool and the intermediate data structure, translating user actions into structured operations that manipulate the data effectively.

In some aspects, the SDK interface 2614 may perform authorization and validation checks on the CRUD APIs to ensure the requested actions can be taken. When a CRUD API request is received from the engineering tool 2616, the SDK interface 2614 may first verify that the user or process initiating the request has the necessary permissions to perform the requested operation. This authorization check may involve validating user credentials, checking role-based access controls, or verifying API keys.

After authorization, the SDK interface 2614 may validate the incoming data and parameters associated with the CRUD request. For Create and Update operations, this validation may include checking that all required fields are present, data types are correct, and values fall within acceptable ranges. For Read and Delete operations, the SDK interface 2614 may verify that the requested data exists and is accessible to the user.

The SDK interface 2614 may also perform semantic validation to ensure the requested action maintains the integrity and consistency of the data model. This may involve checking for potential conflicts with existing data, enforcing business rules, or verifying that the action complies with predefined modeling standards.

If any authorization or validation checks fail, the SDK interface 2614 may reject the CRUD API request and return an appropriate error message to the engineering tool 2616. This process helps prevent unauthorized access, data corruption, and inconsistencies in the engineering data managed by the system.

In some cases, the SDK interface 2614 may log all CRUD API requests and their outcomes for auditing and troubleshooting purposes. This logging may capture details such as the user initiating the request, the type of operation, timestamps, and the result of the authorization and validation checks.

This system allows for the retrieval, modification, and storage of complex hardware system models, facilitating collaboration and version control in engineering projects. In some aspects, the system may also include additional features such as search and navigation capabilities, collaborative features allowing multiple users to simultaneously view and edit snapshots of the model, and an analysis engine for providing representations, analytics, simulations, and recommendations based on the engineering data stored in the intermediate data structure.

FIG. 27A depicts a dataflow diagrams 2700A for a file retrieval and parsing process involving multiple components. The process begins with the pull module 2102 initiating a pull request (O2702) to the DVC storage 1712. This request is transmitted (O2704) to the DVC storage, which then retrieves the requested file (O2706). The retrieved file is then transmitted back to the pull module 2102 (O2708).

Upon receiving the file, the pull module 2102 provides it (O2710) to the primary data structure manager 2108. The primary data structure manager 2108 then manages the local copy of the file (O2712), ensuring it is properly stored and accessible.

Next, the primary data structure manager 2108 provides the file (O2714) to the parser 1706B. The parser 1706B then parses the file to obtain an abstract syntax tree (AST) (O2716). This parsing process converts the file's content into a structured representation that can be more easily manipulated and analyzed.

Once the AST is generated, the parser 1706B provides it (O2718) to the AST manager 2608. Finally, the AST manager 2608 manages the received AST (O2720), storing it and making it available for further processing or analysis.

This sequence demonstrates the flow of data from initial retrieval through parsing and management, involving multiple specialized components to handle different aspects of the process. In some aspects, the system may also include additional features such as search and navigation capabilities, collaborative features allowing multiple users to simultaneously view and edit snapshots of the model of the complex hardware system, and an analysis engine for providing representations, analytics, simulations, and recommendations based on the engineering data stored in the intermediate data structure.

FIG. 27B depicts a dataflow diagram 2700B of a system for managing and processing engineering data. The system comprises several components including an AST manager 2608, an AST ingest and sysml updater 2610, an intermediate data structure manager 2612, an SDK interface 2614, and an engineering tool 2616.

The dataflow begins with the AST manager 2608 providing an abstract syntax tree (AST) to the AST ingest and sysml updater 2610, as indicated by block O2722. The AST ingest and sysml updater 2610 then parses the AST to obtain an intermediate data structure, as shown in block O2724.

The intermediate data structure is then provided from the AST ingest and sysml updater 2610 to the intermediate data structure manager 2612, as depicted by block O2726. The intermediate data structure manager 2612 manages the intermediate data structure, as indicated by block O2728.

The SDK interface 2614 receives the intermediate data structure from the Intermediate data structure manager 2612, as shown by block O2730. The SDK interface 2614 then provides the intermediate data structure to the engineering tool 2616, as illustrated by block O2732.

The engineering tool 2616 performs several operations. It displays the intermediate data structure (or graphics based on the intermediate data structure) and performs CRUD (Create, Read, Update, Delete) engineering actions, as indicated by block O2734. The engineering tool 2616 also provides CRUD API(s) back to the SDK interface 2614, as shown by block O2736.

Finally, the SDK interface 2614 determines CRUD actions on the intermediate data structure, as depicted by block O2738. This completes the dataflow cycle within the system.

The diagram illustrates the flow of data and operations between different components of the system, showcasing how the AST is processed, transformed into an intermediate data structure, and ultimately used by the engineering tool 2616 for various engineering actions. In some aspects, the system may also include additional features such as search and navigation capabilities, collaborative features allowing multiple users to simultaneously view and edit snapshots of the model of the complex hardware system, and an analysis engine for providing representations, analytics, simulations, and recommendations based on the engineering data stored in the intermediate data structure.

In some cases, the engineering tool 2616 may interact with the intermediate data structure by storing, modifying, and accessing the data through the SDK interface 2614. The system may store the intermediate data structure in the one or more memories. The system may also modify the intermediate data structure based on user inputs received via the user interface of the engineering tool 2616, thereby generating a modified version of the intermediate data structure. The modified version of the intermediate data structure may then be stored in the one or more memories. The system may also access a modified version of the intermediate data structure, which is modified by the engineering tool 2616 based on user inputs received via the engineering tool 2616.

The engineering tool 2616 interacts with the intermediate data structure in several ways. In some aspects, the system may store the intermediate data structure in one or more memories. The engineering tool 2616 may modify the intermediate data structure based on user inputs received via its user interface, thereby generating a modified version of the intermediate data structure. This modified version of the intermediate data structure may then be stored in the one or more memories.

In some cases, the system may access a modified version of the intermediate data structure, which is modified by the engineering tool 2616 based on user inputs received via the engineering tool 2616. The engineering tool 2616 may perform several operations, such as displaying the intermediate data structure (or graphics based on the intermediate data structure) and performing CRUD (Create, Read, Update, Delete) engineering actions, as indicated by block O2734.

The engineering tool 2616 may also provide CRUD API(s) back to the SDK interface 2614 based on the CRUD engineering actions requested by user inputs, as shown by block O2736. This allows the SDK interface 2614 to determine CRUD actions on the intermediate data structure, as depicted by block O2738. This completes the dataflow cycle within the system, showcasing how the AST is processed, transformed into an intermediate data structure, and ultimately used by the Engineering tool 2616 for various engineering actions.

FIG. 27C depicts a dataflow diagram 2700C of a process for updating and converting the intermediate data structure back into the primary data structure format. The process involves several components, including the SDK interface 2614, intermediate data structure manager 2612, AST ingest and sysml updater 2610, unparser 1706A, and primary data structure manager 2108.

The sequence begins with the SDK interface 2614 providing instructions for CRUD (Create, Read, Update, Delete) actions (O2740) to the intermediate data structure manager 2612. Upon receiving these instructions, the intermediate data structure manager 2612 updates its internal data structure (O2742). Following this update, the intermediate data structure manager 2612 provides the updated intermediate data structure (O2744) to the AST ingest and sysml updater 2610.

The AST ingest and sysml updater 2610 then processes this information to update the abstract syntax tree (O2746). Once the AST is updated, it is provided (O2748) to the unparser 1706A. The unparser 1706A's role is to convert the updated AST back into a file format. This process, labeled as O2750, involves unparsing the updated AST to obtain a new file.

After the new file is generated, the unparser 1706A provides it (O2752) back to the primary data structure manager 2108. The primary data structure manager 2108 then performs the final step in this sequence by updating its file with the new file (O2754). The process then proceeds to operations O2714-O2734, to repeat the loop until a user stops working or indicates a commit for the project.

This sequence demonstrates the flow of data from the initial update of the intermediate data structure through the conversion back into the primary data structure format. It involves multiple specialized components to handle different aspects of the process. In some aspects, the system may also include additional features such as search and navigation capabilities, collaborative features allowing multiple users to simultaneously view and edit snapshots of the model of the complex hardware system, and an analysis engine for providing representations, analytics, simulations, and recommendations based on the engineering data stored in the intermediate data structure.

FIG. 27D depicts a dataflow diagram 2700D of a commit process involving multiple components. The process begins with the commit module 2104 initiating a commit operation (O2756). This triggers the primary data structure manager 2108 to request the file to be committed (O2758). The primary data structure manager 2108 then retrieves the file (O2760) and provides it back to the commit module (O2762). Upon receiving the file, the commit module processes it and transmits a commit request to the DVC storage 1712 (O2764). Finally, the DVC storage performs the actual commit operation, storing the file in its version-controlled repository (O2766). This sequence ensures that changes made to the primary data structure are properly committed and stored in the distributed version control system.

In response to a commit input from a user, the system may store the modified version of the first snapshot in the distributed version control system as a second snapshot. This allows for version control and tracking of changes made to the model of the complex hardware system. The commit process ensures that all modifications made to the model are accurately reflected in the version-controlled repository, providing a reliable and efficient means of managing complex hardware system models.

In some aspects, the system may include additional capabilities for analyzing and managing changes to the complex hardware system model. For instance, the system may generate different views of the systems modeling information based on user-selected filters or parameters. These different views may include graph structure views, tabular views, and text editor views, providing users with a variety of perspectives on the model data. This flexibility in data representation can enhance the user's understanding of the model and facilitate more effective decision-making.

3.C.ii. Text Injection

The present disclosure relates to systems and methods for managing and modifying models of complex hardware systems using distributed version control. The system may include a client application that interacts with a distributed version control system to obtain snapshots of the model, stored in a text-based systems modeling language. The client application may include a parser capable of transforming these snapshots into an intermediate data structure that can be loaded and manipulated by an engineering application.

The system may also feature a user interface that allows for the display and modification of the intermediate data structure in various formats, including graphical and tabular representations. This flexibility accommodates different user preferences and requirements, enhancing the collaborative and dynamic nature of the workflow.

The parser may also verify the syntax of the engineering data before converting it into a compliant data structure, ensuring the quality and integrity of the engineering data. Furthermore, the system may include an analysis engine that provides additional insights and recommendations based on the engineering data stored in the intermediate data structure.

In some embodiments, the system may facilitate the management and version control of engineering data in distributed environments, enhancing collaboration, flexibility, data integrity, and cost-effectiveness. The system may also support iterative design and development processes, streamline the process of updating and maintaining engineering data, and provide a safeguard against errors, ensuring data consistency and enhancing the overall reliability and productivity of the engineering data management process.

Figure 28:
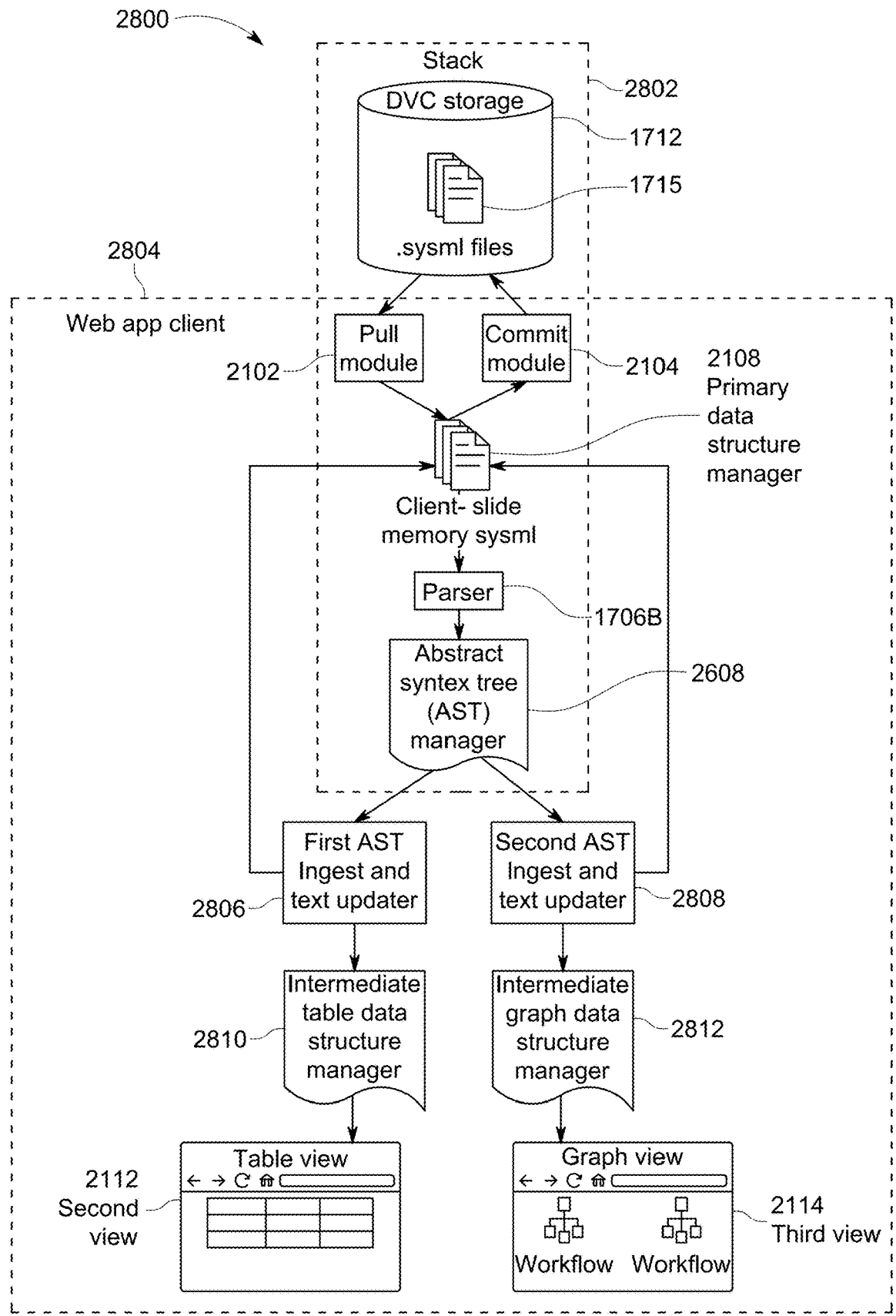
FIG. 28 illustrates a system diagram of a data management and visualization system, according to aspects of the present disclosure.

FIG. 28 depicts a system diagram 2800 of a data management and visualization system. The system comprises a stack 2802 and a web app client 2804. The stack 2802 includes a distributed version control (DVC) storage 1712 containing stored files 1715. The web app client 2804 interacts with the stack 2802 through various components.

A pull module 2102 retrieves data from the DVC storage 1712. The retrieved data is managed by a primary data structure manager 2108. A parser 1706B processes the data, which is then handled by an abstract syntax tree (AST) manager 2608.

The system includes two AST ingest and text updater components: a first AST ingest and text updater 2806 and a second AST ingest and text updater 2808. These components interact with an intermediate table data structure manager 2810 and an intermediate graph data structure manager 2812, respectively.

The first AST ingest and text updater 2806 and the second AST ingest and text updater 2808 may be designed to convert the Abstract Syntax Tree (AST) into specific target data structures, such as tabular or graph representations. These components may play a key role in transforming the AST into formats that can be more easily manipulated or visualized by other parts of the system.

In some aspects, the first AST ingest and text updater 2806 and the second AST ingest and text updater 2808 may be configured to track the correspondence between nodes and edges of the AST and their respective target data structures. This tracking mechanism may allow the system to maintain a clear relationship between the original AST representation and the derived tabular or graph structures.

The first AST ingest and text updater 2806 and the second AST ingest and text updater 2808 may also be capable of generating text injections to SysML v2 files based on updates made to the target data structures. These text injections may be created using line and column data included in the nodes and edges of the AST that correspond to the SysML file. This feature may allow for precise updates to the original SysML v2 files, ensuring that changes made in the intermediate representations are accurately reflected in the source files.

In some cases, when updates are made to the target data structures, the first AST ingest and text updater 2806 and the second AST ingest and text updater 2808 may analyze these changes and determine the corresponding modifications needed in the SysML v2 files. By utilizing the line and column data stored in the AST nodes and edges, these components may generate text injections that can be applied to the exact locations in the SysML v2 files where the changes are required.

The system may use this bidirectional mapping between the AST, target data structures, and SysML v2 files to maintain consistency across different representations of the model. This approach may allow users to work with the representation that is most convenient for their current task, while ensuring that all changes are propagated accurately throughout the system.

In some cases, the system may implement text injection to modify SysML v2 files based on changes made to the intermediate data structures. Text injection may involve adding, deleting, or replacing text in specific locations within the SysML v2 file, using line and column information to precisely target the modifications.

When adding text, the system may insert new content at a specified line and column position within the SysML v2 file. This may be used to introduce new elements, attributes, or relationships to the model. For example, the system may add a new component definition or a new connection between existing components.

Deleting text may involve removing a specified range of characters starting from a particular line and column position. This may be used to eliminate obsolete or redundant information from the model. The system may delete entire lines or portions of lines, depending on the nature of the modification.

Replacing text may combine the operations of deleting existing content and adding new content at the same location. This may be used to update existing elements or attributes with new values or definitions. The system may replace individual words, phrases, or entire blocks of text as needed.

In some aspects, the text injection process may utilize the line and column data stored in the AST nodes and edges to determine the exact locations for modifications in the SysML v2 file. This precise targeting may help maintain the overall structure and formatting of the file while applying the necessary changes.

The system may also implement safeguards to ensure that text injections do not introduce syntax errors or inconsistencies into the SysML v2 file. These safeguards may include syntax validation checks before and after the injection process, as well as mechanisms to revert changes if any issues are detected.

By using text injection, the system may efficiently propagate changes made in the intermediate data structures back to the original SysML v2 files, maintaining consistency across different representations of the model and enabling seamless collaboration among users working with various views of the system.

Text injection is a highly performant feature that may be utilized either with or instead of the unparser in object models such as the SDK. This method allows for precise modifications to be made directly in the SysML v2 files based on updates from the intermediate data structures. By leveraging line and column data stored in the AST nodes and edges, text injection can target specific locations within the SysML v2 files for adding, deleting, or replacing text. This ensures that changes made in the intermediate representations are accurately reflected in the source files, enhancing the efficiency and accuracy of the system. Text injection may replace or be used alongside the unparser, providing a flexible and high-performance solution for managing updates to complex hardware system models.

In some cases, the system may need to consider trade-offs between using an unparser versus text injections when updating SysML v2 files based on changes made to the intermediate data structures. The performance of the intermediate data structure on the engineering client front end may influence this decision.

When the intermediate data structure is relatively small or the changes are minor, text injections may offer better performance. Text injections can be more efficient for localized changes, as they allow for precise modifications to specific parts of the SysML v2 file without regenerating the entire file. This approach may result in faster update times and reduced computational overhead, especially when dealing with large models where only small portions need to be modified.

However, in cases where the intermediate data structure is complex or undergoes extensive modifications, using an unparser may prove more advantageous. The unparser can regenerate the entire SysML v2 file from the modified intermediate data structure, ensuring consistency across the entire model. This approach may be more reliable when dealing with numerous or interdependent changes, as it reduces the risk of introducing inconsistencies that might occur with multiple targeted text injections.

The choice between using an unparser or text injections may also depend on the specific requirements of the engineering application and the nature of the changes being made. For instance, if maintaining the exact formatting and structure of the original SysML v2 file is crucial, text injections may be preferred as they allow for more precise control over the modifications. On the other hand, if a complete regeneration of the file is acceptable or even desirable (e.g., to apply consistent formatting or to reorganize the structure), an unparser may be the better option.

In some implementations, the system may employ a hybrid approach, using text injections for minor updates and switching to the unparser for more substantial changes. This adaptive strategy may optimize performance based on the scale and complexity of the modifications, balancing the benefits of both methods.

The system may also consider factors such as the frequency of updates, the size of the overall model, and the available computational resources when deciding between text injections and unparsing. In environments where real-time collaboration is critical, the faster response times of text injections for small changes may be preferred to maintain a smooth user experience.

Ultimately, the decision between using an unparser or text injections may involve a careful analysis of the specific use case, performance requirements, and the characteristics of the intermediate data structure. The system may be designed to dynamically choose the most appropriate method based on these factors, ensuring optimal performance and reliability in managing complex hardware system models.

The intermediate data structures are visualized through a second view 2112 and a third view 2114, providing different representations of the data. A commit module 2104 allows changes to be committed back to the DVC storage 1712.

In some aspects, the system may submit a pull request to a distributed version control system, which comprises a plurality of snapshots of the model of the complex hardware system. These snapshots are stored in the distributed version control system in a text notation. The system may then receive a first snapshot of the model of the complex hardware system, which is in the text notation.

The system may perform a transform operation to the first snapshot of the model of the complex hardware system, thereby generating a transform of the first snapshot. This transform of the first snapshot is in a format configured for graphical display in an engineering application. The system may then display the transform of the first snapshot via a user interface of the engineering application.

In response to user inputs received via the user interface of the engineering application, the system may generate a modified version of the first snapshot of the model of the complex hardware system. This modified version of the first snapshot of the model of the complex hardware system is then stored in the one or more memories of the system.

The system diagram 2800 further illustrates the collaborative features of the system. In some aspects, the client application within the web app client 2804 may enable multiple users to simultaneously view and edit snapshots of the model of the complex hardware system. This collaborative feature may be facilitated through the user interface of the engineering application, which allows users to interact with the transform of the first snapshot in real-time. This feature enhances the dynamic and collaborative nature of the workflow, allowing multiple users to contribute to the model simultaneously.

In some cases, after the user inputs have been received and a modified version of the first snapshot of the model of the complex hardware system has been generated, the system may store this modified version in a staging environment. The staging environment may be a part of the one or more memories of the system, providing a temporary storage area for changes to the model before they are committed to the distributed version control system. This feature allows for further review and validation of the modifications before they are officially incorporated into the model, enhancing the reliability and integrity of the model.

In some aspects, the staging environment may also facilitate collaboration among users. For instance, multiple users may work on different modifications in the staging environment, and these modifications can be reviewed and merged together before being committed to the distributed version control system. This feature supports iterative design and development processes, allowing for efficient management and control of modifications to the model.

FIG. 29A depicts a dataflow diagram 2900A depicting the process of retrieving and parsing a file from a distributed version control system. The process begins with the pull module 2102 initiating a pull request (O2902). This request is transmitted to the DVC storage 1712 (O2904). Upon receiving the request, the DVC storage retrieves the requested file (O2906) and transmits it back to the pull module (O2908). The pull module then forwards the file to the primary data structure manager 2108 (O2910). The primary data structure manager manages the local copy of the file (O2912) and subsequently provides it to the parser 1706B (O2914). The parser then parses the file to obtain an abstract syntax tree (AST) (O2916). Once the AST is generated, it is provided to the AST manager 2608 (O2918). Finally, the AST Manager manages of the AST (O2920).

In some aspects, the system may submit a pull request to a distributed version control system, which comprises a plurality of snapshots of the model of the complex hardware system. These snapshots are stored in the distributed version control system in a text notation. The system may then receive a first snapshot of the model of the complex hardware system, which is in the text notation.

The system may perform a transform operation to the first snapshot of the model of the complex hardware system, thereby generating a transform of the first snapshot. This transform of the first snapshot is in a format configured for graphical display in an engineering application. The system may then display the transform of the first snapshot via a user interface of the engineering application.

In some cases, the system may obtain a first snapshot of the model of the complex hardware system from a distributed version control system, where the first snapshot is in a text-based systems modeling language. The system may parse the text of the first snapshot in the systems modeling language to generate an intermediate data structure, which is configured to be loaded and manipulated by an engineering application.

The system uses an Abstract Syntax Tree (AST) as an intermediate representation between the text-based systems modeling language and the engineering application. This AST is generated by parsing the text of the first snapshot in the systems modeling language. The AST represents the syntactic structure of the first snapshot and serves as a bridge between the text-based systems modeling language and the engineering application. This allows the system to transform the first snapshot into an intermediate data structure that can be loaded and manipulated by the engineering application.

In some aspects, the system may store the intermediate data structure in one or more memories. The system may then access a modified version of the intermediate data structure, where the modified version is modified by the engineering application based on user inputs received via the engineering application. The system may then unparse the modified version of the intermediate data structure, thereby generating a modified version of the first snapshot of the model of the complex hardware system, where the modified version of the first snapshot is in the text-based systems modeling language. The system may then store the modified version of the first snapshot of the model of the complex hardware system in the one or more memories.

Figure 29B:
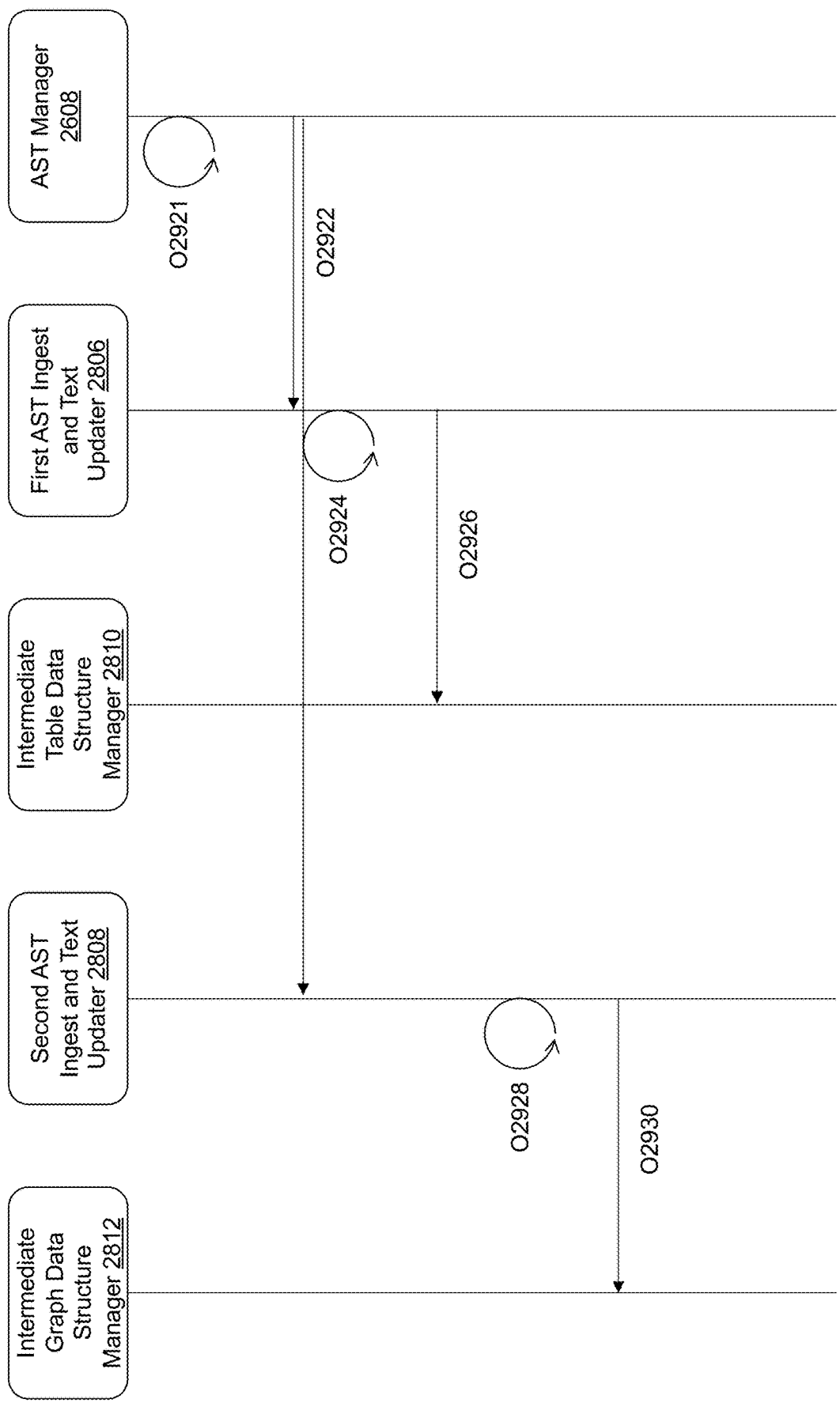
FIG. 29B illustrates a dataflow diagram for transforming an Abstract Syntax Tree into intermediate data structures, according to aspects of the present disclosure.

FIG. 29B depicts a dataflow diagram 2900B depicting the process of transforming an abstract syntax tree (AST) into intermediate table and graph data structures. The diagram shows interactions between five components: AST manager 2608, First AST ingest and text updater 2806, intermediate table data structure manager 2810, second AST ingest and text updater 2808, and intermediate graph data structure manager 2812.

The process begins with the AST manager 2608 initiating operation O2921, which selects the target intermediate data structure(s). This operation determines which type of data structure(s) the AST will be transformed into. Following this selection, the AST manager executes operation O2922, providing the AST to the designated targets.

The first AST ingest and text updater 2806 receives the AST and performs operation O2924. This operation parses the AST to obtain an intermediate table data structure. Once the parsing is complete, the first AST ingest and text updater 2806 executes operation O2926, providing the newly created intermediate table data structure to the intermediate table data structure manager 2810.

Simultaneously, the second AST ingest and text updater 2808 also receives the AST from the AST manager. It performs operation O2928, which parses the AST to obtain an intermediate graph data structure. After parsing, the second AST ingest and text updater 2808 executes operation O2930, providing the generated intermediate graph data structure to the intermediate graph data structure manager 2812.

This sequence demonstrates the parallel processing of the AST into two different intermediate data structures-a table structure and a graph structure. The process efficiently transforms the AST into formats that can be more easily manipulated or visualized by other components of the system, depending on the specific requirements of the application.

In some aspects, the system may perform a transform operation on the first snapshot to generate a transform in a format for graphical display in an engineering application. The system may then store the intermediate data structure in the one or more memories. The system may determine a type of the intermediate data structure, and parse the first snapshot into the determined type of the intermediate data structure. The system includes separate AST ingest and text updater components for table and graph data structures. The system allows for parallel processing of the AST into both table and graph intermediate data structures.

FIG. 29C depicts a dataflow diagram 2900C depicting the interaction between various components in a data management system. The process begins with the intermediate graph data structure manager 2812 providing the intermediate graph data structure to the second view 2112 in step O2932. Upon receiving this data, the second View 2112 displays it and enables CRUD (Create, Read, Update, Delete) engineering actions in step O2934. After the user performs actions in the second view, updates are provided back to the intermediate graph data structure manager in step O2936. The manager then updates the intermediate graph data structure internally in step O2938.

Simultaneously, a parallel process occurs with the intermediate table data structure manager 2810. It provides the intermediate table data structure to the third view 2114 in step O2940. The third view then displays this data and allows CRUD engineering actions in step O2942. Any updates made in the third view are provided back to the intermediate table data structure manager in step O2944.

The second view 2112 also interacts with the intermediate table data structure manager 2810. In step O2946, it updates the intermediate table data structure, ensuring consistency between the graph and table representations.

In some aspects, the system may display the transform of the first snapshot via a user interface of the engineering application. The system generates a modified version of the first snapshot in response to user inputs received via the user interface. The system modifies the intermediate data structure via a user interface of the engineering application based on user inputs, generating a modified version of the intermediate data structure. The system stores the modified version of the intermediate data structure in the one or more memories. The client application generates different views of the systems modeling information based on user-selected filters or parameters. These views may include graph structure views, tabular views, and/or text editor views. The client application provides search and navigation capabilities within the different views to locate specific model elements or relationships.

In some aspects, the system may display the transform of the first snapshot via a user interface of the engineering application. The system generates a modified version of the first snapshot in response to user inputs received via the user interface. The system modifies the intermediate data structure via a user interface of the engineering application based on user inputs, generating a modified version of the intermediate data structure. The system stores the modified version of the intermediate data structure in the one or more memories. The client application generates different views of the systems modeling information based on user-selected filters or parameters. These views may include graph structure views, tabular views, and/or text editor views. The client application provides search and navigation capabilities within the different views to locate specific model elements or relationships.

Figure 29D:
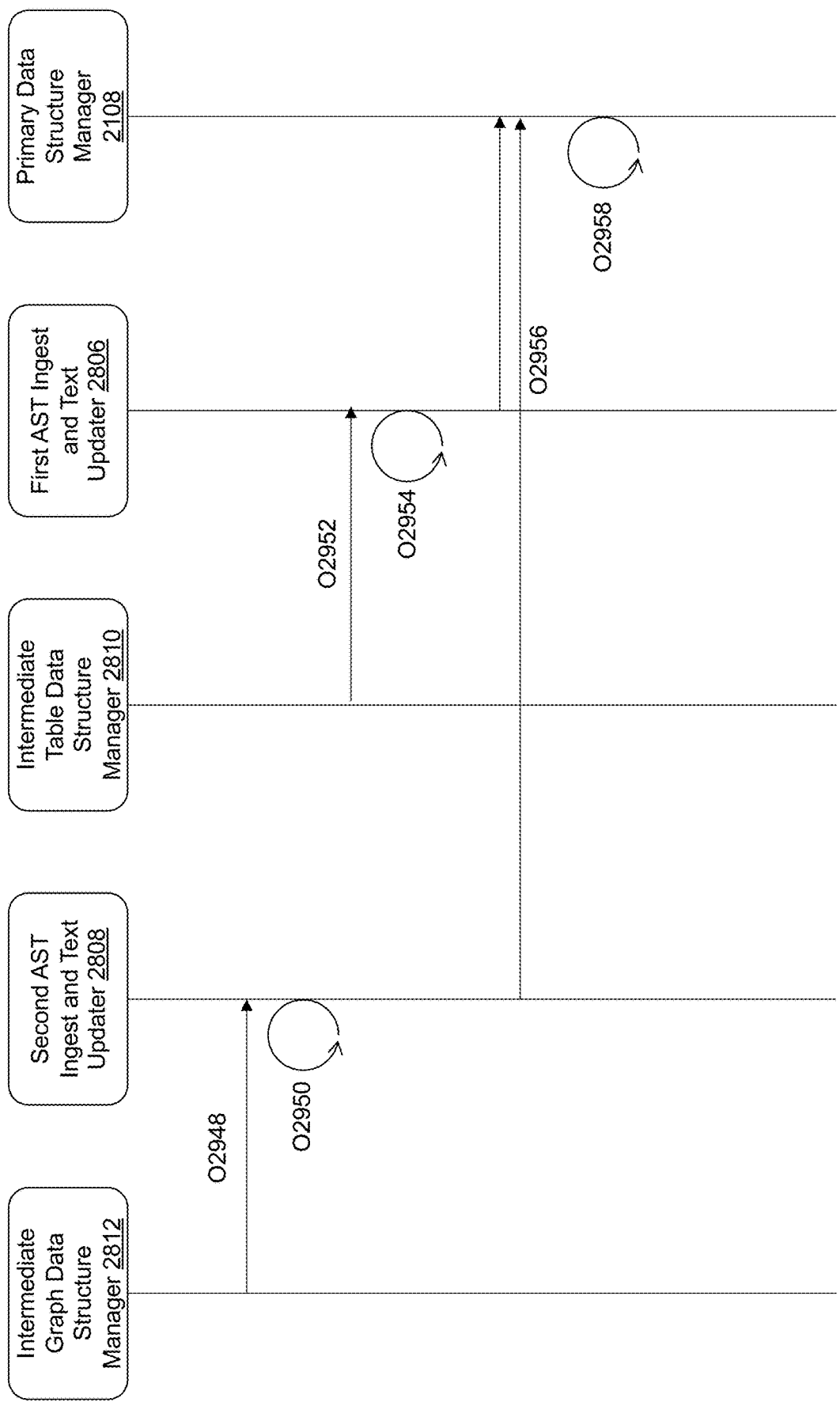
FIG. 29D illustrates a dataflow diagram for a process for updating and managing data structures, according to aspects of the present disclosure.

FIG. 29D depicts a dataflow diagram 2900D for a process involving multiple components for updating and managing data structures. The sequence begins with the intermediate graph data structure manager 2812 providing an updated intermediate graph data structure to the second AST ingest and text updater 2808 (O2948). Upon receiving this data, the second AST ingest and text updater 2808 determines the appropriate textual update injection (O2950).

Simultaneously, the intermediate table data structure manager 2810 provides an updated intermediate table data structure to the first AST ingest and text updater 2806 (O2952). The first AST ingest and text updater 2806 then determines the necessary textual update injection based on the received table data (O2954). Both the second and first AST ingest and text updaters (2808 and 2806) then provide their respective textual update injection(s) to the primary data structure manager 2108 (O2956).

The primary data structure manager 2108 then updates the primary data structure to reflect the textual update injections or the copy of the primary data structure. For instance, the primary data structure manager 2108 may update the primary data structure after confirming valid syntax and such for the textual update injections or the copy of the primary data structure.

In some aspects, the system may access the modified version of the intermediate data structure. The system may then generate a modified version of the first snapshot of the model of the complex hardware system based on the modified version of the intermediate data structure, where the modified version of the first snapshot is in the text-based systems modeling language.

The system may then unparse the modified version of the intermediate data structure, thereby generating a modified version of the first snapshot of the model of the complex hardware system, where the modified version of the first snapshot is in the text-based systems modeling language. The system may then store the modified version of the first snapshot of the model of the complex hardware system in the one or more memories.

This sequence demonstrates how updates from the intermediate graph and table data structures are integrated into the primary data structure through the AST ingest and text updater components. This process ensures that changes made in both the graph and table data structures are properly integrated and reflected in the primary data structure.

In some aspects, the system may access the modified version of the intermediate data structure. The system may then generate a modified version of the first snapshot of the model of the complex hardware system based on the modified version of the intermediate data structure, where the modified version of the first snapshot is in the text-based systems modeling language.

FIG. 29E depicts a dataflow diagram 2900E depicting the commit process in a distributed version control system. The diagram involves three main components: the primary data structure manager 2108, the commit module 2104, and the DVC storage 1712.

The process begins with operation O2960, where the commit module 2104 initiates a commit action. This triggers operation O2962, in which the commit module requests a file from the primary data structure manager 2108. In response, the primary data structure manager performs operation O2964 to retrieve the requested file.

Once the file is retrieved, operation O2966 occurs, where the primary data structure manager provides the file to the commit module. The commit module then proceeds with operation O2968, transmitting a commit request to the DVC storage 1712. This commit request includes the file that was retrieved from the primary data structure manager.

Finally, the DVC storage 1712 executes operation O2970, which involves committing the file to the distributed version control system. This step completes the commit process, ensuring that the changes made to the file are now stored and tracked in the version control system.

In some aspects, the system may store the modified version of the first snapshot of the model of the complex hardware system in the one or more memories. In response to a commit input from a user, the system may store the modified version of the first snapshot in the distributed version control system as a second snapshot of the first snapshot of the complex hardware system. This process involves interaction between the primary data structure manager, commit module, and DVC storage. The commit process ensures that the changes made to the model are stored and tracked in the version control system, providing a record of modifications and facilitating version control.

3.D. Analysis, Review, and Merger Management

FIGS. 30, 31, and 32A-32F depict features of analysis, review, and merger management for a client-and-server infrastructure for capturing, storing, and managing engineering data using distributed version control. The features of FIGS. 30, 31, and 32A-32F may apply to or use any features of FIGS. 1, 2, 3, 4A-4B, 5, 6, 7, 8, 9, 10, 11, 13, 14, 15, 16, 17, 18, 19A-19C, 20A-20C, 21, 22, 23A-23B, 24A-24B, and 25.

The present disclosure relates to systems and methods for managing and modifying models of complex hardware systems using distributed version control. The system may include a client application that communicates with a server, with the client application comprising a user interface and a parser. The user interface may manage a structured user interface and pass data and requests to the parser. The parser may be configured to convert graphical engineering data into a data structure that is compliant to a model language syntax and vice versa.

The system may obtain a snapshot of the model of the complex hardware system from a distributed version control system, with the snapshot being in a text-based systems modeling language. The system may generate an intermediate data structure based on the snapshot, which can be loaded and manipulated by an engineering application. The system may also store the intermediate data structure and access a modified version of it, which is modified by the engineering application based on user inputs.

The system may generate a modified version of the snapshot based on the modified version of the intermediate data structure, perform a comparison of the snapshot of the model to the modified version of the snapshot, and display changes between the snapshot of the model and the modified version of the snapshot.

The system may also include an analysis engine and a dashboard interface, which may provide representations, analytics, simulations, recommendations, and the like, based on the engineering data stored in the intermediate data structure. The analysis engine may display certain data to a user in the dashboard interface, and receive user interactions from the dashboard interface, updating the engineering data stored in the intermediate data structure based on the user interactions.

In some embodiments, the system may perform syntax verification, apply syntax highlighting and formatting to enhance readability, convert highlighting and formatting in an intermediary representation for display on graphical or tabular representations, and obtain comments within the modified version of the snapshot of the model of the complex hardware system to explain complex changes or provide context for the modifications.

In some cases, the system may notify relevant stakeholders about updates made to the modified version of the snapshot of the model of the complex hardware system, perform a semantic analysis to determine the significance of changes in the context of the overall system model, calculate metrics for each version of the systems modeling information, generate visualizations of the changes, identify potential conflicts or inconsistencies introduced by changes across different versions, analyze the adherence of each version to predefined modeling standards or best practices, generate suggestions for optimizing or refactoring the systems model based on the analysis of changes and complexity metrics, and create an audit trail of all analyses performed, including timestamps and user information.

These and other aspects of the present disclosure will be apparent from the detailed description that follows.

Figure 30:
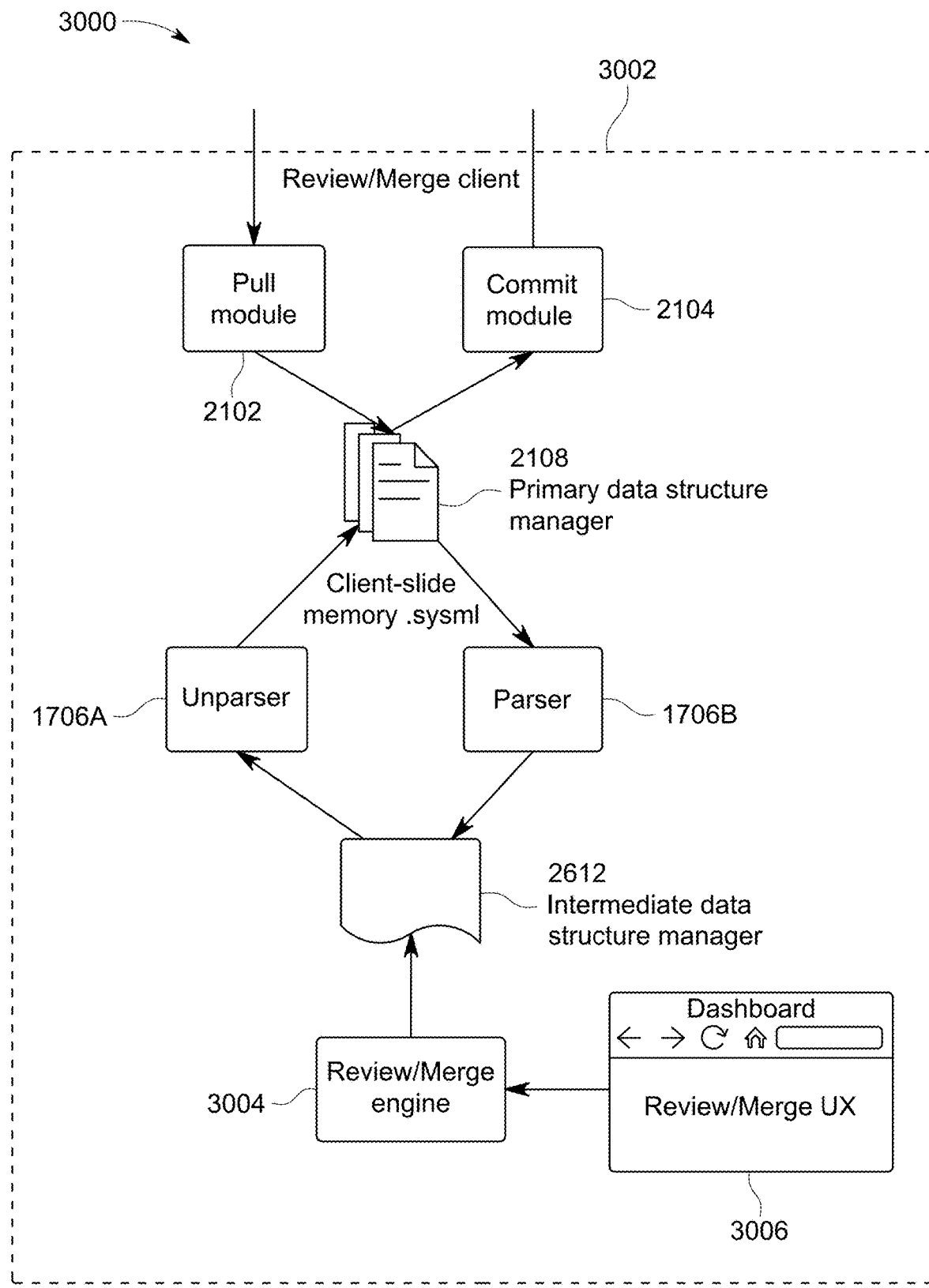
FIG. 30 illustrates a system diagram of a review and merge client for managing hardware system models, according to aspects of the present disclosure.

FIG. 30 depicts a system diagram 3000 of a review and merge client 3002 for managing and processing complex hardware system models. The system comprises several interconnected components that work together to facilitate the review and merge process.

The review and merge client 3002 includes a pull module 2102 and a commit module 2104. The pull module 2102 is responsible for retrieving data from a distributed version control system. In some cases, a set of snapshots of the model of a complex hardware system in a text-based systems modeling language, including at least a first snapshot (e.g., previous version, or separate branch version of a project), which is compared to a second version of the snapshot, e.g., that a user is working on currently, or as part of a merge request (e.g., from the DVC system). The commit module 2104 handles the process of saving changes back to the version control system. These changes are based on a modified version of an intermediate data structure that has been manipulated by an engineering application.

The review and merge client 3002 includes a primary data structure manager 2108, which manages the client-side memory of the system model. This component interacts with both the pull module 2102 and the commit module 2104 to maintain the current state of the model.

The review and merge client 3002 also includes an unparser 1706A and a parser 1706B. The unparser 1706A is responsible for converting the internal representation of the model into a text-based format, while the parser 1706B performs the reverse operation, converting text-based input into the internal representation.

The review and merge client 3002 also includes an intermediate data structure manager 2612, which handles the management of data between different representations used in the review and merge process, as discussed above with respect to FIGS. 21, 26 and 28. This manager may store and manage an intermediate data structure based on the initial snapshot of the model, and also in accessing a modified version of this intermediate data structure, which has been altered by the engineering application based on user inputs.

The review and merge engine 3004 coordinates the overall review and merge operations, interacting with the intermediate data structure manager 2612 and other components of the system. This engine plays a key role in performing a comparison of the initial snapshot of the model to the modified version of the snapshot, thereby generating a diff. Based on this diff, the engine can display changes between the initial snapshot of the model and the modified version of the snapshot.

Finally, the system includes a review and merge user interface 3006, which provides a graphical interface for users to interact with the review and merge process, displaying relevant information and allowing user input.

The components of the system are interconnected, allowing for the flow of data and control between different parts of the review and merge client 3002. This architecture enables the system to efficiently manage the complex processes involved in reviewing and merging hardware system models.

The review and merge engine 3004 coordinates the overall review and merge operations, interacting with the intermediate data structure manager 2612 and other components of the system. This engine plays a key role in performing a comparison of the initial snapshot of the model to the modified version of the snapshot, thereby generating a diff. Based on this diff, the engine can display changes between the initial snapshot of the model and the modified version of the snapshot. In some cases, the review and merge engine 3004 may perform a semantic analysis to determine the significance of changes in the context of the overall system model.

Finally, the system includes a review and merge user interface 3006, which provides a graphical interface for users to interact with the review and merge process, displaying relevant information and allowing user input. The user interface 3006 may receive user inputs via the engineering application and access a modified version of the intermediate data structure. Based on the modified version of the intermediate data structure, the user interface 3006 may generate a modified version of the first snapshot of the model of the complex hardware system, wherein the modified version of the first snapshot is in the text-based systems modeling language.

In some aspects, the components of the system are interconnected, allowing for the flow of data and control between different parts of the review and merge client 3002. This architecture enables the system to efficiently manage the complex processes involved in reviewing and merging hardware system models.

Figure 31:
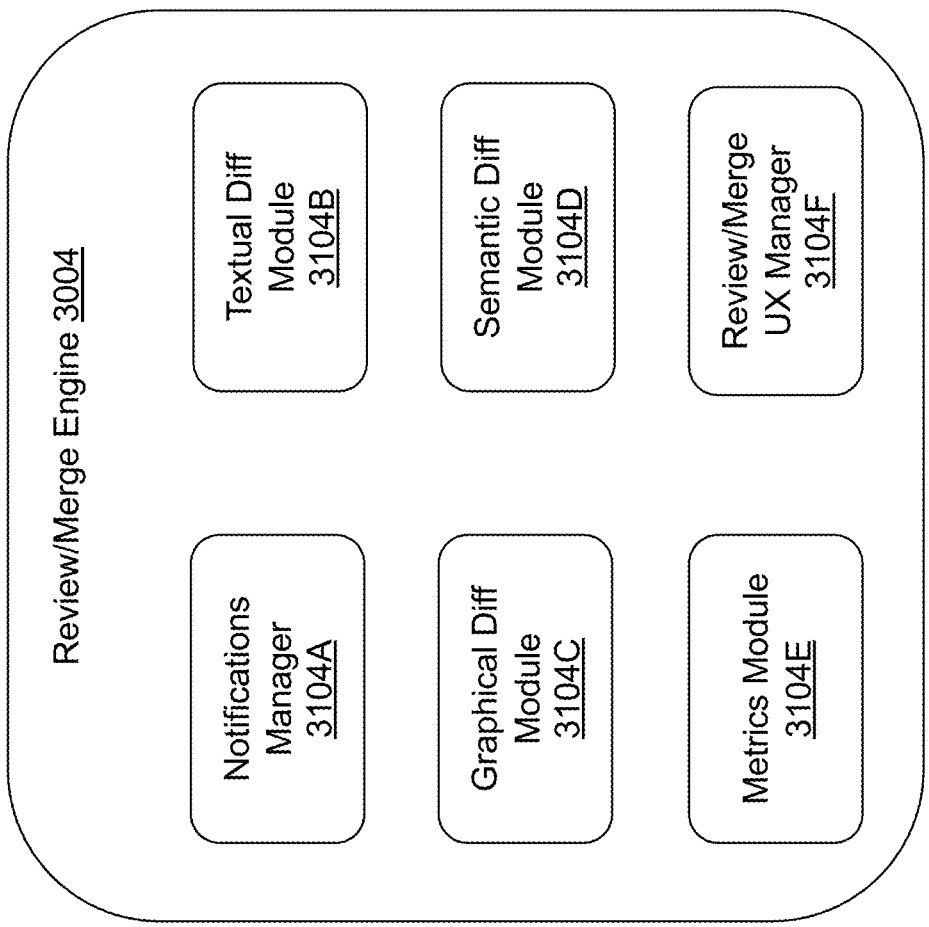
FIG. 31 illustrates a system diagram of a review and merge engine, according to an embodiment.

FIG. 31 depicts a system diagram 3100 of a review and merge engine 3004. The review and merge engine 3004 comprises several modules that work together to facilitate the review and merging process of complex hardware system models.

The review and merge engine 3004 includes a notifications manager 3104A, which is responsible for managing and sending notifications related to the review and merge process. The textual diff module 3104B handles the comparison and differentiation of textual representations of the system models, e.g., based on outputs from the DVC system or locally determined between two files.

The graphical diff module 3104C processes and displays the graphical differences between versions of the system model. See, e.g., FIGS. 32E and 32F. For instance, the graphical diff module 3104C may populate a graphical representation (e.g., graphs or tabular formats) of the model, and emphasize portions of the graphical representation based on the diffs between two models (e.g., text-based files) or two branches. The graphical diff module 3104C may determine a type of emphasis for the diffs based on the types of diffs. For instance, a new subsystem or connection between subsystems may be indicated by a first type of indicator (e.g., a first symbol, a first color-coded highlighting and the like), a deleted subsystem or connection between subsystems may be indicated by a second type of indicator (e.g., a second symbol, a second color-coded highlighting and the like), and a re-arrangement of existing subsystems may be indicated by a third type of indicator (e.g., a third symbol, a third color-coded highlighting and the like). Generally, the graphical diff module 3104C may generate and display a graphical representation of the model (based on the intermediate data structure with the primary data structure as "source of truth") and overlay indicators based on types of diffs for components of the graphical representation.

The semantic diff module 3104D analyzes and presents the semantic differences in the model versions. For instance, the semantic diff module 3104D may determine semantic meaning of the diffs and present the semantic meanings in a user interface. See, e.g., FIGS. 32E and 32F. For instance, the semantic diff module 3104D may use language model service 206 and/or the ontology service 210 to determine features of the diffs and related entities, and generate a textual description based on the feature and related entities.

The metrics module 3104E calculates and provides various metrics related to the changes and versions of the system model. In some cases, the metrics module 3104E may determine/retrieve metrics from metadata from the DVC system. In some cases, the metrics module 3104E may use language model service 206 and/or the ontology service 210 to determine features of the diffs and related entities, and generate a metrics based on the feature and related entities. For instance, the metrics module 3104E may determine a number of subsystems and relationships between subsystems that have been add, modified, or deleted based on the diffs.

The review and merge UX manager 3104F may manage the user experience aspects of the review and merge process. See, e.g., FIGS. 32A-32F.

The modules within the review and merge engine 3004 are interconnected, allowing for seamless data flow and coordination between different aspects of the review and merge process. This configuration enables comprehensive analysis, comparison, and management of complex hardware system models throughout their development and revision cycles.

In some aspects, the review and merge engine 3004 performs a comparison of the first snapshot of the model of the complex hardware system to the modified version of the snapshot, thereby generating a diff. This diff is then used by the various modules within the engine to perform their respective functions. For instance, the textual diff module 3104B may use the diff to highlight the changes in the textual representation of the model, while the graphical diff module 3104C may use the diff to visually represent the changes in the graphical representation of the model.

In some cases, the review and merge engine 3004 may perform a semantic analysis to determine the significance of changes in the context of the overall system model. This analysis may be performed by the semantic diff module 3104D, which analyzes the semantic differences in the model versions and provides insights into the impact of the changes on the overall system model.

The system may also identify potential conflicts or inconsistencies introduced by changes across different versions. This could be done by the review and merge UX manager 3104F, which manages the user experience aspects of the review and merge process and can flag potential conflicts or inconsistencies for the user's attention.

In some aspects, the system may analyze the adherence of each version to predefined modeling standards or best practices. This could be done by the metrics module 3104E, which calculates and provides various metrics related to the changes and versions of the system model, the language model service 206, and/or the ontology service 210, which determines entitles and relationships and conflicts between them. These metrics could include measures of adherence to predefined modeling standards or best practices.

In some cases, the system may generate suggestions for optimizing or refactoring the systems model based on the analysis of changes and complexity metrics. This could be done by the review and merge UX manager 3104F, which could use the insights gained from the semantic analysis and the metrics to generate suggestions for improving the system model.

In some cases, the notifications manager 3104A may manage and send notifications related to the review and merge process. These notifications may include updates about changes made to the model, alerts about potential conflicts or inconsistencies, and reminders about pending review tasks. The notifications manager 3104A may interact with other components of the system to gather the necessary information and distribute the notifications to the relevant stakeholders.

In some cases, the textual diff module 3104B may handle the comparison and differentiation of textual representations of the system models. In some cases, the textual diff module 3104B may use the diff generated by the review and merge engine 3004 to highlight the changes in the textual representation of the model. This can help users to quickly identify and understand the modifications made to the model.

In some cases, the graphical diff module 3104C may process and display the graphical differences between versions of the system model. The graphical diff module 3104C may use the diff to visually represent the changes in the graphical representation of the model. This can provide a more intuitive and accessible way for users to review and assess the changes.

In some cases, the semantic diff module 3104D may analyze and present the semantic differences in the model versions. The semantic diff module 3104D may perform a semantic analysis to determine the significance of changes in the context of the overall system model. This can provide insights into the impact of the changes on the overall system functionality and performance.

In some cases, the metrics module 3104E may calculate and provide various metrics related to the changes and versions of the system model. These metrics may include measures of the number of changes, the complexity of changes, and the adherence of each version to predefined modeling standards or best practices.

In some cases, the review and merge UX manager 3104F may handle the user experience aspects of the review and merge process. The review and merge UX manager 3104F may manage the display of changes, the navigation through different versions, and the interaction with the review and merge process.

The modules within the review and merge engine 3004 are interconnected, allowing for seamless data flow and coordination between different aspects of the review and merge process. This configuration enables comprehensive analysis, comparison, and management of complex hardware system models throughout their development and revision cycles.

Figure 32A:
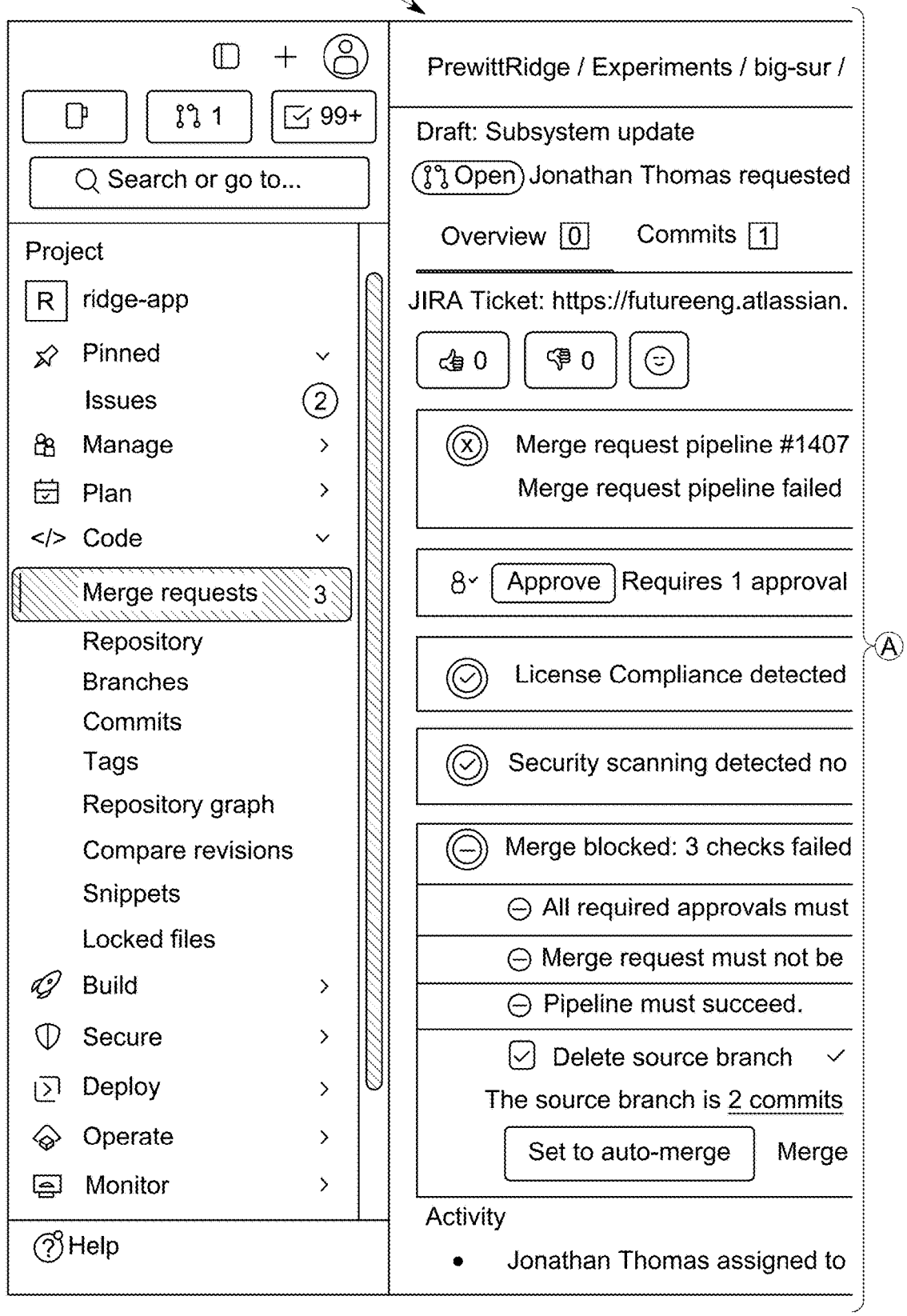
FIG. 32A illustrates a first review/merge interface displaying an overview tab, according to aspects of the present disclosure.
Figure 32A:
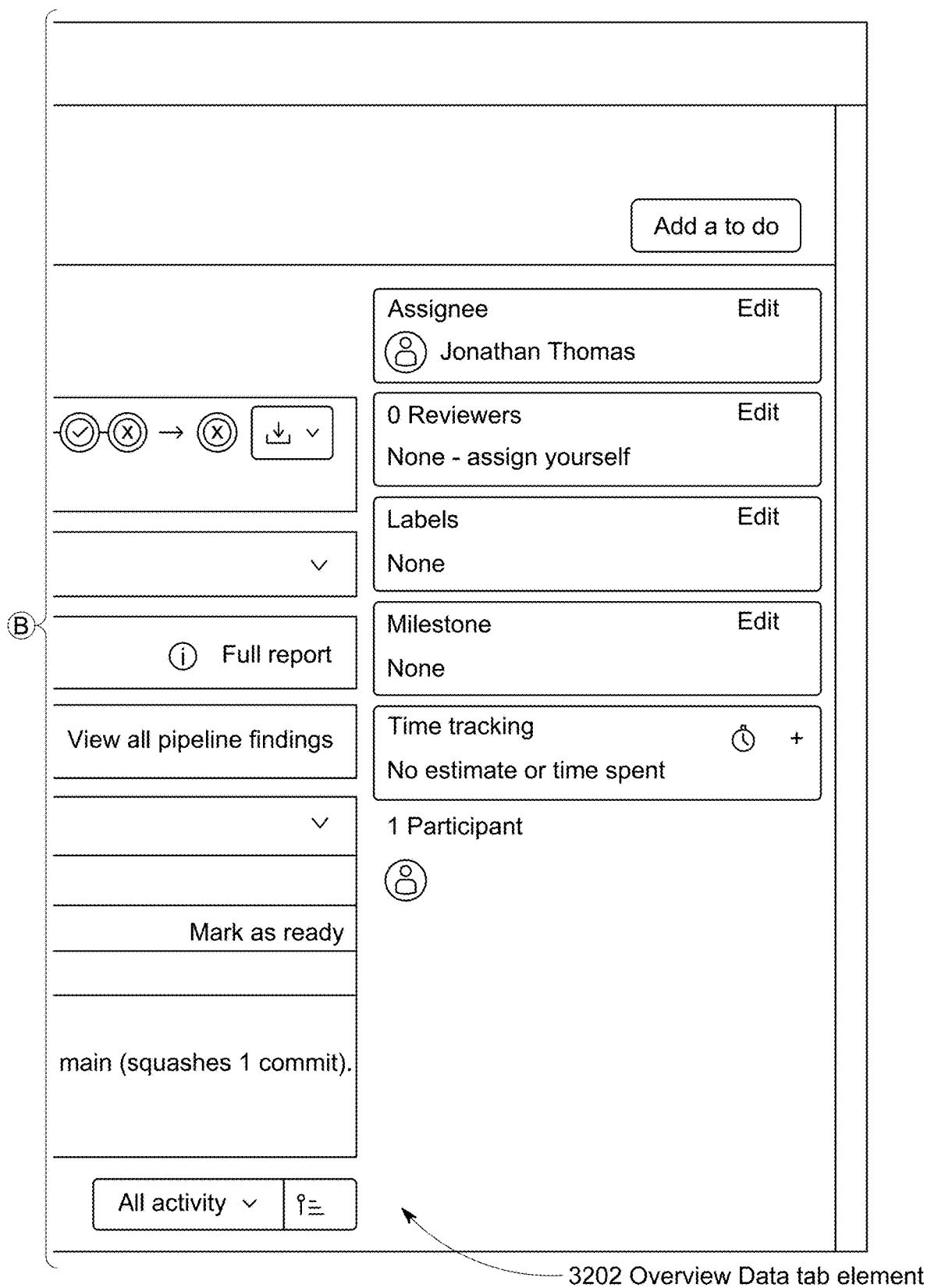

FIG. 32A depicts a user interface view of a first review and merge interface 3200A for a software development and version control system. The interface 3200A displays information related to a merge request for a subsystem update.

The interface 3200A includes an overview tab 3202 that presents key information about the merge request. The overview tab 3202 shows the title of the draft merge request and provides details such as the requester's name, the time elapsed since the request was made, and the associated ticket.

The overview tab 3202 displays the status of various checks and approvals required for the merge request. In some cases, the overview tab 3202 may indicate a status (e.g., that a merge request pipeline has failed) and provide information on license compliance checks, security scanning results, and merge blocking issues.

The interface 3200A also includes options for approving the merge request, viewing additional reports, and setting auto-merge conditions. On the right side of the interface, there are sections for assigning reviewers, adding labels, setting milestones, and tracking time spent on the merge request.

At the bottom of the overview tab 3202, an activity section is visible, showing recent actions taken on the merge request. This activity section provides a chronological record of the actions and changes associated with the merge request, facilitating asynchronous design review by allowing team members to review the history of the merge request at their convenience.

In some aspects, the first review and merge interface 3200A may also include additional features or functionalities to further enhance the review and merge process. For example, it may provide tools for comparing different versions of the system model, analyzing the impact of proposed changes, or generating reports on the progress of the merge request. These additional features may be integrated into the interface 3200A or provided as separate modules or plugins that can be added to the interface as needed.

Figure 32B:
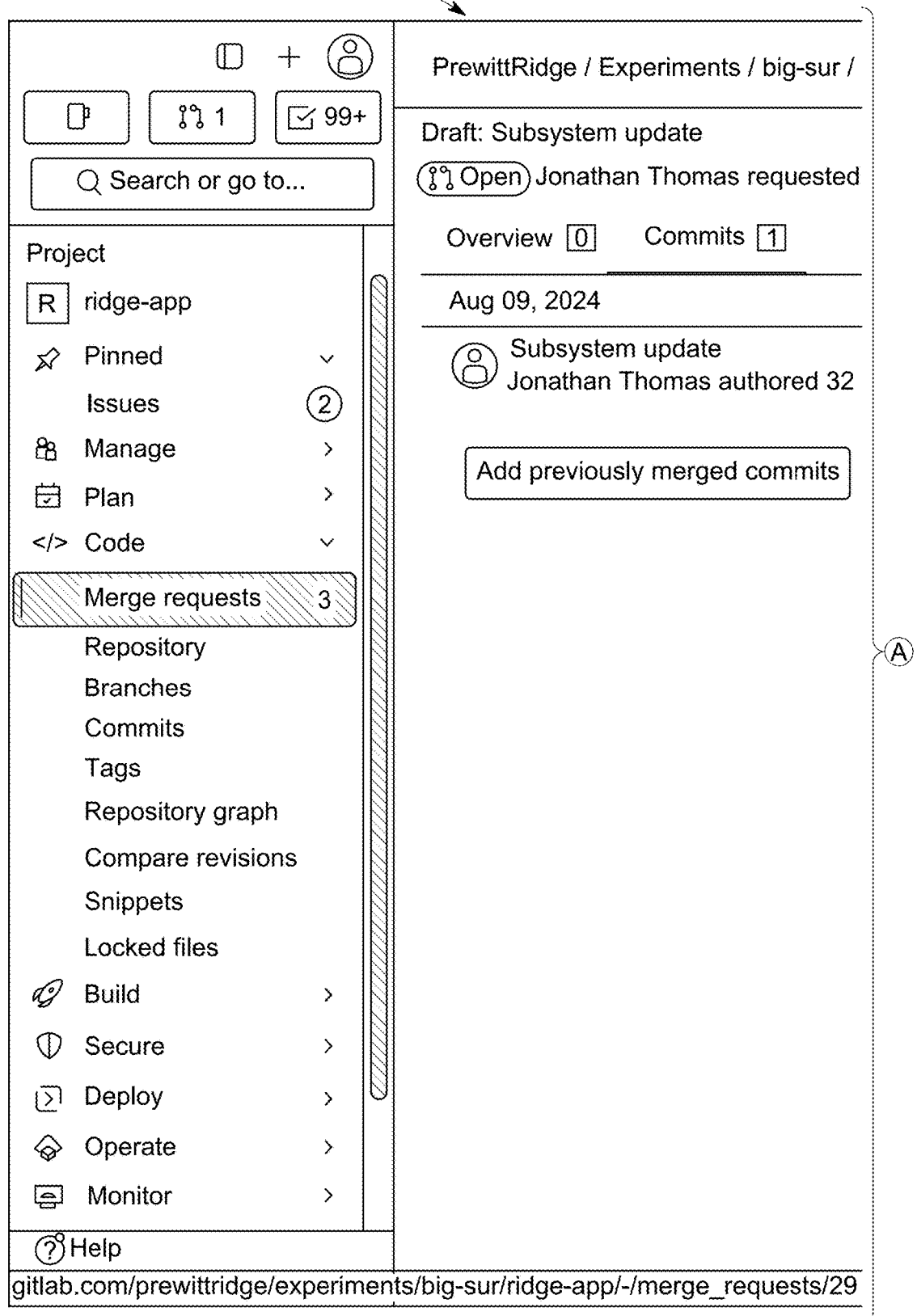
FIG. 32B illustrates a second review and merge interface displaying a commit history tab, according to an embodiment.
Figure 32B:
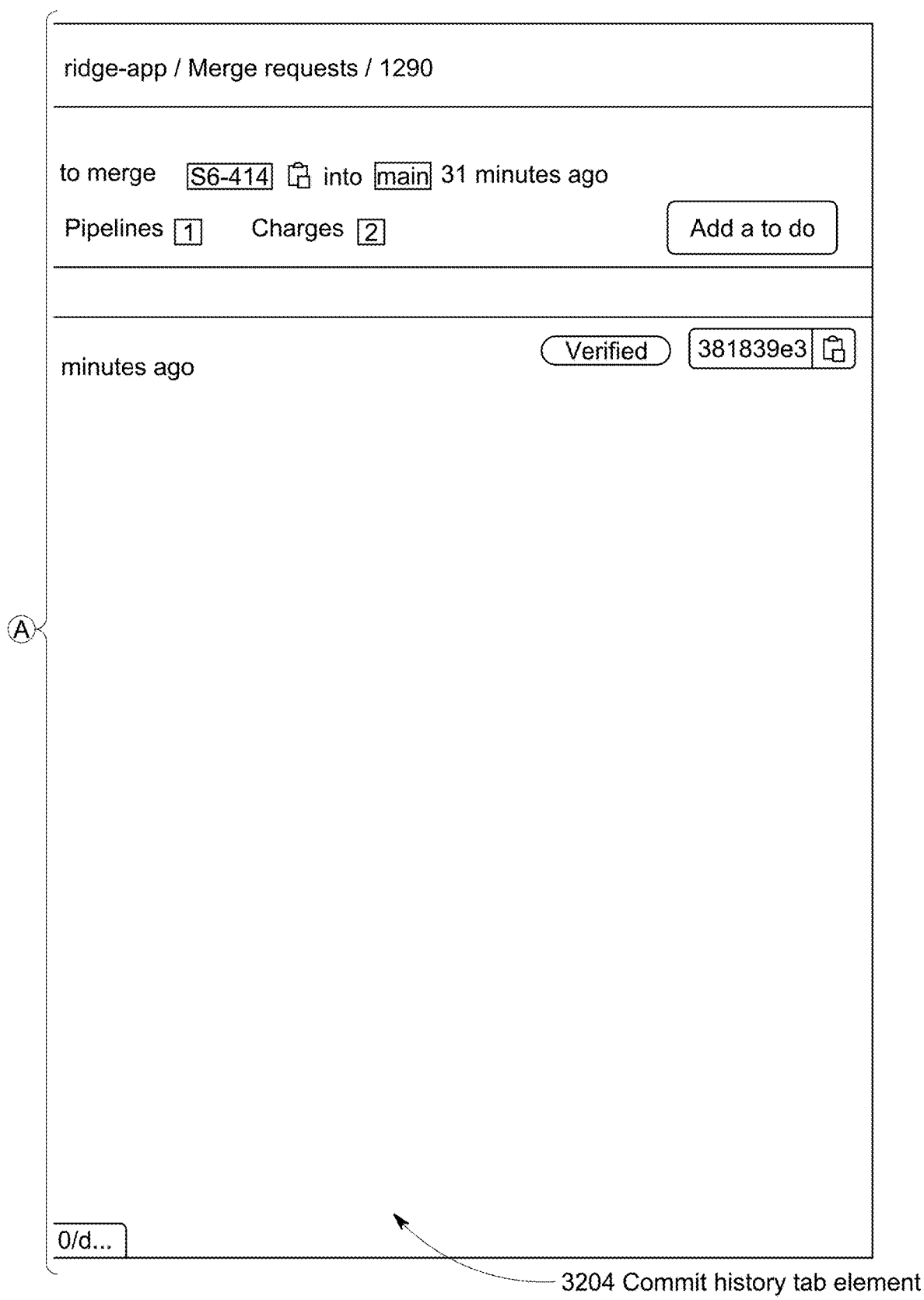

FIG. 32B depicts a second review and merge interface 3200B for a system used in reviewing and merging changes to a complex hardware system model. The interface 3200B displays information related to a draft subsystem update. The interface 3200B includes a commit history tab 3204, which provides a chronological view of commits made to the system.

The commit history tab 3204 allows users to view and track changes made to the system over time. It displays information such as the commit title, author, and timestamp for each commit. This feature enables users to understand the evolution of the system model and review specific changes made at different points in time.

The second review and merge interface 3200B also includes other elements such as navigation options on the left side and additional tabs at the top, including "Overview," "Commits," "Pipelines," and "Changes." These elements provide users with various ways to interact with and analyze the system model and its changes.

In some aspects, the commit history tab 3204 may be used to create an audit trail of all analyses performed, including timestamps and user information. This audit trail can provide a comprehensive record of the review and merge process, facilitating accountability and traceability. It can also aid in identifying patterns or trends in the changes made to the system model, which can inform future modifications and improvements.

In some cases, the system may also calculate metrics for each version of the systems modeling information. These metrics may be displayed in the commit history tab 3204 or in a separate metrics tab. The metrics may include measures of the number of changes, the complexity of changes, and the adherence of each version to predefined modeling standards or best practices. These metrics can provide valuable insights into the development and evolution of the system model, aiding in the review and merge process.

Figure 32C:
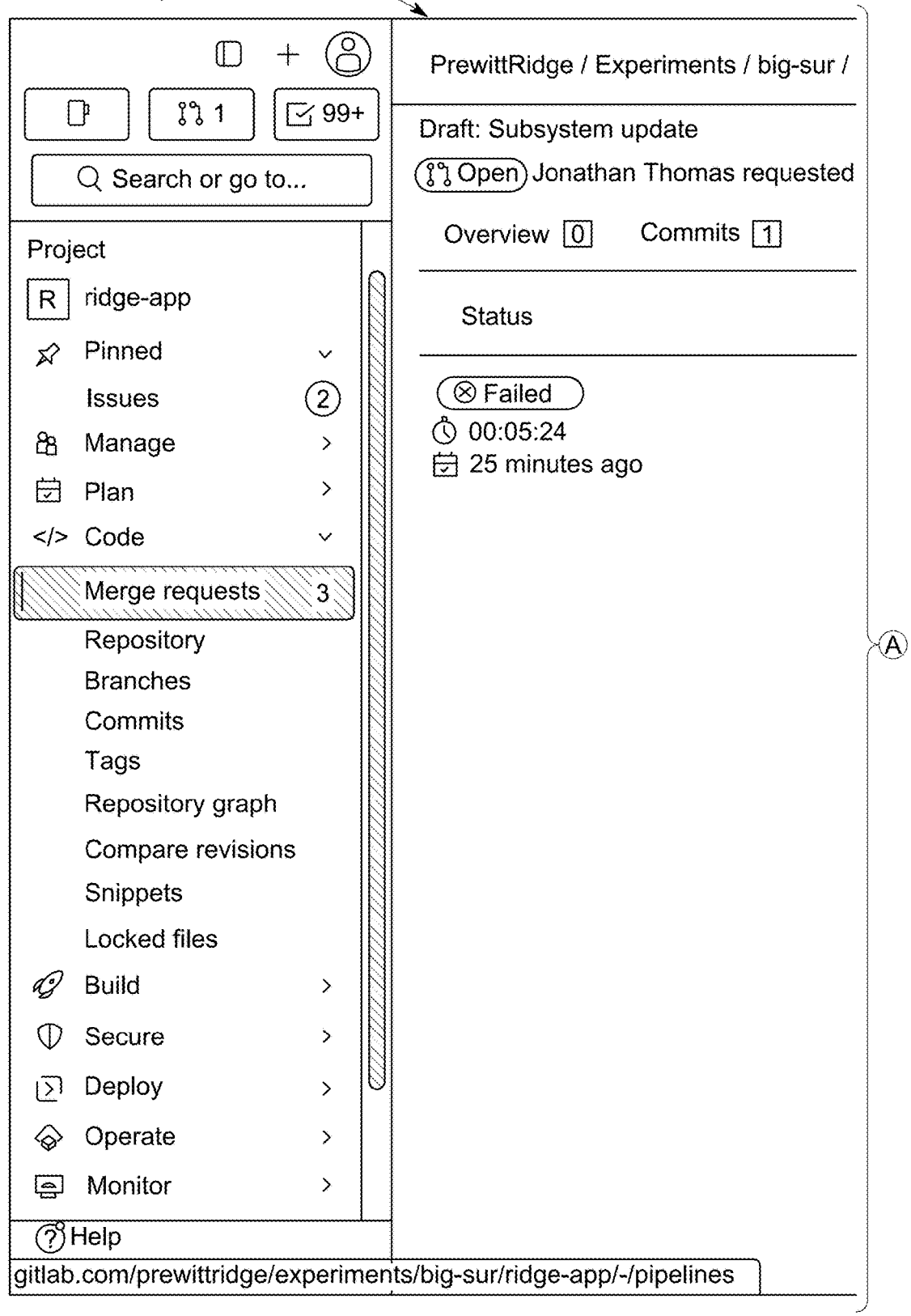
FIG. 32C illustrates a third review and merge interface displaying a pipeline tab, according to aspects of the present disclosure.
Figure 32C:
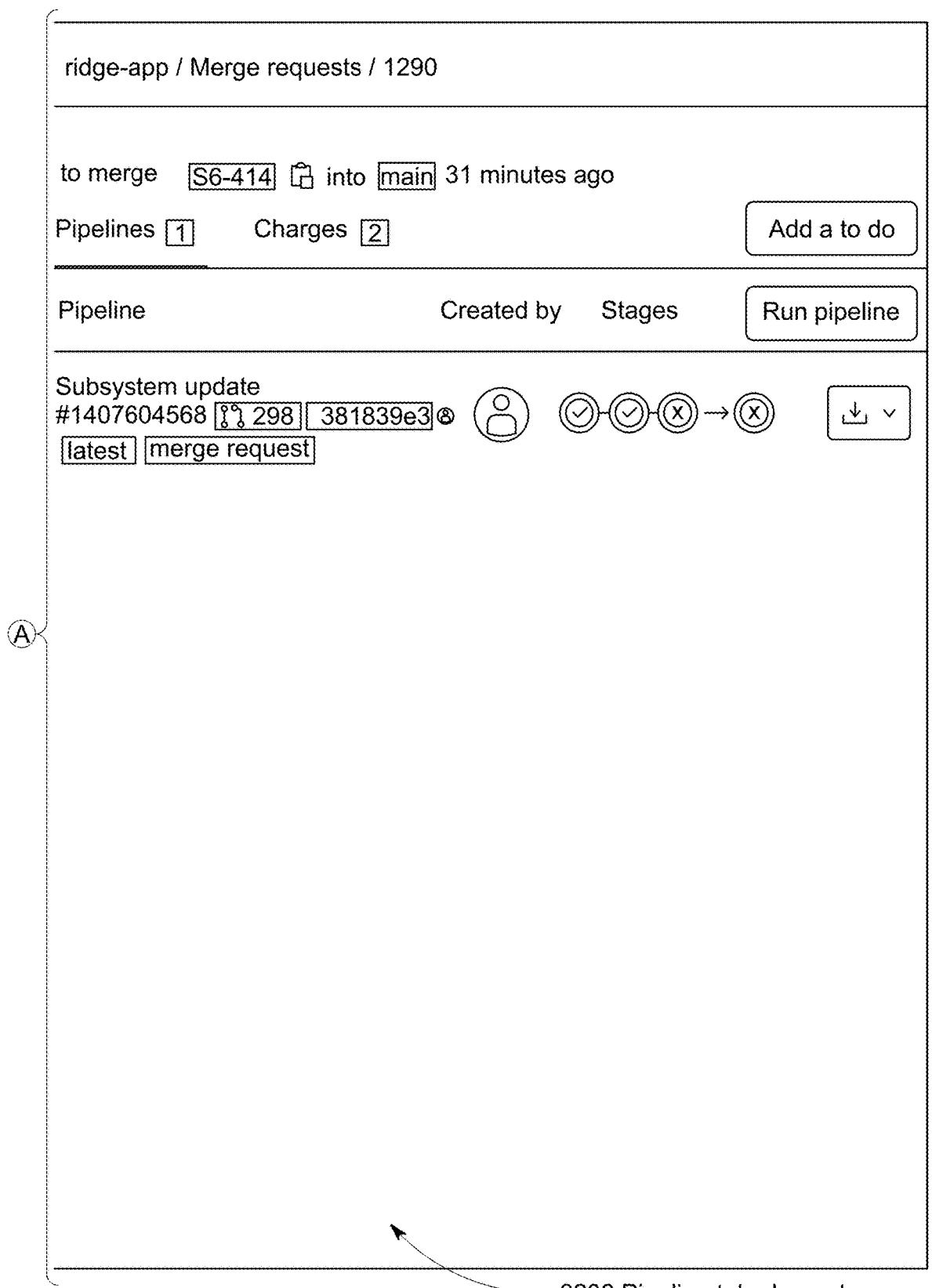

FIG. 32C depicts a third review and merge interface 3200C for a system used in reviewing and merging changes to a complex hardware system model. The interface 3200C displays a pipeline tab 3206, which provides information about the status and progress of a subsystem update.

The pipeline tab 3206 shows details of a merge request. The tab includes sections for status, pipeline, created by, and stages of the update process.

The pipeline tab 3206 also displays a timeline of the update stages, represented by circular icons in different colors, indicating the progress and status of each stage. A "Run pipeline" button is provided, allowing users to initiate or re-run the pipeline process.

The third review and merge interface 3200C includes a navigation panel on the left side, providing access to various project management features such as issues, code, merge requests, and repository information. This layout allows users to efficiently navigate between different aspects of the project while reviewing and merging changes to the complex hardware system model.

In some aspects, the pipeline tab 3206 may provide a visual representation of the progress of the subsystem update, allowing users to easily track the status of the update process. This can be particularly useful in complex hardware system models where multiple updates may be occurring simultaneously or in a specific sequence.

In some cases, the pipeline tab 3206 may also include additional features or functionalities to further enhance the review and merge process. For example, it may provide tools for comparing different versions of the system model, analyzing the impact of proposed changes, or generating reports on the progress of the merge request. These additional features may be integrated into the pipeline tab 3206 or provided as separate modules or plugins that can be added to the interface as needed.

Figure 32D:
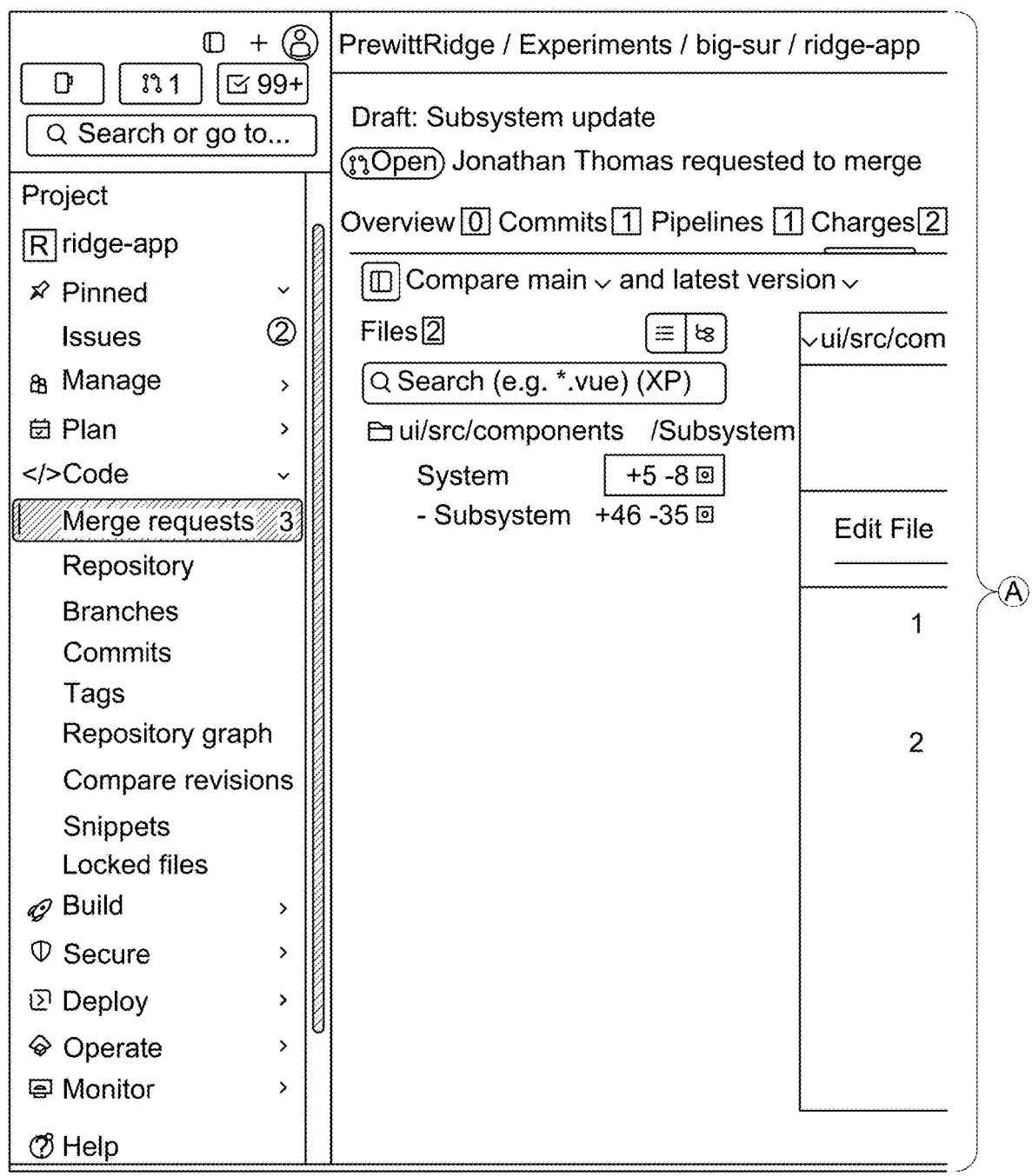
FIG. 32D illustrates a fourth review and merge interface displaying a review tab with textual notation, according to an embodiment.
Figure 32D:
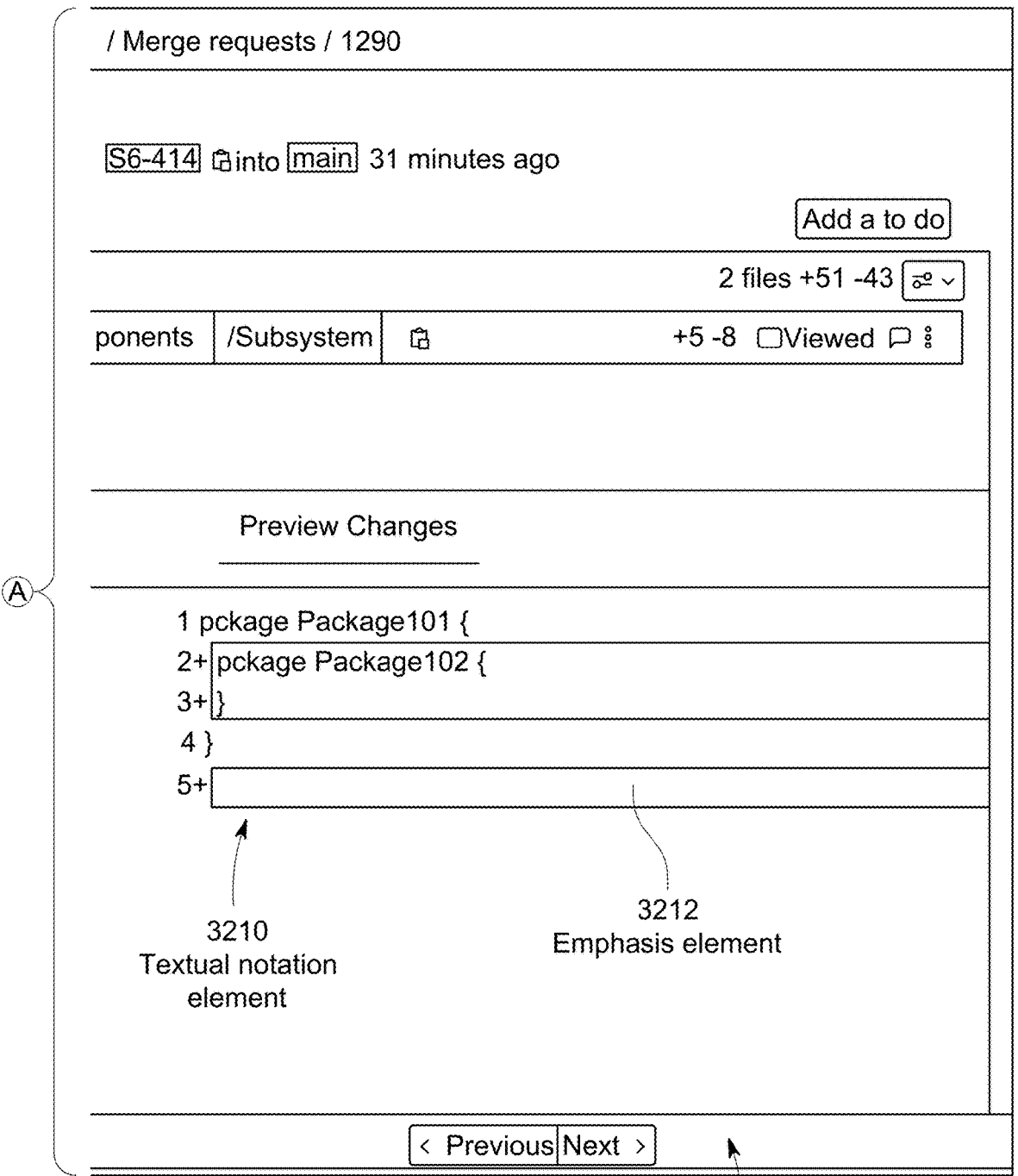

FIG. 32D depicts a fourth review and merge interface 3200D for a system that manages and displays changes in complex hardware system models. The interface 3200D includes a review tab 3208, which provides a detailed view of modifications made to the system model.

The interface 3200D displays textual notation 3210, which represents a text-based description of the system model. In this example, the textual notation 3210 shows package definitions, specifically Package 101 and Package 102.

An emphasis element 3212 is applied to certain lines within the textual notation 3210. This emphasis element 3212 highlights specific changes or additions to the model, making it easier for users to identify modifications. In this case, the emphasis element 3212 is applied to the newly added Package 102 definition.

The review tab 3208 provides context for the changes being reviewed, allowing users to navigate through different aspects of the model modifications. This tab-based interface enables efficient review and management of complex system model changes.

In some aspects, the fourth review and merge interface 3200D combines these elements to provide a comprehensive view of system model changes, facilitating collaborative review and modification processes for complex hardware system models. The system may apply syntax highlighting and formatting to the modified version of the first snapshot to enhance readability. This can help users to quickly identify and understand the modifications made to the model.

In some cases, the system may also obtain comments within the modified version of the first snapshot of the model of the complex hardware system to explain complex changes or provide context for the modifications. These comments can be displayed in the review tab 3208, providing additional information and insights to the users.

In some embodiments, the system may perform a semantic analysis to determine the significance of changes in the context of the overall system model. This analysis can be performed by the review and merge engine 3004, which analyzes the semantic differences in the model versions and provides insights into the impact of the changes on the overall system functionality and performance.

In some cases, the system may also calculate metrics for each version of the systems modeling information. These metrics may include measures of the number of changes, the complexity of changes, and the adherence of each version to predefined modeling standards or best practices. These metrics can provide valuable insights into the development and evolution of the system model, aiding in the review and merge process.

Figure 32E:
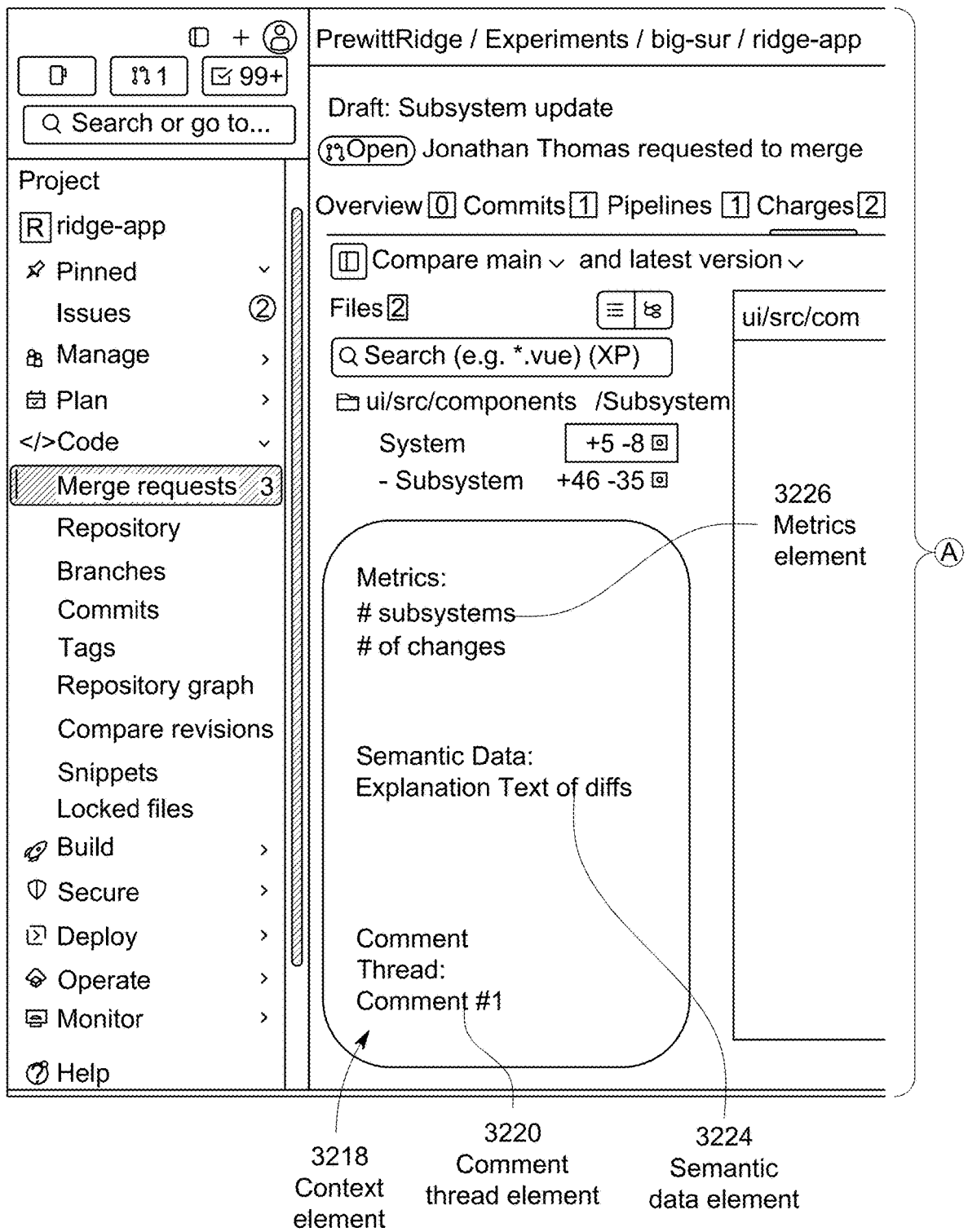
FIG. 32E illustrates a fifth review and merge interface displaying a review tab with a first graphical notation, according to aspects of the present disclosure.
Figure 32E:
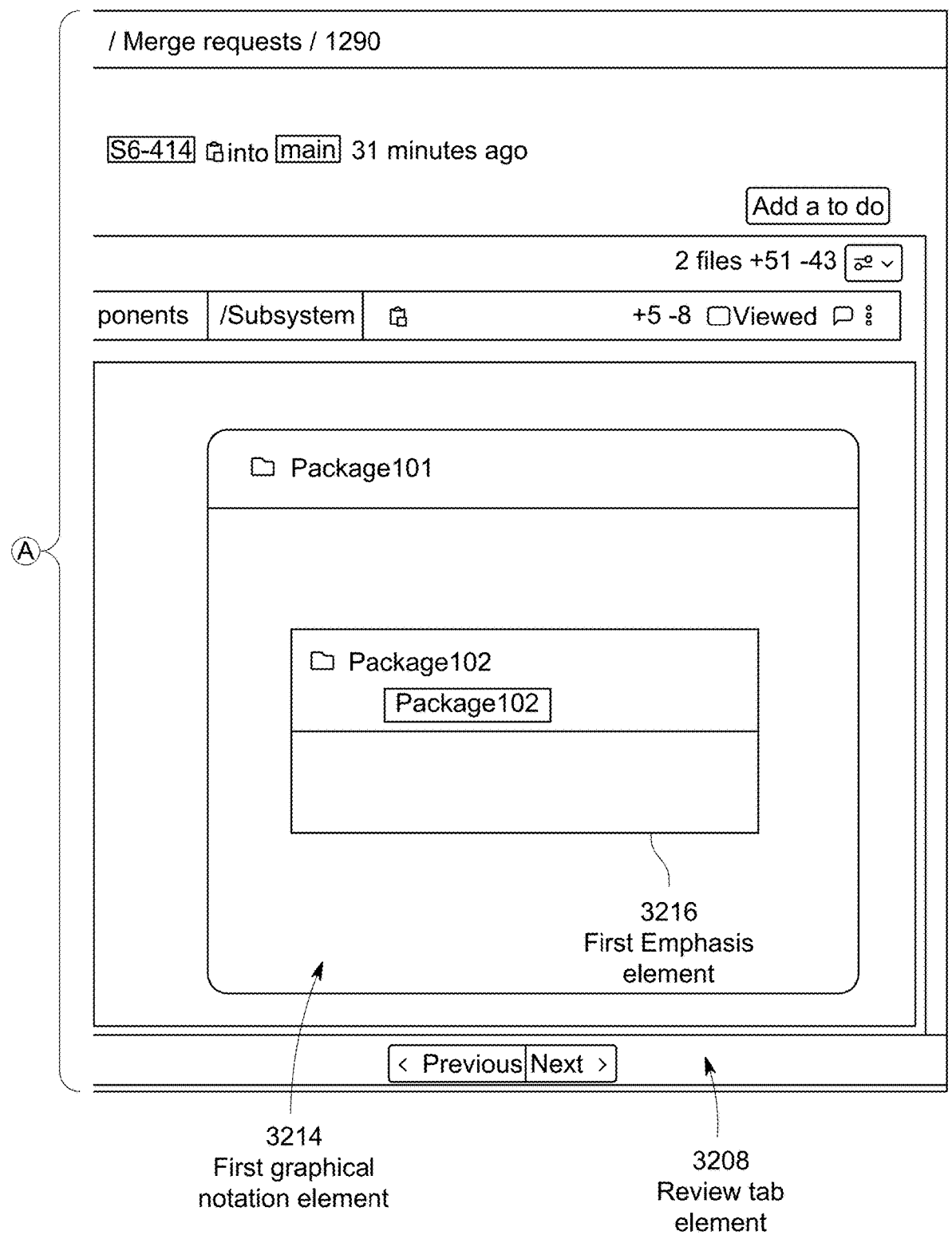

FIG. 32E depicts a fifth review and merge interface 3200E for a system that manages and displays changes in complex hardware system models. The interface 3200E includes a review tab 3208, which provides a detailed view of modifications made to the system model.

The interface 3200E features a first graphical notation 3214, which provides a visual representation of the system model. Within the first graphical notation 3214 (e.g., system model in graph representation), a first emphasis element 3216 is shown, highlighting a specific component or change in the model. This first emphasis element 3216 may be applied to certain parts of the first graphical notation 3214 to highlight specific changes or additions to the model, making it easier for users to identify modifications. In some cases, the system may apply syntax highlighting and formatting to the modified version of the first snapshot to enhance readability. This can help users to quickly identify and understand the modifications made to the model.

A context element 3218 is displayed on the left side of the interface, providing additional information and options related to the review process. This element includes metrics, semantic data, and a comment thread. The metrics element 3226 presents quantitative data about the changes, such as the number of subsystems and the number of changes made. This information helps reviewers quickly assess the scope of modifications. In some aspects, the system may calculate metrics for each version of the systems modeling information. These metrics can provide valuable insights into the development and evolution of the system model, aiding in the review and merge process.

The semantic data element 3224 offers explanatory text about the differences between versions, providing context and clarification for the changes made to the model. In some cases, the system may obtain comments within the modified version of the first snapshot of the model of the complex hardware system to explain complex changes or provide context for the modifications. These comments can be displayed in the review tab 3208, providing additional information and insights to the users.

A comment thread element 3220 is included, allowing reviewers to discuss specific aspects of the changes or provide feedback. This element facilitates collaboration and communication during the review process. In some aspects, the system may notify relevant stakeholders about updates made to the modified version of the first snapshot of the model of the complex hardware system. This ensures that all relevant parties are kept informed about the progress of the review and merge process, facilitating effective collaboration and decision-making.

In some cases, the system may also perform a semantic analysis to determine the significance of changes in the context of the overall system model. This analysis can be performed by the review and merge engine 3004, which analyzes the semantic differences in the model versions and provides insights into the impact of the changes on the overall system functionality and performance.

In summary, the fifth review and merge interface 3200E combines these elements to provide a comprehensive view of system model changes, facilitating collaborative review and modification processes for complex hardware system models.

Figure 32F:
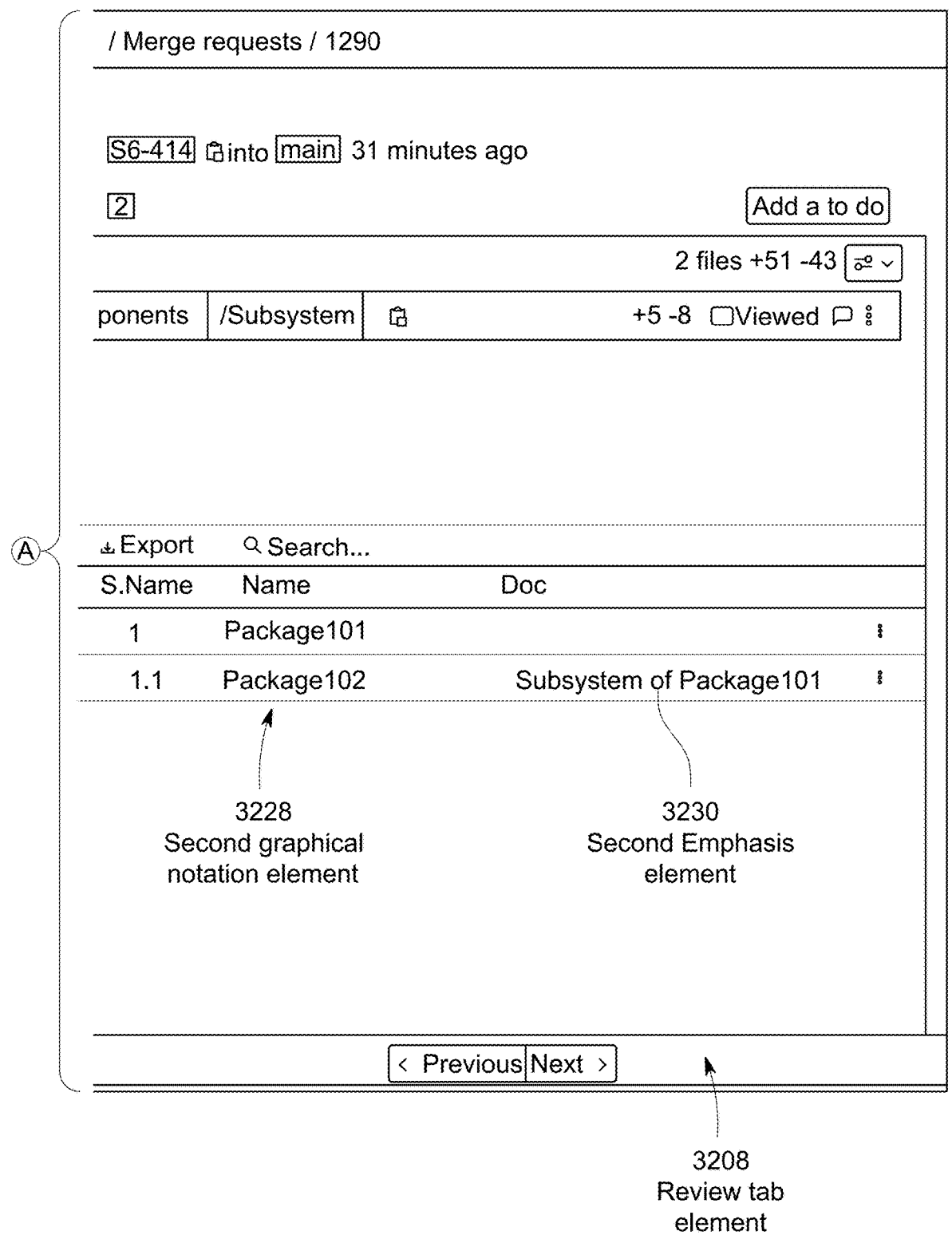
FIG. 32F illustrates a sixth review and merge interface displaying a review tab with a second graphical notation, according to aspects of the present disclosure.

FIG. 32F depicts a sixth review and merge interface 3200F for a system that manages and displays changes in complex hardware system models. The interface 3200F includes a review tab 3208, which provides a detailed view of modifications made to the system model.

The interface 3200F features a second graphical notation 3228, which provides a visual representation of the system model. Within the second graphical notation 3228 (e.g., system model in tabular representation), a second emphasis element 3230 is shown, highlighting a specific component or change in the model. This second emphasis element 3230 may be applied to certain parts of the second graphical notation 3228 to highlight specific changes or additions to the model, making it easier for users to identify modifications. In some cases, the system may apply syntax highlighting and formatting to the modified version of the first snapshot to enhance readability. This can help users to quickly identify and understand the modifications made to the model.

A context element 3218 may displayed on the left side of the interface, providing additional information and options related to the review process. This element includes metrics, semantic data, and a comment thread.

In summary, the sixth review and merge interface 3200F combines these elements to provide a comprehensive view of system model changes, facilitating collaborative review and modification processes for complex hardware system models.

In some cases, the system may perform a semantic analysis of the significance of changes made to the model. This analysis may involve examining the nature and impact of the changes, such as the addition or removal of components, alterations in system relationships, or modifications to system parameters. The results of this semantic analysis may provide valuable insights into the implications of the changes, aiding users in assessing the potential effects on the overall system performance and functionality.

In some aspects, the system may calculate metrics of the changes made to the model. These metrics may include quantitative measures such as the number of lines added or removed in the text notation, the number of components added or deleted in the graphical representation, or the degree of alteration in system parameters. These metrics can provide a quantitative assessment of the extent and magnitude of the changes, offering a clear and objective measure of the modifications made to the model.

In some cases, the system may analyze the adherence of each version of the model to predefined modeling standards or best practices. This analysis may involve checking the syntax and structure of the model against established guidelines, verifying the consistency and coherence of the model elements, or assessing the completeness and comprehensiveness of the model coverage. By ensuring compliance with modeling standards, the system can enhance the quality and reliability of the model, reducing the risk of errors or inconsistencies.

In some aspects, the system may create an audit trail of the analysis and changes made to the model. This audit trail may include a record of all modifications made to the model, the results of the semantic analysis and metrics calculation, and the outcomes of the standards adherence analysis. The audit trail can provide a comprehensive history of the model evolution, facilitating traceability and accountability in the model development process. This can be particularly beneficial in collaborative environments, where multiple users may be involved in modifying the model, or in regulated industries, where documentation of the model development process may be required for compliance purposes.

The present disclosure relates to systems and methods for managing and modifying models of complex hardware systems using distributed version control. The disclosure provides a robust and flexible platform for capturing, storing, and managing engineering data, with a focus on enhancing collaboration, efficiency, and data integrity in the engineering data management process.

A key feature of the system is its use of a text-first paradigm, which offers significant advantages in terms of data portability and cybersecurity. By prioritizing text-based representations of system models, the disclosure facilitates easier data transfer between different tools and platforms, while also reducing potential security vulnerabilities associated with proprietary or binary data formats.

In contrast to traditional approaches that rely on intermediate databases for comparison and manipulation of system models, the present disclosure performs diffs directly on text files. This approach streamlines the process of tracking and managing changes to complex hardware system models, eliminating the need for additional database infrastructure and improving performance.

One of the challenges in managing complex hardware systems is presenting technical information in a user-friendly manner, particularly for users who may not have a software development background. The disclosure addresses this challenge by providing intuitive interfaces for visualizing and interacting with complex diffs. These interfaces are designed to be accessible to mechanical and aerospace engineers, allowing them to effectively review and manage changes to system models without requiring extensive software development expertise.

By combining these features, the disclosure offers a comprehensive solution for managing and modifying models of complex hardware systems, supporting collaborative workflows and enhancing the overall efficiency of the engineering process.

Figure 33A:
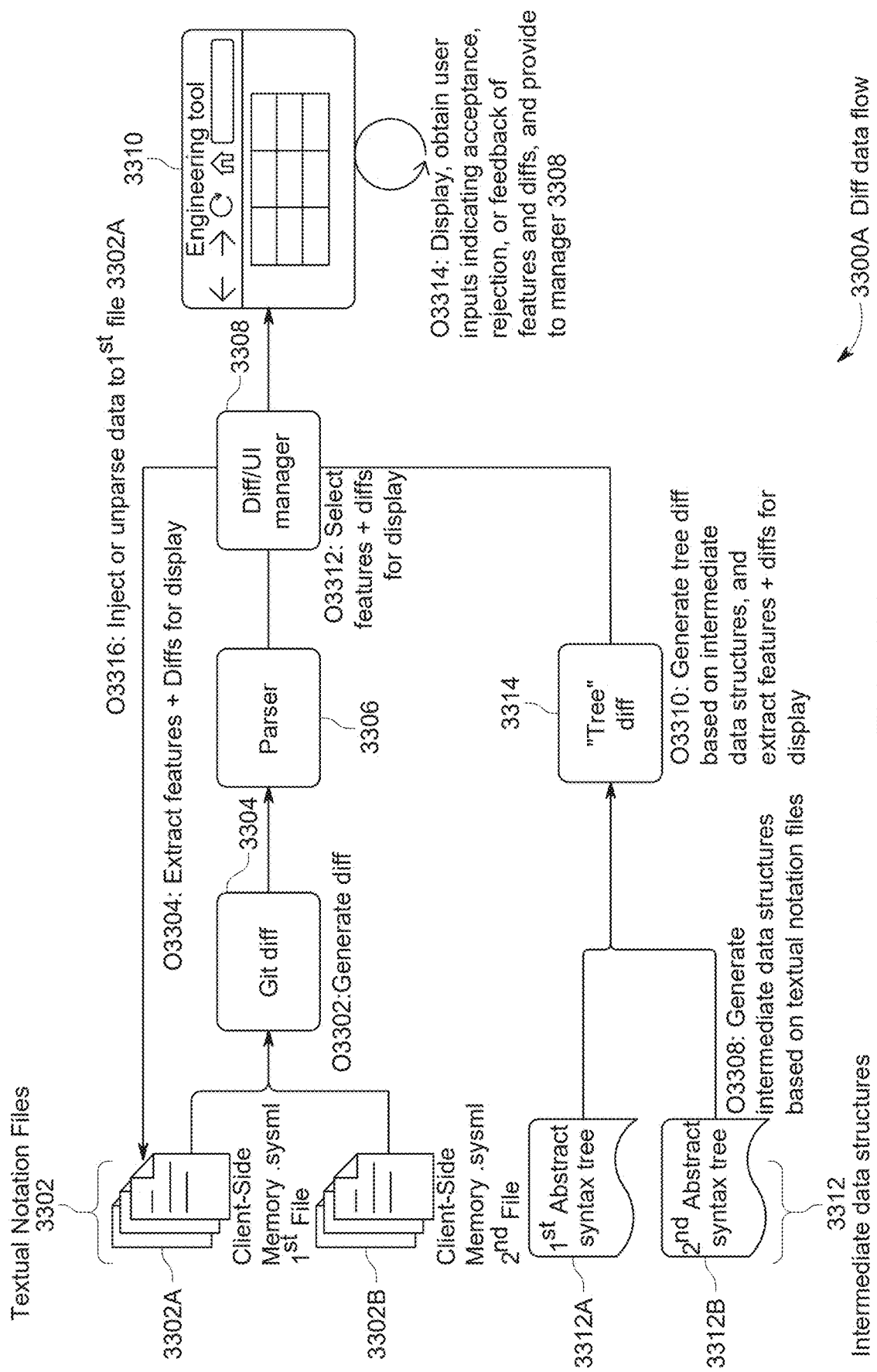
FIG. 33A illustrates a block diagram of a diff data flow system for processing textual notation files, according to aspects of the present disclosure.

The present disclosure relates to a diff data flow system 3300A for processing and comparing textual notation files. FIG. 33A illustrates a block diagram of the diff data flow system 3300A, which comprises several interconnected components that work together to generate, extract, and manage diffs between files.

The diff data flow system 3300A includes textual notation files 3302, which comprise a first file 3302A and a second file 3302B. These files may contain representations of complex hardware system models in a text-based systems modeling language. In some cases, the first file 3302A may represent a first snapshot of the model, while the second file 3302B may represent a modified version of the snapshot.

A git diff module 3304 may be used to generate a diff between the first file 3302A and the second file 3302B. The git diff module 3304 may compare the contents of the two files and identify the differences between them.

The output from the git diff module 3304 may be passed to a parser 3306. The parser 3306 may extract features and diffs for display from the git diff output. In some cases, the parser 3306 may analyze the diff output and organize the information in a format that is more suitable for further processing and visualization.

A diff manager 3308 may receive the parsed information from the parser 3306. The diff manager 3308 may select features and diffs for display based on various criteria or user preferences. In some cases, the diff manager 3308 may use both abstract syntax tree (AST) based diffs and traditional text-based diffs to achieve the desired functionality.

The diff data flow system 3300A may also include intermediate data structures 3312, consisting of a first abstract syntax tree 3312A and a second abstract syntax tree 3312B. These abstract syntax trees may be generated based on the textual notation files 3302. In some cases, the system may generate an intermediate data structure based on the first snapshot, which can be loaded and manipulated by an engineering application.

A tree diff 3314 may be generated using the first abstract syntax tree 3312A and the second abstract syntax tree 3312B. The tree diff 3314 may provide a more detailed and structured representation of the differences between the two files.

An engineering tool interface 3310 may be connected to the diff manager 3308. The engineering tool interface 3310 may display the selected features and diffs, obtain user inputs indicating acceptance, rejection, or feedback of features and diffs, and provide this information back to the diff manager 3308.

The diff data flow system 3300A may perform several operations to process and compare the textual notation files. These operations may include generating a diff between the first file 3302A and second file 3302B, extracting features and diffs for display from the git diff output, generating intermediate data structures based on the textual notation files, generating a tree diff based on the intermediate data structures, selecting features and diffs for display, and displaying and obtaining user inputs through the engineering tool interface 3310.

In some cases, the system may obtain a first snapshot of the model of the complex hardware system from a distributed version control system, where the snapshot may be in a text-based systems modeling language. The system may then perform a comparison between the first snapshot and a modified version, generating a diff that highlights the changes made to the model.

By utilizing both AST-based diffs and traditional text-based diffs, the diff data flow system 3300A may provide a comprehensive and flexible approach to comparing and managing changes in complex hardware system models. This approach may allow for efficient identification and visualization of modifications, facilitating collaborative development and review processes.

Figure 33B:
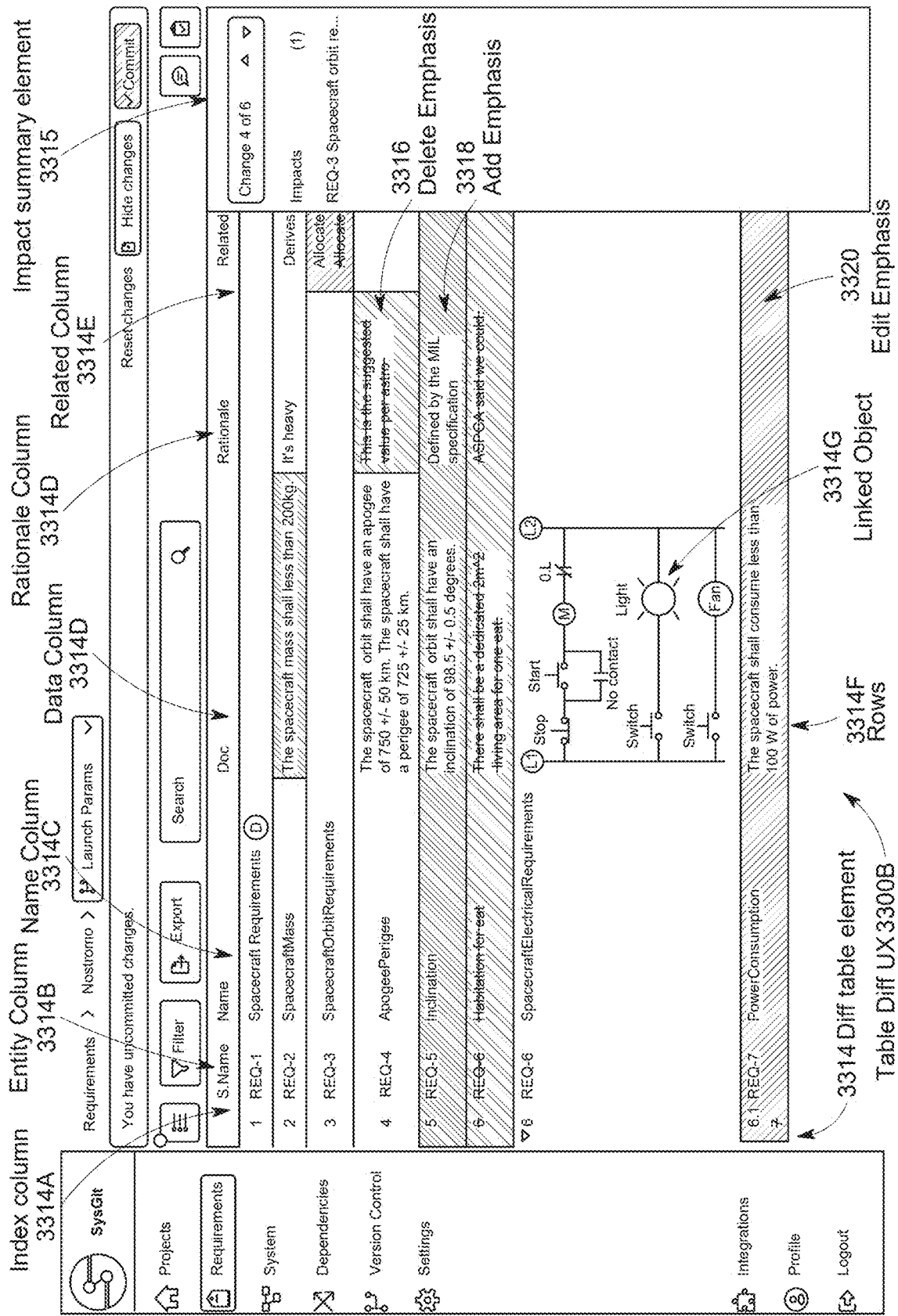
FIG. 33B depicts a table diff interface for comparing models of complex hardware systems, in accordance with example embodiments.

FIG. 33B illustrates a table diff interface 3300B of a system for modifying and comparing models of complex hardware systems. The table diff interface 3300B may comprise a diff table element 3314 that displays changes between different versions of a system model.

The diff table element 3314 may include several columns: an index column 3314A, an entity column 3314B, a name column 3314C, a data column 3314D, and a related column 3314E. These columns may organize and present information about various components and parameters of the system model.

The diff table element 3314 may contain multiple rows 3314F, each representing a different aspect or requirement of the system being modeled. In some cases, some rows may include a linked object 3314G, which may be a circuit diagram in this instance.

The table diff interface 3300B may employ visual cues to highlight different types of changes. A delete emphasis 3316 may be indicated by red highlighting. An add emphasis 3318 may be shown with green highlighting. An edit emphasis 3320 may be represented by yellow highlighting. These visual cues may allow users to quickly identify modifications made to the system model.

An impact summary element 3315 may be displayed on the right side of the table diff interface 3300B, providing an overview of the changes and their potential effects on the system, such as for a selected field in the diff table element 3314.

In some cases, the system may apply syntax highlighting and formatting to the modified version of the first file 3302A to enhance readability. The system may convert the highlighting and formatting to an intermediary representation for display on the diff table element 3314 of the table diff interface 3300B.

The table diff interface 3300B may display changes between the first file 3302A and the second file 3302B based on the tree diff 3314 generated by the diff manager 3308. The diff manager 3308 may select features and diffs for display in the diff table element 3314.

In some cases, the engineering tool interface 3310 may display the diff table element 3314 and obtain user inputs indicating acceptance, rejection, or feedback of features and diffs. The engineering tool interface 3310 may provide this information back to the diff manager 3308.

The table diff interface 3300B may facilitate the comparison and management of different versions of complex system models, allowing users to efficiently review and understand changes made to the model over time.

Figure 33C:
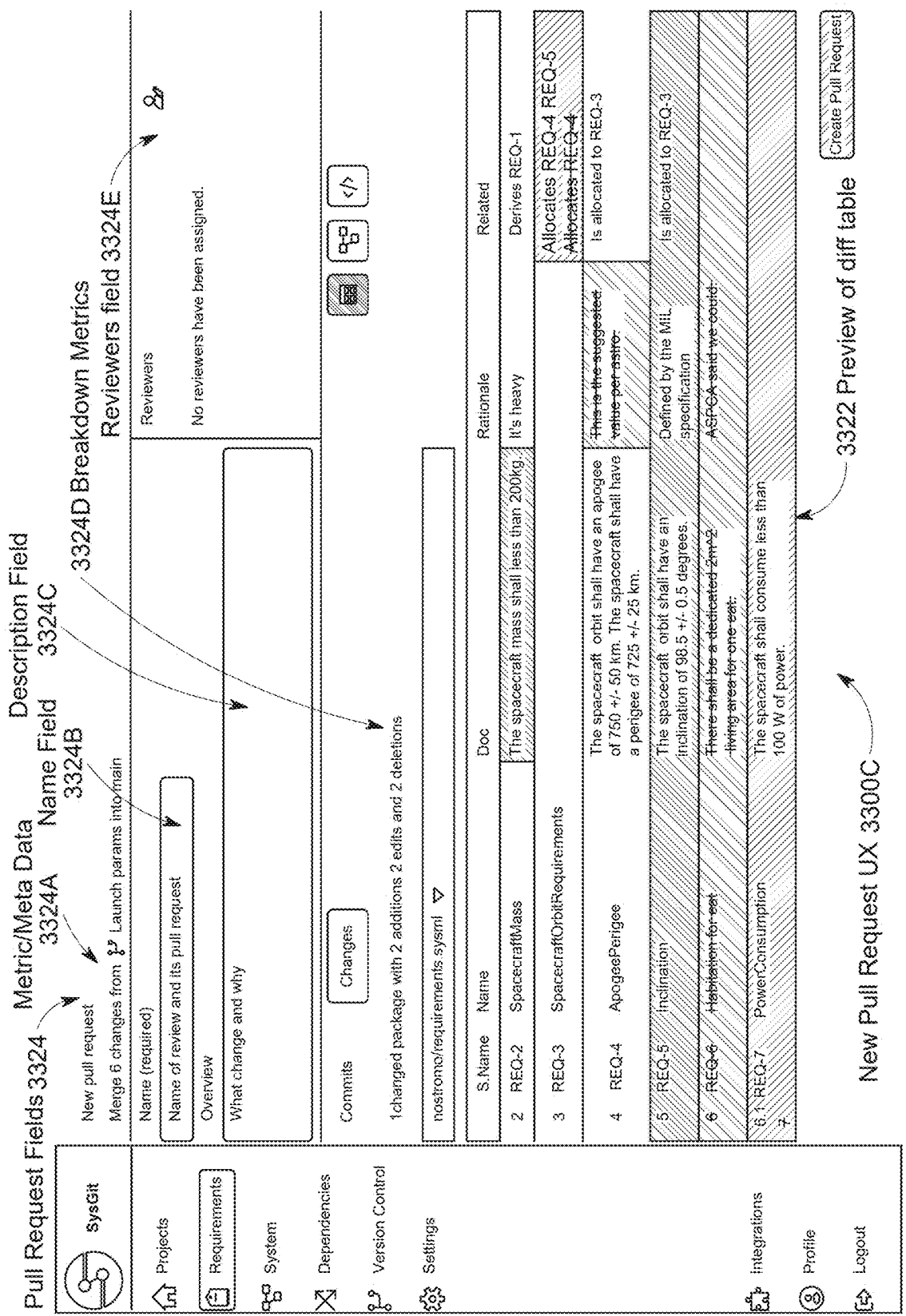
FIG. 33C illustrates a new pull request interface for a system modeling application, according to an embodiment.

FIG. 33C illustrates a new pull request interface 3300C for a system modeling application. The new pull request interface 3300C may comprise several components that facilitate the creation and review of pull requests for system model changes.

A diff table preview 3322 may be displayed at the bottom of the new pull request interface 3300C. The diff table preview 3322 may show a detailed view of the changes made to the system model, including information such as requirement IDs, names, descriptions, rationales, and related items. In some cases, the diff table preview 3322 may use color-coding to highlight additions, modifications, and deletions in the model, similar to the delete emphasis 3316, add emphasis 3318, and edit emphasis 3320 used in the table diff interface 3300B.

The new pull request interface 3300C may include pull request fields 3324, which contain various input areas for the user to provide information about the pull request. At the top of the pull request fields 3324 may be a metric data field 3324A, displaying information about the number of changes being merged. This metric data may be generated based on the comparison between the first file 3302A and the second file 3302B performed by the diff manager 3308.

Below the metric data field 3324A may be a name field 3324B where the user can input a name for the pull request. Adjacent to the name field 3324B may be a description field 3324C, allowing the user to provide a detailed explanation of the changes and their purpose. In some cases, the system may obtain comments concerning the modified version of the first file 3302A to explain changes or provide context for the modifications. These comments may be entered in the description field 3324C.

The new pull request interface 3300C may also include a breakdown metrics section 3324D, which provides a summary of the changes made, such as the number of additions, edits, and deletions in the affected files. This information may be derived from the tree diff 3314 generated by comparing the first abstract syntax tree 3312A and the second abstract syntax tree 3312B.

On the right side of the new pull request interface 3300C may be a reviewers field 3324E, where users can assign reviewers to the pull request. The assigned reviewers may be responsible for reviewing and approving the changes before they are merged into the main branch of the system model.

In some cases, the system may access a modified version of the intermediate data structures 3312, which may be modified by the engineering tool interface 3310 based on user inputs received via the new pull request interface 3300C. The system may store the intermediate data structures 3312 in one or more memories.

Based on the modified version of the intermediate data structures 3312, the system may generate a modified version of the first file 3302A. This modified version may be in the text-based systems modeling language used for the textual notation files 3302. The parser 3306 may be responsible for converting the modified intermediate data structures 3312 back into the text-based systems modeling language.

The new pull request interface 3300C may be part of a larger application, with a navigation menu on the left side providing access to various sections such as Projects, Requirements, System, Dependencies, Version Control, and Settings. This interface may allow users to create, review, and manage pull requests for changes to system models, providing a comprehensive view of the proposed modifications and facilitating collaboration among team members.

Figure 33D:
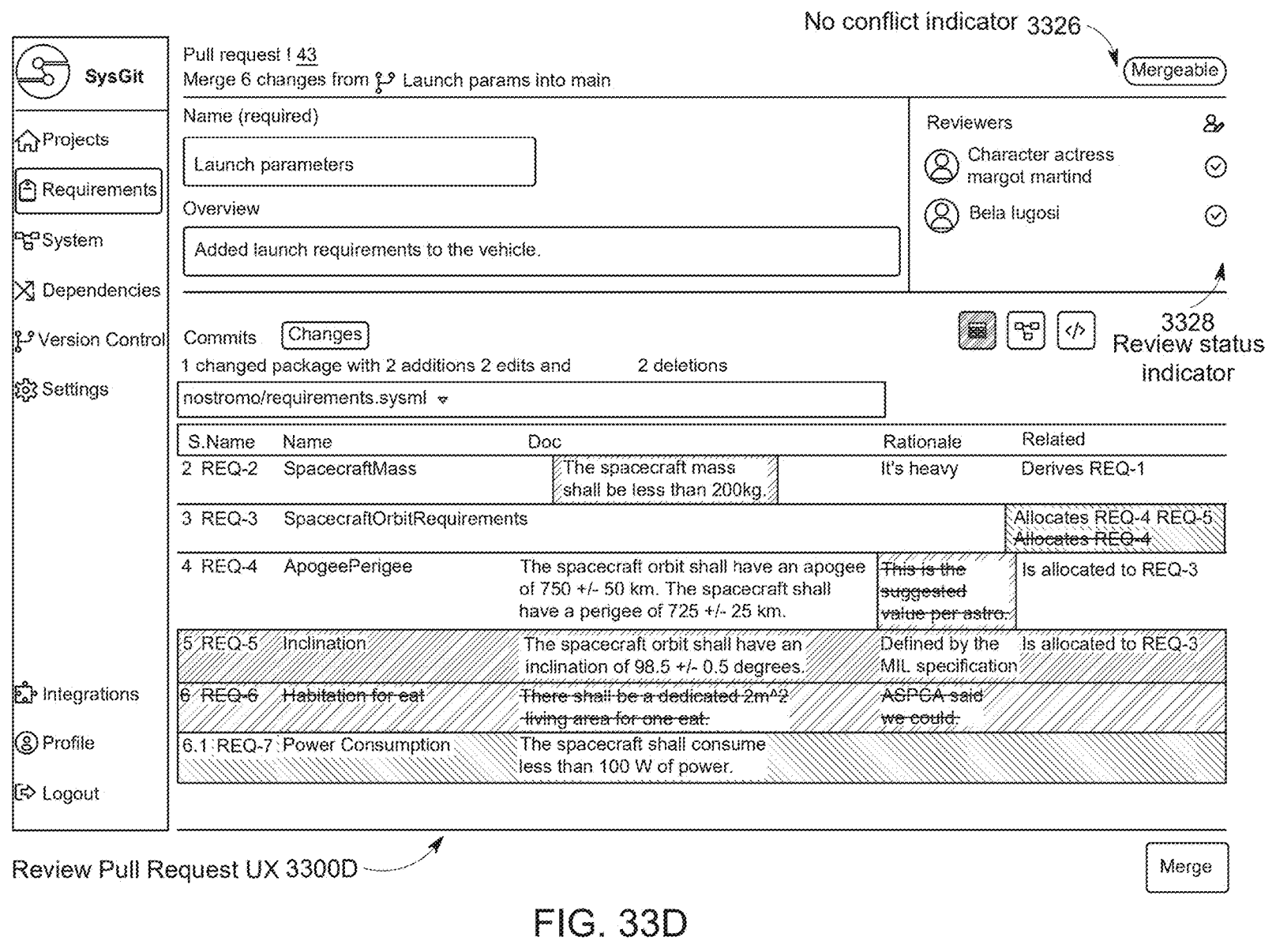

FIG. 33D depicts a review pull request interface 3200D for a system used in reviewing and merging changes to a complex hardware system model. The review pull request interface 3200D may include a review tab 3208, which provides a detailed view of modifications made to the system model.

The review pull request interface 3200D may display textual notation 3210, which represents a text-based description of the system model. In some cases, the textual notation 3210 may correspond to the textual notation files 3302, including the first file 3302A and the second file 3302B. The textual notation 3210 may show package definitions, such as Package101 and Package102.

An emphasis element 3212 may be applied to certain lines within the textual notation 3210. The emphasis element 3212 may highlight specific changes or additions to the model, making it easier for users to identify modifications. In some cases, the emphasis element 3212 may correspond to the delete emphasis 3316, add emphasis 3318, or edit emphasis 3320 used in the table diff interface 3300B.

The review pull request interface 3200D may include a merge status indicator 3326. The merge status indicator 3326 may display information about whether the proposed changes can be merged into the main branch of the system model without conflicts.

A reviewer approval status 3328 may be included in the review pull request interface 3200D. The reviewer approval status 3328 may show the current state of approval from assigned reviewers, indicating whether they have approved or rejected the proposed changes.

In some cases, the system may allow for adding comments to specific parts of the code during the review process. Users may be able to select portions of the textual notation 3210 and attach comments or feedback directly to those sections. These comments may be visible to other reviewers and may help facilitate discussion about specific aspects of the proposed changes.

The system may provide the ability to iterate through changes and accept or reject them individually. Users may be able to navigate through the modifications highlighted by the emphasis element 3212 and make decisions on each change separately. This granular approach to reviewing changes may allow for more precise control over which modifications are incorporated into the final version of the system model.

In some cases, the system may provide asynchronous design review capabilities. Reviewers may be able to access and review the proposed changes at different times, allowing for flexibility in the review process. The review pull request interface 3200D may maintain a record of all comments, approvals, and rejections, ensuring that all feedback is captured even when reviewers are not working simultaneously.

The system may notify relevant stakeholders about updates made to the modified version of the system model. When changes are made or new comments are added, the system may send notifications to assigned reviewers or other interested parties. These notifications may help keep all stakeholders informed about the progress of the review process and any important developments.

In some cases, the review pull request interface 3200D may integrate with the engineering tool interface 3310, allowing users to view and interact with the changes in a format that is compatible with their engineering tools. The diff manager 3308 may provide the necessary information to populate the review pull request interface 3200D with the relevant changes and metadata.

The parser 3306 may be used to convert the textual notation 3210 into a format that can be easily compared and analyzed. The intermediate data structures 3312, including the first abstract syntax tree 3312A and the second abstract syntax tree 3312B, may be utilized to generate the tree diff 3314, which may inform the display of changes in the review pull request interface 3200D.

By providing a comprehensive view of the proposed changes, along with tools for detailed review and collaboration, the review pull request interface 3200D may facilitate efficient and thorough review of modifications to complex hardware system models.

FIG. 33E depicts a merge conflict interface 3300E for a version control system. The merge conflict interface 3300E may display a pull request for merging changes from one branch to another within a project. At the top of the merge conflict interface 3300E, a conflict indicator 3330 may alert users that there are conflicts between the branch and main that must be resolved before merging.

The merge conflict interface 3300E may include several sections providing information about the merge request. A name field may display "Launch Parameters" as the title of the changes. An overview section may briefly describe the modifications, stating "Added launch requirements to the vehicle."

The merge conflict interface 3300E may show a list of reviewers for the pull request, including profile pictures and names of the assigned reviewers. Below this, a tabular view may present the changes made to a file named "nostromo/requirements.sysml". The tabular view may include columns for S.Name (requirement ID), Name, Doc (description), Rationale, and Related items.

In some cases, the tabular view may highlight additions, edits, and deletions using color coding. The delete emphasis 3316 may indicate deleted content, the add emphasis 3318 may show new additions, and the edit emphasis 3320 may represent modifications. Specific changes may be visible, such as modifying the spacecraft mass requirement and adding a new inclination requirement.

The merge conflict interface 3300E may perform an automated conflict detection to identify conflicts between the modified version of the first file 3302A and a second snapshot, which may be represented by the second file 3302B. The diff manager 3308 may compare the first abstract syntax tree 3312A and the second abstract syntax tree 3312B to generate the tree diff 3314, which may be used to identify potential conflicts or inconsistencies introduced by changes across different versions.

In some cases, the merge conflict interface 3300E may display a review interface highlighting the identified conflicts and providing options for resolving the conflicts. The engineering tool interface 3310 may present these options to users, allowing them to select which version of conflicting changes to keep or providing a way to manually merge the conflicting sections.

The system may receive a merge request to merge the modified version of the first file 3302A with the second file 3302B and initiate a merge process. This merge request may be initiated through the new pull request interface 3300C, which may then trigger the display of the merge conflict interface 3300E if conflicts are detected.

At the bottom of the merge conflict interface 3300E, action buttons may be provided, including a "Merge" button, allowing users to complete the merge process once conflicts are resolved. The merge conflict interface 3300E may provide a comprehensive view of the proposed changes, enabling users to review and resolve conflicts before finalizing the merge.

In some cases, the parser 3306 may be used to analyze the textual notation files 3302 and generate the intermediate data structures 3312, which may be used by the diff manager 3308 to identify and present conflicts in a format that is easily understandable to users. The engineering tool interface 3310 may then display these conflicts within the merge conflict interface 3300E, allowing users to interact with and resolve the conflicts efficiently.

Figure 33F:
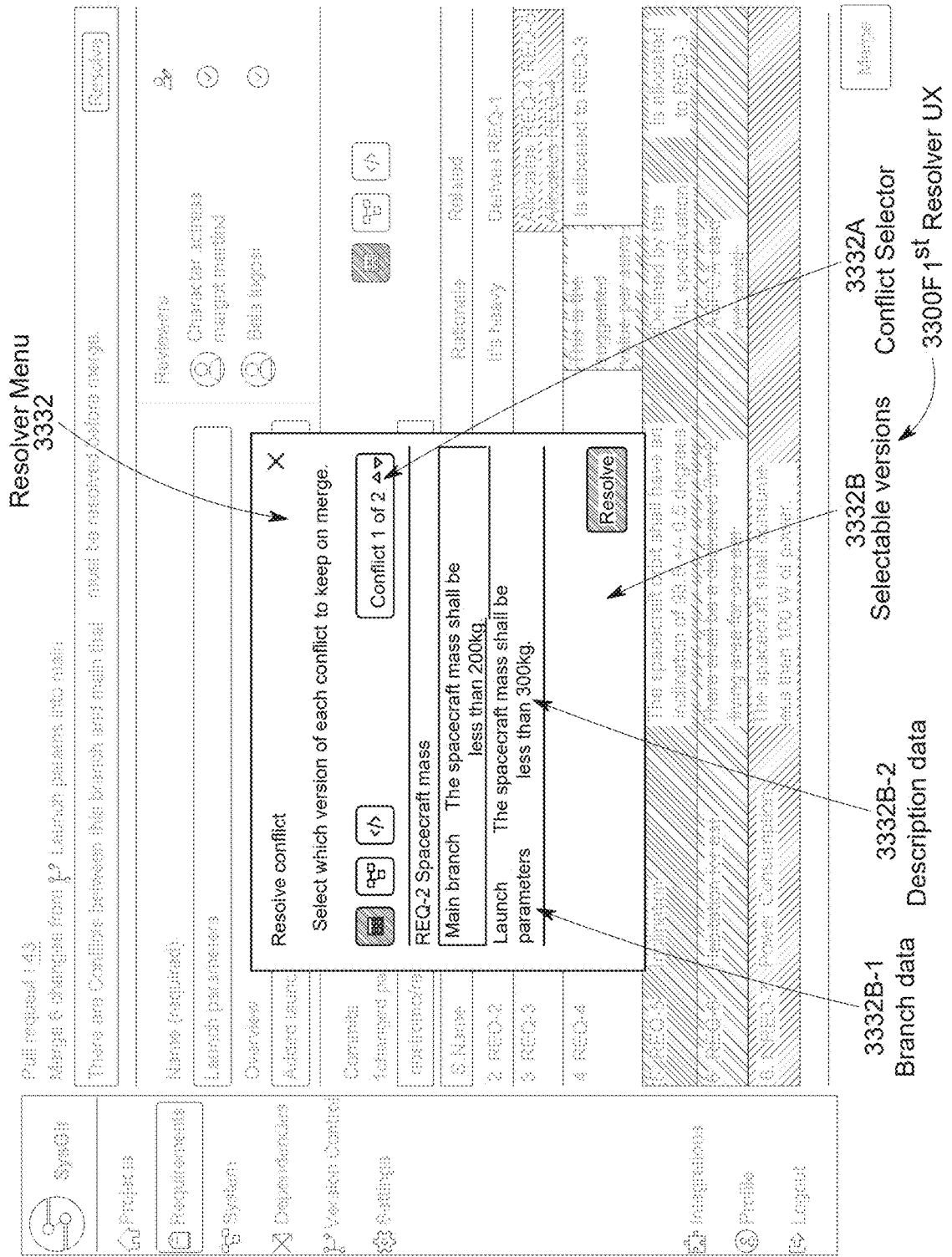
FIG. 33F depicts a resolver interface for managing conflicts in a version control system, according to an embodiment.

FIG. 33F depicts a resolver interface 3300F for a system used in managing and resolving conflicts in a version control system. The resolver interface 3300F comprises several components that facilitate the conflict resolution process.

A resolver menu 3332 may be displayed as an overlay on the main interface. The resolver menu 3332 may contain the primary tools and options for resolving conflicts between different versions of a file or project.

Within the resolver menu 3332, a conflict selector 3332A may be included, which may allow users to navigate between different conflicts that need resolution. In some cases, the conflict selector 3332A may show "Conflict 1 of 2." indicating multiple conflicts exist.

The resolver interface 3300F may display branch data 3332B-1, which may show information about the branches being compared. In some cases, the branch data 3332B-1 may show "Main branch" and "Launch parameters" as the two branches in conflict.

Adjacent to the branch data 3332B-1, description data 3332B-2 may be presented. The description data 3332B-2 may provide details about the conflicting changes. For instance, the description data 3332B-2 may show different specifications for spacecraft mass between the two branches.

The resolver interface 3300F may include selectable versions 3332B, which may allow users to choose which version of the conflicting data to keep. The selectable versions 3332B may be represented by the content from both branches being displayed side by side.

At the top of the resolver menu 3332, there may be options for different views of the conflict, corresponding to different data representation formats.

The background of the resolver interface 3300F may show a table view of the project, with various requirements and specifications listed. This may provide context for the conflicts being resolved.

In some cases, the resolver interface 3300F may display a pipeline interface showing stages of the merge process and their respective statuses. The pipeline interface may provide a visual representation of the progress of the merge process, allowing users to track the status of each stage and identify any bottlenecks or issues.

The system may generate a merged snapshot by combining non-conflicting portions of the modified version of the first file 3302A and the second file 3302B, and store the merged snapshot in the distributed version control system. The diff manager 3308 may analyze the tree diff 3314 to identify non-conflicting portions and combine them into a merged snapshot.

In some cases, the resolver interface 3300F may display a commit history associated with the merge request, providing a chronological view of commits. The commit history may allow users to review the sequence of changes leading up to the current conflict, providing valuable context for resolving the conflict.

The resolver interface 3300F may display a merge interface with an overview of the merge request, including requester information, status of checks and approvals, and options for approving or rejecting. This overview may help users understand the context of the merge request and make informed decisions about resolving conflicts.

Figure 33G:
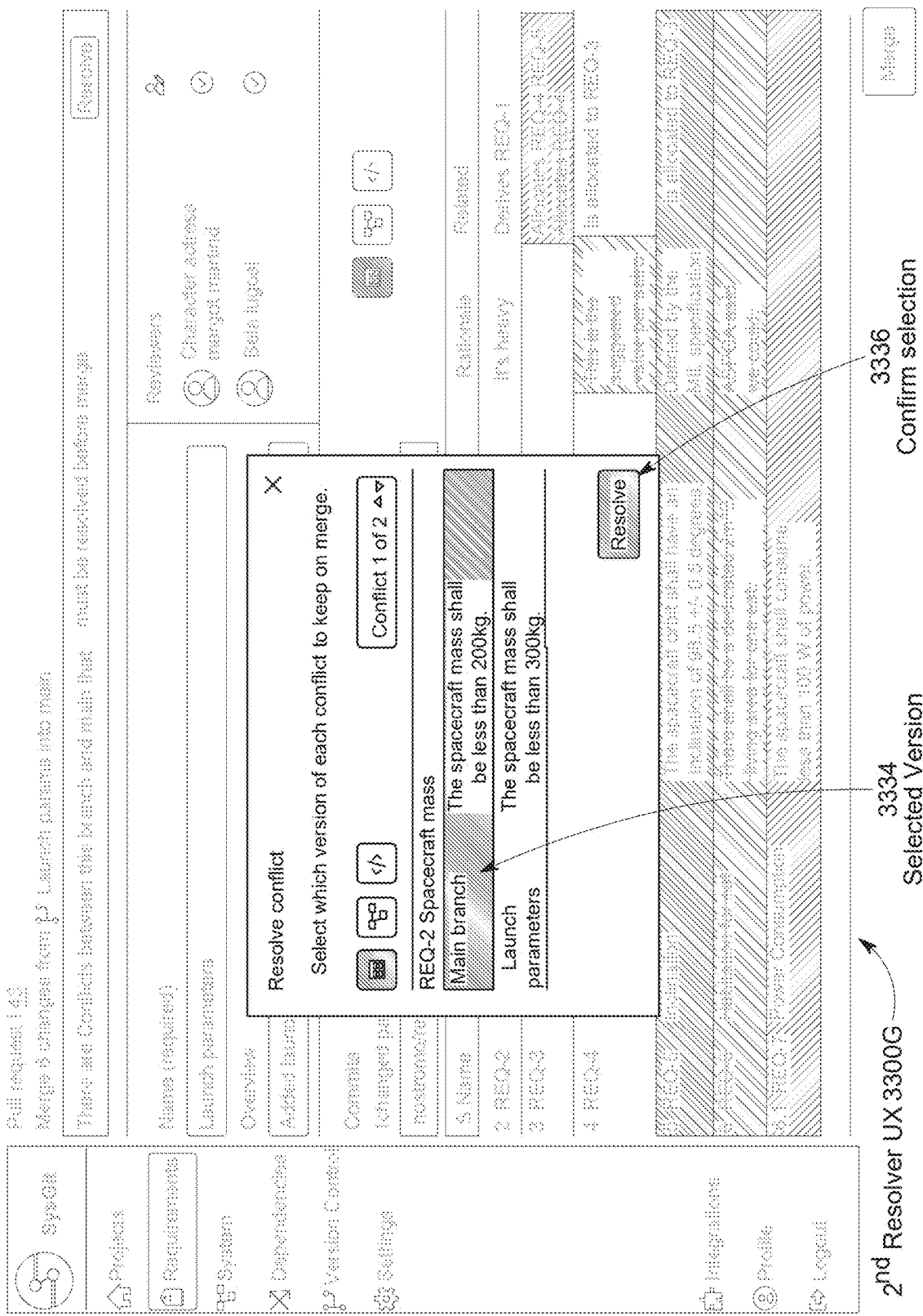
FIG. 33G illustrates a resolver interface with a version selector for managing conflicts, according to aspects of the present disclosure.

FIG. 33G illustrates a resolver interface 3300G for managing conflicts in a version control system. The resolver interface 3300G may display a conflict resolution window overlaid on a pull request interface.

The resolver interface 3300G may include a version selector 3334, which may allow users to choose between different versions of conflicting changes. In some cases, the version selector 3334 may present two options for a spacecraft mass requirement, one from the main branch and another from the launch parameters branch.

Adjacent to the version selector 3334 may be a selection confirmer 3336, represented by a "Resolve" button, which may allow users to confirm their selection and resolve the conflict.

The resolver interface 3300G may provide a clear visual representation of the conflicting changes and facilitate the resolution process within the context of the larger pull request interface.

In some cases, the parser 3306 may be used to analyze the textual notation files 3302 and generate the intermediate data structures 3312, which may be used by the diff manager 3308 to identify and present conflicts in a format that is easily understandable to users. The engineering tool interface 3310 may then display these conflicts within the resolver interface 3300F and resolver interface 3300G, allowing users to interact with and resolve the conflicts efficiently.

The system integrates various components and interfaces to facilitate the management and modification of complex hardware system models using distributed version control. The workflow begins with the creation of a pull request, as illustrated in FIG. 33C. The new pull request interface 3300C allows users to input relevant information about the proposed changes, including a name, description, and assigned reviewers. The system may calculate metrics for each version of the systems modeling information, which may be displayed in the metric data field 3324A.

Once a pull request is created, the system may perform a comparison between the original and modified versions of the model. FIG. 33A depicts the diff data flow system 3300A, which processes and compares textual notation files. The system may generate a diff between the files, extract features for display, and create intermediate data structures for further analysis.

The system may perform a semantic analysis to determine the significance of changes in the context of the overall system model. This analysis may involve examining the nature and impact of the modifications, such as the addition or removal of components, alterations in system relationships, or modifications to system parameters. The results of this semantic analysis may provide valuable insights into the implications of the changes, aiding users in assessing the potential effects on the overall system performance and functionality.

FIG. 33B illustrates the table diff interface 3300B, which presents the changes in a tabular format. The system may apply visual cues, such as color-coding, to highlight different types of changes. This interface allows users to quickly identify and understand the modifications made to the model.

During the review process, as shown in FIG. 33D, the review pull request interface 3200D may display the textual notation of the changes with emphasis elements highlighting specific modifications. The system may analyze the adherence of each version to predefined modeling standards or best practices. This analysis may involve checking the syntax and structure of the model against established guidelines, verifying the consistency and coherence of the model elements, or assessing the completeness and comprehensiveness of the model coverage.

In some cases, conflicts may arise between different versions of the model. FIG. 33E depicts the merge conflict interface 3300E, which alerts users to conflicts that must be resolved before merging. The system may perform automated conflict detection and provide options for resolving these conflicts.

The resolver interfaces 3300F and 3300G, shown in FIG. 33F and FIG. 33G respectively, offer tools for managing and resolving conflicts. Users may navigate between different conflicts, view branch information, and select which version of conflicting data to keep.

Throughout the process, the system may create an audit trail of all analyses performed, including timestamps and user information. This audit trail may include a record of all modifications made to the model, the results of the semantic analysis and metrics calculation, and the outcomes of the standards adherence analysis. The audit trail may provide a comprehensive history of the model evolution, facilitating traceability and accountability in the model development process.

In some cases, the system may handle non-textual elements like images within the primarily text-based system using relative path URLs or base64 encoding. This approach allows for the inclusion of visual elements while maintaining the text-based nature of the version control system.

The system may be implemented as a non-transitory computer-readable medium storing instructions. When executed by one or more processors, these instructions may cause the processors to perform the operations of the system, including the creation of pull requests, diff generation, conflict resolution, and merging of changes. This implementation allows for efficient and flexible management of complex hardware system models using distributed version control, supporting both textual and graphical manipulation of the models, and facilitating collaborative review and modification processes.

3.E. Exemplary Flowchart

Figure 34:
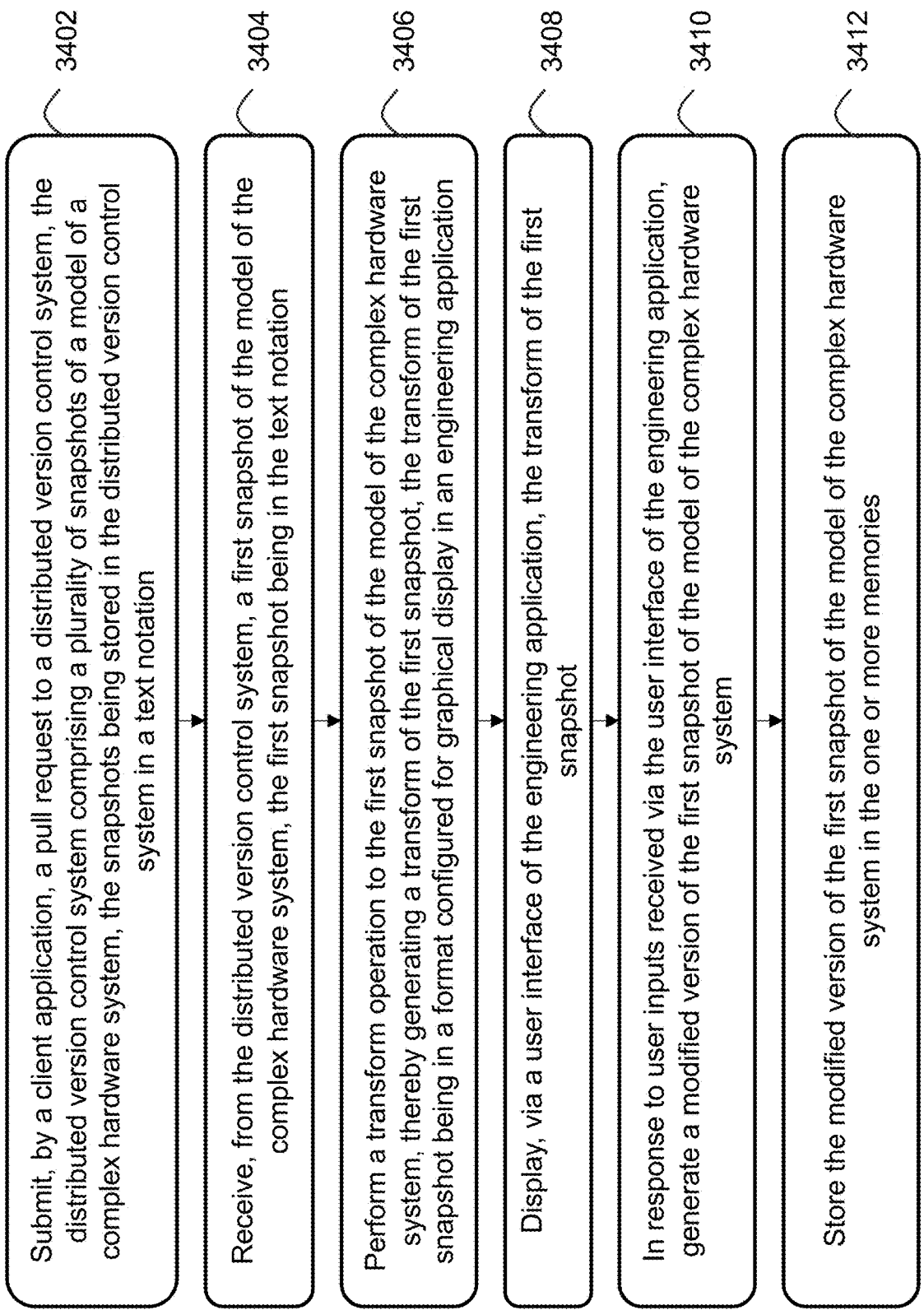
FIG. 34 illustrates a flowchart of a method for modifying a model of a complex hardware system, according to aspects of the present disclosure.

FIG. 34 depict an exemplary flowchart of a client-and-server infrastructure for capturing, storing, and managing engineering data using distributed version control. The features of FIG. 34 may apply to or use any features of FIGS. 1, 2, 3, 4A-4B, 5, 6, 7, 8, 9, 10, 11, 13, 14, 15, 16, 17, 18, 19A-19C, 20A-20C, 21, 22, 23A-23B, 24A-24B, and 25.

The present disclosure provides a system and methods for managing and modifying complex hardware system models using distributed version control. The system includes a client application that interacts with a distributed version control system to obtain snapshots of the system model stored in a text-based systems modeling language. The client application includes a parser that transforms the text-based snapshot into an intermediate data structure that can be loaded and manipulated by an engineering application. The intermediate data structure is stored in memory and can be modified based on user inputs received via the engineering application. The modified version of the intermediate data structure is then transformed back into the text-based systems modeling language, creating a modified version of the snapshot. This modified snapshot is stored in memory, providing an updated version of the system model.

The system thus enables efficient and flexible management of complex hardware system models, supporting both textual and graphical manipulation of the models, and facilitating collaborative review and modification processes.

FIG. 34 depicts a method 3400 for modifying a model of a complex hardware system. The method 3400 begins at step 3402, where a client application submits a pull request to a distributed version control system. The distributed version control system comprises a plurality of snapshots of the model of the complex hardware system, with the snapshots being stored in the distributed version control system in a text notation. This text notation may be a text-based systems modeling language, such as SysML v2, which provides a standardized format for representing complex hardware system models. The use of a text-based systems modeling language allows for efficient storage and retrieval of the model data, as well as compatibility with various engineering applications.

At step 3404, the system receives a first snapshot of the model of the complex hardware system from the distributed version control system. This first snapshot is in the text notation, which provides a detailed and structured representation of the system model. The first snapshot may include information about the components of the system, their properties, and their relationships, as well as any constraints or requirements that apply to the system.

The method 3400 then proceeds to step 3406, where a transform operation is performed on the first snapshot of the model of the complex hardware system. This transform operation generates a transform of the first snapshot, which is in a format configured for graphical display in an engineering application. The transform operation may involve parsing the text notation of the first snapshot to generate an intermediate data structure, such as a graph-based or tabular representation of the model. This intermediate data structure is designed to be loaded and manipulated by an engineering application, allowing users to interact with the model in a more intuitive and visual manner.

In some cases, the transform operation may involve applying a set of rules to interpret and restructure the text notation of the first snapshot. These rules may be defined based on the syntax and semantics of the text-based systems modeling language, ensuring that the transformed model accurately reflects the original system model. The transform operation may also involve generating an abstract syntax tree (AST) from the text notation of the first snapshot. The AST provides a hierarchical representation of the model, facilitating efficient traversal and manipulation of the model data.

In some aspects, the system may store line and column data corresponding to locations of tokens within nodes or edges of the abstract syntax tree. This data can be used to track the original location of each element in the text notation, facilitating accurate conversion back to the text notation after modifications have been made to the model.

The system may also use one or more grammar files to parse the text of the first snapshot in the systems modeling language. These grammar files define rules and tokens for parsing the text-based systems modeling language, ensuring that the parsing process accurately captures the structure and semantics of the model. The system may select a specific grammar file from the one or more grammar files based on the type of the text-based systems modeling language, allowing for compatibility with different versions or variants of the language.

After the transform operation, the system may store and display the intermediate data structure in one or more memories, as depicted in step 3408. This storage operation ensures that the transformed model is preserved and can be accessed for further processing or manipulation. The stored intermediate data structure serves as a working version of the model, which can be loaded into the engineering application for viewing and editing.

Continuing with the description of method 3400, at step 3408, the system displays the transform of the first snapshot via a user interface of the engineering application. This user interface may be a graphical user interface that presents the transform of the first snapshot in a visual format, such as a diagram, chart, or table. The display of the transform allows users to visually inspect and interact with the model of the complex hardware system, facilitating a more intuitive and user-friendly experience. In some cases, the user interface may provide various tools and features for manipulating and analyzing the transform of the first snapshot, such as zooming, panning, highlighting, and filtering functionalities.

In response to user inputs received via the user interface of the engineering application, the system generates a modified version of the first snapshot of the model of the complex hardware system at step 3410. These user inputs may include commands or actions for adding, deleting, or modifying elements of the model, changing the structure or relationships within the model, or adjusting the parameters or properties of the model elements. The system processes these user inputs and applies the corresponding modifications to the first snapshot (e.g., by unparsing an updated intermediate data structure or by text injection), resulting in a modified version of the first snapshot that reflects the user's changes.

The system then stores the modified version of the first snapshot in one or more memories, as depicted in step 3412. This storage operation ensures that the modified version of the first snapshot is preserved and can be accessed for further processing or manipulation. The stored modified version of the first snapshot serves as an updated version of the model, which can be loaded into the engineering application (via parser generating a new intermediate data structure) for further viewing and editing.

The system modifies the intermediate data structure based on the user inputs received via the user interface of the engineering application. This modification process involves updating the intermediate data structure to reflect the changes made to the first snapshot. The modified version of the intermediate data structure represents the current state of the model in a format that is compatible with the engineering application and suitable for further processing and analysis.

The system stores the modified version of the intermediate data structure in the one or more memories. This storage operation ensures that the modified version of the intermediate data structure is preserved and can be accessed for further processing or manipulation. The stored modified version of the intermediate data structure may serve as a working version of the model, which can be loaded into the engineering application for further viewing and editing.

In summary, the method 3400 provides a comprehensive and flexible approach for modifying a model of a complex hardware system using distributed version control. The method 3400 leverages the capabilities of a distributed version control system and an engineering application to facilitate efficient and user-friendly manipulation of the model. The method 3400 also ensures that the modifications made to the model are accurately reflected in both the text-based snapshot and the intermediate data structure, maintaining consistency and integrity of the model data.

Based on the modified version of the intermediate data structure, the system generates a modified version of the first snapshot of the model of the complex hardware system at step 3412. This generation operation involves transforming the modified version of the intermediate data structure back into the text-based systems modeling language, resulting in a modified version of the first snapshot that reflects the changes made to the model. The system may use various techniques to perform this transformation, such as reverse parsing or text injection operations. In some cases, the system may also apply formatting or beautification rules to enhance the readability and structure of the modified version of the first snapshot.

The system may store the modified version of the first snapshot of the model of the complex hardware system in the one or more memories. This storage operation ensures that the modified version of the first snapshot is preserved and can be accessed for further processing or manipulation. The stored modified version of the first snapshot serves as an updated version of the model.

In some cases, a commit request operation involves sending a request to the distributed version control system to update the stored snapshots with the modified version of the first snapshot. The system may use various techniques to submit the commit request, such as network communication protocols, application programming interfaces (APIs), or command-line interfaces. In some cases, the system may also include additional information in the commit request, such as metadata, comments, or tags, to provide context or facilitate tracking of the modifications.

The method 3400 provides a comprehensive and flexible approach for modifying a model of a complex hardware system using distributed version control. The method 3400 leverages the capabilities of a distributed version control system and an engineering application to facilitate efficient and user-friendly manipulation of the model. The method 3400 also ensures that the modifications made to the model are accurately reflected in both the text-based snapshot and the intermediate data structure, maintaining consistency and integrity of the model data.

In some cases, the system may also use one or more grammar files to parse the text of the first snapshot in the systems modeling language. These grammar files define rules and tokens for parsing the text-based systems modeling language, ensuring that the parsing process accurately captures the structure and semantics of the model. The system may select a specific grammar file from the one or more grammar files based on the type of the text-based systems modeling language, allowing for compatibility with different versions or variants of the language.

In some cases, the system may perform a semantic analysis of the significance of changes made to the model. This analysis may involve examining the nature and impact of the changes, such as the addition or removal of components, alterations in system relationships, or modifications to system parameters. The results of this semantic analysis may provide valuable insights into the implications of the changes, aiding users in assessing the potential effects on the overall system performance and functionality.

In some aspects, the system may calculate metrics for each version of the systems modeling information. These metrics may include quantitative measures such as the number of lines added or removed in the text notation, the number of components added or deleted in the graphical representation, or the degree of alteration in system parameters. These metrics can provide a quantitative assessment of the extent and magnitude of the changes, offering a clear and objective measure of the modifications made to the model.

In some cases, the system may analyze the adherence of each version of the model to predefined modeling standards or best practices. This analysis may involve checking the syntax and structure of the model against established guidelines, verifying the consistency and coherence of the model elements, or assessing the completeness and comprehensiveness of the model coverage. By ensuring compliance with modeling standards, the system can enhance the quality and reliability of the model, reducing the risk of errors or inconsistencies.

In some aspects, the system may create an audit trail of the analysis and changes made to the model. This audit trail may include a record of all modifications made to the model, the results of the semantic analysis and metrics calculation, and the outcomes of the standards adherence analysis. The audit trail can provide a comprehensive history of the model evolution, facilitating traceability and accountability in the model development process. This can be particularly beneficial in collaborative environments, where multiple users may be involved in modifying the model, or in regulated industries, where documentation of the model development process may be required for compliance purposes.

In some embodiments, the method 3400 may be implemented as computer-executable instructions stored on a non-transitory computer-readable medium. When executed by one or more processors, these instructions cause the processors to perform the operations of the method 3400. This implementation allows for efficient and flexible management of complex hardware system models using distributed version control, supporting both textual and graphical manipulation of the models, and facilitating collaborative review and modification processes.

In some aspects, the system may perform a transform operation on the first snapshot of the model of the complex hardware system, thereby generating a transform of the first snapshot. This transform operation may involve parsing the text notation of the first snapshot to generate an intermediate data structure. The intermediate data structure may be a graph-based representation of the model of the complex hardware system. This graph-based representation may provide a visual and intuitive way of understanding the structure and relationships within the system model. It may include nodes representing components of the system and edges representing relationships or interactions between these components. The graph-based representation may be particularly useful for complex hardware systems with many interconnected components, as it can help users to visualize and understand the overall system architecture.

In some cases, the intermediate data structure may be a tabular representation of the model of the complex hardware system. This tabular representation may organize the system model data into rows and columns, providing a structured and organized view of the model. Each row may represent a component of the system, and each column may represent a property or attribute of the components. The tabular representation may be particularly useful for systems with many components that share similar properties or attributes, as it allows for easy comparison and analysis of these components.

In some aspects, the transform operation may involve generating a graphical representation of the model based on the text notation of the first snapshot. This graphical representation may provide a visual depiction of the system model, allowing users to easily understand and interact with the model. The graphical representation may include diagrams, charts, or other visual elements that represent the components and relationships of the system model. The graphical representation may be particularly useful for users who prefer a visual approach to understanding and manipulating the system model.

Continuing with the description of method 3400, the transform operation performed on the first snapshot of the model of the complex hardware system at step 3406 may involve several sub-steps. In some cases, the transform operation may comprise converting the text notation of the first snapshot into a format compatible with a specific engineering tool. This conversion process may involve translating the text notation into a format that can be read and manipulated by the engineering tool, such as a graphical or tabular format. This conversion allows the engineering tool to interact with the model data in a manner that is consistent with its native data handling capabilities, facilitating efficient and accurate manipulation of the model.

In some aspects, the transform operation may also comprise extracting metadata from the text notation of the first snapshot. This metadata extraction process may involve identifying and extracting additional information embedded in the text notation that is not directly related to the model data but provides context or supplementary information about the model. This metadata may include, for example, information about the source or author of the model, the date and time of model creation or modification, or annotations or comments associated with the model. The extracted metadata can provide valuable insights into the model and its development history, aiding in the review and analysis of the model.

In some cases, the transform operation may comprise applying a set of rules to interpret and restructure the text notation of the first snapshot. These rules may be defined based on the syntax and semantics of the text-based systems modeling language, ensuring that the transformed model accurately reflects the original system model. The application of these rules can help to ensure that the model data is correctly interpreted and structured, reducing the risk of errors or inconsistencies in the transformed model.

In some aspects, the transform operation may comprise generating an abstract syntax tree (AST) from the text notation of the first snapshot. The generation of the AST involves tokenizing the text notation to identify individual elements and operators within the first snapshot. This tokenization process breaks down the text notation into discrete units or tokens, each representing a specific element or operator in the model. The identified tokens are then organized into an AST, a tree data structure that represents the hierarchical structure and relationships of the elements and operators in the model. The AST provides a structured and intuitive representation of the model, facilitating efficient traversal and manipulation of the model data.

In some cases, the generation of the AST includes tokenizing the text notation to identify individual elements and operators within the first snapshot. This tokenization process involves scanning the text notation and breaking it down into discrete units or tokens, each representing a specific element or operator in the model. The identified tokens are then used to construct the nodes and edges of the AST, with each node representing an element or operator and each edge representing a relationship or interaction between elements or operators. This process ensures that the AST accurately reflects the structure and semantics of the model as represented in the text notation.

In some aspects, the tokenizing step may include classifying the identified elements and operators based on predefined categories relevant to the model of the complex hardware system. This classification process may involve assigning each token to a category based on its type, role, or function in the model. For instance, tokens representing system components may be classified into different categories such as subsystems, components, or parts, while tokens representing relationships or interactions may be classified into categories such as dependencies, associations, or connections. This classification of tokens can facilitate the construction of the AST and enhance the interpretability of the model.

The generation of the AST may further include constructing nodes for each identified element and operator, and establishing edges between nodes based on their operational or hierarchical relationships within the text notation. Each node in the AST may represent a token from the text notation, and each edge may represent a relationship or interaction between tokens. The nodes and edges of the AST may be organized in a hierarchical structure that reflects the structure of the model as represented in the text notation. This hierarchical structure can provide a traversable representation of the model, facilitating efficient traversal and manipulation of the model data.

In some cases, the AST may be utilized to perform syntax checking to validate the structural and syntactical correctness of the first snapshot according to the rules of the text-based systems modeling language. This syntax checking process may involve verifying that the tokens and their arrangements in the AST conform to the syntax rules of the systems modeling language. Syntax errors, such as missing or misplaced tokens, incorrect token sequences, or invalid token combinations, may be identified and flagged for review. This syntax checking can help to ensure that the first snapshot is correctly represented in the AST, reducing the risk of errors or inconsistencies in the transformed model.

In some aspects, errors identified during the syntax checking are flagged for review, and the system provides suggestions for corrections to achieve compliance with the modeling language syntax. These suggestions may be presented to the user through the user interface of the engineering application, providing guidance on how to correct the syntax errors. The suggestions may include, for example, adding missing tokens, rearranging token sequences, or replacing invalid tokens. This feedback mechanism can assist users in correcting syntax errors, enhancing the quality and reliability of the model.

In some cases, the system configures the AST to support modifications directly within the tree structure, enabling dynamic updates to the first snapshot in response to user inputs received via the engineering application interface. These modifications may involve adding, deleting, or moving nodes or edges in the AST, or changing the attributes or properties of nodes or edges. The modified AST may then be transformed back into the text notation, generating a modified version of the first snapshot that reflects the changes made to the model. This dynamic modification capability can facilitate efficient and flexible manipulation of the model, supporting iterative design and development processes.

In some aspects, the system may provide search and navigation capabilities within the different views to locate specific model elements or relationships. For instance, the system may include a search function that allows users to enter keywords or phrases to find relevant elements or relationships in the model. The system may also provide navigation tools, such as a tree view or a breadcrumb trail, that allow users to navigate through the hierarchical structure of the model. These search and navigation capabilities can facilitate efficient and targeted exploration of the model, helping users to quickly locate and access the information they need.

In some cases, the system may enable collaborative features allowing multiple users to simultaneously view and edit snapshots of the model of the complex hardware system. This collaborative functionality may be facilitated through a shared workspace or a version control system that allows multiple users to access and modify the same model concurrently. The system may provide tools for conflict resolution, such as merge functions or conflict markers, to handle situations where multiple users make conflicting changes to the same part of the model. This collaborative editing capability can enhance teamwork and coordination among users, facilitating collective decision-making and problem-solving in the model development process.

In some cases, generating the abstract syntax tree comprises tokenizing the text of the first snapshot to generate a series of tokens. This tokenization process involves scanning the text notation and breaking it down into discrete units or tokens, each representing a specific element or operator in the model. The identified tokens are then used to construct the nodes and edges of the AST, with each node representing an element or operator and each edge representing a relationship or interaction between elements or operators. This process ensures that the AST accurately reflects the structure and semantics of the model as represented in the text notation.

In some aspects, the tokenizing step may include classifying the identified elements and operators based on predefined categories relevant to the model of the complex hardware system. This classification process may involve assigning each token to a category based on its type, role, or function in the model. For instance, tokens representing system components may be classified into different categories such as subsystems, components, or parts, while tokens representing relationships or interactions may be classified into categories such as dependencies, associations, or connections. This classification of tokens can facilitate the construction of the AST and enhance the interpretability of the model.

In some cases, the generation of the AST further includes constructing nodes for each identified element and operator, and establishing edges between nodes based on their operational or hierarchical relationships within the text notation. Each node in the AST may represent a token from the text notation, and each edge may represent a relationship or interaction between tokens. The nodes and edges of the AST may be organized in a hierarchical structure that reflects the structure of the model as represented in the text notation. This hierarchical structure can provide a clear and intuitive representation of the model, facilitating efficient traversal and manipulation of the model data.

In some aspects, the system may utilize one or more grammar files to facilitate the parsing and unparsing operations for the text-based systems modeling language. These grammar files may define lexical rules specifying how individual characters are grouped into tokens. For instance, the lexical rules may specify that certain sequences of characters form a single token, or that certain characters serve as delimiters between tokens. This tokenization process can help to break down the text notation into manageable units, facilitating the parsing and interpretation of the model.

In addition to lexical rules, the grammar files may also include syntactic rules describing how tokens can be combined to form valid language constructs. These syntactic rules may define the structure and order of tokens in a valid expression or statement in the systems modeling language. For instance, the syntactic rules may specify that a certain token must be followed by another specific token, or that a certain token must be enclosed within a pair of other tokens. These syntactic rules can help to ensure that the model is correctly structured and adheres to the syntax of the systems modeling language.

In some cases, the system may use the one or more grammar files to generate a parser for the text-based systems modeling language. This parser may be a software component that reads the text notation of the first snapshot and applies the lexical and syntactic rules defined in the grammar files to interpret the model. The parser may generate an intermediate data structure, such as an abstract syntax tree (AST), that represents the structure and semantics of the model in a format that can be manipulated by the engineering application.

In some aspects, the system may also use the one or more grammar files to generate an unparser for converting the modified version of the intermediate data structure back into the text-based systems modeling language. This unparser may perform the reverse operation of the parser, translating the intermediate data structure into a text notation that conforms to the syntax of the systems modeling language. The unparser may apply the lexical and syntactic rules defined in the grammar files in reverse order, ensuring that the modified version of the first snapshot accurately reflects the changes made to the model.

In some embodiments, the one or more grammar files are modular and extensible, allowing for updates and modifications to the language specification of the text-based systems modeling language. This modularity and extensibility can facilitate the adaptation of the system to changes in the systems modeling language, such as the introduction of new syntax rules or the modification of existing rules. The system may update or replace the grammar files as needed to accommodate these changes, ensuring that the parsing and unparsing operations remain accurate and up-to-date. This flexibility can enhance the robustness and longevity of the system, enabling it to support a wide range of systems modeling languages and to evolve with advancements in systems modeling practices.

In some embodiments, the system may perform a transform operation on the modified version of the intermediate data structure to generate a modified version of the first snapshot of the model of the complex hardware system. This transform operation, also referred to as an "unparsing" process, may involve converting the modified version of the intermediate data structure back into the text-based systems modeling language. The system may apply a set of transformation rules during this process that convert data elements of the intermediate data structure into corresponding elements in the text-based systems modeling language. These transformation rules may be defined in a grammar file that specifies mappings between elements of the intermediate data structure and elements of the text-based systems modeling language.

The grammar file may be modifiable to accommodate updates in the text-based systems modeling language or changes in the intermediate data structure format. This flexibility allows the system to adapt to evolving modeling languages and data structure formats, ensuring that the unparsing process remains accurate and up-to-date.

In addition to the transformation rules, the system may also perform a validation process during the unparsing operation. This process may involve validating the generated text-based representation against a schema or a set of rules defined for the text-based systems modeling language to ensure compliance with the language standards. This validation process can help to ensure that the modified version of the first snapshot accurately reflects the changes made to the model and adheres to the syntax and semantics of the systems modeling language.

In some cases, the system may generate a text-based representation of the modified version of the first snapshot that is compliant with the text-based systems modeling language. This compliant text-based representation may be generated by applying the transformation rules to the modified version of the intermediate data structure and validating the resulting text-based representation against the schema or rules of the systems modeling language. This compliant text-based representation can provide a clear and accurate depiction of the modified model, facilitating further review, analysis, or manipulation of the model.

In summary, the system's capability to perform a transform operation on the modified version of the intermediate data structure, thereby generating a compliant text-based representation of the modified version of the first snapshot, provides a robust and flexible mechanism for managing and modifying models of complex hardware systems. This capability ensures that modifications made to the model in the graphical or tabular format of the engineering application are accurately reflected in the text-based systems modeling language, maintaining consistency and integrity of the model data across different representations and formats.

In some aspects, the system may maintain a mapping between elements in the intermediate data structure and corresponding locations in the first snapshot. This mapping may be used to determine where to perform text injections when transforming the modified version of the intermediate data structure. For instance, if a user modifies a component in the graphical representation of the model, the system may identify the corresponding element in the intermediate data structure and determine its location in the first snapshot based on the mapping. The system may then inject the modified text at the corresponding location in the first snapshot, ensuring that the changes made in the graphical representation are accurately reflected in the text notation.

In some cases, the system may perform syntax validation on the text-injected version of the first snapshot to ensure compliance with the text-based systems modeling language. This validation process may involve checking the syntax of the text-injected version against the rules of the systems modeling language, identifying any syntax errors or inconsistencies, and flagging them for review. If any syntax errors or inconsistencies are detected, the system may revert the text injections that introduced these errors or inconsistencies, thereby preserving the integrity of the first snapshot. This syntax validation and error correction mechanism can help to ensure that the modified version of the first snapshot is syntactically correct and compliant with the systems modeling language.

In some aspects, the system may generate different views of the systems modeling information based on user-selected filters or parameters. These views may include graph structure views, tabular views, and tree views. The graph structure views may provide a visual representation of the system model, showing the components of the system and their relationships in a graphical format. The tabular views may present the system model data in a structured table format, allowing users to easily compare and analyze the data. The tree views may display the hierarchical structure of the system model, providing a clear overview of the system's organization and dependencies. These different views can facilitate efficient and targeted exploration of the model, helping users to quickly locate and access the information they need.

In some cases, the system may provide search and navigation capabilities within the different views to locate specific model elements or relationships. For instance, the system may include a search function that allows users to enter keywords or phrases to find relevant elements or relationships in the model. The system may also provide navigation tools, such as a tree view or a breadcrumb trail, that allow users to navigate through the hierarchical structure of the model. These search and navigation capabilities can facilitate efficient and targeted exploration of the model, helping users to quickly locate and access the information they need.

In some aspects, the system may enable collaborative features allowing multiple users to simultaneously view and edit snapshots of the model of the complex hardware system. This collaborative functionality may be facilitated through a shared workspace or a version control system that allows multiple users to access and modify the same model concurrently. The system may provide tools for conflict resolution, such as merge functions or conflict markers, to handle situations where multiple users make conflicting changes to the same part of the model. This collaborative editing capability can enhance teamwork and coordination among users, facilitating collective decision-making and problem-solving in the model development process.

In some aspects, the method 3400 may include additional analysis and visualization techniques applied to the modified snapshot and changes made to the complex hardware system model. For instance, the system may apply syntax highlighting and formatting to the text-based format of the modified snapshot. This may involve identifying changes in the text notation, such as additions, deletions, or modifications, and visually indicating these changes using different colors, fonts, or styles. This syntax highlighting and formatting can enhance the readability of the modified snapshot, making it easier for users to identify and understand the changes made to the model.

In summary, the creation and management of an audit trail that records the analysis and changes made to the complex hardware system model is a feature of the method 3400 that enhances transparency, accountability, and traceability in the model development process. This feature ensures that all modifications and analyses are accurately recorded and easily accessible, facilitating review, analysis, and reporting of the model development process.

4. Computer System

Figure 35:
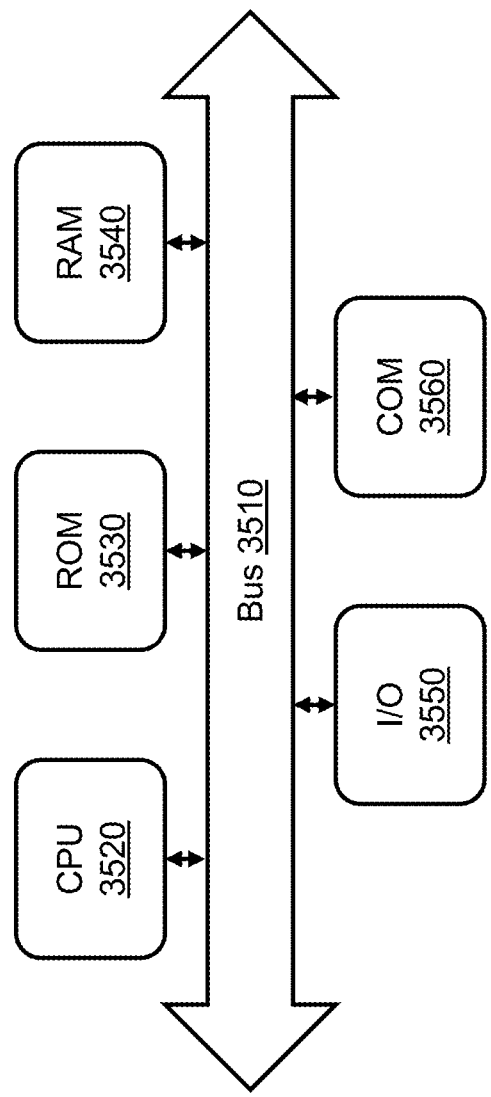
FIG. 35 depicts an example system that may execute techniques presented herein.

FIG. 35 depicts an example system that may execute techniques presented herein. FIG. 35 is a simplified functional block diagram of a computer that may be configured to execute techniques described herein, according to exemplary cases of the present disclosure. Specifically, the computer (or "platform" as it may not be a single physical computer infrastructure) may include a data communication interface 3560 for packet data communication. The platform may also include a central processing unit ("CPU") 3520, in the form of one or more processors, for executing program instructions. The platform may include an internal communication bus 3510, and the platform may also include a program storage and/or a data storage for various data files to be processed and/or communicated by the platform such as ROM 3530 and RAM 3540, although the system 3500 may receive programming and data via network communications. The system 3500 also may include input and output ports 3550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

5. Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

As used herein, the terms "transmit," "provide," "receive," and "obtain" may refer to the transfer or communication of data, information, or signals between various components or entities. This may include, but is not limited to, transmission over a network (such as a local area network, wide area network, or the Internet), transfer between devices (such as between computers, smartphones, or other electronic devices), communication between central processing units (CPUs) or graphics processing units (GPUs), exchange of information between microservices, transfer of data between software components within an environment, or any other form of data transfer or communication as indicated by the context in which the terms are used. The specific mode or medium of transmission or provision may vary depending on the particular implementation and system architecture.

As used herein, the term "module" may refer to software code, a software component, a software function, a software application, and firmware. As indicated by context, "module" may be logical, digital, analog, optical, electronic, or quantum implementations of operations or functions. A module may be implemented as a standalone unit or as part of a larger system. In some cases, a module may interact with other modules or components to perform specific tasks or operations within the system. As indicated by context or based on design preference, any two modules may be combined. As indicated by context or based on design preference, any module may be broken into two or more modules that provide some or all of the operations or functions of the single module. The specific implementation of module(s) may vary depending on the requirements of the system and the particular application.

The term "exemplary" is used in the sense of "example" rather than "ideal." As used herein, the singular forms "a," "an," and "the" include plural reference unless the context dictates otherwise.

6. Examples

Exemplary embodiments of the systems and methods disclosed herein are described in the numbered paragraphs below.

A1. A system for modifying a model of a complex hardware system, the system comprising: one or more memories configured to store computer-executable instructions; and one or more processors configured to execute the computer-executable instructions, wherein the system is configured to: submit, by a client application, a pull request to a distributed version control system, the distributed version control system comprising a plurality of snapshots of the model of the complex hardware system, the snapshots being stored in the distributed version control system in a text notation; receive, from the distributed version control system, a first snapshot of the model of the complex hardware system, the first snapshot being in the text notation; perform a transform operation to the first snapshot of the model of the complex hardware system, thereby generating a transform of the first snapshot, the transform of the first snapshot being in a format configured for graphical display in an engineering application; display, via a user interface of the engineering application, the transform of the first snapshot; in response to user inputs received via the user interface of the engineering application, generate a modified version of the first snapshot of the model of the complex hardware system; and store the modified version of the first snapshot of the model of the complex hardware system in the one or more memories.

A2. The system of A1, wherein the transform operation comprises parsing the text notation of the first snapshot to generate an intermediate data structure.

A3. The system of A2, wherein the intermediate data structure is a graph-based representation of the model of the complex hardware system.

A4. The system of A2, wherein the intermediate data structure is a tabular representation of the model of the complex hardware system.

A5. The system of any of A1-A4, wherein the transform operation comprises generating a graphical representation of the model of the complex hardware system based on the text notation of the first snapshot.

A6. The system of any of A1-A5, wherein the transform operation comprises converting the text notation of the first snapshot into a format compatible with a specific engineering tool.

A7. The system of any of A1-A6, wherein the transform operation comprises extracting metadata from the text notation of the first snapshot.

A8. The system of any of A1-A7, wherein the transform operation comprises applying a set of rules to interpret and restructure the text notation of the first snapshot.

A9. The system of any of A1-A8, wherein the transform operation comprises generating an abstract syntax tree (AST) from the text notation of the first snapshot.

A10. The system of A9, wherein the generation of the abstract syntax tree (AST) includes tokenizing the text notation to identify individual elements and operators within the first snapshot.

A11. The system of A10, wherein the tokenizing step includes classifying the identified elements and operators based on predefined categories relevant to the model of the complex hardware system.

A12. The system of A11, wherein the generation of the AST further includes constructing nodes for each identified element and operator, and establishing edges between nodes based on their operational or hierarchical relationships within the text notation.

A13. The system of A12, wherein the AST is utilized to perform syntax checking to validate the structural and syntactical correctness of the first snapshot according to the rules of the text-based systems modeling language.

A14. The system of A13, wherein errors identified during the syntax checking are flagged for review, and the system provides suggestions for corrections to achieve compliance with the modeling language syntax.

A15. The system of A14, wherein the system configures the AST to support modifications directly within the tree structure, enabling dynamic updates to the first snapshot in response to user inputs received via the engineering application interface.

A16. The system of A15, wherein the modifications to the AST are synchronized with the intermediate data structure to ensure consistency across different representations of the model of the complex hardware system.

A17. The system of A9, wherein the system is further configured to: store column and line data corresponding to locations of tokens within nodes of the abstract syntax tree (AST).

A18. The system of A17, wherein the system is further configured to: store column and line data corresponding to locations of tokens within edges of the abstract syntax tree (AST).

A19. A computer-implemented method for modifying a model of a complex hardware system, the method comprising: submitting, by a client application, a pull request to a distributed version control system, the distributed version control system comprising a plurality of snapshots of the model of the complex hardware system, the snapshots being stored in the distributed version control system in a text notation; receiving, from the distributed version control system, a first snapshot of the model of the complex hardware system, the first snapshot being in the text notation; performing a transform operation to the first snapshot of the model of the complex hardware system, thereby generating a transform of the first snapshot, the transform of the first snapshot being in a format configured for graphical display in an engineering application; displaying, via a user interface of the engineering application, the transform of the first snapshot; in response to user inputs received via the user interface of the engineering application, generating a modified version of the first snapshot of the model of the complex hardware system; and storing the modified version of the first snapshot of the model of the complex hardware system in one or more memories.

A20. A non-transitory computer-readable medium storing instructions that, when executed by one or more processors, cause the one or more processors to perform operations comprising: submitting, by a client application, a pull request to a distributed version control system, the distributed version control system comprising a plurality of snapshots of the model of the complex hardware system, the snapshots being stored in the distributed version control system in a text notation; receiving, from the distributed version control system, a first snapshot of the model of the complex hardware system, the first snapshot being in the text notation; performing a transform operation to the first snapshot of the model of the complex hardware system, thereby generating a transform of the first snapshot, the transform of the first snapshot being in a format configured for graphical display in an engineering application; displaying, via a user interface of the engineering application, the transform of the first snapshot; in response to user inputs received via the user interface of the engineering application, generating a modified version of the first snapshot of the model of the complex hardware system; and storing the modified version of the first snapshot of the model of the complex hardware system in one or more memories.

B1. A system for modifying a model of a complex hardware system, the system comprising: one or more memories configured to store computer-executable instructions; and one or more processors configured to execute the computer-executable instructions, wherein the system is configured to: obtain, from a distributed version control system, a first snapshot of the model of the complex hardware system, wherein the first snapshot is in a text-based systems modeling language; parse a text of the first snapshot in the systems modeling language to generate an intermediate data structure, wherein the intermediate data structure is configured to be loaded and manipulated by an engineering application; store the intermediate data structure in the one or more memories; modify, via a user interface of the engineering application, the intermediate data structure based on user inputs, thereby generating a modified version of the intermediate data structure; store the modified version of the intermediate data structure in the one or more memories; access the modified version of the intermediate data structure; based on the modified version of the intermediate data structure, generate a modified version of the first snapshot of the model of the complex hardware system, wherein the modified version of the first snapshot is in the text-based systems modeling language; and store the modified version of the first snapshot of the model of the complex hardware system in the one or more memories.

B2. The system of B1, wherein the system is further configured to: generate, by the client application, different views of the systems modeling information based on user-selected filters or parameters.

B3. The system of B2, wherein the different views include one or combinations of: graph structure views, tabular views, and/or text editor views B4. The system of B2, wherein the system is further configured to: provide, by the client application, search and navigation capabilities within the different views to locate specific model elements or relationships.

B5. The system of any of B1-B4, wherein the system is further configured to: enable, by the client application, collaborative features allowing multiple users to simultaneously view and edit snapshots of the model of the complex hardware system.

B6. The system of any of B1-B5, wherein parsing the text of the first snapshot in the systems modeling language to generate the intermediate data structure comprises: generating an abstract syntax tree (AST) based on the text of the first snapshot.

B7. The system of B6, wherein generating the abstract syntax tree comprises: tokenizing the text of the first snapshot to generate a series of tokens; and constructing the abstract syntax tree based on the generated series of tokens.

B8. The system of B7, wherein generation of the abstract syntax tree further includes constructing nodes for each identified element and operator, and establishing edges between nodes based on their operational or hierarchical relationships within the text notation.

B9. The system of B7, wherein constructing the abstract syntax tree comprises: applying grammar rules to group and organize the tokens into a hierarchical structure representing a logical structure of the model of the complex hardware system.

B10. The system of B6, wherein the system is further configured to: store line and column data corresponding to locations of tokens within nodes or edges of the abstract syntax tree.

B11. The system of B1, wherein the system is further configured to: use one or more grammar files to parse the text of the first snapshot in the systems modeling language.

B12. The system of B11, wherein the one or more grammar files define rules and tokens for parsing the text-based systems modeling language.

B13. The system of B11, wherein the system is further configured to: select a specific grammar file from the one or more grammar files based on a type of the text-based systems modeling language.

B14. The system of B11, wherein the one or more grammar files include lexical rules specifying how individual characters are grouped into tokens.

B15. The system of B11, wherein the one or more grammar files include syntactic rules describing how tokens can be combined to form valid language constructs.

B16. The system of B11, wherein the system is further configured to: use the one or more grammar files to generate a parser for the text-based systems modeling language.

B17. The system of B11, wherein the system is further configured to: use the one or more grammar files to generate an unparser for converting the modified version of the intermediate data structure back into the text-based systems modeling language.

B18. The system of B11, wherein the one or more grammar files are modular and extensible, allowing for updates and modifications to the language specification of the text-based systems modeling language.

B19. A computer-implemented method for modifying a model of a complex hardware system, the method comprising: obtaining, from a distributed version control system, a first snapshot of the model of the complex hardware system, wherein the first snapshot is in a text-based systems modeling language; parsing a text of the first snapshot in the systems modeling language to generate an intermediate data structure, wherein the intermediate data structure is configured to be loaded and manipulated by an engineering application; storing the intermediate data structure in one or more memories; modifying, via a user interface of the engineering application, the intermediate data structure based on user inputs, thereby generating a modified version of the intermediate data structure; storing the modified version of the intermediate data structure in the one or more memories; accessing the modified version of the intermediate data structure; based on the modified version of the intermediate data structure, generating a modified version of the first snapshot of the model of the complex hardware system, wherein the modified version of the first snapshot is in the text-based systems modeling language; and storing the modified version of the first snapshot of the model of the complex hardware system in the one or more memories.

B20. A non-transitory computer-readable medium storing instructions that, when executed by one or more processors, cause the one or more processors to perform operations for modifying a model of a complex hardware system, the operations comprising: obtaining, from a distributed version control system, a first snapshot of the model of the complex hardware system, wherein the first snapshot is in a text-based systems modeling language; parsing a text of the first snapshot in the systems modeling language to generate an intermediate data structure, wherein the intermediate data structure is configured to be loaded and manipulated by an engineering application; storing the intermediate data structure in one or more memories; modifying, via a user interface of the engineering application, the intermediate data structure based on user inputs, thereby generating a modified version of the intermediate data structure; storing the modified version of the intermediate data structure in the one or more memories; accessing the modified version of the intermediate data structure; based on the modified version of the intermediate data structure, generating a modified version of the first snapshot of the model of the complex hardware system, wherein the modified version of the first snapshot is in the text-based systems modeling language; and storing the modified version of the first snapshot of the model of the complex hardware system in the one or more memories.

C1. A system for modifying a model of a complex hardware system, the system comprising: one or more memories configured to store computer-executable instructions; and one or more processors configured to execute the computer-executable instructions, wherein the system is configured to: obtain, from a distributed version control system, a first snapshot of the model of the complex hardware system, the first snapshot being in a text-based systems modeling language; based on the first snapshot of the model of the complex hardware system, generate an intermediate data structure, the intermediate data structure being configured to be loaded and manipulated by an engineering application; store the intermediate data structure in the one or more memories; access a modified version of the intermediate data structure, wherein the modified version of the intermediate data structure is modified by the engineering application based on user inputs received via the engineering application; transform the modified version of intermediate data structure, thereby generating a modified version of the first snapshot of the model of the complex hardware system, wherein the modified version of the first snapshot is in the text-based systems modeling language; and store the modified version of the first snapshot of the model of the complex hardware system in the one or more memories.

C2. The system of C1, wherein the system is further configured to unparse the modified version of the intermediate data structure to generate a text-based representation of the modified version of the first snapshot, wherein the text-based representation is compliant with the text-based systems modeling language.

C3. The system of C2, wherein the unparsing includes applying a set of transformation rules that convert data elements of the intermediate data structure into corresponding elements in the text-based systems modeling language.

C4. The system of C3, wherein the transformation rules are defined in a grammar file that specifies mappings between elements of the intermediate data structure and elements of the text-based systems modeling language.

C5. The system of C4, wherein the grammar file is modifiable to accommodate updates in the text-based systems modeling language or changes in the intermediate data structure format.

C6. The system of C2, wherein the unparsing further includes validating the generated text-based representation against a schema or a set of rules defined for the text-based systems modeling language to ensure compliance with the language standards.

C7. The system of C6, wherein the validation includes checking for syntax errors, data type mismatches, and missing required elements in the text-based representation.

C8. The system of any of C1-C7, wherein transforming the modified version of the intermediate data structure comprises: updating an abstract syntax tree (AST) based on the modified version of the intermediate data structure; and traversing the AST to generate the modified version of the first snapshot in the text-based systems modeling language.

C9. The system of C8, wherein traversing the AST comprises: recursively visiting nodes of the AST; and for each visited node, generating corresponding text in the text-based systems modeling language based on the node type and attributes.

C10. The system of C8, wherein the system is further configured to: apply formatting rules during the traversal of the AST to generate properly indented and structured text in the text-based systems modeling language.

C11. The system of C8, wherein the system is further configured to: preserve comments and metadata associated with AST nodes when generating the modified version of the first snapshot.

C12. The system of any of C1-C11, wherein the system is further configured to: determine a type of the intermediate data structure, and parse the first snapshot into the determined type of the intermediate data structure, and transformation of the modified version of the intermediate data structure is selected based on the determined type of the intermediate data structure.

C13. The system of any of C1-C12, wherein transforming the modified version of the intermediate data structure comprises performing text injection to update the first snapshot based on changes in the modified version of the intermediate data structure.

C14. The system of C13, wherein performing text injection comprises: identifying specific locations in the first snapshot corresponding to modified portions of the intermediate data structure; generating text snippets in the text-based systems modeling language that represent the modifications; and inserting the generated text snippets into the identified locations in the first snapshot.

C15. The system of C14, wherein identifying specific locations in the first snapshot comprises utilizing line and column data associated with nodes in an abstract syntax tree (AST) representation of the first snapshot.

C16. The system of C13, wherein performing text injection further comprises: deleting portions of text in the first snapshot that correspond to removed or modified elements in the intermediate data structure; and replacing the deleted portions with updated text representing the current state of the intermediate data structure.

C17. The system of C13, wherein the system is further configured to: maintain a mapping between elements in the intermediate data structure and corresponding locations in the first snapshot; and use the mapping to determine where to perform text injections when transforming the modified version of the intermediate data structure.

C18. The system of C13, wherein the system is further configured to: perform syntax validation on the text-injected version of the first snapshot to ensure compliance with the text-based systems modeling language; and revert text injections that introduce syntax errors or inconsistencies.

C19. A computer-implemented method for modifying a model of a complex hardware system, the method comprising: obtaining, from a distributed version control system, a first snapshot of the model of the complex hardware system, the first snapshot being in a text-based systems modeling language; based on the first snapshot of the model of the complex hardware system, generating an intermediate data structure, the intermediate data structure being configured to be loaded and manipulated by an engineering application; storing the intermediate data structure in one or more memories; accessing a modified version of the intermediate data structure, wherein the modified version of the intermediate data structure is modified by the engineering application based on user inputs received via the engineering application; transforming the modified version of intermediate data structure, thereby generating a modified version of the first snapshot of the model of the complex hardware system, wherein the modified version of the first snapshot is in the text-based systems modeling language; and storing the modified version of the first snapshot of the model of the complex hardware system in the one or more memories.

C20. A non-transitory computer-readable medium storing instructions that, when executed by one or more processors, cause the one or more processors to perform operations for modifying a model of a complex hardware system, the operations comprising: obtaining, from a distributed version control system, a first snapshot of the model of the complex hardware system, the first snapshot being in a text-based systems modeling language; based on the first snapshot of the model of the complex hardware system, generating an intermediate data structure, the intermediate data structure being configured to be loaded and manipulated by an engineering application; storing the intermediate data structure in one or more memories; accessing a modified version of the intermediate data structure, wherein the modified version of the intermediate data structure is modified by the engineering application based on user inputs received via the engineering application; transforming the modified version of intermediate data structure, thereby generating a modified version of the first snapshot of the model of the complex hardware system, wherein the modified version of the first snapshot is in the text-based systems modeling language; and storing the modified version of the first snapshot of the model of the complex hardware system in the one or more memories.

D1. A system for modifying a model of a complex hardware system, the system comprising: one or more memories configured to store computer-executable instructions; and one or more processors configured to execute the computer-executable instructions, wherein the system is configured to: obtain, from a distributed version control system, a first snapshot of the model of the complex hardware system, wherein the first snapshot is in a text-based systems modeling language; based on the first snapshot of the model of the complex hardware system, generate an intermediate data structure, wherein the intermediate data structure is configured to be loaded and manipulated by an engineering application; store the intermediate data structure in the one or more memories; access a modified version of the intermediate data structure, wherein the modified version of the intermediate data structure is modified by the engineering application based on user inputs received via the engineering application; based on the modified version of the intermediate data structure, generate a modified version of the first snapshot of the model of the complex hardware system, wherein the modified version of the first snapshot is in the text-based systems modeling language; store the modified version of the first snapshot of the model of the complex hardware system in a staging environment; and in response to a commit input from a user, store, in the distributed version control system, the modified version of the first snapshot of the complex hardware system as a second snapshot of the first snapshot of the complex hardware system.

D2. The system of D1, wherein the system is further configured to: perform a comparison of the first snapshot of the model to the modified version of the first snapshot; and display changes between the first snapshot of the model and the modified version of the first snapshot.

D3. The system of D2, wherein displaying the changes includes applying syntax highlighting to emphasize modifications in the modified version of the first snapshot.

D4. The system of any of D1-D3, wherein the system is further configured to: perform a semantic analysis to determine significance of changes between the first snapshot and the modified version of the first snapshot in context of the overall model of the complex hardware system.

D5. The system of any of D1-D4, wherein the system is further configured to: calculate metrics for the first snapshot and the modified version of the first snapshot, wherein the metrics include at least one of: number of changes, complexity of changes, or adherence to predefined modeling standards.

D6. The system of any of D1-D5, wherein the system is further configured to: generate a graphical representation of the changes between the first snapshot and the modified version of the first snapshot.

D7. The system of any of D1-D6, wherein the system is further configured to: identify potential conflicts or inconsistencies introduced by changes between the first snapshot and the modified version of the first snapshot.

D8. The system of any of D1-D7, wherein the system is further configured to: create an audit trail of analyses performed on the first snapshot and the modified version of the first snapshot, including timestamps and user information.

D9. The system of any of D1-D8, wherein the system is further configured to: notify relevant stakeholders about updates made in the modified version of the first snapshot.

D10. The system of any of D1-D9, wherein the text-based systems modeling language is SysML v2.

D11. The system of any of D1-D10, wherein the staging environment allows for review and validation of modifications before they are committed to the distributed version control system.

D12. The system of any of D1-D11, wherein the system is further configured to: enable multiple users to simultaneously view and edit the first snapshot across different user environments.

D13. The system of any of D1-D12, wherein the system is further configured to: receive a merge request for the modified version of the first snapshot; perform a comparison between the modified version of the first snapshot and a target branch in the distributed version control system; generate a diff report highlighting differences between the modified version of the first snapshot and the target branch; and display the diff report to a user for review.

D14. The system of D13, wherein the system is further configured to: identify conflicts between the modified version of the first snapshot and the target branch based on the comparison; and provide options to resolve the identified conflicts.

D15. The system of D13, wherein the system is further configured to: apply automated merge rules to resolve non-conflicting differences between the modified version of the first snapshot and the target branch.

D16. The system of D13, wherein the system is further configured to: generate a preview of the merged result combining the modified version of the first snapshot and the target branch; and allow the user to review and approve the preview before finalizing the merge.

D17. The system of D13, wherein the system is further configured to: generate a graphical representation of the changes between the target branch and the modified version of the first snapshot; display the graphical representation in a user interface, wherein the graphical representation may include visual indicators highlighting added, deleted, or modified elements of the model.

D18. The system of D17, wherein the system is further configured to: provide interactive elements in the graphical representation that allow a user to navigate between different portions of the changes and access detailed information about specific modifications.

D19. A computer-implemented method for modifying a model of a complex hardware system, the method comprising: obtaining, by one or more processors, a first snapshot of the model of the complex hardware system from a distributed version control system, wherein the first snapshot is in a text-based systems modeling language; generating, by the one or more processors, an intermediate data structure based on the first snapshot, wherein the intermediate data structure is configured to be loaded and manipulated by an engineering application; storing the intermediate data structure in one or more memories; accessing, by the one or more processors, a modified version of the intermediate data structure, wherein the modified version is modified by the engineering application based on user inputs received via the engineering application; generating, by the one or more processors, a modified version of the first snapshot of the model of the complex hardware system based on the modified version of the intermediate data structure, wherein the modified version of the first snapshot is in the text-based systems modeling language; storing the modified version of the first snapshot of the model of the complex hardware system in a staging environment; and in response to a commit input from a user, storing, by the one or more processors, the modified version of the first snapshot of the complex hardware system in the distributed version control system as a second snapshot of the first snapshot of the complex hardware system.

D20. A non-transitory computer-readable medium having stored thereon computer-executable instructions that, when executed by one or more processors of a computer system, cause the computer system to perform a method for modifying a model of a complex hardware system, the method comprising: obtaining a first snapshot of the model of the complex hardware system from a distributed version control system, wherein the first snapshot is in a text-based systems modeling language; generating an intermediate data structure based on the first snapshot, wherein the intermediate data structure is configured to be loaded and manipulated by an engineering application; storing the intermediate data structure; accessing a modified version of the intermediate data structure, wherein the modified version is modified by the engineering application based on user inputs received via the engineering application; generating a modified version of the first snapshot of the model of the complex hardware system based on the modified version of the intermediate data structure, wherein the modified version of the first snapshot is in the text-based systems modeling language; storing the modified version of the first snapshot of the model of the complex hardware system in a staging environment; and in response to a commit input from a user, storing the modified version of the first snapshot of the complex hardware system in the distributed version control system as a second snapshot of the first snapshot of the complex hardware system.

E1. A system for modifying a model of a complex hardware system, the system comprising: one or more memories configured to store computer-executable instructions; and one or more processors configured to execute the computer-executable instructions, wherein the system is configured to: obtain, from a distributed version control system, a first snapshot of the model of the complex hardware system, wherein the first snapshot being in a text-based systems modeling language; based on the first snapshot of the model of the complex hardware system, generate an intermediate data structure, wherein the intermediate data structure is configured to be loaded and manipulated by an engineering application; store the intermediate data structure in the one or more memories; access a modified version of the intermediate data structure, wherein the modified version of the intermediate data structure is modified by the engineering application based on user inputs received via the engineering application; based on the modified version of the intermediate data structure, generate a modified version of the first snapshot of the model of the complex hardware system, wherein the modified version of the first snapshot is in the text-based systems modeling language; perform a comparison of the first snapshot of the model of the complex hardware system to the modified version of the first snapshot of the model of the complex hardware system, thereby generating a diff; and based on the diff, display changes between the first snapshot of the model of the complex hardware system and the modified version of the first snapshot of the model of the complex hardware system.

E2. The system of E1, wherein the system is further configured to: apply, by the client application, syntax highlighting and formatting to the modified version of the first snapshot to enhance readability.

E3. The system of any of E1-E2, wherein the system is further configured to: convert the highlighting and formatting in an intermediary representation for display on graphical or tabular representations of the modified version of the first snapshot of the model of the complex hardware system.

E4. The system of any of E1-E3, wherein the system is further configured to: obtain, by the client application, comments concerning the modified version of the first snapshot of the model of the complex hardware system to explain changes or provide context for the modifications.

E5. The system of any of E1-E4, wherein the system is further configured to: notify, by the client application, relevant stakeholders about updates made to the modified version of the first snapshot of the model of the complex hardware system.

E6. The system of any of E1-E5, wherein the system is further configured to: provide asynchronous design review.

E7. The system of any of E1-E6, wherein the system is further configured to: perform, by the client application, a semantic analysis to determine the significance of changes in the context of the overall system model.

E8. The system of any of E1-E7, wherein the system is further configured to: calculate, by the client application, metrics for each version of the systems modeling information.

E9. The system of any of E1-E8, wherein the system is further configured to: identify, by the client application, potential conflicts or inconsistencies introduced by changes across different versions.

E10. The system of any of E1-E9, wherein the system is further configured to: analyze, by the client application, the adherence of each version to predefined modeling standards or best practices.

E11. The system of any of E1-E10, wherein the system is further configured to: create, by the client application, an audit trail of all analyses performed, including timestamps and user information.

E12. The system of any of E1-E11, wherein the system is further configured to: receive a merge request to merge the modified version of the first snapshot with a second snapshot of the model of the complex hardware system; and initiate a merge process to combine the modified version of the first snapshot and the second snapshot.

E13. The system of E12, wherein the system is further configured to: display a merge interface comprising an overview of the merge request, including requester information, status of checks and approvals, and options for approving or rejecting the merge request.

E14. The system of E12, wherein the system is further configured to: display a commit history associated with the merge request, the commit history providing a chronological view of commits made to the system model.

E15. The system of E12, wherein the system is further configured to: display a pipeline interface showing stages of the merge process and their respective statuses.

E16. The system of E12, wherein the system is further configured to: perform an automated conflict detection to identify conflicts between the modified version of the first snapshot and the second snapshot.

E17. The system of E16, wherein the system is further configured to: display a review interface highlighting the identified conflicts and providing options for resolving the conflicts.

E18. The system of E12, wherein the system is further configured to: generate a merged snapshot by combining non-conflicting portions of the modified version of the first snapshot and the second snapshot; and store the merged snapshot in the distributed version control system.

E19. A computer-implemented method for modifying a model of a complex hardware system, the method comprising: obtaining, from a distributed version control system, a first snapshot of the model of the complex hardware system, wherein the first snapshot is in a text-based systems modeling language; based on the first snapshot of the model of the complex hardware system, generating an intermediate data structure, wherein the intermediate data structure is configured to be loaded and manipulated by an engineering application; storing the intermediate data structure in one or more memories; accessing a modified version of the intermediate data structure, wherein the modified version of the intermediate data structure is modified by the engineering application based on user inputs received via the engineering application; based on the modified version of the intermediate data structure, generating a modified version of the first snapshot of the model of the complex hardware system, wherein the modified version of the first snapshot is in the text-based systems modeling language; performing a comparison of the first snapshot of the model of the complex hardware system to the modified version of the first snapshot of the model of the complex hardware system, thereby generating a diff; and based on the diff, displaying changes between the first snapshot of the model of the complex hardware system and the modified version of the first snapshot of the model of the complex hardware system.

E20. A non-transitory computer-readable medium storing instructions that, when executed by one or more processors, cause the one or more processors to perform operations for modifying a model of a complex hardware system, the operations comprising: obtaining, from a distributed version control system, a first snapshot of the model of the complex hardware system, wherein the first snapshot is in a text-based systems modeling language; based on the first snapshot of the model of the complex hardware system, generating an intermediate data structure, wherein the intermediate data structure is configured to be loaded and manipulated by an engineering application; storing the intermediate data structure in one or more memories; accessing a modified version of the intermediate data structure, wherein the modified version of the intermediate data structure is modified by the engineering application based on user inputs received via the engineering application; based on the modified version of the intermediate data structure, generating a modified version of the first snapshot of the model of the complex hardware system, wherein the modified version of the first snapshot is in the text-based systems modeling language; performing a comparison of the first snapshot of the model of the complex hardware system to the modified version of the first snapshot of the model of the complex hardware system, thereby generating a diff; and based on the diff, displaying changes between the first snapshot of the model of the complex hardware system and the modified version of the first snapshot of the model of the complex hardware system.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for modifying a model of a hardware system, the system comprising:
one or more memories configured to store computer-executable instructions; and
one or more processors configured to execute the computer-executable instructions, wherein the system is configured to:
obtain, from a distributed version control system, a first snapshot of the model of the hardware system, wherein the first snapshot being in a text-based systems modeling language;
based on the first snapshot of the model of the hardware system, generate an intermediate data structure, wherein the intermediate data structure is configured to be loaded and manipulated by an engineering application;

store the intermediate data structure in the one or more memories;

access a modified version of the intermediate data structure, wherein the modified version of the intermediate data structure is modified by the engineering application based on user inputs received via the engineering application;

based on the modified version of the intermediate data structure, generate a modified version of the first snapshot of the model of the hardware system, wherein the modified version of the first snapshot is in the text-based systems modeling language;

perform a comparison of the first snapshot of the model of the hardware system to the modified version of the first snapshot of the model of the hardware system, thereby generating a diff;

based on the diff, display changes between the first snapshot of the model of the hardware system and the modified version of the first snapshot of the model of the hardware system;

receive a merge request to merge the modified version of the first snapshot with a second snapshot of the model of the hardware system; and initiate a merge process to combine the modified version of the first snapshot and the second snapshot.

2. The system of claim 1, wherein the system is further configured to: apply, by the engineering application, syntax highlighting and formatting to the modified version of the first snapshot to enhance readability.

3. The system of claim 2, wherein the system is further configured to: convert the syntax highlighting and formatting to an intermediary representation for display on graphical or tabular representations of the modified version of the first snapshot of the model of the hardware system.

4. The system of claim 1, wherein the system is further configured to: obtain, by the engineering application, comments concerning the modified version of the first snapshot of the model of the hardware system to explain changes or provide context for modifications for the modified version of the first snapshot.

5. The system of claim 1, wherein the system is further configured to: notify, by the engineering application, stakeholders about updates made to the modified version of the first snapshot of the model of the hardware system.

6. The system of claim 5, wherein the system is further configured to: provide asynchronous design review.

7. The system of claim 1, wherein the system is further configured to: perform, by the engineering application, a semantic analysis to determine an impact of the changes on overall system functionality and performance.

8. The system of claim 1, wherein the system is further configured to: calculate, by the engineering application, metrics for each snapshot of the model.

9. The system of claim 1, wherein the system is further configured to: identify, by the engineering application, potential conflicts or inconsistencies introduced by changes across different versions of snapshots of the model.

10. The system of claim 1, wherein the system is further configured to: analyze, by the engineering application, adherence of each snapshot of the model to predefined modeling standards or best practices.

11. The system of claim 1, wherein the system is further configured to: perform a semantic analysis to determine an impact of the changes on overall system functionality and performance; and create, by the engineering application, an audit trail of the analysis performed, including timestamps and user information.

12. The system of claim 1, wherein the system is further configured to: display a merge interface comprising an overview of the merge request, including requester information, status of checks and approvals, and options for approving or rejecting the merge request.

13. The system of claim 1, wherein the system is further configured to: display a commit history associated with the merge request, the commit history providing a chronological view of commits made to the system model.

14. The system of claim 1, wherein the system is further configured to: display a pipeline interface showing stages of the merge process and their respective statuses.

15. The system of claim 1, wherein the system is further configured to: perform an automated conflict detection to identify conflicts between the modified version of the first snapshot and the second snapshot.

16. The system of claim 15, wherein the system is further configured to: display a review interface highlighting the identified conflicts and providing options for resolving the conflicts.

17. The system of claim 1, wherein the system is further configured to: generate a merged snapshot by combining non-conflicting portions of the modified version of the first snapshot and the second snapshot; and store the merged snapshot in the distributed version control system.

18. A computer-implemented method for modifying a model of a hardware system, the method comprising:

obtaining, from a distributed version control system, a first snapshot of the model of the hardware system, wherein the first snapshot is in a text-based systems modeling language;

based on the first snapshot of the model of the hardware system, generating an intermediate data structure, wherein the intermediate data structure is configured to be loaded and manipulated by an engineering application;

storing the intermediate data structure in one or more memories;

accessing a modified version of the intermediate data structure, wherein the modified version of the intermediate data structure is modified by the engineering application based on user inputs received via the engineering application;

based on the modified version of the intermediate data structure, generating a modified version of the first snapshot of the model of the hardware system, wherein the modified version of the first snapshot is in the text-based systems modeling language;

performing a comparison of the first snapshot of the model of the hardware system to the modified version of the first snapshot of the model of the hardware system, thereby generating a diff;

based on the diff, displaying changes between the first snapshot of the model of the hardware system and the modified version of the first snapshot of the model of the hardware system;

receiving a merge request to merge the modified version of the first snapshot with a second snapshot of the model of the hardware system; and initiating a merge process to combine the modified version of the first snapshot and the second snapshot.

19. A non-transitory computer-readable medium storing instructions that, when executed by one or more processors, cause the one or more processors to perform operations for modifying a model of a hardware system, the operations comprising:

obtaining, from a distributed version control system, a first snapshot of the model of the hardware system, wherein the first snapshot is in a text-based systems modeling language;

based on the first snapshot of the model of the hardware system, generating an intermediate data structure, wherein the intermediate data structure is configured to be loaded and manipulated by an engineering application;

storing the intermediate data structure in one or more memories;

accessing a modified version of the intermediate data structure, wherein the modified version of the intermediate data structure is modified by the engineering application based on user inputs received via the engineering application;

based on the modified version of the intermediate data structure, generating a modified version of the first snapshot of the model of the hardware system, wherein the modified version of the first snapshot is in the text-based systems modeling language;

performing a comparison of the first snapshot of the model of the hardware system to the modified version of the first snapshot of the model of the hardware system, thereby generating a diff;

based on the diff, displaying changes between the first snapshot of the model of the hardware system and the modified version of the first snapshot of the model of the hardware system;

receiving a merge request to merge the modified version of the first snapshot with a second snapshot of the model of the hardware system; and initiating a merge process to combine the modified version of the first snapshot and the second snapshot.

\* \* \* \* \*